US005208748A

United States Patent [19]

Flores et al.

[11] Patent Number: 5,208,748

[45] Date of Patent: May 4, 1993

[54] METHOD AND APPARATUS FOR STRUCTURING AND MANAGING HUMAN COMMUNICATIONS BY EXPLICITLY DEFINING THE TYPES OF COMMUNICATIONS PERMITTED BETWEEN PARTICIPANTS

[75] Inventors: Carlos F. Flores, Berkeley, Calif.; Juan J. Ludlow, Mexico City, Mexico; Chauncey F. Bell, III, Alameda, Calif.; Raul M. Mora, Tlalpan, Mexico; Terry A. Winograd, Stanford; Michael J. Graves, Alameda, both of Calif.

[73] Assignee: Action Technologies, Inc., Alameda, Calif.

[21] Appl. No.: 368,179

[22] Filed: Jun. 19, 1989

Related U.S. Application Data

[63] Continuation-in-part of Ser. No. 798,904, Nov. 18, 1985, Pat. No. 5,157,003.

[51] Int. Cl.[5] .............. G06F 15/42

[52] U.S. Cl. .............. 364/419

[58] Field of Search .............. 364/419

*Primary Examiner*—Gail O. Hayes

*Attorney, Agent, or Firm*—Blakely, Sokoloff, Taylor & Zafman

[57] ABSTRACT

A method for managing communications between individuals utilizing a programmed computer system. The method involves several definitional steps that are critical to achieving a practicable methodology for conversation management. The integrated concepts of "moves in conversations" of two basic types (Conversation for Action and Conversation for Possibilities), conversational roles, types of incompletions, and logical/functional relationships between moves, incompletions, and roles, provide a set of constructs on which a powerful and practicable methodology for conversation management may be built. They provide a basis for defining a meaningful conversation record format which can be integrated into a conversation data base using standard data base building and management tools. A system for managing communications which incorporates the methodology of this invention provides a powerful framework for structuring human conversations. The method further involves creating a body of recommended declarative text for each move which the participant may include in the message as part of the data elements of the move. The method also features a variety of conversation database access facilities using different record sort or collection criteria including the individual incompletions, the domains of the conversation, the participants, and dates. The invention and the conversation record management and retrieval which it facilitates enables time and date commitments related to calendar activities, such as meeting schedules, appointments and appointments and the like, to be integrated into the database.

19 Claims, 40 Drawing Sheets

1 $P^2$:ANSWER/REPORT DONE
2 $P^2$:DECLINE DELEGATION
3 $P^1$:CANCEL DELEGATION

4 R:THANK YOU→FINAL STATE
R:CANCEL→CANCEL STATE

5 $P^1$:DECLINE→DECLINE STATE
$P^1$:CANCEL→DECLINE STATE

METHOD AND APPARATUS FOR STRUCTURING AND MANAGING HUMAN COMMUNICATIONS BY EXPLICITLY DEFINING THE TYPES OF COMMUNICATIONS PERMITTED BETWEEN PARTICIPANTS

CROSS REFERENCE TO RELATED APPLICATIONS

This application is a continuation-in-part of Flores et al. U.S. patent application Ser. No. 798,904, filed Nov. 18, 1985, now U.S. Pat. No. 5,157,003 and entitled "Method For Managing Human Communications Utilizing a Programmed Computer System."

BACKGROUND OF THE INVENTION

1. Field of the Invention

This invention relates generally to methods for facilitating and managing communications between individuals who are involved in a community of action or purpose. In one sense, aspects of the invention relate to such fields as electronic mail, word processing, data base management and other methods for facilitating the transaction of business between individuals and the management of data and communications related to such transactions.

In another, more important sense, this invention is a pioneering one which establishes a new field of managing business, social and personal communications by integrating state of the art computer and communication tools and methodologies within a new conceptual and methodological framework: managing communications by treating them as moves in conversations in a structured context which encourages participants to carry out their communications in a more meaningful, organized manner and promotes completion of conversations to the satisfaction of all of their participants.

This invention is based on the development of a precise and rigorous language of distinctions which is valid for observation and interpretation of what is happening in the whole gamut of human conversation and simultaneously forms the basis for a method for supporting, enhancing, and coordinating human conversation which can be carried out in a variety of computer and communication system environments.

2. Description of the Prior Art

1. Electronic Mail

The earliest tools for generating utterances, including both spoken and written manifestations of language, were writing implements, from the quill to the typewriter, to the modern word processor. None of these devices operate in accord with what speakers do in language, that is, with what speakers except or hope to accomplish with their utterances. They deal only with the form of utterances, as sequences of letters, figures, typographical marks, etc. There is no communication management, no helpful machine/human interaction which facilitates accomplishment of the purposes and goals of the communications being prepared.

Many devices have been invented for transmitting visible sequences of marks or audible sounds from one place to another, from the postal service to telephony, facsimile, and more recently, electronic mail systems.

A person who composes an utterance does so within a certain background of understanding as to what is being done. In the current prevalent practice in electronic mail, the relevant structure is the identification of sender and receiver and the times and places of sending and receipt, along with an unstructured natural-text phrase used by readers to identify and group the messages. The user of such a system is provided with choices of action that can be described in terms of this basic "who-where-when" structure. For example, the "Answer" option which is provided in many systems allows a response to be sent to the original sender, while "Forward" sends a copy of the message to a third party.

Some electronic mail systems incorporate various file management facilities such as assigning keyword attributes to files for automated retrieval, automatic aging of files to eliminate old messages, and sorting based on individual or combinational criteria such as sender, date, and the like. The effective use of these facilities is dependent on the ability of the user to integrate these facilities into a personal framework of organization of the work that the person does and the communications related to that work.

Electronic mail systems do not limit or structure the kinds of messages that may be sent, in accordance with either the content or context of previous messages. In particular, there is no assistance providing in structuring the flow of communications toward accomplishment of goals and results. The management of the communications is essentially left to the discretion and ability of the users of the system.

2. Computerized Procedure Management Systems (Systems for Managing Performance of Specified Tasks)

Some system designers have recognized the opportunity to use electronic computer and communication tools to facilitate and organize communications within organizations concerning standard procedures and standard forms. The simplest and most prevalent implementation of repetitive communications is with "forms" in the standard business sense. The existence of tools like a "purchase order" or an "invoice" derives from the existence of certain recurring communications (getting a supplier to send goods, requesting payment, etc.) in which the collection and transmission of relevant details has the same structure each time. Paper-based forms have been developed over centuries, and computer-based forms are prevalent in the current data-processing art.

In addition to standardized forms, there can also be standardized "procedures" in which a sequence of actions follows a regular pattern. For example, the standard procedure in a particular office on receipt of a purchase order can be to send one copy to the billing department, and on receipt of a credit authorization to send another copy to the shipping department. Such procedures have long been codified for human implementation in all kinds of organization.

Computer technology makes it possible to automate forms generation, processing and communication by embedding them as programs in data processing systems. Many computer systems, such as point of sale terminals, automated banking systems, inventory control systems, embody such procedures. A person using such a system communicates within the strict framework of the system and the limited options presented in accordance with the procedures embodied in the computer system. For example, on receiving a purchase order, a user's options may be to "send it through" or "refer it to accounting for a credit check."

3. Conversation Management Theory

In a 1981 Ph.D. thesis entitled "Management and Communication in the Office of the Future", Fernando Flores proposes a "theory of commitment and conversation" which "allows us to provide new guidelines for examining work in an office or organization." The thesis also contains suggestions for design of a prototype system for coordinating conversations based on a speech act model of conversations. This theoretical work provides a foundation for considering new approaches to use of electronic computer and communication technology to manage the flow of communications within a conversational network, but it does not provide a complete, practicable methodology for carrying out management of conversations.

The Flores thesis does not suggest an overall methodology which provides for managing conversations for declaring specific realizable possibilities as distinct from coordinating conversations related to commitments for some specific action. It does not address the concept of "permitted moves" in conversations of various types in various states with various starting and ending "incompletions" and depending upon the "role" of the participant. There are only limited suggestions in the Flores thesis of constructing and managing a data base of conversations and these do not provide a practicable methodology.

SUMMARY OF THE INVENTION

1. Objects of the Invention

It is the principal object of this invention to provide improved apparatus and methods for managing electronic communications among humans utilizing electronic computer and communications systems.

It is another object of this invention to provide apparatus and methods for managing electronic conversations between individuals within a community of participants on the basis of a methodology which is structured but adaptable to different types and categories of conversations.

It is another object of this invention to provide apparatus and methods for managing electronic conversations for action of the request and offer type within a structured conversational protocol of permitted moves which comprise a highly useful level of modelling of business and social conversational interaction.

It is another object of this invention to provide apparatus and methods for managing electronic conversations which incorporates a number of convenient methodological tools for initiating conversations, selecting conversations for making electronic moves, and tracking commitments and incompletions.

It is another object of this invention to provide apparatus and methods for managing electronic conversations in which an individual participant includes a plurality of other principal participants in the conversation.

It is another object of this invention to provide apparatus and methods for managing electronic conversations among a multiplicity of participants using distributed conversation data bases for the participants and separate management of conversation states and incompletions for each participant.

It is another object of this invention to provide apparatus and methods for managing moves in electronic conversations and enclosures attached to moves in an integrated conversation management and conversation data base arrangement.

It is another object of this invention to provide apparatus and methods for managing electronic conversations in which delegation of actions to complete declared possibilities are managed in a conversation with compound states.

It is another object of this invention to provide apparatus and methods for managing electronic conversations in which a generic set of protocols are employed to provide basic compatibility between systems employing different specific conversational protocols falling within protocols of the generic set.

It is another object of this invention to provide apparatus and methods for managing electronic conversations which simplify the management of a large number of conversational protocols.

2. Features and Advantages of the Invention

This invention features a method for managing communications between individuals utilizing a programmed computer system. The method involves several definitional steps that are critical to achieving a practicable methodology for conversation management. Preferred implementations of these definitional steps lead to a breakthrough in flexibility and performance of methods for coordinating business and social communications. These definitional steps are the following:

a. defining all communications between a set of participants as moves in conversations for declaring specific realizable possibilities or as moves in conversations for producing actions to complete specific possibilities;

b. defining said conversations as taking place within a set of declared or understood domains of possibilities;

c. defining a set of conversational roles played by participants in said conversations, with each participant playing at least one conversational role in any said conversation;

d. defining a set of types of incompletions which occur recurringly within said conversations, including a first type in which a conversational move by at least one participant to declare at least one specific realizable possibility is missing, and a second type in which a conversational move by at least one participant to complete a specific realizable possibility is missing;

e. defining a set of types of permitted moves in conversations on the basis of said defined incompletions, said defined roles, and the specific types of incompletions produced by said permitted moves;

f. defining for each of said types of moves a set of associated data; and g. defining a conversation record format for said conversations comprising identities and roles of participants, incompletions, and a pre-defined body of data associated with each move of the conversation, including the type of move.

The integrated concepts of "moves in conversations" of two basic types (Conversation for Action and Conversation for Possibilities), conversational roles, types of incompletions, and logical/functional relationships between moves, incompletions, and roles, provide a set of constructs on which a powerful and practicable methodology for conversation management may be built. They provide a basis for defining a meaningful conversation record format which can be integrated into a conversation data base using standard data base building and management tools. More specifically, they are a foundation for establishing a conversation management program with powerful, yet easy to use features for initiating conversations, selecting and making moves in conversations, and automating conversation record management.

The basic methodological steps of the conversation management program of this invention comprise the following:

h. establishing a conversation management program for enabling interactive computer-controlled management of each of a plurality of said conversations including the steps of:

(1) providing facilities for use of each participant in opening a new conversation with an initial move and entering data associated therewith;

(2) creating a new conversation record for each said new conversation by assembling said entered data according to said conversation record format, including said incompletions produced by said initial move and said entered data, and storing said new conversation record in at least one file;

(3) providing facilities for use of each participant in selecting an existing conversation in which to make a move;

(4) deriving from said definition of types of permitted moves and said conversation record corresponding to said selected conversation the set of currently permitted moves consistent with the role of the said participant in said selected conversation;

(5) providing facilities for use of said participant in selecting and making a move from said set of permitted moves in said selected conversation, and entering data associated with said move;

(6) updating said stored conversation record associated with said selected conversation as said participant makes said permitted move, said updating including storing data associated with said permitted move and said types of incompletions produced by said permitted move; and (7) providing facilities for use of each participant to review new moves by other participants in all conversations in which said participant plays a conversational role.

A system for managing communications which incorporates the methodology of this invention provides a powerful framework for structuring human conversations. This framework facilitates more effective communication and leads to consistent achievement of results and goals. The methodology permits standard data base and file management technologies to be integrated simply and effectively into the organizing and structuring of conversation records for instantaneous retrieval of data which is critical to tracking the status of a conversation and any commitments to action which it involves. Participants using systems which incorporate the methodology of this invention are effectively enabled to organize virtually their entire flow of work, including the commitments which it involves, around the facilities which the conversation management program provides. This produces a coherent framework, leading to consistency and clarity in communications. The inevitable result is a dramatic overall improvement in productivity.

A preferred embodiment of the method of this invention includes a number of features which greatly enhance its utility to the participants in a conversational network. Preferably the step of defining permitted moves includes selecting a name for each move which distinguishes the character of the move to the community of participants involved. The permitted moves are displayed to the participant in a menu and selection is made from that menu. This provides direct coaching to the participant on the moves that can be made and facilitates meaningful and effective move selection.

A further level of coaching on the meaning of the different permitted moves can be provided by help text associated with each move which can be accessed from the same menu display of permitted moves. The method of this invention further involves creating a body of recommended declarative text for each move which the participant may include in the message as part of the data elements of the move.

The method of this invention also features a variety of conversation data base access facilities using different record sort or collection criteria including the individual incompletions, the domains of the conversation, the participants, and dates, in cases where incompletion are recorded in the form of date tokens. These facilities make it convenient to extract lists of conversations, both for review of the status of the conversations and the selection of a conversation in which to make a next move permitted to that participant.

The method of this invention and the conversation record management and retrieval which it facilitates enables time and date commitments related to calendar activities, such as meeting schedules, appointments and the like, to be integrated into the data base. This data can then be extracted along with other commitments due on a particular date to produce an integrated display of all commitments associated with that date.

Other objects, features and advantages will be apparent from the detailed description given below of the method of this invention and embodiments of systems which incorporate the method of this invention.

2. Features and Advantages of the Invention

One aspect of this invention features a machine-implemented method for managing business, social, and/or personal communications in which a communication among a set of participants is treated as a move in one of a first type of conversation for declaring specific realizable possibilities and a second type of conversation for producing action to complete a specific declared possibility. The method utilizes a computer system including a user input/output interface and a record storage system.

The method is based on a predefined set of conversational roles played by participants in said conversations, with each participant playing at least one conversational role in any one of said conversations.

The method is further based on a preselected set of types of incompletions which occur recurringly within said conversations, including a first type in which a conversational move by at least one participant to declare at least one specific realizable possibility is missing, and a second type in which a conversational move by at least one participant to complete a specific realizable possibility is missing. Other types of recurring incompletions are missing response, move alerts and schedule alerts.

The method is also based on a set of types of permitted moves for each of said first type of conversation and said second type of conversation, including at least one predefined initial type of move and subsequent types of moves preselected on the basis of a functional relationship among said types of incompletions, said conversational roles, and a specific subset of said types of incompletions produced by each of said initial and subsequent types of moves.

The method utilizes a preselected set of associated data for each of said initial and subsequent types of moves, and a predefined conversation record format for each of said conversations comprising identities and roles of participants, incompletions, and a pre-defined body of data associated with each move in the conversation, including the type of move.

The integrated concepts of "moves in conversations" of two basic types (Conversation for Action and Conversation for Possibilities), conversational roles, types of incompletions, and logical/functional relationships between moves, incompletions, and roles, provide a set of constructs on which a powerful and practicable methodology for conversation management may be built. They provide a basis for defining a meaningful conversation record format which can be integrated into a conversation data base using standard data base building and management tools. More specifically, they are a foundation for establishing a conversation management program with powerful, yet easy to use features for initiating conversations, selecting and making moves in conversations, and automating conversation record management.

A preferred version of the method of this invention employs the following steps:

a. presenting to one participant via said user input/output interface device a selection menu comprising menu elements for selecting one of Task 1 comprising opening a new conversation of one of said first type and second type, Task 2 comprising selecting an existing conversation in which to make a subsequent type of move, and Task 3 comprising reviewing one of all initial types of moves and subsequent types of moves by other participants in all converstions in which said one participant plays one of said conversational roles;

b. responding to a selection by said one participant of said Task 1 via said interface device by performing a sequence of steps comprising:

b.1. prompting said one participant via said interface device to select an initial move in one of said first and second types of conversations;

b.2. prompting said one participant via said interface device to enter said set of associated data for said selected initial move; and b.3. responding to entry of said set of associated data by creating and storing in said record storage system a new conversation record corresponding to said conversation record format, including said associated data and said types of incompletions produced by said selected initial type of move;

c. responding to a selection by said one participant of said Task 2 via said interface device by performing a sequence of steps comprising:

c.1. deriving from said stored conversation record of said selected existing conversation a subset of said set of moves comprising currently permitted moves for said one participant;

c.2. prompting said one participant via said interface device to select one of said currently permitted moves;

c.3. prompting said one participant via said interface device to enter said set of associated data for said selected one of said currently permitted moves; and c.4. responding to entry of said set of associated data by updating and storing in said record storage system said conversation record corresponding to said selected conversation, including said associated data and said types of incompletions produced by said selected one of said currently permitted moves;

d. responding to a selection by said one participant of said Task 3 via said user input/output interface device by presenting to said one participant via said interface device at least a portion of each of said sets of associated data corresponding to each of said initial types of moves or subsequent types of moves in one of a time sequence of data presentations corresponding to each said existing conversation and a list of simultaneous data presentations for a plurality of said existing conversations.

A system for managing communications which incorporates the methodology of this invention provides a powerful framework for structuring human conversations. This framework facilitates more effective communication and leads to consistent achievement of results and goals. The methodology permits standard data base and file management technologies to be integrated simply and effectively into the organizing and structuring of conversation records for instantaneous retrieval of data which is critical to tracking the status of a conversation and any commitments to action which it involves.

Participants using systems which incorporate the methodology of this invention are effectively enabled to organize virtually their entire flow of work, including the commitments which it involves, around the facilities which the conversation management program provides. This produces a coherent framework, leading to consistency and clarity in communications. The inevitable result is a dramatic overall improvement in productivity.

A preferred embodiment of the method of this invention includes a delegate move which can be made in selected types of conversations to open a subsidiary delegate conversation with separate tracking of the state and incompletions of that conversation but with all moves in that conversation linked to the main conversation in the data base of the participants receiving the moves. This feature greatly expands the performance of conversation management within the business management context in which delegations of responsibility to other team members is a regular occurrence.

A preferred embodiment of the method of this invention further includes an enclosure management feature which is implemented by maintaining in the conversation data base a record of the current storage location of all files which have been sent or received as enclosures. Facilities are provided for accessing an enclosure file at the time that the move to which it is attached is selected from a list of conversations in the data base. This feature, along with the move tracing feature of the invention, creates an expert file tracking feature which can be used to track changes in documents being worked on by participants in a conversation.

A preferred embodiment of this invention includes group conversation protocols in which a participant can direct a Request or Offer of other initial moves in a conversation to a plurality of other participants. Conversation management of group conversations utilizes a separate set of finite state machines to separate the management of states and incompletions in the conversation data bases of the opening participant and the other participants. This gives each of the multiple participants effective management of that participants side of the overall conversation without confusing the participant that initiated the convversation.

A preferred embodiment of the method of this invention includes a number of other features which greatly enhance its utility to the participants in a conversational network. Preferably the step of defining permitted moves includes selecting a name for each move which distinguishes the character of the move to the community of participants involved. The permitted moves are displayed to the participant in a menu and selection is made from that menu.

This provides direct coaching to the participant on the moves that can be made and facilitates meaningful and effective move selection.

A further level of coaching on the meaning of the different permitted moves can be provided by help text associated with each move which can be accessed from the same menu display of permitted moves. The method of this invention further involves creating a body of recommended declarative text for each move which the participant may include in the message as part of the data elements of the move.

The method of this invention also features a variety of conversation data base access facilities using different record sort or collection criteria including the individual incompletions, the domains of the conversation, the participants, and dates, in cases where incompletion are recorded in the form of date tokens. These facilities make it convenient to extract lists of conversations, both for review of the status of the conversations and the selection of a conversation in which to make a next move permitted to that participant.

The method of this invention and the conversation record management and retrieval which it facilitates enables time and date commitments related to calendar activities, such as meeting schedules, appointments and the like, to be integrated into the data base. This data can then be extracted along with other commitments due on a particular date to produce an integrated display of all commitments associated with that date.

Another aspect of this invention features apparatus for managing an electronic conversation between at least a first and a second participant with said electronic conversation being defined by a set of assigned roles for said participants, a set of unique conversation states including an initial state and a final state with each of said states being defined in accordance with a prearranged set of incompletions represented by token data elements, and a set of permitted moves for each of said participants including an initial move. The apparatus comprising conversation opening means for providing a first participant with a facility to open an electronic conversation with at least a second participant by selecting an initial electronic move, including means for recording in a conversation record associated with each of said participants prearranged data elements including said assigned roles, a conversation state consisting of said initial state, and a set of token data elements comprising incompletions based on said assigned roles and said initial electronic move.

The apparatus further comprises conversation continuing means for presenting to one of said participants a list of permitted electronic moves in said electronic conversation based on data elements in said conversation record, including said assigned role of said one participant and said conversation state, and for responding to and recording a move selected by said one participant from said list, including means for updating said conversation record based on said selected electronic move with a conversation state comprising the current conversation state after said selected electronic move and a set of token data elements comprising current incompletions after said selected electronic move.

The apparatus of this invention features the use of stored finite state machine tables wherein a basic set of permitted moves for each participant is listed along with state and token transition information for each of such moves.

The apparatus of this invention further features the use of distributed conversation data bases for the individual participants in the electronic conversation and the provision for a delegate move which produces a subconversatin within the main conversation and compound conversation states associated with the main and subconversation. Separate token records of incompletion are kept for the main and subconversation but move records for the two conversations are maintained in a single conversation record so that all moves in both are available for tracing.

The apparatus of this invention further includes, in combination with the distributed data bases feature, a conversation data base management means which includes means for designating and recording plural principal participants in connection with the initial move of the conversation together with means for individually managing the state transitions and tokens of incompletion of the plural participants in their individual, distributed conversation data bases and with separate means for managing state transitions and tokens of incompletion of the participant opening the multiple participant conversation. In this way, meaningful conversation state information is maintained for each of the participants without requiring commonality of states in all of the conversation data bases of the participants.

The conversation data base management means of this invention further includes means for attaching participant selected files and enclosures with electronic moves for transport with the move, means for recording file name information on both sent and received enclosures in the conversation data bases of all participants to the conversation, and means for accessing the enclosure attached to each move at the time the move is retrieved from the conversation data base and displayed to the participant.

In one embodiment of the apparatus of this invention, plural conversations of the same generic type are provided, e.g. Request and Question with Question being a more primitive form of the Request type of conversation, and different move names are provided in the different conversations. In this embodiment the conversation management means of this invention further includes means for storing in the conversation data base both the actual type of conversation based on the initial move and the generic type of conversation and means for storing in the conversation data base move records that include both the actual move name and the generic move name. Means are also provided for placing both the actual move name and the generic move name in fields of the move message text that is sent to other participants. Incoming move processing means are provided for selecting one of these two move names based on looking up the actual move name in a Move Definition Table and using that actual move name if it is in that Table or defaulting to use of the generic move name if the actual move name is not in the Move Definition Table. This provides basic conversation management compatibility between different versions of conversation manager systems that share the same prselected generic conversation types and generic move names but different specific types of convesations and moves within the generic types.

The apparatus of this invention further includes specific means for implementing the additional features of the invention that are described above in connection with the method aspects of this invention.

Other objects, features and advantages will be apparent from the detailed description given below of the method of this invention and embodiments of systems which incorporate the method of this invention.

GENERAL METHOD OF THIS INVENTION

Figure 1:
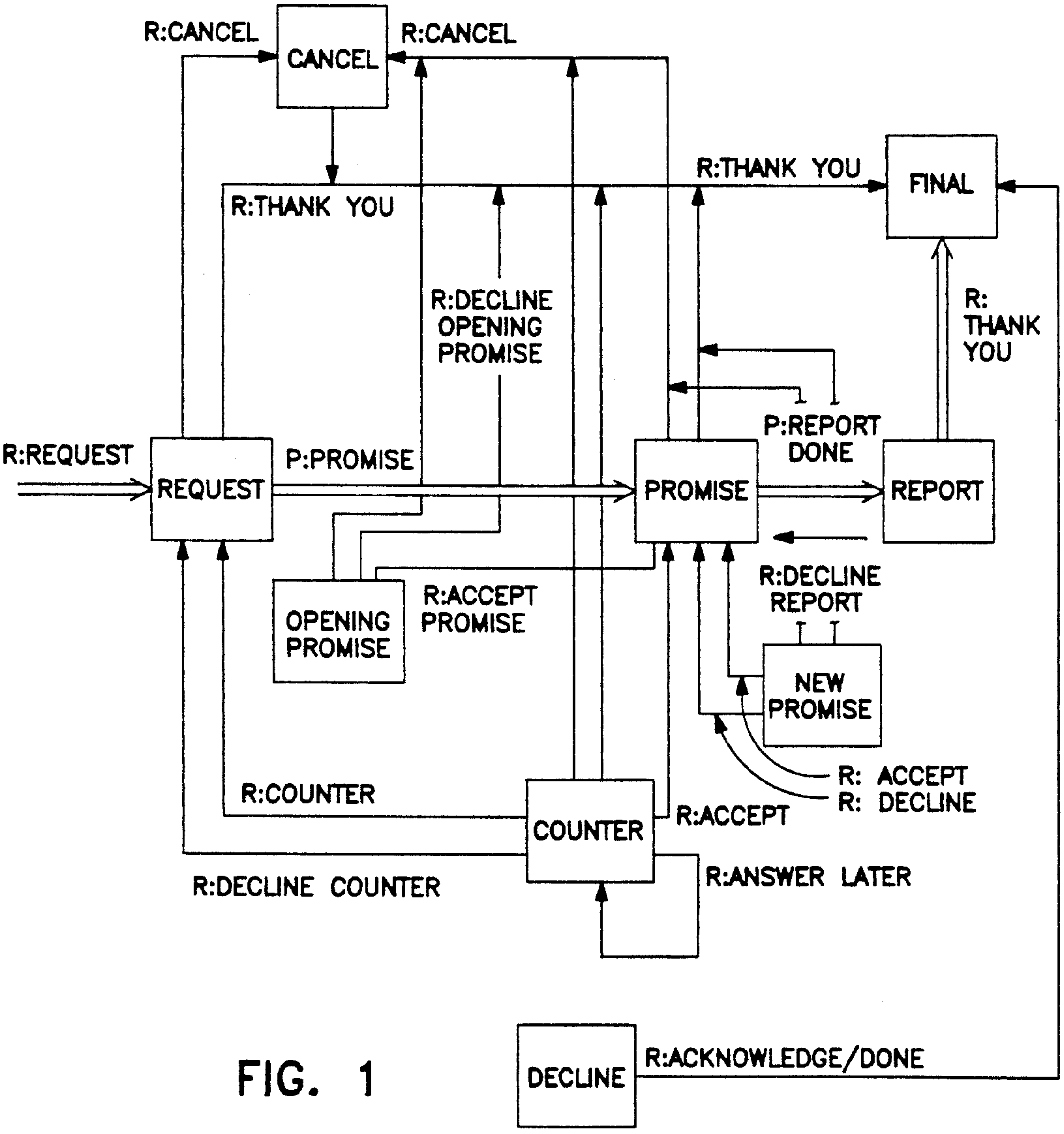
FIGS. 1-24 are schematic diagrams illustrating the structure and operation of a finite state machine implementation of conversation management apparatus and methods in accordance with one embodiment of this invention.

This invention comprises a machine-implemented method for managing business, social and personal communications utilizing a programmed computer system. The method of this invention may also use electronic telecommunication apparatus in certain embodiments for carrying out the method in specific hardware environments. The method of this invention comprises a powerful, new management tool which can be configured in a variety of ways, in systems and circumstances with different degrees of complexity, to achieve productivity increases and other advantages within the business and social environment of the participants using systems which employ the method. The method is based on making records of communications among a set of participants employing a computer system. These records are made and recorded as "moves" in conversations with a pre-defined structure. The invention utilizes two such structures, one called "conversation for action" and one "conversation for possibilities". The basic structure of these two conversation types is universal and constitutes a part of the method of this invention. Other aspects, such as particular words associated with the conversations and their parts, are culturally specific and are configurable and adaptable in the preferred implementation.

A "participant" is an entity capable of producing a communication (a "move") within the computer system, which triggers the storage of an element in one or more data storage locations in the form of a conversation record. Each record of a "move" is identified with a particular participant that produced it, and others who are involved in the conversation and will receive it. For this purpose, the identified participant can be an organization, group, or institution, with some person authorized by that entity actually using the computer system on its behalf. Talking about a "set of participants" means one or more participants. This includes the potential for only one participant, in which the system is used for communications with oneself, in order to activate the facilities of the system for tracking and managing conversations.

In speaking of a "communication" or a "move in a conversation" human communicative acts are characterized in two dimensions. In the "systems dimension," a communication is constituted by some specific transmission or storage of a data record within the computer system. In the "human dimension," an interpretation of some physical act is referred to as constituting a particular type of move in the conduct of conversations. This does not necesarily imply a computer system: a person can make a conversational move by speaking, writing, or even gesturing, as well as making use of computer devices. A key feature of the invention is the structuring of the communications in the systems dimensions according to their standard interpretations in the human dimension.

In speaking of "moves," particular steps are referred to in the sequence of acts that constitute a conversation between people. This is analogous to the moves in a game, such as chess, which follow one after the other according to certain rules that determine which possibilities are legal at a given moment, and which lead to certain kinds of "completion" of the game. This invention is based on identifying two universal kinds of "conversation game" which form a large part of human action-oriented communication. The rules and moves of these "games" serve as the structure for defining the elements and operations of the communications system which is the invention.

The first kind of conversation is a "conversation for possibilities" (or CFP) in which the participants are seeking to identify (but not yet to carry out) some agreement or understanding of a result, goal, or objective of mutual interest. The moves in this conversation are oriented to the generation, refinement, assessment, and discussion of possible actions. The desired outcome of the game is the specification of possible actions which will then be the subject of conversations for action (see below).

A typical example might be a discussion between the President of a company and the Chairman of the Board of Directors about the desirability of expanding company business into a new product area, either by acquiring an existing business or alternatively by developing a new product directly. Neither participant is asking or expecting any specific action by the other in the initial conversation or conversations, except for the actions necessary to continue the conversation itself—for example, speaking when spoken to, and answering each other's questions. In ordinary parlance the communications that constitute these conversations are referred to as articulations of "thoughts", "ideas", "feelings" and the like. In the method of the invention, this type of conversation is regarded as a series of moves in a conversation, each of which moves is, in the moment of its being made, relevant to the possibilities that participants are concerned with developing or bringing forth in their conversation. The conversation itself is, without necessarily being explicitly declared so, oriented to the goal of declaring specific relevant and relizable possibilities for subsequent action. The primary conversational moves in this type of conversation may be interpreted as consisting in making assessments, spoken and listened to by the participants, of directions open or possible for action, in making speculations about alternative directions, and in the making of declarations about, and assessments about the declarations of possibilities made in the conversation.

The second kind of conversation, the "conversation for action" (CFA) is a conversation oriented towards commitment and completion of actions by one party at the behest of another (which in the one participant case will be him or herself). The moves in this conversation produce commitment to action, and declarations of completion of the "conditions of satisfaction" which were committed to. For example, a company president might open a CFA with a request that the company vice president provide an estimate of the cost of developing a new product internally. The subsequent moves include possibilities for the vice president to commit to providing it (or decline to do so) and to report that it is complete. The possibilities for the president include accepting the report, declining it, and withdrawing the request.

Management and business conversations include both CFPs and CFAs, intermixed. The methodology of the invention has the capability to handle this intermixture in the way that the moves are made using the communications capacities of the computer system. The operational interface provides means for creating communications that represent moves, and for accessing and reading them according to the conversation structure.

Associated with each type of conversation there are defined standard conversational roles to be played by the participants (the different "players in the game")~-with each participant playing at least one conversational role in any conversation.

For the purpose of the invention (in the system dimension), what is effective about roles is that the moves that are open to a participant at any time depend only on his or her designated role(s), and the history of previous moves. In the human dimension, roles are often associated with complex contextual relationships of authority and control, which depend on the purposes of the conversation. Such relationships are not of concern in the functioning of the invention, which deals only with a small number of universal predefined roles associated with each conversation type, as specified in the description of the mechanism.

In defining a conversation, specific classes of "incompletions" are identified which correspond to things not yet achieved in the conversation. When a conversation is started these "incompletions" are activated, i.e., specific records for the "incompletions" are created. For example, when a request has been made, the conversation is missing a commitment to fulfill the request, and also is missing a response indicating that the request was received for consideration by the person to whom it was addressed, who may respond by declining, counteroffering, or the like, as well as by accepting. A move can fulfill an incompletion. For example, a response in which the recipient of a request sends a counter-offer fulfills the incompletion of responding, but not the one of committing. A response accepting the request fulfills both. In general a correspondence can be defined between incompletions and moves, in which the current set of incompletions determines the possible moves for each role, and each move can potentially fulfill some incompletions and/or create others.

The method of this invention is further based on a preselected set of types of permitted moves in conversations on the basis of the defined incompletions, the defined roles, and the specific types of incompletions produced by the permitted moves.

The "permitted move" concept lies at the heart of the method of this invention and the structuring of a system in which participants may construct for themselves conversations which are consistent with the possibilities and actions developed within those conversations in a meaningful way. "Permitted" here is used in the sense of constraint, that is the participants cannot make a move which is not permitted. Different types of conversations have different and particular incompletions and patterns of incompletions, and specific moves have the effect of completing those incompletions for participants in different roles. This will be clear from the examples given below.

The relationship of moves and incompletion provides the basis for the functioning of the central aspects of the invention. When a participant wants to initiate a conversation, the device presents a set of choices and prompts that lead the user to specify the conversation type, incompletion details (such as the time for completions) and the associated roles. This is encoded in the message and record structure as entered into the machine, and transmitted to the other participants. When a participant responds to a communication in a particular conversation, the device presents alternative possible moves, based on the conversation type, the participant's role and the state of the incompletions. Each time a move is made, the invention updates the records of the conversation and its incompletions, and also provides a structure for participants to query the records and find out about the existance and state of incompletions, and further details of existing conversations. The actual mechanisms for data storage and state transition are not specific to the invention. The new invention lies in using the universal structure of conversations and conversational moves as the basis for generating, storing and organizing sequences of communications.

The set of moves and incompletions that define a particular conversation type (a "conversational game") can be very general, or can be specific to a particular kind of activity, such as fulfilling an order, with possibilities for back-orders, partial deliveries, substitutions of goods, etc. The method allows for the creation and use of special-purpose conversation types, which are defined to suit particular conversations in a particular organization, and also includes a set of very general types, based on the two fundamental conversation types (CFP and CFA) described above. So far moves have been defined in terms of the sets of possibilities and the incompletions they affect. In addition, there can be data associated with a move, which is communicated and stored in the computer system. There can be a specific kind of data associated with each type of move in a type of conversation, and this data is managed in a database that is interlinked with the recording of the conversation structure of moves and incompletions. The invention does not propose specific data formats, but is concerned with the way that data is crosslinked with the conversation structure.

The method steps employed begin with presenting to one participant via said user input/output interface device a selection menu comprising menu elements for selecting one of Task 1 comprising opening a new conversation of one of said first type and second type, Task 2 comprising selecting an existing conversation in which to make a subsequent type of move, and Task 3 comprising reviewing one of all initial types of moves and subsequent types of moves by other participants in all converstions in which said one participant plays one of said conversational roles.

The method of this invention further involves responding to a selection by said one participant said Task 1 via said interface device by performing a sequence of steps comprising:

b.1. prompting said one participant via said interface device to select an initial move in one of said first and second types of conversations;

b.2. prompting said one participant via said interface device to enter said set of associated data for said selected initial move; and b.3. responding to entry of said set of associated data by creating and storing in said record storage system a new conversation record corresponding to said conversation record format, including said associated data and said types of incompletions produced by said selected initial type of move.

The conversation management program of this invention may be viewed as a supervisory program which accesses the facilities of a standard database management program in unique ways to achieve a unique purpose.

The management of data elements relating to incompletions is a particularly important aspect of this invention. It should be understood that the data values of the incompletions could be various types. In many applications, the data values should take on dates or, more generally, times. However, there are applications where the values could be binary where the incompletion has no important relation to time. Some incompletions could have dollar values, others could have "mood" values or have values which are based on a mathematical function or formula or on authority relations among roles available.

The method of this invention further includes responding to a selection by said one participant of said Task 2 via said interface device by performing a sequence of steps comprising:

c.1. deriving from said stored conversation record of said selected existing conversation a subset of said set of moves comprising currently permitted moves for said one participant;

c.2. prompting said one participant via said interface device to select one of said currently permitted moves;

c.3. prompting said one participant via said interface device to enter said set of associated data for said selected one of said currently permitted moves; and c.4. responding to entry of said set of associated data by updating and storing in said record storage system said conversation record corresponding to said selected conversation, including said associated data and said types of incompletions produced by said selected one of said currently permitted moves;

A very important step of the conversation management program is the one which involves deriving from the definition of types of permitted moves and the conversation record corresponding to the selected conversation the set of currently permitted moves consistent with the role of the participant in the selected conversation. This can be done in a variety of ways and conveniently can be done by using look up tables together with steps which analyze the current incompletions to determine whether certain moves should be permitted to the participant. It should be understood that there may be some moves which are always permitted to each participant regardless of role or state of incompletions or other prior moves that have been made. A COMMENT move, for example, may always be appropriate in some embodiments, but there may be some applications in which the COMMENT move would not always be permitted.

While the other steps c.2. through c.4. are straightforward, that is only true because of the already defined relationship between the moves and the incompletions and the roles. The step of updating stored conversation records importantly involves manipulation of stored incompletions in accordance with the relationships previously defined.

Task 3 described above involves reviewing "new moves" in conversations, which may be an initial move in a new conversation or a continuing move in an existing conversation. The term "new move" is used to denote a move that is newly coming to the attention of the participant to which it is directed. Once the participant has reviewed that move, it becomes the latest move in the conversation in which it was made. Thereafter it is retrievable using the conversation and move retrieval facilities which are also provided in accordance with the method of this invention and designated as Task 2 above. It should be understood that the review of new moves (Task 3) and the selecting of conversations in which to make a move (Task 2) could also be integrated so that the participant reviewing new moves can make a continuing move in the conversation in which the new move appears.

EMBODIMENTS OF SYSTEMS INCORPORATING THE METHOD OF THIS INVENTION

The current embodiment, Version II of The Coordinator system (made available in the English language, with translations into German, Italian, and Spanish languages currently under way), is a system for managing business, social, and/or personal communications. The current embodiment is programmed to operate on IBM PC-XT/AT-compatible personal computers operating under version 3.1 or later of the PC-DOS and PC-DOS-compatible operating systems. Each participant in a conversation works at such a personal computer, each operating a copy of the programs for The Coordinator system. Data communications among the personal computers operated by participants are through commercially-available local area networks and standard voice-grade phone lines. More than one participant may at different times work on the same personal computer, and may engage in conversations with themselves or others working at a single personal computer or at a plurality of personal computers.

a. Defining Communications as Moves in Conversations

With The Coordinator system, communications take place between a set of participants and are defined, interpreted by the programs, and understood by the participants as moves in conversations where participants making moves in conversations are:

(1) declaring specific realizable possibilities—producing in the conversation specific distinctions regarding possibilities that might be realized, and producing distinctions regarding actions that might be taken to bring those possibilities about; and/or (2) producing in their conversation actions to complete the specific possibilities that have been declared.

The basic unit of interaction in The Coordinator system is the conversation. All communications between individuals are defined as moves in conversations. In this description of the embodiment the word "move" refers to a single communication event consisting of a participant "speaking" (in text or other digital communication objects) to other participants who have the opportunity of (a) "listening" to the speaking of the first participant by looking at, reading, and/or interpreting the text and accompanying objects, together with the opportunity of (b) themselves speaking according to the moves given to them.

Conversations are constituted of moves interpreted by the participants to have a unity—a conversation begins when a participant "opens" a conversation with a move, proceeds through other moves by the participants in the conversation, and is "closed" in the moment that a participant with the authority in the conversation declares the possibilities of the conversation realized, or declares the conversation closed with possibilities unrealized.

Conversations in The Coordinator system are divided into two categories: Conversations for Possibilities and Conversations for Action.

(1) There are four primary types of Conversations for Action, called "INFORM," "QUESTION," "OFFER," and "REQUEST," (all of which are conducted between two participants), and a 11 sub-types, including those types of conversations when directed to two or more participants, when conducted with oneself, and including a way of starting a REQUEST conversation in the middle, called an "OPENING PROMISE" to one other person, a group, or oneself.

(2) There is one type of Conversations for Possibilities, "WHAT IF," for conversations conducted with one other participant, and two sub-types, those conducted with two or more participants, and those conducted with oneself.

(3) This is one type of conversation which allows a participant to speak without explicit consideration of the type of action he is taking, and/or is intentionally ambiguous with respect to its intended action, called "NOTE," and two sub-types, those conducted with two or more participants, and those conducted with oneself.

Table 1 shows a facsimile of the menu presented by The Coordinator system to a participant in the moment that the participant indicates that he wishes to open a new conversation. To produce this (or any other) menu in this embodiment, and to select items and take actions in the menu, the user follows keyboard conventions defined in the IBM Common User Access ("CUA") specification for that company's Systems Application Architecture. The top seven items in the menus are the names of types of conversation that may be started. These include one type (shown as "Note") that is intentionally ambiguous as to whether it is a Conversation for Action or a Conversation for Possibilities, five types of Conversations for Action (shown as "Inform," "Question," "Offer," "Request," and "Promise") and one type of Conversation for Possibilities (shown as "What if"). To select an option, a participant moves the "cursor" on a video screen until the cursor is located on the desired option, and then presses the "Enter" button on the keyboard. Other options shown in the menu will be introduced later in this description.

b. Conversations Occur within Domains of Possibilities

Each conversation within The Coordinator system takes place within one or more declared or understood domains of possibilities. The Coordinator system includes facilities for declaring domains of possibilities. Tables 2-15 illustrate the steps involved in initiating a request conversation, following the selection of "Request" in the menu shown in Table 1. Table 8 shows the "Envelope" menu that offers the participant the opportunity to declare one or more domains, called "categories," within which the conversation will occur. Table 9 shows the menu that The Coordinator system presents to a participant, containing the names of a number of domains ("categories") declared by an actual participant using the system over time. As with the previous description of a menu, a participant places the cursor on the names of one or more domains in which he will open his conversation, presses the Enter key to select each, and then selects "OK" at the bottom of the menu to complete his selection.

The Coordinator system allows a participant to initiate a conversation without declaring for it a specific domain of possibilities, in which case the participant can later assign to it a domain, or select it from among those conversations in which he is participating that do not belong to an explicitly-declared domain.

At the time of opening a new conversation, a participant may also add a new domain to the list of declared domains and then may select that newly-declared domain as the domain of possibilities for the conversation. Further, each time the participant makes a move, The Coordinator system gives the participant the opportunity to re-name the domain in which a conversation is being conducted.

When a participant initiates a Conversation for Action, "domain" refers to the domain of possibilities in which a participant declares a specific possibility that participants will complete with actions that will occur in the conversation.

The method of the invention makes a number of distinctions that are normally not made explicitly in peoples' understanding of what is happening in conversations. An example will help clarify the several distinctions of domains, possibilities, specific realizable possibilities, declared possibilities of actions to complete specific declared possibilities, etc.

To illustrate, we describe the following move of a "Mr. Smith." In a domain of possibilities Mr. Smith has called his "career", one day he declares the specific, realizable possibility of "learning about accounting", and makes that declaration as he is making the move of requesting admission to an upcoming night school course (which move of making a request is an action in the conversation that has the possibility of completing the specific declared possibility of learning accounting at some date in the future).

When a participant initiates a Conversation for Possibilities, it is the domain of possibilities in which the participant will declare and define specific realizable possibilities in the conversation.

From the perspective of the objective of producing actionable possibilities in conversations, or completing actions in conversations, the domain of possibilties then can be thought of as the "senior" declaration of the conversation—it is the participant's name for that domain of possibilities for the sake of which the participant makes requests, promises, assertions, and declarations in the conversation.

Domains of possibility are specific to individual participants in conversations. When one participant names a domain, each other participant in the conversation may "adopt" the same name or give a different name for the domain. For example, a lawyer preparing a patent filing may open a Conversation for Action of the REQUEST type with a client, "Jones," and give the client's name as the domain of possibilities for the conversation. When Jones reads the request, it will make no sense to adopt the name, "Jones," as the name of the domain.

For Jones, however, an appropriate name to declare for the domain might be "patent." Thus each conversation occurs within at least one understood domain of possibilities, that may or may not be explicitly declared, and often the domain of possibilities will be different for different participants in the conversation. Also, the domain of possibilities may change for a given participant as the conversation progresses.

The Coordinator system can present to a participant all his conversations in any domain he has declared, or all conversations for which no domain has been declared. When a participant reviews a conversation, The Coordinator system presents facilities to change the declared domain of the conversation. These features are described later in this document.

c. Participants Play Conversational Roles

In these conversations through The Coordinator system, each participant plays at least one of a set of defined conversational roles. In the current embodiment, three roles are defined—requestor, promisor, and observer. Different participants enter conversations in different roles as they are (1) "addressed" by other participants as they start conversations, and (2) as participants in existing conversations include additional participants as observers in those existing conversations.

The actual "act" of "addressing" a communication to a participant in The Coordinator system is illustrated in Tables 6–7, which show facsimiles of the menus which the system presents to a participant for addressing his communication to one or more people in any type of conversation. Table 6 shows the "Envelope" menu used for addressing and declaring key aspects of the conversational opening. Table 7 shows the menu of potential addresses with whom the participant has declared himself to be in everyday conversation through The Coordinator system. The Envelope menu is presented by the system when the participant selects "Envelope" from the menu shown in Table 1. Alternatively, if the participant has not already selected at least one addressee at the time that he selects "Send" from the menu shown in Table 1, then the system presents the Envelope menu as part of the process of sending and recording the communication that begins the conversation.

To address a communication, the participant begins the declaration of a realizable possibility in this conversation by entering a "Subject" for the conversation. Then, moving the cursor among the various options under Subject in the Envelope menu, the participant presses "Enter" to select "To . . . ", and is presented with the menu shown in Table 7. When the participant has selected one or more addressees by moving the cursor to their names in the menu and pressing "Enter," he selects "OK" at the bottom right of the menu. Other, optional selections in the menu are "Cc," for defining observers to this conversation, "Categories," for declaring one or more domains of possibilities in which the conversation will be conducted, "Enclosure," for naming a document that may be delivered with the communication and henceforth included as part of the unity of this conversation, and "When," for declaring dates for incomplete actions in the conversation. All these options will be discussed later in this description. Finally, at the bottom of the Envelope menu, the selection "OK" is for signifying that the conversation is completely addressed and characterized.

If the participant does NOT stipulate at least one addressee in the "To" field of the Envelope menu, when the participant instructs the system to send and record the communication, The Coordinator system will represent to him the Envelope menu until a "To" addressee has been named.

The act of declaring participants with whom a participant is in regular conversation is done with tools available when the participant selects "Address Book" from the "Tools" menu. A facsimile of a participant's address book is shown in Table 16. Here the system lists, in a form defined by the participant, the names of those participants with whom he is in daily communication.

If the participant selects the "Cc" option of the Envelope menu, to include observers in the conversation, The Coordinator system will present a menu headed Cc rather than To but otherwise identical to that shown in Table 7 for the selection of addressees who will be observers of the conversation.

By selecting more than one name in these menus, and through various tools for making and presenting lists of participants, very large numbers of participants may be included in conversations as participants and observers.

One of the more important features of the observer capability in this method, however, has to do with a case where there is only one observer who is a manager and who is included as an observer of conversations being conducted by subordinates, which thereby gives to the subordinates the capacity of giving reports to the manager without actually doing the separate act of reporting, because the manager is able to observe the business conversations in which they are engaged. In this manner, the manager is not required to engage in any conversations except when, in the process of observing, he may elect to intervene in such conversations.

The Coordinator system distinguishes the three different types of conversational roles in conversations as introduced above. A participant has the role of REQUESTOR when he opens a Conversation for Action of the QUESTION or REQUEST type, or when he makes an opening declaration in a WHAT IF conversation, or when he is the, or one of the initial "To" addressees of the opening of a Conversation for Action of the INFORM or OFFER type opened by another participant. A participant has the role of PROMISOR when he opens an INFORM or OFFER, or when he is the, or one of the initial "To" addressees of a QUESTION or REQUEST, or when he is a "To" addressee in the opening declaration in a WHAT IF Conversation for Possibilities. When conducting an INFORM, QUESTION, OFFER, REQUEST, or WHAT IF conversation with himself, a participant's role moves back and forth among REQUESTOR and PROMISOR as he takes actions appropriate to one or the other role. Finally, when taking the action of delegating action which is provided for in The Coordinator system, a PROMISOR in a QUESTION or REQUEST conversation takes on an additional role of REQUESTOR (or "delegator") with regard to the delegation in the conversation, and, after the action of accepting such a delegation, another participant in the conversation also becomes a PROMISOR (or "delegatee") in the conversation.

A participant has the role of OBSERVER if he participates in any conversation while not playing either the role of requestor or that of promisor. In the balance of this description we will use the phrase "primary participants" to distinguish conversational participants in the roles of requestor and promisor.

d. Conversations have Recurring Incompletions

The Coordinator system embodies a method that defines a set of types of declared incompletions which occur recurringly within conversations, including a first type in which a future conversational move by at least one participant to declare at least one specific realizable possibility is missing, a second type in which a future conversational move by at least one participant to complete a specific realizable possibility is missing, a third type in which a future reminder of some possibility or action is missing for a participant, and a fourth type in which a future even such as an appointment or meeting, is missing for a participant. In the remainder of this description, the third and fourth types will be referred to as "reminder" and "appointment," or, collectively, as "alerts."

The first type of incompletion is referred to as "missing response". Conversations for Possibilities are conversations for declaring specific realizable possibilities. "Missing response" is defined as a type of declared incompletion that occurs recurringly in all such conversations. In this definition, as participants in a Conversation for Possibilities converse with each other, the most common incompletion—at any moment after the conversation has been opened, and continuing to the moment that the conversation is declared complete—is the missing declaration of the participant or participants next due to speak.

Conversations for Action are conversations to produce actions to complete specific possibilities. The incompletion, "missing response" occurs recurringly in such conversations. Beginning with the opening of a conversation, and continuing until the conversation is declared complete, at each moment one or more participants are missing one or more other participants' declaration (and sometimes the missing declaration is the participant's own).

For example, when a speaker opens a Conversation for Action, he declares a realizable possibility for himself (at least), and moves in a way defined so as to be consistent with producing action to complete that possibility. The primary addressee of the opening move of such conversations is prompted by that move to distinguish a specific realizable possibility for himself and to respond to the opening move either by declaring for himself the possibility of realizing the declared possibility of the conversation, or by declaring that he will not declare such a possibility for himself.

The opening move of a Conversation for Action (and also of a Conversation for Possibilities) thus produces an incompletion of the first type—the participant opening the conversation is missing a response from the primary addressee.

The second type of declared incompletion is referred to as "missing fulfillment". The fulfillment that is missing is the declaration of fulfillment of an action to complete a specific realizable possibility declared in the conversation. This second type of incompletion appears in Conversations for Action, beginning with the opening move of such conversations, and normally remains present for at least one of the participants for as long as the conversation remains "open" (i.e., has not been declared complete).

Since a Conversation for Possibilities is defined not to be a conversation for the completion of specific realizable possibilities, the missing fulfillment type of incompletion is not defined to occur recurringly in such conversations.

The third type of declared incompletion is referred to as "missing reminder," or sometimes just "reminder." The action that is missing is the announcement to a participant, at a particular moment in time in the future, of a possibility or action of which the participant asked to be reminded at that moment. For example, in a Conversation for Action concerning the preparation of a report, the participant who has promised to prepare the report might ask to be reminded to schedule certain secretarial resources to be available shortly before the time when the report is due. In The Coordinator system, this type of incompletion is defined to occur recurringly in all types of conversations.

The fourth type of declared incompletion is that in which a future appointment, meeting, or event is missing for a participant. For example, in the same Conversation for Action concerning preparation of a report, several meetings and scheduled desk-work might be needed for research and writing. As with reminders, in The Coordinator system, this type of incompletion is defined to occur recurringly in all types of conversations.

Participants in conversations make moves to complete incompletions—as they participate in conversations in which a realizable possibility is being declared, and conversations in which actions are being taken to complete such declared possibilities. As they make moves, incompletions may be completed, and new incompletions may be created. So long as incompletions are present in a conversation, that conversation is said to remain "open". When a conversation no longer has incompletions declared within it, then that conversation is said to be "closed" or in the "final" state.

Alerts—reminders and appointments—are declarations that are private to the participant making the declaration, and have no effect on the current incompletions of the conversation as a whole, nor on the incompletions of any other participant in the conversation. Each alert is the declaration that the participant making the declaration is missing an "alert" by The Coordinator system to that participant that is to be completed at a date (and sometimes time) specified in the token representing the incompletion of the alert. Alerts are the only incompletions which may be declared by an observer in any of the types of conversation defined in The Coordinator system.

"Tokens" are defined in The Coordinator system to distinguish the dates declared for the completion of incompletions in conversations. These tokens represent dates by which missing declarations (called "responses"), fulfillments of declared possibilities (called "fulfillments"), dates on which reminders of missing possibilities or action are to be announced, or dates and times of events such as appointments or meetings have been declared as dates for completion by participants in a conversation.

Each of the primary conversational roles, requestor and promisor, has at least four tokens associated with it—two response and two fulfillment tokens, and in addition each has an unlimited number of alert (reminder and appointment) tokens associated with it. That is, the requestor and the promisor in a conversation may each have associated with them one token for each of requestor's fulfillment, requestor's response, promisor's fulfillment, promisor's response, and in addition each may declare an unlimited number of alert tokens.

With these tokens it becomes possible to answer questions of the sort, By when is the next move in the conversation to be made? Who is to make that move? When is (this) request or promise to be fulfilled? What is the next action due in this conversation? How many meetings are we scheduled to have (and have we already had) on this matter?

So, for example, in the (fictitious) case that all possible incompletions were simultaneously recorded for both a requestor and a promisor in a conversation, the full set of recorded incompletions would be:

requestor is missing requestor's response
requestor is missing requestor's fulfillment
requestor is missing promisor's response
requestor is missing promisor's fulfillment
requestor is missing (some number of) reminders
requestor is missing (some number of) appointments
promisor is missing promisor's response
promisor is missing promisor's fulfillment
promisor is missing requestor's response
promisor is missing requestor's fulfillment
promisor is missing (some number of) reminders
promisor is missing (some number of) appointments.

Tokens are stored with conversation records. If the token is present, it specifies a date associated with the completion of an incompletion in the conversation.

The primary method of presentation of response and fulfillment tokens to participants for declaration of dates for completion is illustrated in Table 13, where will be found a facsimile of the menu presented to a participant after he selects "When" in the Envelope menu. Also, a participant can select in the Tools/Customization menu of The Coordinator system (see Table 24) the option "Prompt for dates," in which case the menu and calendar shown in Table 13 will be presented whenever a participant issues the command to "Send" a composition for which response and fulfillment incompletion dates have not yet been declared. The specific menu illustrated in Table 13 is from an opening move in a Conversation for Action, which can be deduced by the fact that there are fields presented for the participant to enter tokens of all three types described above: a token (date) for fulfillment of a possibility, called here "Please complete by . . . ", a token (date) for declaration of realizable possibilities, called here, "Please respond by . . . ", and the alert "Remind me . . . "

The system presents to the participant those particular fields corresponding to incompletions that will be present in the conversation immediately following the move the participant is currently engaged in making. A participant using the system enters a date in each such field that he determines will support the completion of the incompletion indicated. For example, in some conversations with colleagues it is not necessary to distinguish a particular moment when a response will be desired IF they are in daily conversation with each other and have standard practices with each other regarding how quickly they will "get back" to each other. On the other hand, for example, if the present conversation being opened is a very urgent matter, selecting tomorrow's date in the little calendar for a response will produce a note in all participants' calendars on the following day—a convenient warning to the addressee(s) that this matter calls for unusual response. There are no requirements or prohibitions about such entries in The Coordinator system; only recommendations of effective practice are provided.

While entry of dates to accompany tokens by a participant is optional, in fact The Coordinator system is programmed to declare (on behalf of the participant) a specific incompletion date for any incompletion produced by a participant move where the participant does not himself make such a declaration. The "default" dates declared by The Coordinator system for completion of participant incompletions are far future dates that will not operationally interfere with current calendars or other displays of incompletions.

e. Conversational Moves in The Coordinator System

In The Coordinator system, 17 complete sets of types of permitted moves in conversations are embodied. These 17 are listed below.

Conversations for Possibilities
- "What if" with oneself
- "What if" with one person
- "What if" with a group Conversations for Action
- Inform Conversation with oneself
- Inform Conversation with one person
- Inform Conversation with a group Offer Conversation with oneself
Offer Conversation with one person
Offer Conversation with a group
Question Conversation with oneself
Question Conversation with one person
Question Conversation with a group
Request Conversation with oneself
Request Conversation with one person
Request Conversation with a group
Conversations with Ambiguity in Explicit Intention
Note Conversation with oneself
Note Conversation with one person or a group Each set of moves was defined on the basis of the recurring incompletions in conversations described above, and the roles of requestor, promisor, and observer.

In the following and the accompanying Tables and Figures, these sets of moves are described in terms of the incompletions and roles upon which they are based. The types of incompletions each move produces are also described.

(1) Example of Definition of Initial Conversational Moves

In the moment before a participant initiates a conversation the conversation does not exist, and consequently there can be neither declared possibilities, nor declared incompletions in records in The Coordinator system. The initial move in any type of conversation will at least declare a role or roles for speaker and listener, declare some possibility, and create some incompletion.

For example, a participant discovers that he must prepare a report at the end of the week, and, seeking help in preparing the report, opens a Conversation for Action of the REQUEST type with a colleague (e.g., "Please come to my office Thursday at 4 pm").

This move is constituted, (in the language of distinctions of the method of the invention) of (1) a declaration of a specific realizable possibility by a participant playing a role in a conversation—the possibility of the fulfillment of the request itself (and, there may have been an explicit, prior Conversation for Possibilities in which the realizable possibility of this request was defined), and (2) a declaration of specific action(s) for realizing the specific possibility—namely, that the promisor fulfill the requestor's request.

In the terms defined in the previous section on incompletions, then, the requestor creates for himself, in opening the request, the following incompletions:

the requestor's fulfillment is missing—that is, he has declared the possibility of the request, and until he says it is fulfilled, it is incomplete; and the promisor's response is missing—that is, the requestor has made a serious request to someone with whom he has previously agreed to be in conversation, and until the promisor makes some move in the conversation opened by the requestor, the requestor is missing "hearing from the promisor",. which means specifically that he is missing whatever declaration the promisor will make in response to the request is missing.

In the moment that a participant (in this case, let us say it is a different participant, although it need not be in The Coordinator system), playing the role of the promisor, reads this request, that promisor then will acquire two incompletions, corresponding to those of the requestor:

the promisor's response is missing; and
the requestor's fulfillment is missing.

The promisor's own fulfillment is not missing: he has not yet declared for himself any possibility of declaration or action in the conversation.

(2) Example of Definition of Subsequent Conversational Moves

In the current embodiment, moves subsequent to the initial moves in conversations are defined for the purpose of allowing the participants, playing their conversational roles, to declare possibilities, to complete incompletions and to realize the possibilities declared in the conversations.

Let us examine the definition of some moves. For example, here, after the opening move of "request" we have introduced the situation where— the requestor is missing
  the requestor's fulfillment
  the promisor's response
and the promisor is missing
  the requestor's fulfillment
  the promisor's response Let us first define moves for the promisor. One possible move is to have the promisor respond to the requestor and take on, as his own, the requestor's declared possibility. (For example, "I'll be there at 4 as you ask.") In the moment of declaring for himself the possibility of the requestor, the promisor is now missing his own—the promisor's—fulfillment, which corresponds to the requestor's fulfillment, which the promisor is also still missing. We will call this move, "promise", and we see that in the moment that the promisor makes the move his incompletions in the conversation change to:

the promisor is missing
  the requestor's fulfillment
  the promisor's fulfillment Then, in the moment that the requestor reads the response of the promisor, his incompletions also change, to:

the requestor is missing
  the requestor's fulfillment
  the promisor's fulfillment Another possible move for the promisor would be to declare that what is a possibility for the requestor will NOT be a possibility for him. (For example, "Sorry, I am out of town all day Thursday.") We will call this move, "decline", and we see that in the moment that the promisor makes the move his incompletions in the conversation change; we might say that he no longer has any incompletions in the conversation. What the requestor proposed as possibilities for the promisor, the promisor has not declared for himself. On the other hand, in defining the moves in the current embodiment, the inventors specified that after making a decline, the promisor would have the opportunity to declare that he was still missing the requestor's response—that due to the way in which people normally work together, such a conversation generally will remain incomplete for the promisor until he has heard that the requestor has listened to the promisor's decline.

In the case that the promisor declares that he is missing the requestor's response to his decline, then in the moment that the requestor reads the decline of the promisor, the requestor's incompletions change to:

the requestor is missing the requestor's fulfillment, and the requestor is missing the requestor's response.

That is, the requestor still has a declared, realizable, and unrealized possibility—the report due at the end of the week—preparation of which was to have been fulfilled by the action requested—the assistance of a colleague on Thursday. The request will not be fulfilled; however, the possibility in which the request originally arose is still present until declared complete by the requestor, and the conversation remains open with the incompletion of the requestor's fulfillment, awaiting other action from the requestor.

Now let us look for a moment at the definition of moves for the requestor, beginning at the moment immediately after the request has been made. At this point, the requestor has two incompletions: his own fulfillment, and the promisor's response.

One move would be for requestor to declare that he was no longer incomplete in regards to his own fulfillment, independent of declared actions by the promisor. This would be appropriate if, for example, he were to realize that the report he prepared last week for his own thinking is exactly what the boss now is asking for. ("Cancel the meeting I asked for on Thursday—I just realized I've already done the work?") We call this move "cancel". As the requestor makes the move, the inventors specified that the requestor would still be incomplete, due to the social construction of most such conversations, because he had not yet heard the promisor's response to this new declaration of no possibility where before there was a possibility—in other words, he is missing the promisor's acknowledgement of the cancellation of Thursday's meeting.

On reading the requestor's cancel, the promisor is no longer missing the requestor's fulfillment—attendance Thursday is no longer a declared possibility for the requestor. However, the promisor is still missing his own (the promisor's) response in the conversation—typically a simple acknowledgement of the cancellation—an incompletion defined so as to take account for the fact that a requestor's act of cancellation alters the promisor's possibilities. For an example of one case of the working of this particular definition, consider the case where, on reading the request for the Thursday meeting, the promisor immediately cancels his own previously scheduled out-of-town trip so as to be available to the requestor. Now the requestor has cancelled, but the promisor may not be able, or notice that he has the opportunity to re-schedule the trip. Then the conversation remains open until the promisor declares it complete.

(3) Types of Permitted Moves

For each type of conversation in The Coordinator system we define a set of permitted types of moves on the basis of recurring incompletions and the roles defined for participants to play in the conversation.

The types of permitted moves are first defined in terms of the logical method,

"Define a case in which defined incompletions <a,b,c, . . . > occur in a conversation of type <A>;

assess the combination of those incompletions with the role of <role type>;

define types of moves <1,2,3, . . . > that will be permitted in such circumstances in such types of conversations (where "circumstances" is determined by type of conversation, current incompletions, and conversational role);

and, given that a participant makes that type of move, define the completions, remaining incompletions, and new incompletions, of types <x,y,z, . . . > that will be produced by the participant making the move."

In the following sections of this description, "Conversational States" and "Finite State Machines", we present descriptions of all the types of conversations and moves defined in The Coordinator system, as developed under this method, in terms of the development of programs and computational and database "machinery" developed for implementing the method in a practical communications system.

(4) Conversational States

For the programming of the current embodiment the programming notational convention of naming "States of Conversations" was adopted. The notation is used in this way: a series of States, corresponding to general conditions of incompletion found recurringly in conversations, is named. Then, based upon the incompletions found in those states, rules are developed about what roles may be permitted what moves at that state.

This allows the definition and storage of sets of permitted moves in data structures called "finite state machines" (sometimes abbreviated below as "FSM"). The data elements included in these data structures are:

the number of states for each category of conversation;

for each state the name of the state and the number of permitted moves;

for each move the role of the participant that can make that move, the role of the participant(s) to which the move may or must be addressed, the roles of speakers and listeners after the move has been made, the state in which the conversation will arrive after the move, and the token manipulations associated with the move.

For each category of conversation The Coordinator system defines a set of conversational states.

f. Finite State Machine Implementation

Each conversational state then serves as a locus of definitions of sets of permitted moves and incompletions for conversational roles. Once itself defined, a finite state machine defined in terms of these states can be used to determine the permitted moves for every state and for each role that a participant may play in a conversation. As will be shown in detail, requestor and promisor have different permitted moves in any particular state of a conversation.

Tables 25 through 28 are excerpted from the actual 'C'-language code of the program embodying the FSMs of The Coordinator system, and display the names and definition of permitted moves for all 17 sets of types of permitted moves in conversations embodied in Version II of The Coordinator system, together with the patterns of incompletion and role changes associated with each move. Table 25 illustrates the definition of permitted moves in 17 finite state machines; Table 26 illustrates the patterns of incompletion—called "Token Patterns"—associated with the permitted moves embodied in the system; Table 27 illustrates role changes and patterns of incompletion associated with what are termed "non-standard transitions"; and Table 28 shows the master move-definition table.

(1) Conversation States and Permitted Moves

Table 25 declares conversation types, states, permitted moves, states to which conversations arrive after moves, and whether the move has associated with it a standard or non-standard pattern of roles and incompletion tokens. In Table 25, the first line of code in each description of a FSM names the state. On that line, the state is identified by the descriptor "HIDDEN FSMACT". The name of each state appears immediately after this descriptor, in code, and also with a comment indicating the common English name of the state.

The code name of each state is constructed as an acronym, in the following manner:

The first one or two characters denotes the specific conversation type:
q—question
cp—what if (Conversation for Possibilities)
i—inform
n—note
o—offer
r—request.

The second character set denotes whether it is for a conversation with oneself, between two people, or between one person and two or more people;
m—myself (one)
s—standard (two)
g—group (more than two).

The third character set denotes the sequence of the state among all the states in the conversation, and whether it is a compound state used to manage delegation within the conversation:
i—initial state
a—first state
ad—first state, in process of delegating
add—first state, fully delegated
b—second state
bd—second state, in process of delegating
bdd—second state, fully delegated
etc.

The initial state is always identified with an "i" state identifier.

Finally, each state name ends with the characters "act" for the initial state, or "acts" for other states.

Following the descriptor line, moves that can be made in the given state are shown on individual lines. Each line starts with a comment indicating the alphanumeric identifier of the state that ensues if the user selects the move specified on the line. Following the comment, and enclosed within braces, "{" and "}", are a set of three parameters:

The specific move;
The ensuing state. (For example, "STD" means move to state "D");
A pointer to the incompletions left for requestors and promisors after the state transition has been made:

(a) If the third parameter is "NULL," then the move is a "standard" move. To determine the incompletions for requestors and promisors following a standard move, the "Conversation Manager" component of The Coordinator system consults the table of Token Patterns included in the display of Tokens and Patterns of Incompletion, Table 26, and assigns the incompletions and completions denoted there.

(b) If the third parameter is not NULL, then this is a non-standard move. To determine the incompletions for each role, the Conversation Manager first searches for the third parameter in the table of Non-Standard Transitions, also included in Table 27, and then applies the token pattern named there. Non-standard moves include those where the role of one of the participants changes after speaking or listening, and those where all incompletions are removed by the transition.

The following example is a brief explication taken from the conversation type, "Question with a group," in the state, "qgraacts"—the state called "request":

HIDDEN FSMACT ggraacts [] = { /* request */
/* d */ {Q_REPORT, STD, QGRAACT_Q_REPORT}, -continued /* b */ {Q_PROMISE, STB, QGRAACT_Q_PROMISE},
/* ad */ {Q_DELEG, STAD, NULL},
/* e */ {Q_PDECLINE, STE, QGRAACT_Q_PDECLINE},
/* F2 */ {Q_RDECLARE, STF2, NULL},
/* a */ {Q_CANEREQ, STA, NULL},
/* f */ {Q_CANCEL, STF, NULL},
};

Explication:
Acronym for State: qgraacts
English: request
First Transition (from first line from transition set):
Selecting Q_REPORT causes transition to state "D" (STD, which corresponds to state "qrdacts"—the state called "report".

Selecting this transition triggers the Conversation Manager to update the conversation databases of each participant according to the changes in incompletions described in the table of non-standard transitions as "QGRAACT_Q_REPORT."

An example of the use and relevance of non-standard transitions and role transitions can be found below under (13) in the discussion of Conversations for Action with oneself.

(2) Tokens, Token Patterns, and Role Transitions

"Tokens" carry pointers and/or identifiers of incompletions for participants in conversations. One class of token—a date—is assigned to signify the existence of three of the recurring kinds of incompletion that are managed in the current embodiment—MISSING RESPONSE, MISSING FULFILLMENT, and MISSING REMINDER. The fourth kind of recurring incompletion—MISSING EVENT—is signified by a token consisting of a date together with starting and ending times for the event. Since an unlimited number of the third and fourth types of recurring incompletion are allowed to any participant in any conversation, only the first two types of incompletion are managed through FSMs in The Coordinator system.

A total of eight (8) tokens are used to specify all of the particular response and fulfillment incompletions defined in the conversation types in the current embodiment. The name of each token is an acronym assembled from the following:

Each name begins with the letters "TK";

"R" for "Requestor" or "P" for "Promisor" denotes the "owner" of the token—the role of the participant whose conversation records will be altered by the Conversation Manager according to the instructions embodied in the token;

"M" for "My action missing" or "H" for "His action Missing" denotes the role of the participant from whom action is called to complete the incompletion; and "F" for "Fulfillment" or "R" for "Response" denotes the kind of incompletion that is declared missing or completed by the token.

The 8 tokens are listed below.
TKRMF—Requestor missing My Fulfillment
TKRHF—Requestor missing His Fulfillment
TKRMR—Requestor missing My Response
TKRHR—Requestor missing His Response
TKPMF—Promisor missing My Fulfillment
TKPHF—Promisor missing His Fulfillment
TKPMR—Promisor missing My Response
TKPHR—Promisor missing His Response Actions to be taken with sets of tokens are defined, called "Token Patterns," for the purpose of specifying, in a single action, what tokens are to be applied for the Speaker and each Listener in a conversation following a particular move and state-transition.

Table 26 displays the forty Token Patterns that comprise the universe of patterns of incompletion and completion necessary for implementing the conversations in the current embodiment. In Table 26 each of the eight tokens has appended to the end of its name letters indicating the action that is to be taken with the particular token at the moment, "ON" or "OFF," denoting that an incompletion is declared ("ON"), or declared complete ("OFF").

Whenever the Conversation Manager encounters a non-standard move (see discussion above under (1) Conversation States and Permitted Moves) in one of the finite state machines, it searches the Table of Non-Standard Transitions, shown in Table 27, for instructions regarding what role-changes and token pattern to apply for that move. For each non-standard transition, the table specifies four parameters:

the Speaker's Role after the transition has been made;

the Listener's Role before the transition has been made;

the Listener's Role after the transition has been made; and the Token Pattern after the transition has been made.

When the listener's role before the transition has been made (second data element) is NULL, this move will have no impact on the conversation state or tokens of incompletion for the listener. This convention is used in "Multiple-to" or "group" conversations to allow participants to make moves in conversations that cause changes to their own databases while leaving a conversation state unchanged for other participants (particularly the opener of the conversation.)

The following discussion will refer to FIGS. 1 through 24, which illustrate the overall structure and principles of construction of finite state machines in The Coordinator system. These figures show the state-transitions produced by permitted moves for the roles of REQUESTOR and PROMISOR in various types of conversations that illustrate the use of the method presented in this document to implement conversational support in The Coordinator system. Permitted roles for OBSERVERS are shown in a separate Figure. "States" are identified in the Figures by rectangular boxes containing the name of a state, to and from which lines representing moves and state-transitions travel. The names of the moves are shown accompanying the lines, with the notation "R: . . . " to indicate a REQUESTOR move, or "P: . . . " to indicate a PROMISOR move.

Figure 22:
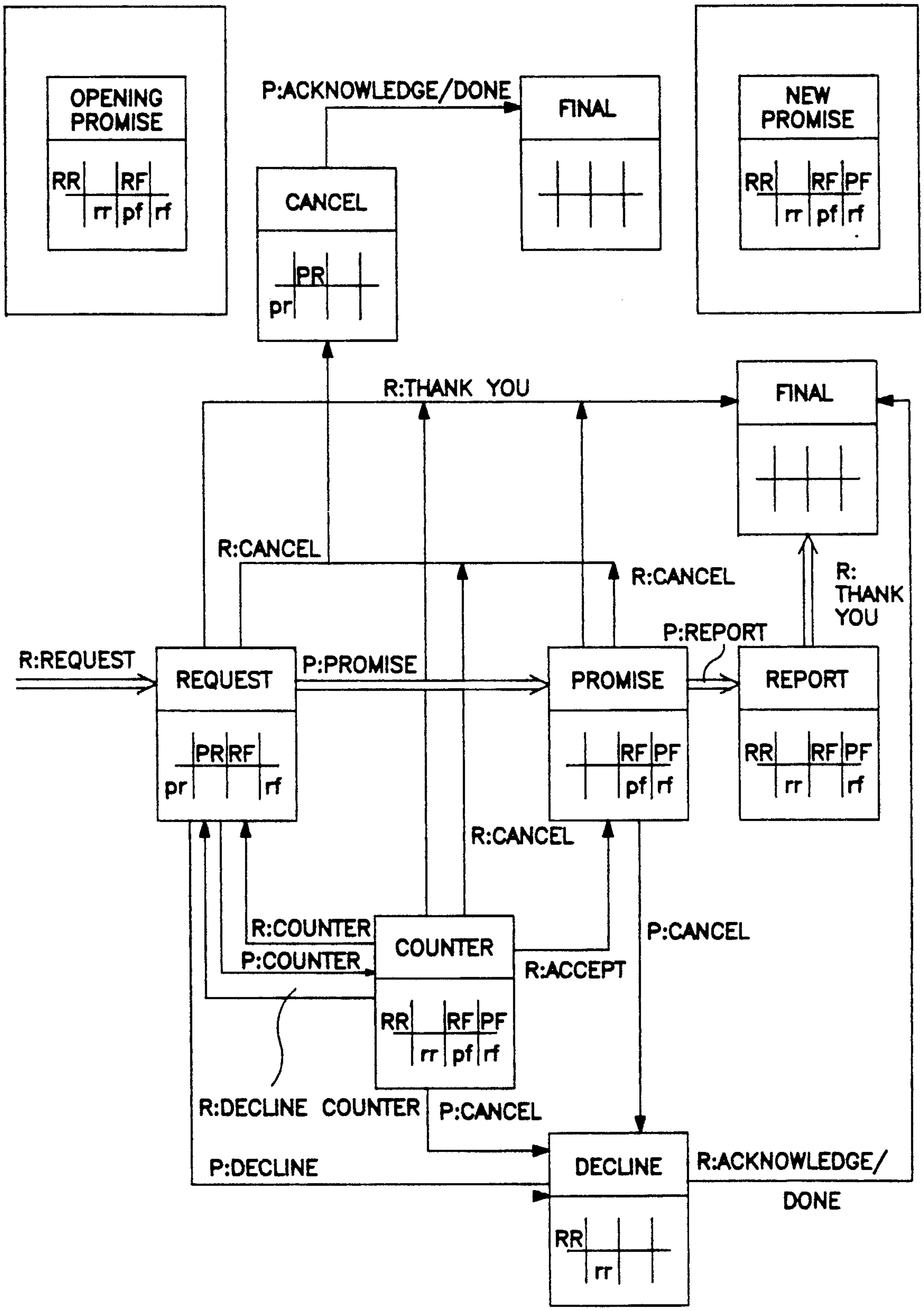
Figure 23:
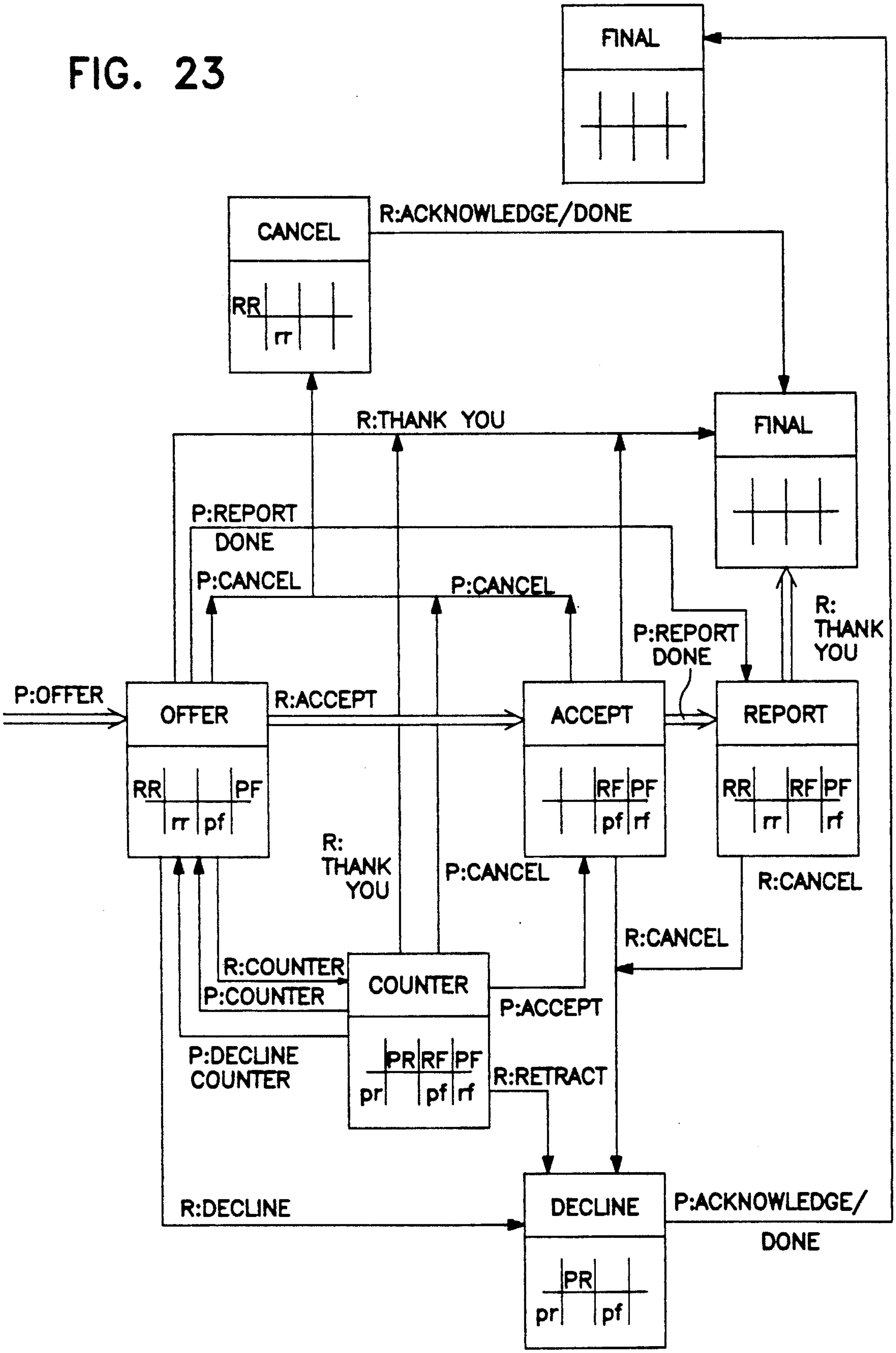
Figure 24:
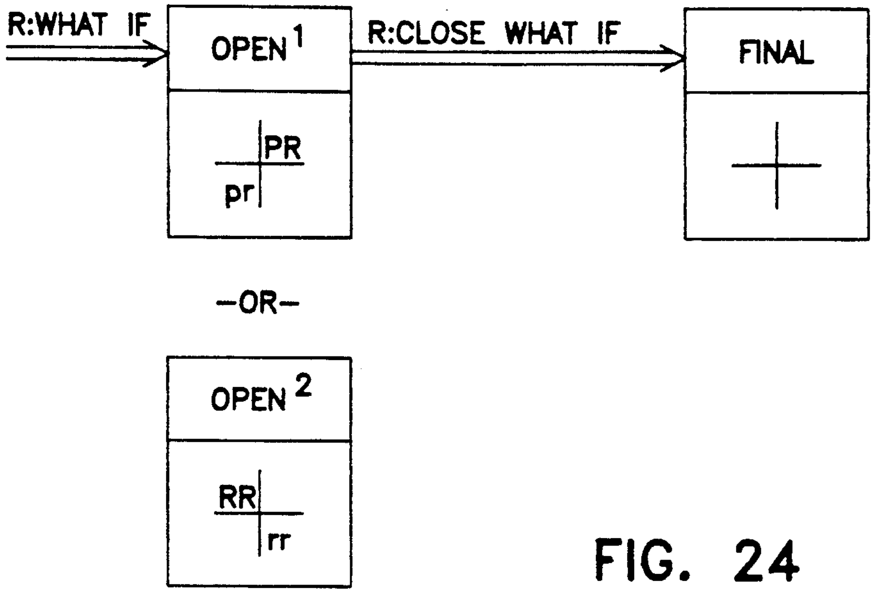

FIGS. 22 through 24 also include notation to describe the incompletions and tokens representing incompletions at states in conversations. The token notation will be described later in this section.

To simplify presentation of these FSMs, three types of permitted move occurring in them are not illustrated in FIGS. 1-9 or 14-24. The three types of moves are: "delegation" moves; "ask reconsideration" moves, in which a participant asks for reconsideration by another participant of a prior move of the other participant; and "revise" moves with which a requestor re-starts a conversation with a new request or question, called "revise request" or "revise question." These kinds of permitted moves are shown named in Tables 25 and 28, and are further illustrated in FIGS. 10 through 13, discussed later.

(3) Permitted Moves for REQUESTOR in REQUEST Conversations between Two Participants Let us begin to examine the finite state machines by looking at FIG. 1. FIG. 1 shows the outline of the finite state machine for the REQUESTOR's moves in a Conversation for Action of the REQUEST type. In The Coordinator system, such conversations are opened by the move called "Request", made by a participant who takes on the role of REQUESTOR in the conversation in the moment of opening the conversation.

Notice the double line beginning in the left center of the Figure. For each Figure describing a FSM for a conversation of the Conversation for Action category (for example, FIG. 1), a darker line will be found that traces a set of "basic moves" through the conversation—the path of progression through conversation states which traverses the minimum number of steps if no major changes occur to the realizable possibilities within which the conversation was begun. In FIG. 1, for example, illustrating the FSM for Conversations for Action of the REQUEST type, the basic moves are:

requestor makes request (for example, "Jones" asks "Brown" to prepare an agenda for a meeting three days hence);

promisor makes promise (Brown replies that he will do it);

promisor reports that the request is fulfilled (Brown delivers the agenda to Jones);

requestor makes a move declaring the conversation complete (Jones says "Thank you").

FIGS. 1 and 2, 3 and 4, and 5 and 6 are paired with each other. The first pair represent FSMs for REQUEST conversations, and the second pair represent FSMs for OFFER conversations, and the third pair represent FSMs for QUESTION conversations. The first Figure of each pair shows permitted moves for the role of REQUESTOR, plus the "basic moves", and the second of each pair shows the moves for the role of PROMISOR. The descriptions of permitted moves within FSMs are separated in this manner—one role to a Figure—to make them easily readable.

Although the FSMs illustrated in these Figures may be referred to as "protocols" of conversations, notice that crucial moves for dealing with incompletions, changing circumstances, and changing assessments of the possibilities to be realized in the conversation are present all the time in each. For example, in FIG. 1 the REQUESTOR is permitted to declare-complete with a thank-you move, permitted to cancel (and also permitted to start the conversation over with a revised request, as shown in another figure discussed below) at any moment after opening the conversation. For example again, in FIG. 2 it can be seen that the PROMISOR has the same freedom to (a) decline the initial request, (b) to cancel his promise, or (c) to cancel his promise and make a new one, at any moment after the conversation has been opened. In these ways it may begin to be apparent how this method of defining a system for supporting communications and conversations provides fundamental differences from "protocol-generating" communications methods.

Figure 10:
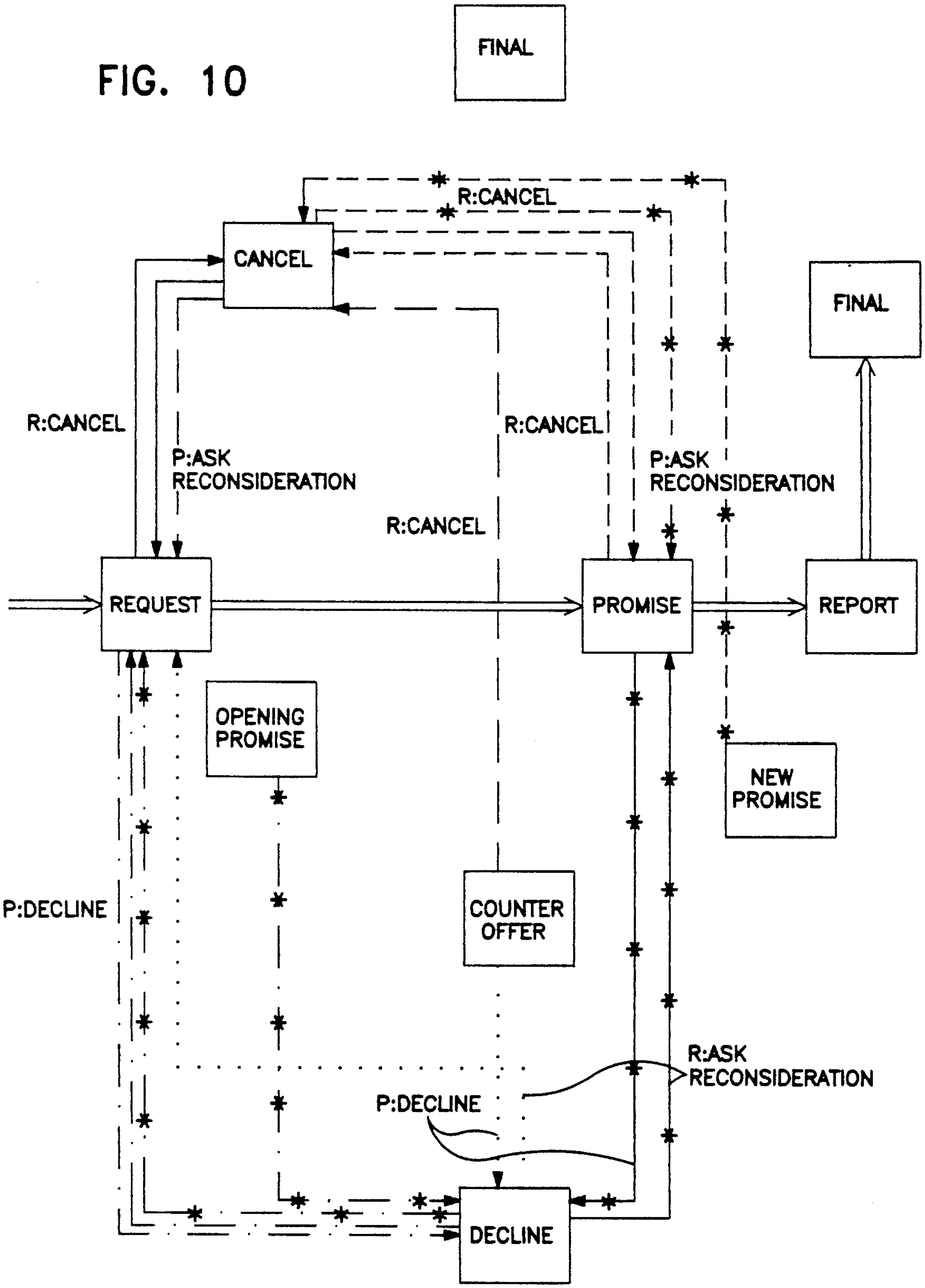

Other features worthy of note include the move, "answer later," appearing in FIGS. 1 through 6, which permits participants to declare an incompletion in a conversation without declaring any specific realizable possibilities for himself or for other participants in the conversation until such time as the participant is in condition to make such declarations, This move, which is not essentially part of the minimal embodiment of the method, is found in The Coordinator system, and represents an example of the type of refinement of conversational support possible with this method. Another move that "tunes" the system to particular conversations, can be seen in FIG. 1 in the definition of the "decline-report" move. In the state "report" a requestor can make a decline report move that moves the conversation back to state promise. A further set of move that "tunes" the system can be seen in FIG. 10, illustrating moves called "ask reconsideration," (included with many of the conversation types in The Coordinator system and discussed later in this description) wherein after receiving a move that changes a conversation into one of the states designed for "unsuccessful" completions—the decline and cancel states—a participant can ask the speaker of the move to reconsider his action, and with the move the conversation is returned to a state that again allows progress to a "successful" completion of the incompletions of the conversation.

Figure 2:
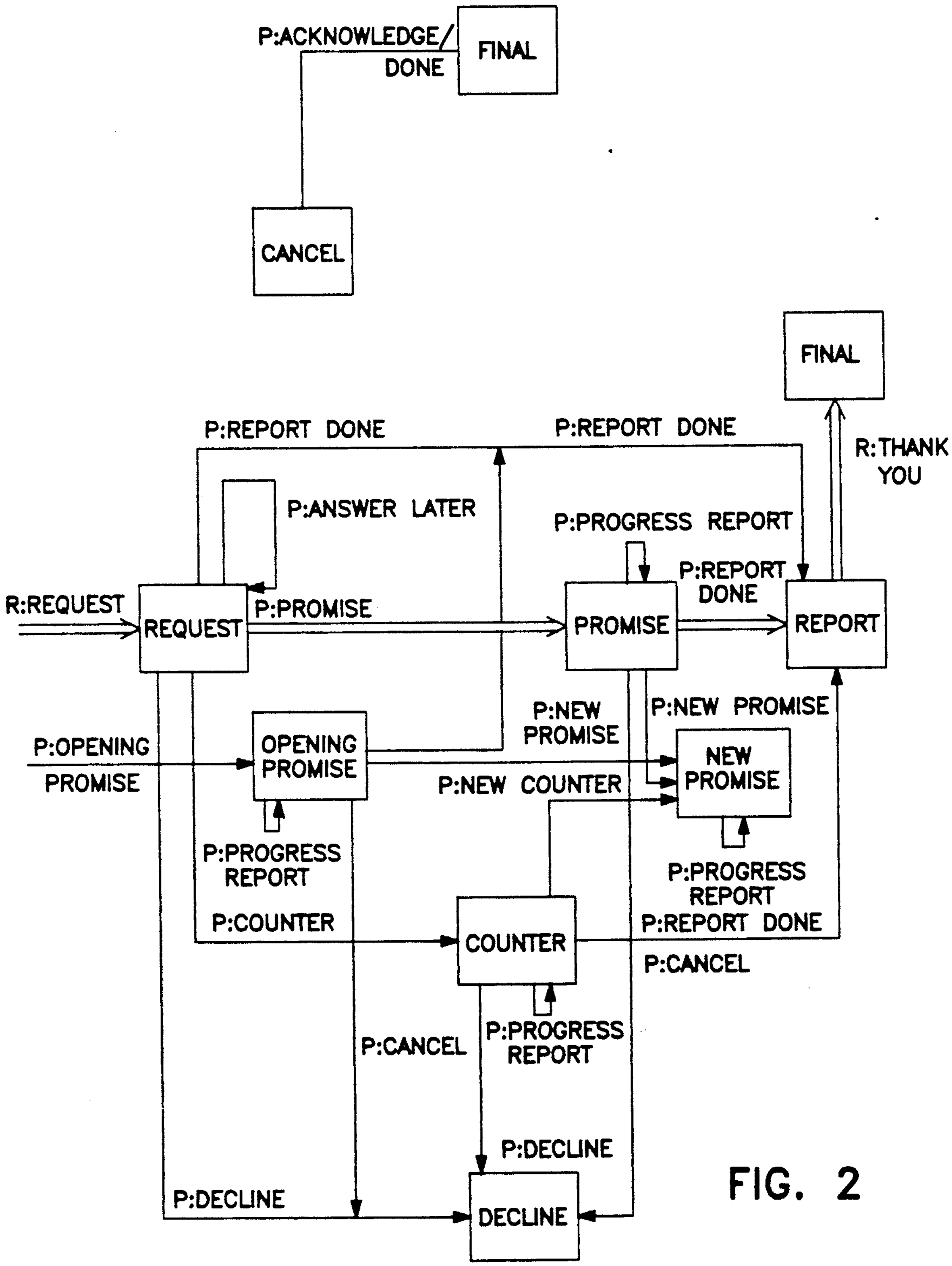

(4) Permitted Moves for PROMISOR in REQUEST Conversations between Two Participants FIG. 2 illustrates the FSM state machine for PROMISOR's moves in a Conversation for Action of the REQUEST type.

Notice in FIG. 2 that a participant may open a request-type conversation in the role of PROMISOR with an opening move called "Opening Promise." This option is illustrated in Table 1 as the option "Promise" in the menu of optional ways of opening conversations from the interface of The Coordinator system. The "Promise" opening of a conversation is a way of opening a REQUEST-type conversation in a special opening state called "Opening Promise."

The promise opening for a request-type conversation is included for the purpose of starting these conversations "in the middle." A participants who "arrives" at The Coordinator system in the middle of a conversation, begun in other media, can with this opening continue the conversation with support from The Coordinator system for completing the conversation. For example, in a meeting earlier in the day, "Alex" may have asked "Robin" to prepare a report. Now, Robin opens a conversation with a promise to prepare the report. A discussion of the difference between an opening promise and an opening offer is included below under the discussion of FSMs for offer-type conversations.

Another feature of the FSM for request conversations in the current embodiment is the designation of the state "New Promise" which allows the promisor to cancel and make a new promise in the middle of a conversation, while reserving to the requestor the opportunity to endorse and declare as his own the new promise, or alternatively to decline or counteroffer the new promise.

Figure 3:
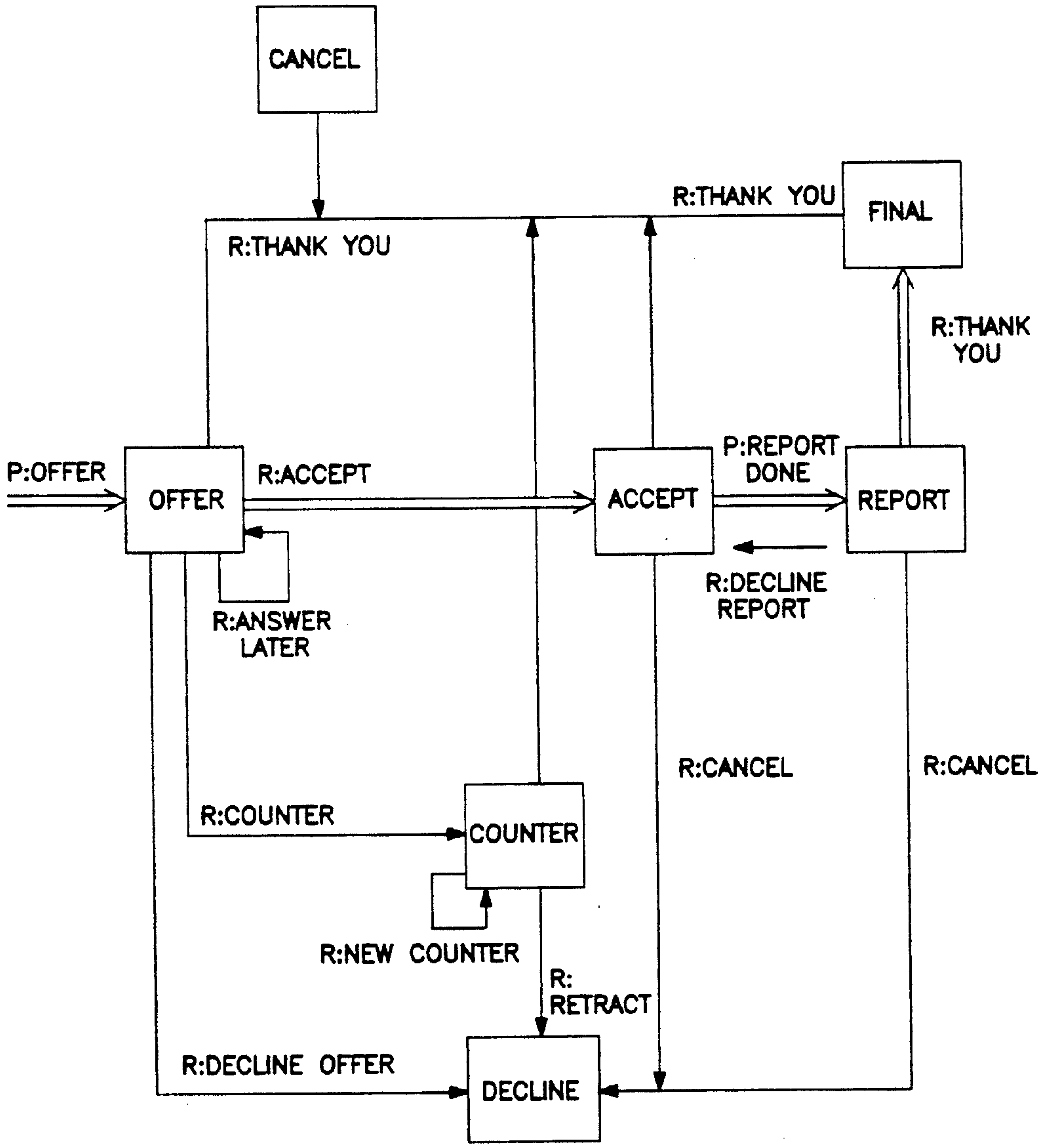

(5) Permitted Moves for REQUESTOR in OFFER Conversations between Two Participants FIG. 3 illustrates the FSM for the REQUESTOR's moves in a Conversation for Action of the OFFER type. In The Coordinator system such conversations are opened by a PROMISOR, who takes on that role in the conversation in the moment that he opens it. The next FIG. shows the PROMISOR's moves.

Figure 4:
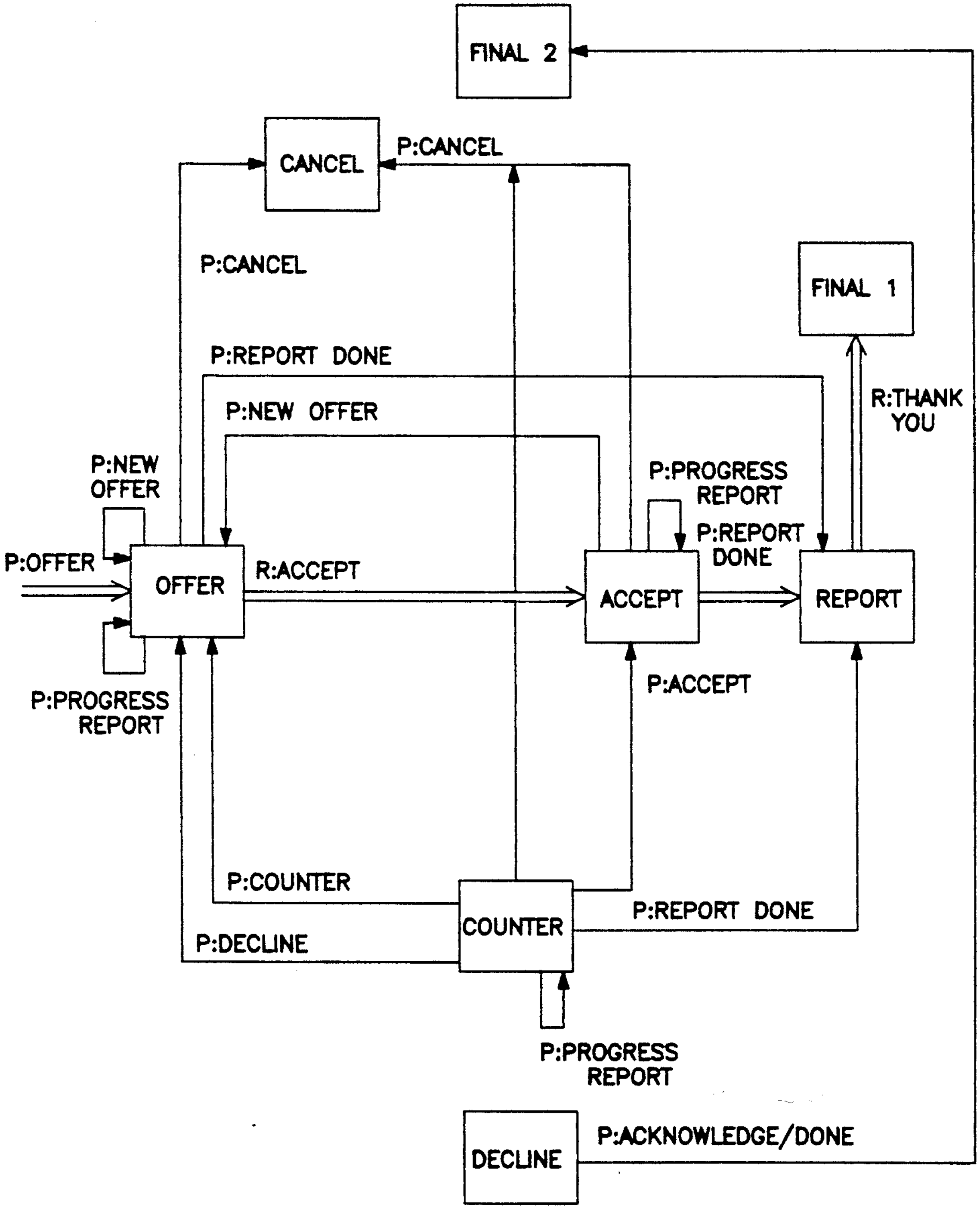

(6) Permitted Moves for PROMISOR in OFFER Conversations between Two Participants FIG. 4 illustrates the FSM for the PROMISOR's moves in a Conversation for Action of the OFFER type.

In an Offer-type conversation, the opening speaker offers or proposes to perform some action(s) to complete some specific possibilities, on condition that the offer is accepted: that is, provided that a participant in the role of requestor declares desire or willingness to have the offer carried out under stipulated conditions. There are small but important differences between this opening of a Conversation for Action and beginning a request conversation with an opening promise. In opening with a promise, the speaker confirms that he already has agreed to perform some action(s), about which there is no question that the requestor would like the action(s) carried out. Typically, a speaker opens a Promise conversation when a request that the promisor perform some action has already been madè, explicitly or implicitly, outside The Coordinator.

In the language of the method of the invention, the principal difference between these openings is that in the opening of an offer, the promisor begins without declaring an incomplete fulfillment for the requestor, while in opening with a promise, the promisor declares the requestor's incomplete fulfillment at the moment of opening the conversation. These distinctions may appear overly subtle from the perspective of casual social interchanges. However, from the perspective of a manager attempting to sort out some breakdown in the smooth functioning of an organization, these distinctions can be understood as essential. The difference between the case in which someone offering a service understood that the offer had already been declared accepted, and the case in which it had not been declared accepted are precisely the distinctions in which responsibility for ensuing actions and consequences may be sorted out. In this way it may be possible from this discussion to see how fundamental distinctions of the method presented here correspond to essential social transactions that are managed in actual practice in everyday conversational networks.

Figure 5:
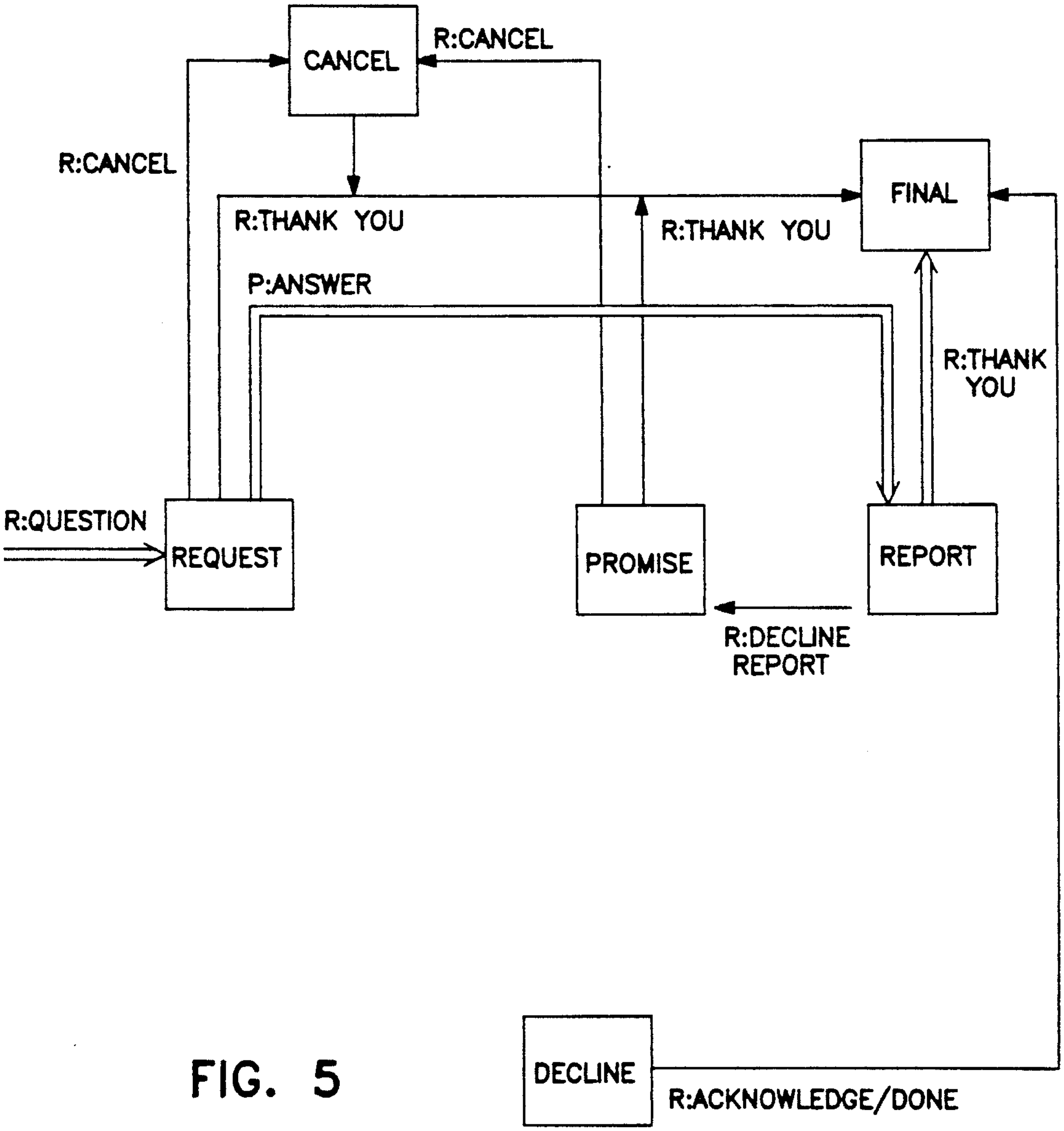
Figure 6:
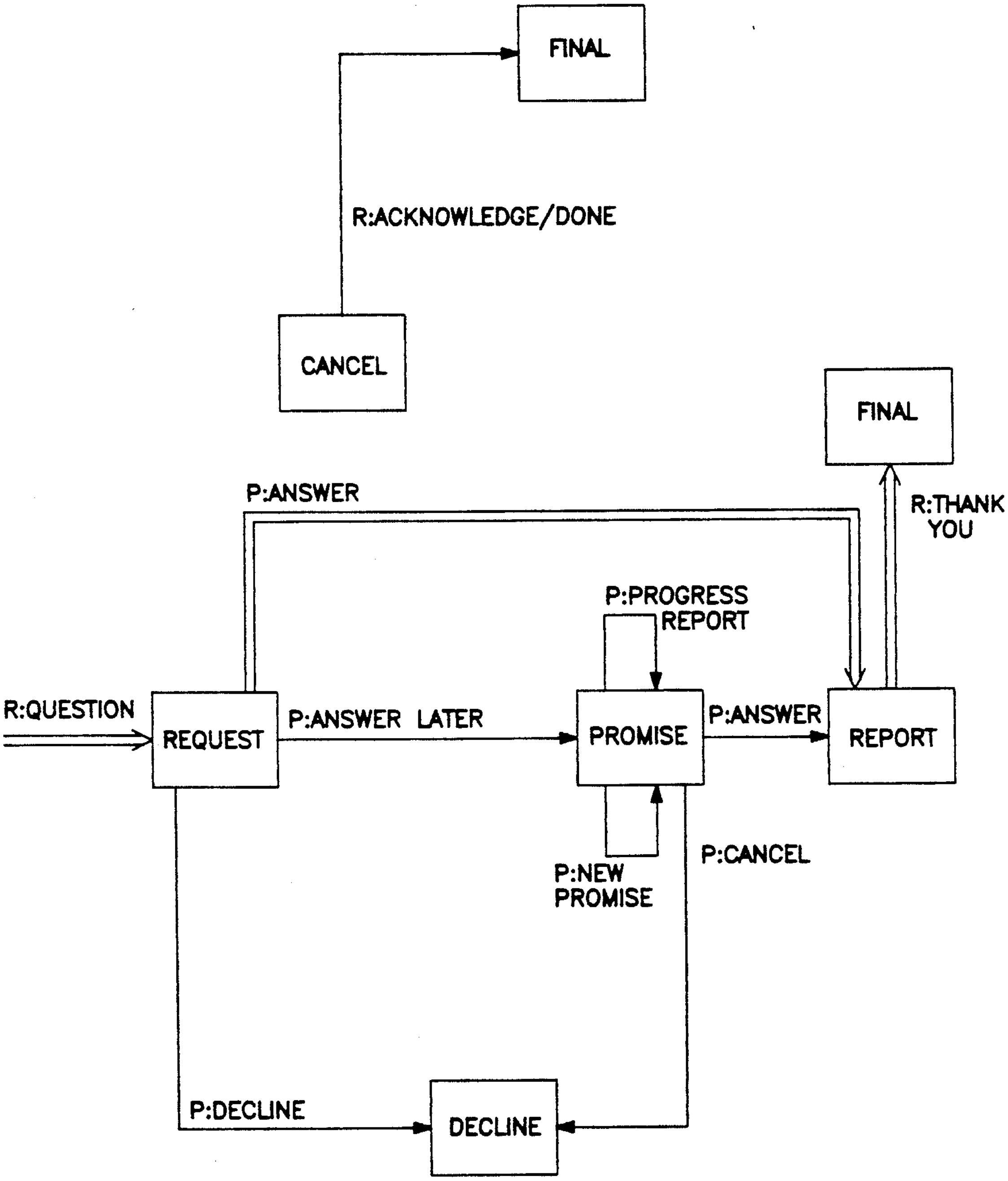

(7) Permitted Moves for REQUESTOR and PROMISOR in QUESTION Conversations between Two Participants FIGS. 5 and 6 illustrate FSMs for conversations of the QUESTION type, in which the person opening the conversation addresses his communication to one addressee. Note that conversations of this type are simplified forms of REQUEST conversations, suitable for asking specific questions or making simple requests. Unlike the protocol for REQUEST conversations, the protocol for QUESTION conversations does not include the state Counteroffer.

Figure 7:
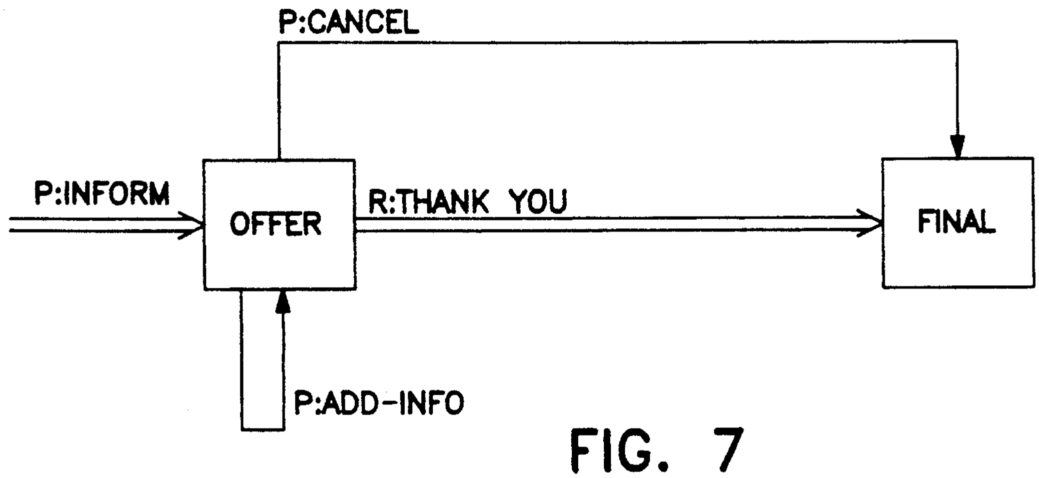

(8) Permitted Moves for REQUESTOR and PROMISOR in INFORM Conversations between Two Participants FIG. 7 illustrates the FSM for a conversation of the INFORM type in which the person opening the conversation (promisor) provides (offers) information to an addressee (requestor).

(9) Permitted Moves in Conversations for Action between a Participant and Two or More Other Participants If the communication starting a conversation is addressed "To" more than one person, then the conversation is said to become a "group conversation." The person starting any type of conversation can select multiple "To" addressees and therewith open a group conversation.

The formal structure of group conversations usually differ from the structure of a conversation with only one "To" addressee. One important example of such a difference is that in a group Request, addressees cannot make counteroffers. The counteroffer option is excluded for the purpose of simplicity—so that the requestor won't become bogged down in multiple negotiations with multiple addressees. Suppose for example that "Alex" sent a request to members of a project team to accept and perform a series of tasks in a project. If he then received distinct and different counteroffers from each member of the team, the situation would quickly become very complicated, and errors or misunderstandings could put the project at risk. When someone wants addressees to be able to make counteroffers to a request, that person can open separate conversations.

Figure 18:
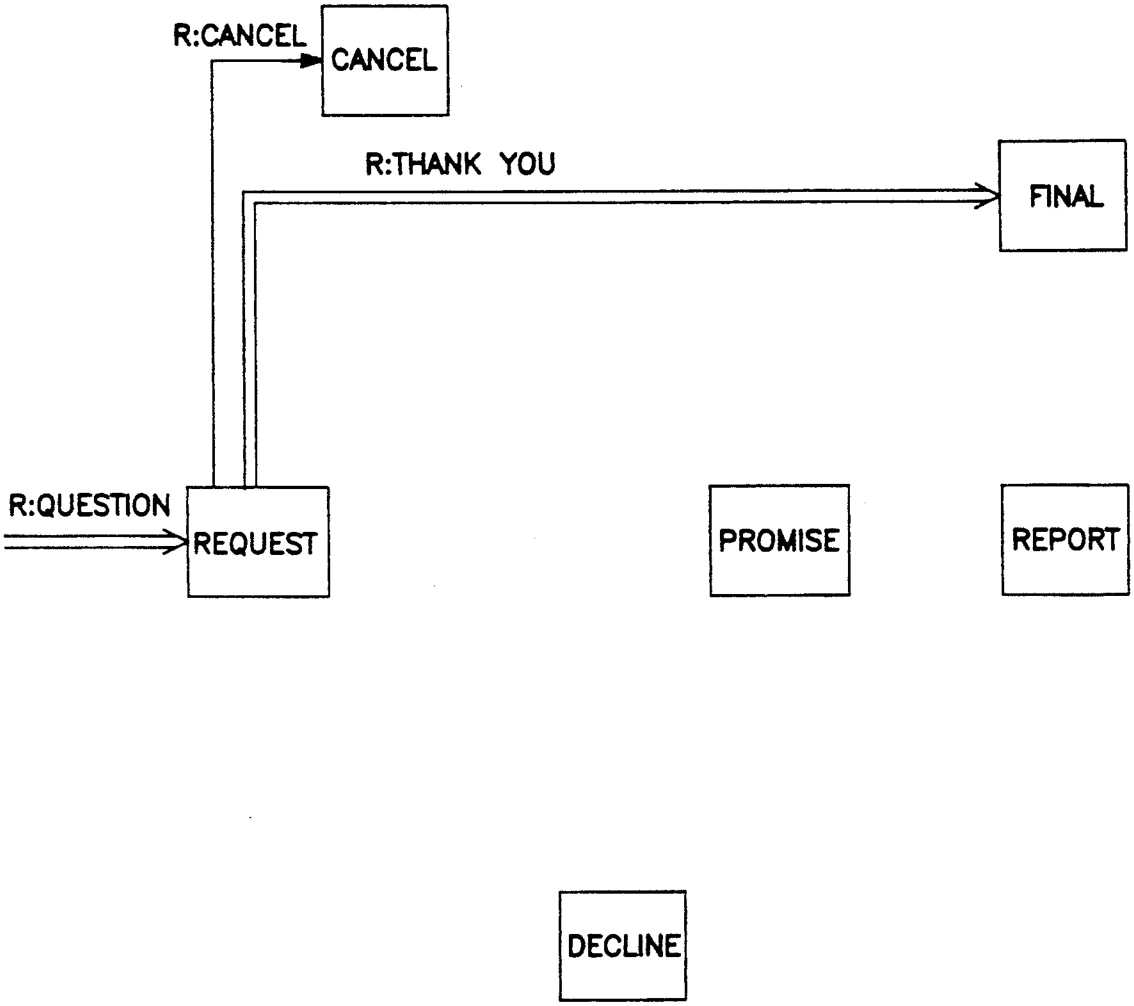
Figure 19:
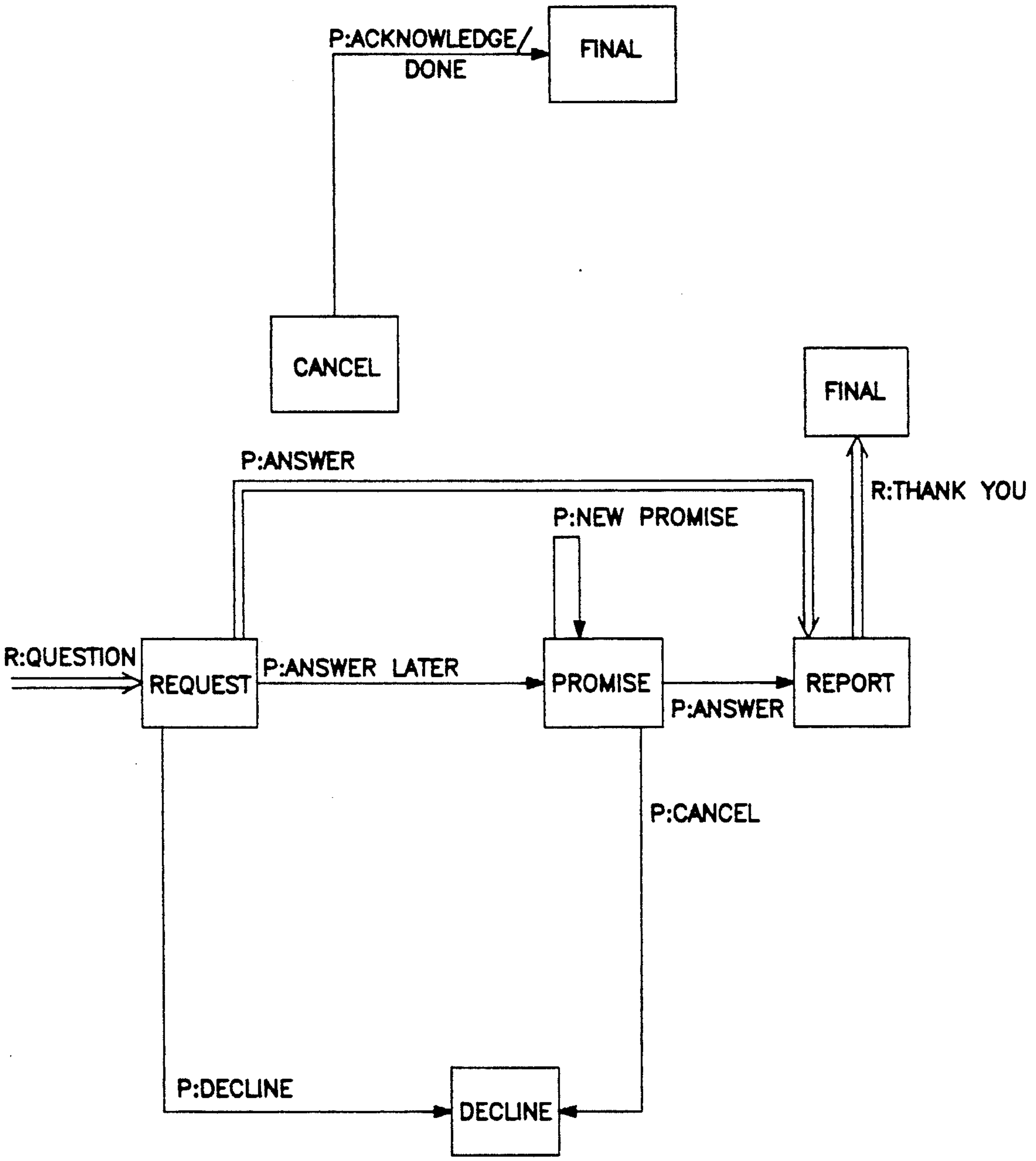
Figure 20:
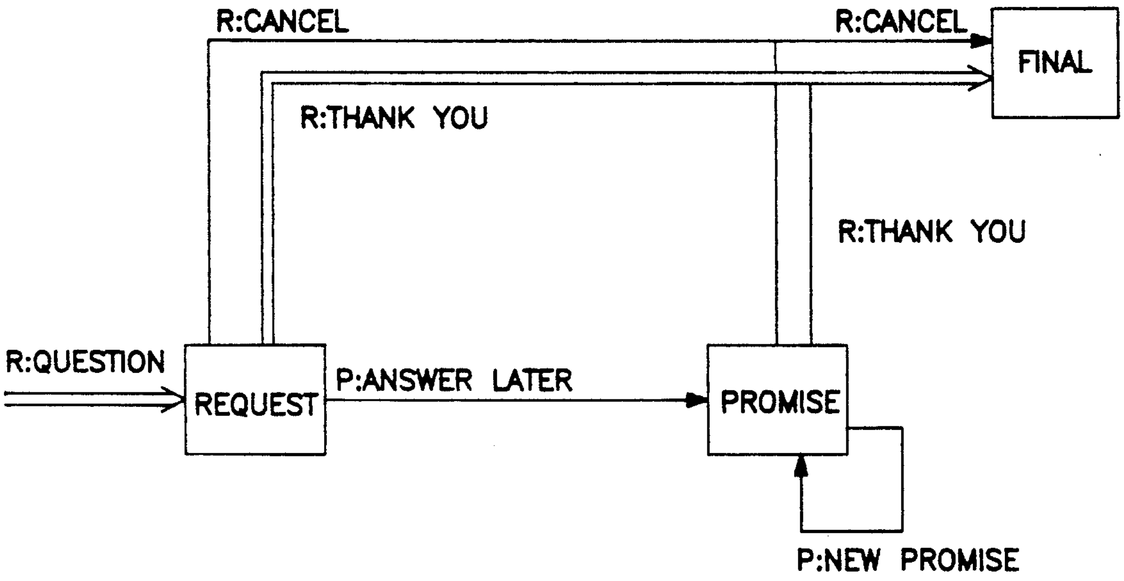

A second example is that in group request and question conversations, moves by promisors affect the state of the conversation for the promisor only, and not for the requestor. As illustrated in FIGS. 18 and 19, in a group question conversation, the requestor can find the conversation in these states: Request, Cancel, or Final. For the promisor, however, the conversation can be in those three states as well as three others: Promise, Report, or Decline. (In addition, if the promisor opens a delegation subconversation, the conversation can be in a compound state, e.g., request-delegating, or promise-delegated. See the discussion of delegation below). Promisors in these conversations make promises, decline, and report completion, thereby changing the states of the conversations shown in their own records. For requestors, however, the conversations remain in the state "Request" until the requestor declares the conversation complete (ideally, after all addressees have answered the question(s) or fulfilled the requests posed by the requestor), or until the requestor cancels the request. When the requestor declares a conversation complete, or cancels his request, the conversational state for the promisor is also changed.

In addition to the conversational state for an individual promisor in a group conversation being different from that of the requestor, the conversational states for different promisors may be different, depending on the moves the different promisors have made in the course of the conversation. Up-to-date and complete conversation records for different participants may include different current token structures for the conversation, representing incompletions in different states of the conversation. Similarly, in other types of group conversation, up-to-date and complete conversation records for different participants may include different current token structures for the conversation.

See Table 29 for an illustration of how token structures may change in the course of a group conversation.

Figure 14:
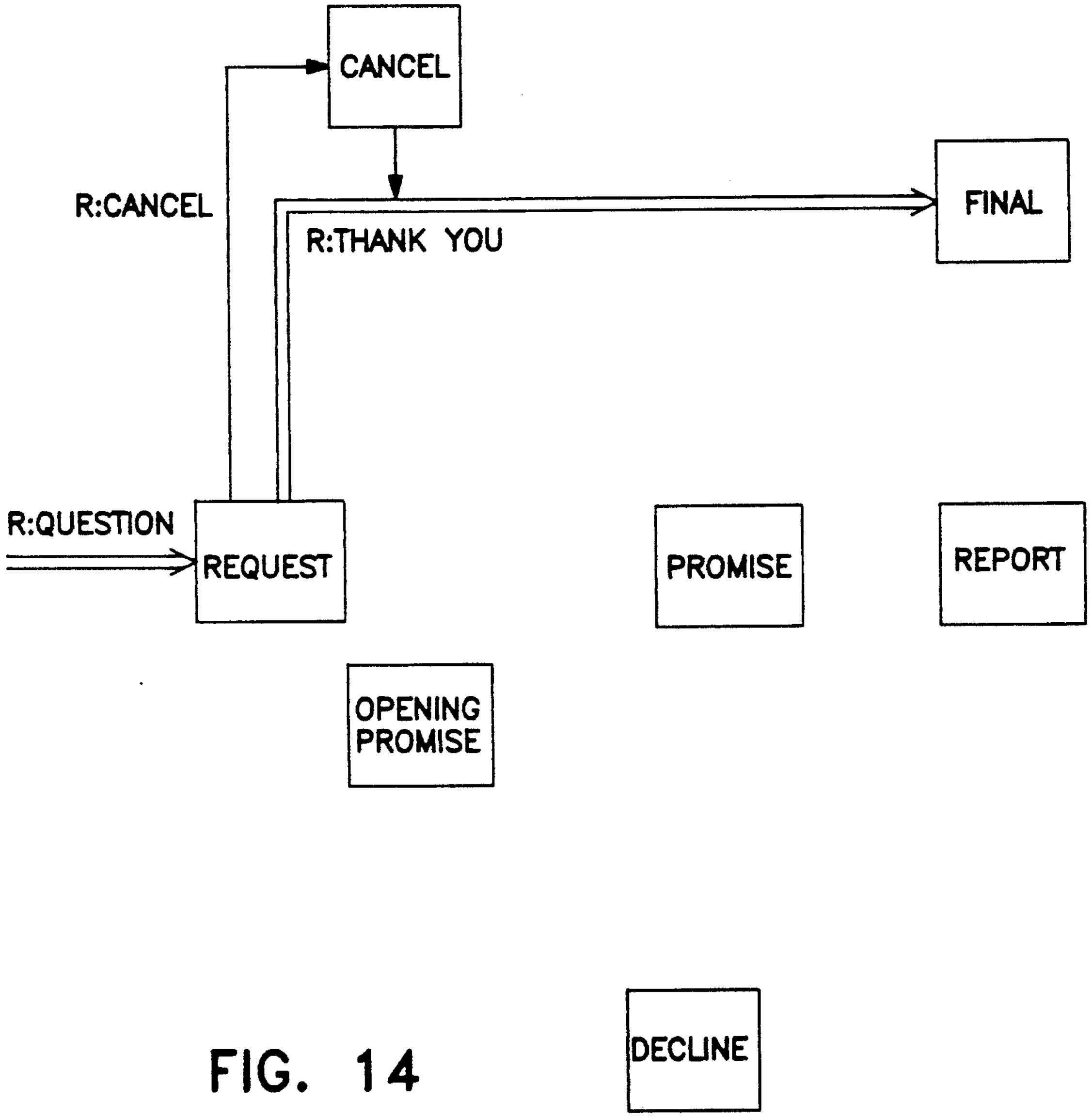
Figure 15:
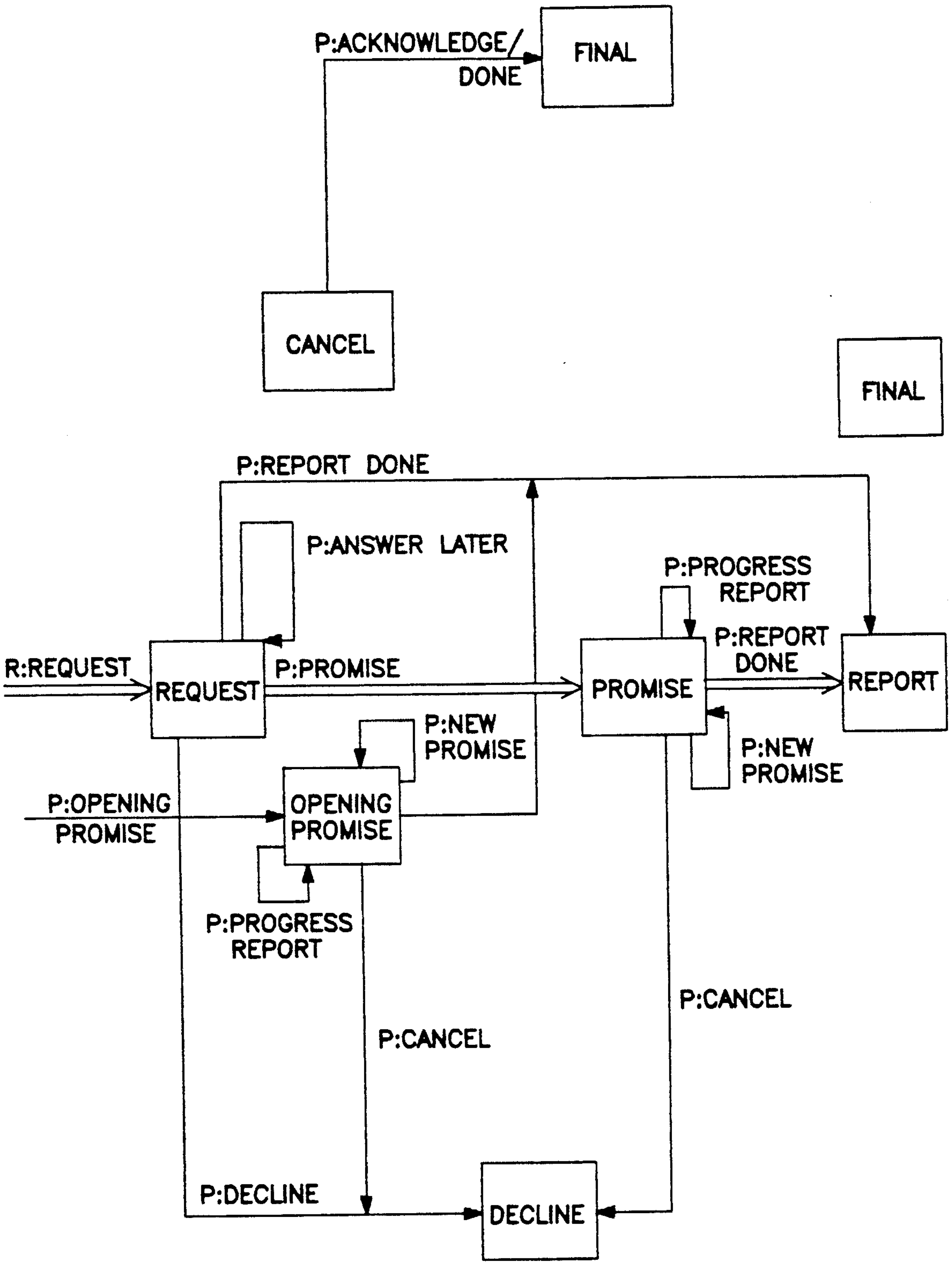

(10) Permitted Moves for REQUESTOR and PROMISOR in REQUEST Conversations between a Participant and Two or More Other Participants FIGS. 14 and 15 illustrate FSMs for REQUEST conversations in which the requestor addresses a request to several individuals.

Figure 16:
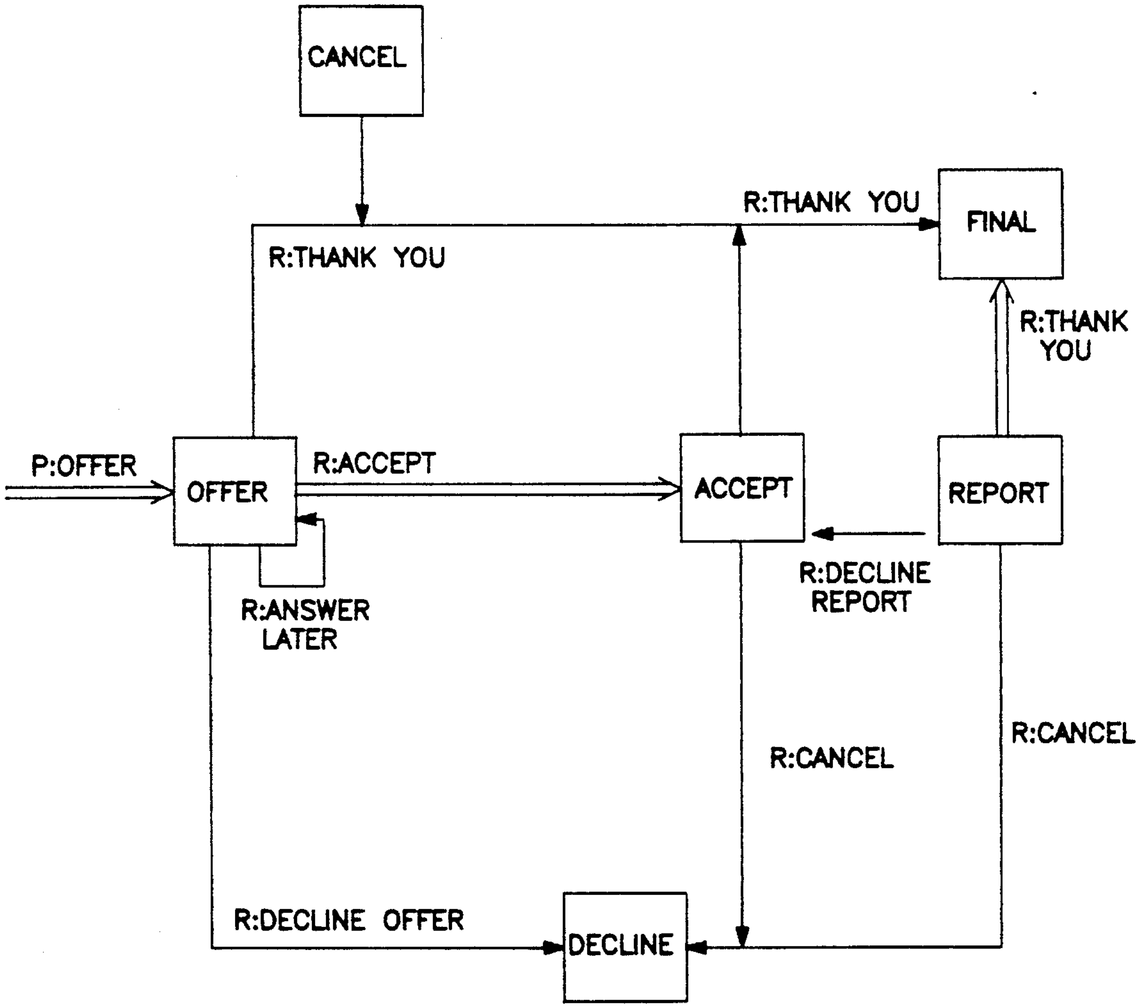
Figure 17:
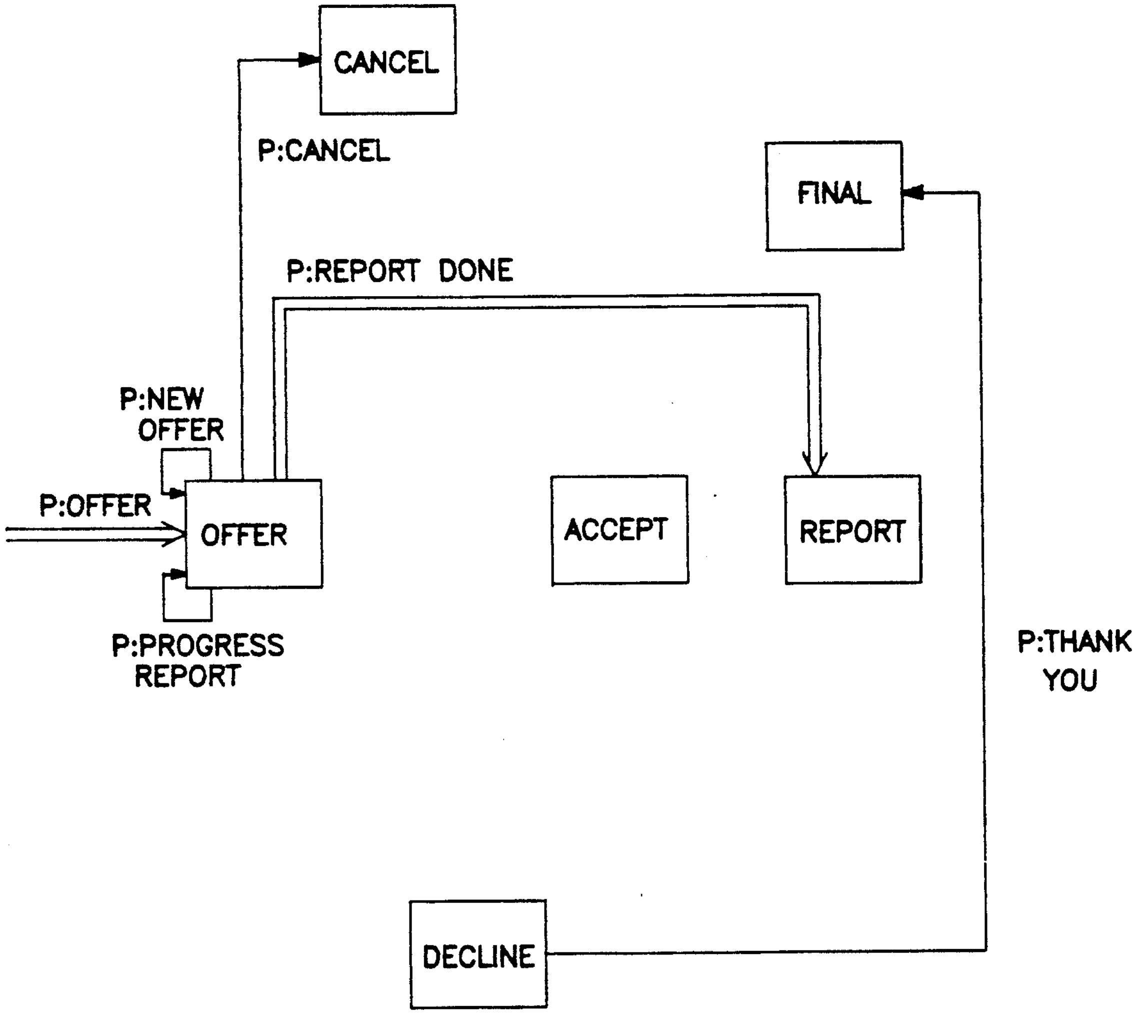

(11) Permitted Moves for REQUESTOR and PROMISOR in OFFER Conversations between a Participant and Two or More Other Participants FIGS. 16 and 17 represent FSMs for OFFER conversations in which the person opening the conversation addresses an offer to several individuals.

(12) Permitted Moves for REQUESTOR and PROMISOR in QUESTION Conversations between a Participant and Two or More Other Participants FIGS. 18 and 19 represent FSMs for QUESTION conversations in which the requestor addresses a question to several individuals.

(13) Permitted Moves in Conversations of a Participant with Himself

In a Conversation with oneself, the Conversation Manager switches the role of the participant back and forth between the roles in the conversation as the participant takes actions. For example, suppose that "Alex" opens a question with himself about certain career plans over the next several years, setting a reply date so that the question will appear to him as he is preparing to take vacation, two months hence. Note that in FIG. 5, it is in the role of requestor that a participant opens a question. Once the question is sent and recorded, however, the role of the participant in the conversation is changed to that of promisor. The process by which this happens can be seen by reviewing the FSM for questions with one self, in Table 25. Notice there that the opening move is designated as "non-standard," with the pointer "QMIACT_REQUEST" indicating where to look in the table of non-standard transitions, Table 27, for role changes and token patterns to apply. "QMIACT_REQUEST" appears as item 36 in the table, accompanied by code that indicates that the speaker, after speaking will be a promisor, that the listener will be a promisor, and that the listener will be a promisor after reading the communication. In other words, the taking of the move, asking a question to oneself, done in the role requestor, has the effect of wholly switching the role of the speaker after the communication is sent and recorded.

In this way, with the role switching back and forth, the FSM supports a conversation with oneself. The process can be understood by reading FIGS. 5 and 6 together, looking at moves that could be taken first in FIG. 5, after which FIG. 6 will indicate what moves could be taken in response. Without going into the detail, there are a few conditions in conversations with oneself where the designers made the assessment that too much detail would be confusing to the user, or that certain alternatives were misleading or worse, and so the FSMs for conversation with oneself are slightly simplified in ways that are not discussed here, although the simplifications can be observed in Table 25.

Also, in The Coordinator system, participants are permitted to add observers to conversations they are conducting with themselves.

(14) Incompletions at States in Conversations for Action

FIGS. 22 and 23 illustrate the minimum essential set of moves and states for REQUEST and OFFER types of conversations between two participants, along with the incompletions and tokens representing those incompletions at the essential states in these types of conversations.

We now describe the notation of representation of tokens representing incompletions in FIGS. 22 and 23. Each token of incompletion is represented by two letters. There are illustrated in the Figures a total of four tokens for a requestor and four for a promisor in every state—not all of which will be present in any state. In each box representing a state, the requestor's tokens appear on top in capital letters and the promisor's tokens are indicated on bottom, in lower case letters:

The incompletions of REQUESTOR are remarked in UPPERCASE characters, namely:

RR: requestor missing requestor's response
PR: requestor missing promisor's response
RF: requestor missing requestor's fulfillment
PF: requestor missing promisor's fulfillment The incompletions of PROMISOR are remarked in lowercase characters, namely rr: promisor missing requestor's response
pr: promisor missing promisor's response
rf: promisor missing requestor's fulfillment
pf: promisor missing promisor's fulfillment For the requestor, then, the RF token indicates that he is missing the fulfillment of a request he has made, the PF token indicates that he is missing the fulfillment of a promise made to him. The RR token indicates that it is the requestor's move in the conversation and the PR token indicates that it is the promisor's move.

For the promisor, the pf token indicates that he is missing the fulfillment of a promise that he has made, the rf token indicates that he is missing the fulfillment of a request made to him. The response tokens for promisor, pr and rr, have the same meaning as the counterpart response tokens for requestor.

In The Coordinator system, a variety of texts are provided for presenting tokens of missing response and fulfillment to the participant, as follows:

When composing a communication:
- Please report by
- Please reply by
- I'll report by
- I'll answer by
- To be completed by
- Please complete by
- I'll complete by When viewing or reading a communication which has been sent:
- <addressee> asked completion by
- <addressee> to complete by
- <addressee> asked for reply by
- <addressee> to complete by
- <addressee> to reply by
- <addressee> asked for report by
- <addressee> to report by When viewing a report of the status of a conversation:
- I'm to complete by
- I'm asked to complete by
- I asked for completion by
- I'm expecting completion by
- No completion date defined
- I'm asked to report by
- I'm asked to reply by
- I'm expecting a reply by When viewing a calendar:
- <date> reminder re <incompletion>
- <date> <addressee> to complete <incompletion>
- <date> <addressee> to reply to <incompletion>

The final states in conversations are defined as the states in which no token is present. That is, there is no remaining incompletion in the conversation. The declare-complete move (called "Thank you") in a Conversation for Action is interpreted by the system as an instruction to record as "complete" all previously recorded incompletions in the conversation.

Reviewing FIG. 22, note that in the state, "request", if the most recent previous move was a counter-offer by a requestor, different dates of fulfillment and response may have been declared by the participants in the conversation, and the tokens may be correspondingly different. We will give a detailed example of this phenomenon later in this section. What has happened in this example is that REQUESTOR's "requestor's fulfillment" token has recorded a new-complete-by date declared in the counter-offer move, and REQUESTOR's "promisor's response" token has recorded for it a new respond-by date. (PROMISOR's tokens will have corresponding differences.)

Also in FIG. 22, note that in the state, "promise", if the last move was an accept of a counter-offer by the requestor, REQUESTOR's "requestor's fulfillment" token date becomes the complete-by date of the counter-offer (called "counter") (if that date differs from the complete-by date of the original request). PROMISOR's "requestor's fulfillment" token will be modified in similar fashion.

Also in FIG. 22, note that in the state, "decline", PROMISOR's "requestor's fulfillment" token is only present if the last move was promisor's cancel of his promise. This token is not present if the last move was a promisor's decline of the request. The REQUESTOR's "requestor's response" token takes the new respond-by date.

Also in FIG. 22, note that in the state, "cancel", the date of response tokens is that produced in the requestor's cancel move, and is not the date of the original request, nor of the promisor's report-complete move (called "report").

In FIG. 23, note that in the state, "accept", if the last move was a promise, the dates given to tokens may differ from those originally given in the conversation. REQUESTOR's "promisor's fulfillment" token is given a "New complete by" date if one was produced in the previous counteroffer move by REQUESTOR. Similarly, the date of PROMISOR's "promisor's fulfillment" token changes.

In FIG. 23, note that in the state, "cancel", dates given to response tokens are those produced in PROMISOR's cancel move.

In FIG. 23, note that in the state, "decline", PROMISOR's fulfillment token is only present if the last move was a requestor's decline of his offer. This token is not present if the last move was a requestor's cancel of the offer. PROMISOR's "promisor's response" token takes the respond-by date of the requestor's decline or cancel move.

(15) Ask Reconsideration Moves

At several junctures during REQUEST, QUESTION, PROMISE and OFFER types of conversations a requestor or promisor may make a move that negates an earlier move, or puts the conversation into a state in which a participant is declaring the conversation unsuccessful for producing the incompletion or incompletions for the sake of which they were participating in it. For example, a requestor may cancel a request, or decline a promise, and a promisor may decline a request. In such cases, the addressee of the communication may wish to raise a question about the decision. By selecting the move "Please reconsider," or "Ask reconsideration," a speaker can ask his interlocutor to reconsider an immediately prior action of these sorts.

FIG. 10 illustrates the way that "ask reconsideration" moves appear in a conversation of the REQUEST type.

The figure includes ask-reconsideration moves made by the requestor and by the promisor. Notice that the lines are keyed, so that for each arrow showing a transition into a state there is a second, corresponding arrow showing a transition to another state as a result of the respondent's ask-reconsideration move.

For instance, while the conversation is in the state Request, if the requestor cancels the request, the state changes to Cancel. In that state, the promisor can acknowledge the cancellation and move the conversation into the state Final. However, the promisor can also elect to ask the requestor to reconsider the cancellation. In that event, the conversation is returned to the state Request. Likewise, while the conversation is in the state Promise, if the requestor declines a promise, the state changes to Decline. Then the promisor can ask the requestor to reconsider the decline, therewith reasserting the promise and returning the conversation to the state Promise.

The two preceding cases are symmetrical in the sense that the ask-reconsideration move returns the conversation to the state in which the cancel or decline was made. This symmetry is not always the case: while a conversation is in the state Counteroffer, if the requestor cancels his request, moving the conversation to state Cancel, the promisor's ask-reconsideration returns the conversation to the state Request rather than to the state Counteroffer.

(16) Revise Request and Revise Question Moves

Figure 11:
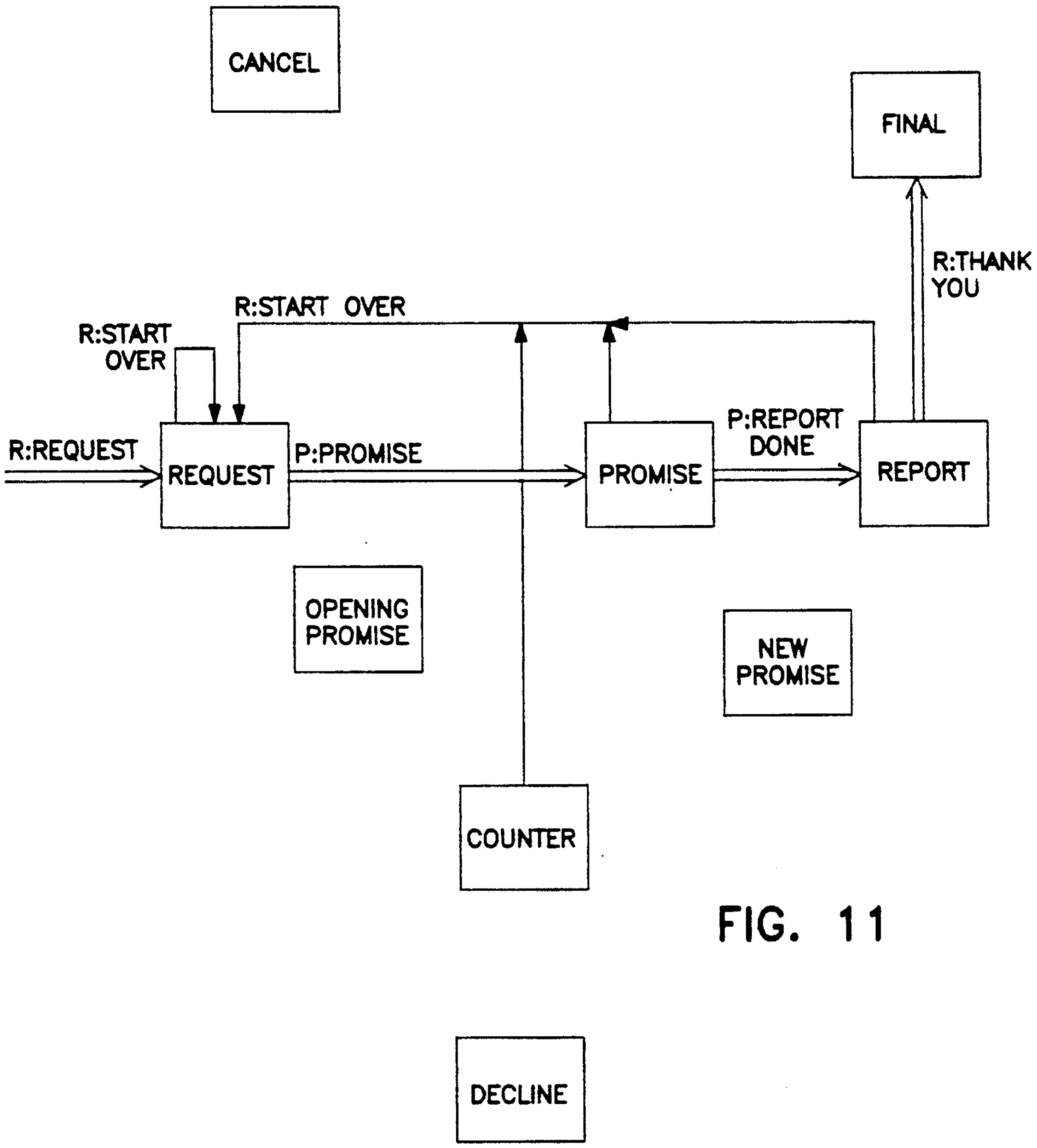

If the declared incompletions of a Conversation for Action, for example a QUESTION or REQUEST, become ambiguous, suspect, or otherwise unclear during the course of the conversation, and if the conversation is not in the state Decline, or Cancel, then the participant who started the conversation can select the "revise" option and re-start the conversation, returning it to the Request state. FIG. 11 illustrates the manner in which these moves are offered within the FSM for a Request conversation.

In conversations of the OFFER type, a "cancel/new offer" move can be made in the Offer, Accept, and Counteroffer states. The revise move leaves the state unchanged.

(17) Delegation

Figure 12:
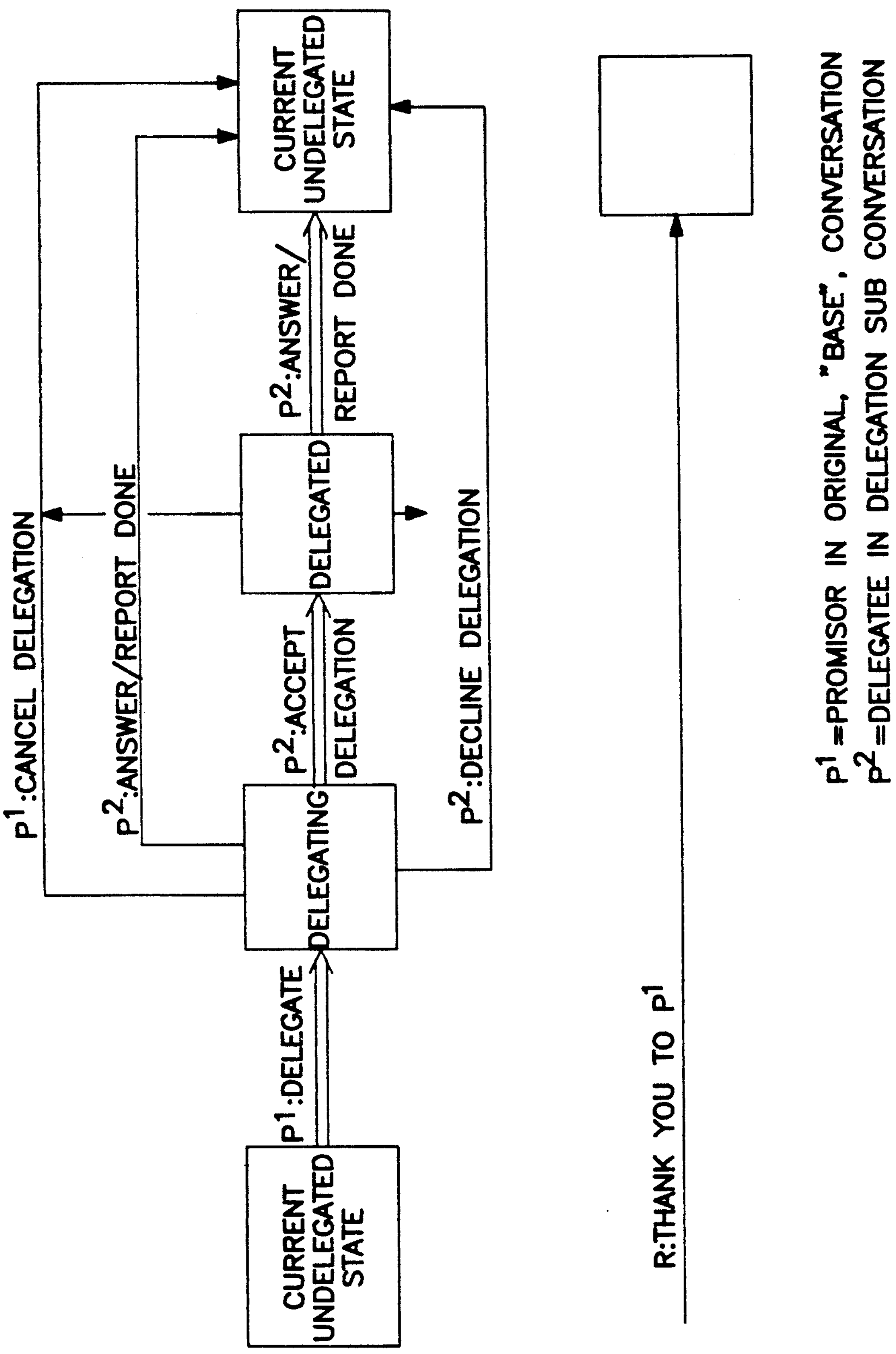

FIG. 12 illustrates the structure of the Delegation subconversation as it is embedded in Question and Request conversations. When a standard or group REQUEST or QUESTION conversation is in the state Request or Promise, a promisor may make a move called "Delegate," which will open, within the same conversation, a delegation subconversation. A promisor may also open a Delegation subconversation in a standard REQUEST conversation that is in the state Counteroffer.

The delegation conversation has the structure of a simple request conversation. In it, the promisor (the delegator-to-be), who has already been asked to perform some action(s) or answer some question(s), asks the addressee (the delegatee) to perform the action instead. While participating in the Delegation subconversation, the delegator also remains in conversation with the person—the original requestor—who sent the opening Request or Question, and can, but need not, name that person as an observer in the Delegation subconversation.

Assume that a promisor delegates a question to someone other than the original requestor. The "base" state for the promisor's conversation with the requestor remains what it was—Request, Promise, or Counteroffer. But the conversational state for the promisor-delegator's subconversation with the delegatee becomes "Delegating," indicating that a delegation has been requested, and the promisor's record of the conversation state will show a compound conversation, called, for example, "Promise, Delegating." That is, the act of delegating changes the conversational state for the promisor-delegator, but it does not change the base state of the conversation for the original requestor.

In fact, no acts in the Delegation subconversation affect the state of the base conversation.

After delegating occurs, the base state of the conversation may change at any time, in accord with moves made by the requestor or promisor.

Also, after delegating occurs, if the delegatee accepts the delegation, the state of the subconversation changes from "Delegating" to "Delegated," indicating that it has been successfully delegated. Again, this does not affect the base state of the conversation.

While a delegation is in process, the state of the conversation for the "middle man"—the promisor-delegator—is a compound state, determined by both the base state of the conversation and the state of the Delegation subconversation. For example, for the middle man the conversation might be in the state Promise, Delegating or in the state Cancel, Delegated.

In the conversation records for the recipient of the original request or question, The Coordinator system keeps together records of the delegator's communications with both the original requestor and the delegatee, retaining distinct the current token structures for the "base" conversation and the Delegation subconversation. Table 30 illustrates how the tokens for the two parts of the conversation are kept distinct during the progress of a Delegation subconversation.

Figure 13:
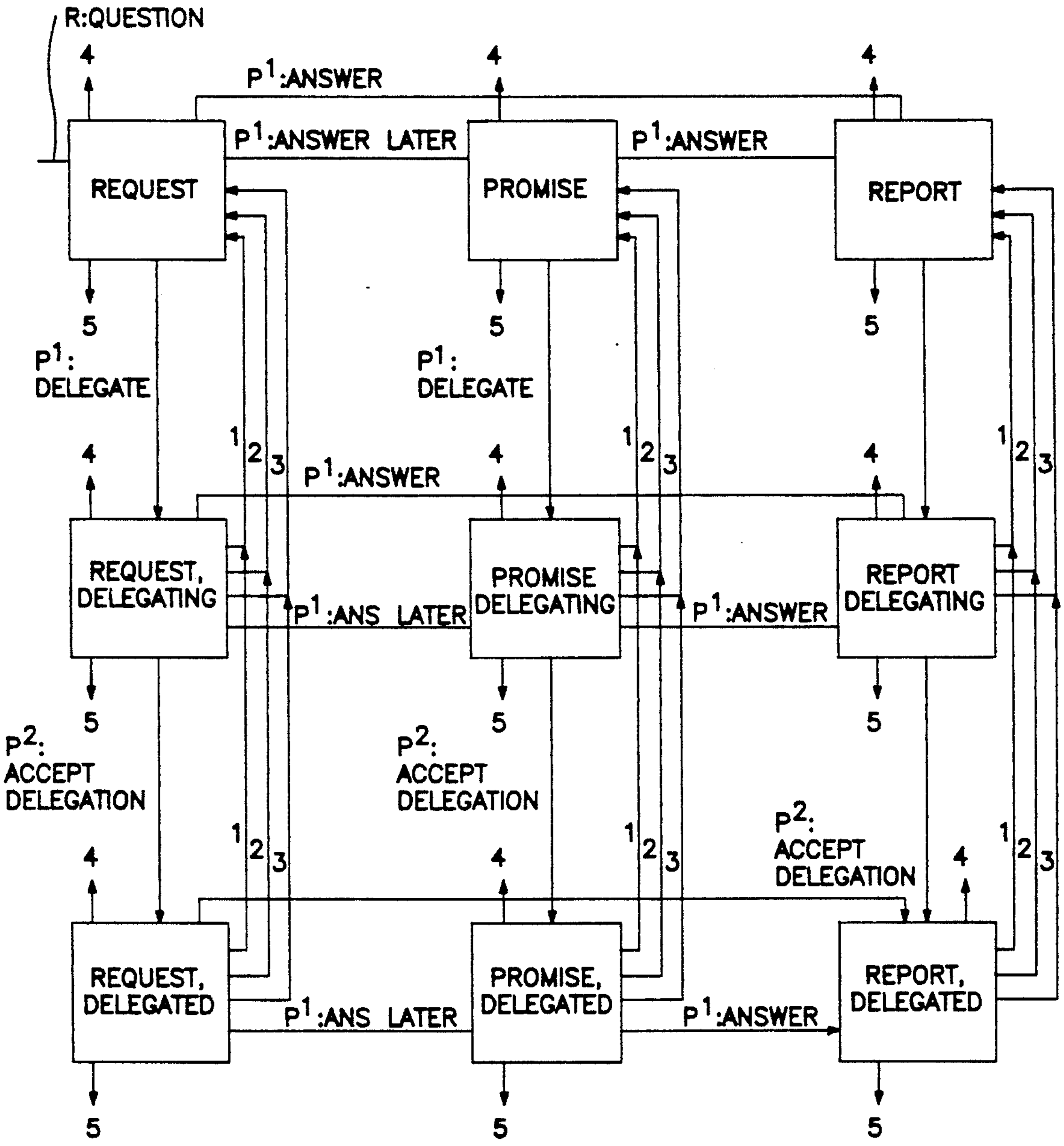

FIG. 13 illustrates the contexts in which a Delegation subconversation may be started in a Question conversation, and further illustrates the structure of transitions among compound states while actions are happening in both parts of a conversation in which a delegation has occurred.

A single Delegation conversation may be opened with one or more addresses in any Request or Question conversation. When that delegation is declared complete, canceled, or declined, a new delegation may be opened, so long as the base conversation is still in an open state before a promisor has reported completion, and so long as no delegation sub-conversation remains open.

(18) Progress Report, Answer Later, and Acknowledge Moves

Two types of progress-report moves, "ask about progress" and "report progress," and two types of acknowledgement moves, "postpone responding" and "acknowledge receipt," are not handled within the FSM of The Coordinator system, but rather are added to those permitted moves derived from a FSM before the full list of permitted moves is presented to a participant by The Coordinator system.

An ask-about-progress move is permitted to requestor when he is missing requestor's fulfillment, and to either of the primary participants when they are missing the response of the other. As a consequence, a requestor is permitted follow-up moves from any state until he declares the conversation complete. PROMISOR is permitted follow-up moves in states counteroffer, decline and report.

A report-progress move is permitted to a promisor when he is missing requestor's fulfillment.

Moves in which the speaker postpones responding, or promises to later, are provided at specific locations in the FSMs—when a promisor is replying to a request, when a requestor is replying to a counter, and so forth.

The rules according to which both kinds of acknowledge moves are permitted to participants are based not only upon the conversational role of the participant and the current fulfillment and response incompletions of the conversation, but also upon a type of incompletion not previously discussed, in which what is missing is the declaration that a participant has listened to a specific declaration by another participant. In normal human conversations, an acknowledge is a kind of move made by a participant to complete an incompletion—the concern that a participant is not listening—that will in turn make it possible for the next declaration to be made in confidence.

The rules governing the making of both acknowledge moves are: (a) the participant preparing to make a move must not have previously made a move in response to the move he might now acknowledge and (b) the move being acknowledged must have been made by a participant participating in this conversation in the role of requestor or promisor. In addition, the acknowledge receipt move can only be made if the move being acknowledged is not itself an acknowledge move.

Progress report, Answer later, and Acknowledge moves do not cause any change in the state of a conversation.

(19) Cogent and Non-Cogent Moves

"Cogent" moves are defined to be those moves defined for the purpose of bringing to completion the missing fulfillment declared by the requestor in opening the conversation. For example, Table 17 shows a facsimile of the menu which The Coordinator system will present to a participant replying to a request. The menu is divided into two parts—top and bottom. The optional moves listed at the top of the menu are all "cogent" moves—moves designed for the purpose of managing and moving to completion those incompletions which the type of conversation is designed to manage and complete. In addition, Postpone responding, listed in the bottom, is also a cogent move. In a Request-type conversation, promisor's decline, counteroffer, promise and report of completion are examples of cogent moves of the promisor, as are requestor's cancel, counteroffer, and declaration of completion.

In contrast, acknowledgements of receipt and comments are defined to be "non-cogent" moves, allowed for the purposes of helping with the administration of the conversation, and allowing participants' to make notes, asides and digressions in the conversation.

The difference between cogent and non-cogent moves is important in the operation of the Conversation Manager. Each cogent move allows a participant to produce changes in (a) the recorded state of the conversation, and/or (b) the recorded roles of one or more participants, and/or (c) one or more tokens of incompletion in the conversation. At a minimum, each cogent move allows at least one change in a token. Because cogent moves have this property of changing the records of aspects of the conversation that can affect the opportunities of different participants to act in the conversation in the future, the "To" addressees of a cogent move cannot be changed after the conversation is begun.

In contrast, participants can re-address non-cogent moves "To" any other addressee to which they can address communications of any type.

In a future embodiment of this method, it is possible for "To" addressees to be added and subtracted from the addressees of a cogent move, in which case the Conversation Manager would be programmed to (a) automatically send the history of the conversation to those added to the conversation, and (b) inform those subtracted that they will not be receiving further communications in this conversation. For the purpose of simplicity this capability has not been included in the current embodiment.

An additional feature of the embodiment apparent in Table 17 is the small dots to the left of the report and decline move options, indicating that these moves are closing moves for this participant—moves which allow the participant to declare that he has fulfilled, or is declining to take action regarding, the principal incompletions declared by the opener of the conversation.

Further, two features of the embodiment having to do with producing a language of distinctions familiar to the participant, which will be discussed later in this description, are also apparent in Table 17. First, notice that there are two "counteroffer" moves listed in the menu. These two moves have exactly the same structure of incompletion defined for them in the FSM; however, they are assigned different text strings for their appearance in menus, lists, and messages, and for defining "boilerplate" text that will appear in them. Second, notice that the left-hand column of move names is in colloquial English-language phrases, while the right column provides clarification of the formal intent of the move in the form of a performative verb. Both these features allow customization of the language in which a move appears in the interface so that it can be made exactly consistent with the understanding of some move in a community of participants.

(20) The Comment (or "Free-form") Move

The move, "Comment," is always permitted, even in conversations that have been closed (i.e., conversations that are in final state). Comment moves do not cause any change in the state of the conversation.

(21) Permitted Moves in Conversations for Possibilities

Figure 8:
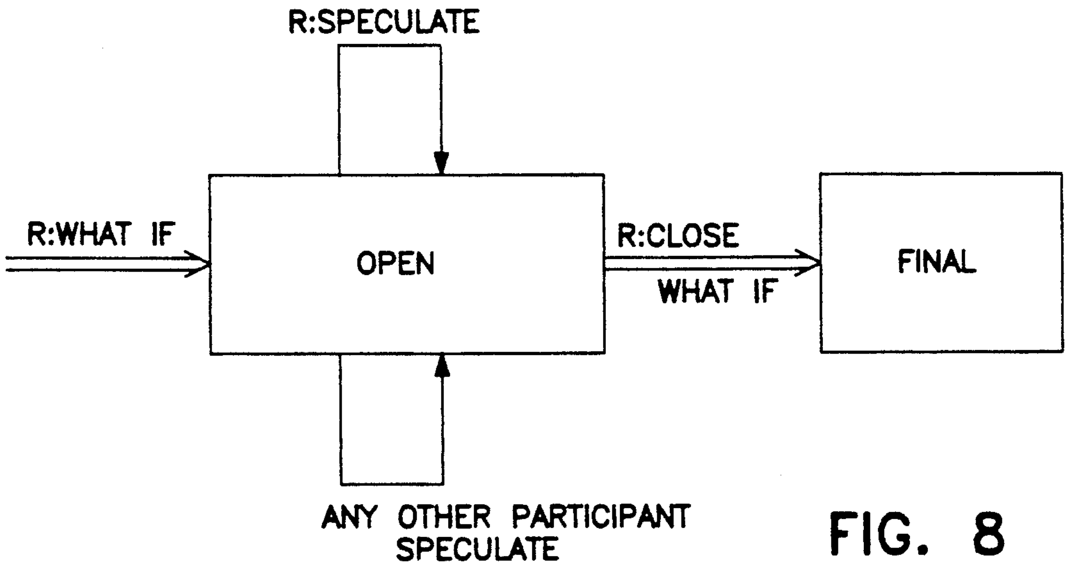

FIG. 8 illustrates the FSM for Conversations for Possibilities. In Conversations for Possibilities The Coordinator system manipulates only two tokens for each role in the conversation: the requestor's response and the promisor(s)'s response tokens. The conversation states are open and final. In the open state, two distinct token patterns are possible, depending upon which party spoke last.

Figure 9:
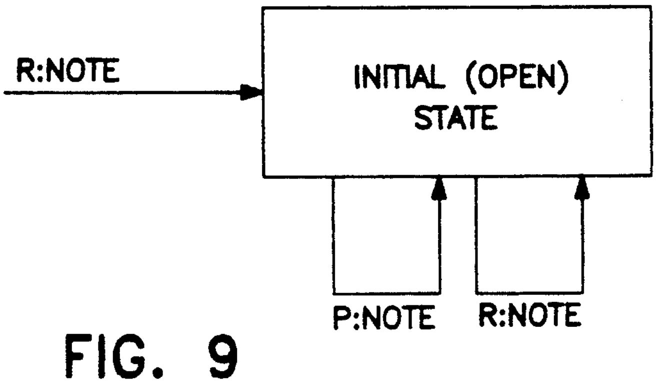

(22) Permitted Moves for Participants in NOTE Conversations between Two Participants FIG. 9 illustrates the FSM of a conversation of the NOTE type. In a Note conversation, the conversation is always in the Initial (open) state, and the only move that any participant can make is to send a Note. As a consequence of this last feature of the conversation, while in the elemental distinctions of the code it is a requestor who starts a note conversation, addressed to one or more promisors, from the perspective of the participant at the interface of The Coordinator system, there is no important differentiation between requestor and promisor roles in the conversation. This feature is consistent with the intentional ambiguity of the Note type of conversation with respect to the types of incompletion that may be declared and carried forward within it.

In Note conversations, the opening speaker leaves unspecified whether the communication is part of a Conversation for Possibilities or a Conversation for Action. As a result, a Note conversation is not explicitly a conversation for declaring specific realizable possibilities or a conversation for producing actions to complete specific possibilities, and there are no tokens representing missed fulfillment. The recipient of a Note can interpret it as a communication in a Conversation for Possibilities or as a communication in a Conversation for Action, as he chooses. Each time a participant makes a move in a Note conversation, that participant has the option of declaring a response incompletion. This is provided to allow the speaker the minimum support in their conversation—asking for and tracking the completion of the response to whatever was brought forth in the note.

A person might choose to open a Note conversation for the sake of simplicity when the point of the communication is thoroughly clear, given the background shared by participants in the conversation, and the opener of the conversation does not wish to initiate a more elaborate conversation. Thus, a person might send a note saying, in effect, "Here's the phone number you asked for, "rather than opening an INFORM or OFFER conversation.

A person might also choose to open a Note conversation when he wishes to leave ambiguous or not force an interpretation of the contents of the note. Thus, a person might send a note giving the place and time of an upcoming talk, without, for example, opening a REQUEST to invite someone to attend, or a WHAT IF conversation to open a speculation about their attendance.

(23) Permitted Moves for Participants in NOTE Conversations between More than Two Participants, and with Oneself Note conversations among more than two "To" addressees, and with oneself, have the same structure as that of Note conversations between two addressess. At any moment any participant can reply to a note, and it can be addressed to anyone.

(24) Permitted Moves for OBSERVERS in Conversations

Figure 21A:
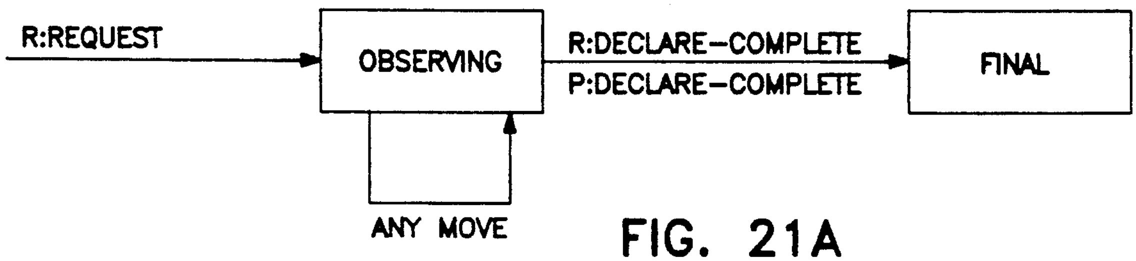
Figure 21B:
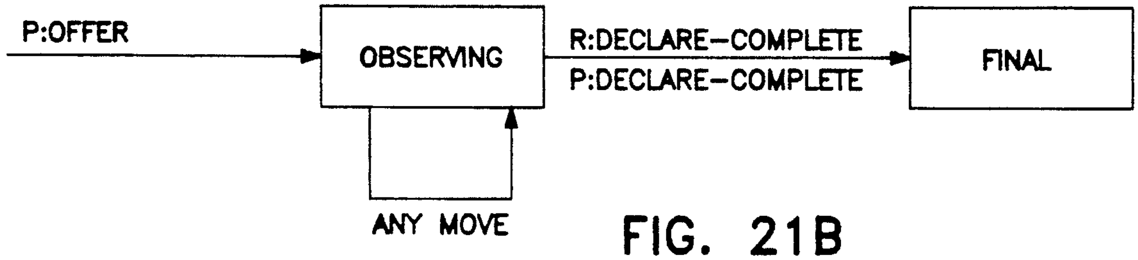
Figure 21C:
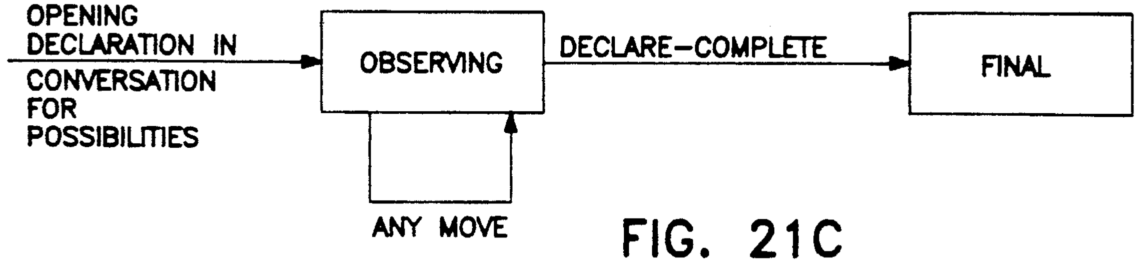

For OBSERVERS, open conversations are placed in the state "Observing". FIGS. 21*a*, *b*, and *c* illustrate the state, "Observing". For an observer in a conversation the state of the conversation has only two states. When an observer receives a communication in a new conversation, that conversation is moved, from the observer's point of view, to the state, "Observing". All conversations remain in that state until a declare-complete move is made by one of the primary participants in the conversation—that is, until a communication is received in which a participant permitted to do so declares the conversation complete. Observers are permitted only "comment" moves in Conversations for Action, unless they are the addressee of a delegation, and, although they are permitted the moves of PROMISOR in Conversations for Possibilities, such conversations are nevertheless held in the state "Observing" in OBSERVERS' conversation records.

(25) Operation of Finite State Machines

In the following we give examples of the operation of The Coordinator system's finite state machines during the conduct of conversations among participants in a sample set of conversations. An example of the functioning of these machines for several types and subtypes of conversation in The Coordinator system is provided.

Each description includes two parts: a part in which moves are described in the language of an observer who is observing participants in a conversation, and a part in the language of an observer who is specifying the structure and operation of the system which is recording the conversation and placing tokens (and other data) in databases to represent incompletions and the declared dates of completion for those incompletions.

(25a) Example of a Conversation for Action of the Request Type

As an example of this type of conversation, consider a conversation opened by "Alex" making a request to "Robin", in the domain "newsales".

This moves, state-transitions, and token manipulations described in this discussion are illustrated in Table 31. In addition, in following this discussion the reader may find it useful to consult FIG. 22, which shows the structure of permitted moves given the minimum defined set of permitted moves in this type of conversation. The Figure is organized to show the moves according to the notational construction of "Conversational States", and thus shows moves as transitions from and to the states of a conversation. The specific incompletions found at each state (i.e., produced by moves which deliver the conversation to that state), and the representative tokens to be found in the conversation record at that state are also indicated in the Figure. Incompletions are noted with alphabetic characters inside boxes representing the states of the conversation as described above in this section.

The conversation begins when Alex makes a request to Robin, asking Robin to deliver a budget to him by June 16th (the "complete-by", or "missing fulfillment" token date).

In addition, he asks Robin to confirm that Robin will be able to fulfill the promise before June 14th (by entering a "Respond-by" date for the incompletion he is creating for the "missing response").

In the conversation record in The Coordinator system that Alex uses, the conversation opened by Alex is in the state "request" after Alex makes the request. For Alex, the requestor, two tokens are recorded: the promisor's response token (PR) for the date he declared for completion of the incompletion of Robin's response he created in making the request, and the requestor's fulfillment token (RF) for the date he declared for completion of the incompletion he declared, of the possibility of Robin fulfilling Alex's possibility of a new budget.

It becomes simpler to follow if we produce a "picture" of the tokens. Immediately after making his initial move, The Coordinator system conversation records show tokens for Alex as illustrated in Table 31. The numbers shown in the Table are date-references: 061489 expands to Jun. 14, 1989.

The Coordinator system that Robin uses receives the request from Alex, processes the communication using the FSM illustrated in FIG. 22, and creates a new conversation record the token structure of which shows the conversation to be in the state, request. For Robin, as promisor, the tokens recorded are the promisor's response token (pr), indicating an incompletion regarding his speaking to Alex, and the requestor's fulfillment token (rf), indicating the incompletion of Alex's missing fulfillment of an action for realizing a possibility.

The token records in Robin's conversation records for this conversation in the state, REQUEST, are illustrated in Table 31.

When Robin reads the request from Alex at his personal computer, he decides to answer immediately, and selects Reply in the Compose menu illustrated in Table 1. The Coordinator system constructs a list of permitted moves according to processes that will be described later, and presents a menu to Alex on which are listed the moves permitted to the promisor at this moment in this type of Conversation for Action (of the "REQUEST" type). The Reply Options menu for replying to a Request is illustrated in Table 17, and the options contained in it are listed below.

| | |
|---|---|
| Cogent moves: | |
| Yes | (promise) |
| OK, except | (counteroffer) |
| No, however | (counteroffer) |
| Delegate it | |
| This is done | (report) |
| Can't, won't or no | (decline) |
| Postpone responding | |
| Non-Cogent moves: | |
| Comment | |
| Acknowledge receipt | |

Notice the moves permitted to the promisor which have notation in parentheses to the right—"promise", "counteroffer", "report," and "decline." Now turn to FIG. 22. Notice the two thin arrows showing permitted moves of decline and counteroffer ("counter"), and the double lines indicating promise and report. These moves appearing in the menu are all basic moves for completing the incompletion created by the participant opening the conversation. (The properties of "cogent" and "non-cogent" moves are discussed in a section above.)

For a next move, from among those permitted and presented on the screen, Robin will move the cursor to one of the two counteroffer moves and there press "Enter" to begin a composition responding to Alex's request. Robin counteroffers ("counter" move) that he is willing to commit himself to complete the budget, not as Alex has asked for on the 16th of June, but on the 19th of June. Having selected the move counteroffer, which produces a new incompletion for the promisor of the promisor's fulfillment, when Robin selects "When" in the Envelope menu, as shown in Tables 12-14, The Coordinator system presents a "token menu" for Robin to fill in with regard to his counteroffer, showing these fields:

"I will complete by . . . "
"Please respond by . . . "
"Remind me . . . "

"I will complete by" allows Robin to declare a date for the incompletion of his own fulfillment that he is creating by making the move, counteroffer. When he does the move of a counteroffer, that is, he is declaring that he is now incomplete with respect to this conversation, and his incompletion has to do with fulfillment of the action declared in the conversation, and the data he declares for fulfillment is June 19th. In addition, he declares June 14th as the date by which he is asking that Alex respond to his counteroffer—the same date as declared by Alex in opening the conversation. ("Remind me" is an option to allow the participant to declare a reminder incompletion, discussed elsewhere in this description.)

The Coordinator system records the move in Robin's conversation records and sends a record of the move to Alex as well. In Robin's personal computer this counteroffer changes the conversational state recorded in his conversation records to "Counteroffer" ("counter"), and triggers the following token manipulations: for Robin, the promisor, the promisor's response token is removed, since his response is no longer missing; the requestor's response token is added with the date of June 14th, since now Alex's response is missing; and the promisor's fulfillment token is added with the date of October 10th. The requestor's fulfillment token remains unchanged, since the requestor's declared incompletion is still incomplete, and will remain so until he accepts the counteroffer or takes another permitted move towards fulfillment.

Robin's token records are illustrated, now for the state, COUNTER, in Table 31.

When Alex, the requestor, receives this counteroffer, the Coordinator system that he uses processes it, changes the conversational state in his conversation record to "Counteroffer", and changes the records of incompletions for Alex, the requestor, in his token records. The promisor's response token is removed, since the promisor has responded. The requestor's response token is added, with the date of June 14th. The promisor's fulfillment token is added with the date of June 19th, since now the promisor's is incomplete with respect to fulfillment of some action in this conversation. The requestor's fulfillment token remains unchanged. Notice now that in both Robin and Alex's conversation records the tokens of fulfillment show different dates (see Table 31, move 2.)

As indicated in FIG. 22, in the state of counter, in a Conversation for Action of type REQUEST, three tokens, requestor's response,
requestor's fulfillment, and
promisor's fulfillment . . . are recorded for the requestor, and three tokens, requestor's response,
promisor's fulfillment, and
requestor's fulfillment . . . are recorded for the promisor.

Now, suppose that Alex reads Robin's counteroffer, selects "Reply" from the Compose menu, and, from among the presented permitted moves, selects the move "accept", declaring that he will accept Robin's counteroffer, and thereby take on as his own the declaration of missing fulfillment with which Robin has countered. Once he has "sent" his move, the conversation record in Alex's personal computer has its conversational state changed from counter to "promise". The requestor's response token is removed, since Alex, the requestor, has responded; and the date associated with the requestor's fulfillment token is changed from June 16th to June 19th, since, by accepting the counteroffer, he has declared for himself a new date for completing that incomplete fulfillment. The promisor's fulfillment token is left unchanged. (See Table 31.)

The move arrives at The Coordinator system that Robin uses, is processed, and the conversational state in his conversation records are changed from counteroffer to promise. The requestor's response token is removed: the requestor has responded. The date associated with the requestor's fulfillment token is changed from June 16th to June 19th. The promisor's fulfillment token is left unchanged. Robin's token records for this conversation in the state, PROMISE, are again illustrated in Table 31, move 3.

As can be seen in FIG. 22, in the state, "promise", in a Conversation for Action of the REQUEST type, the requestor's fulfillment and promisor's fulfillment tokens are recorded for the requestor and the promisor's fulfillment and requestor's fulfillment tokens are recorded for the promisor.

FIG. 22 also discloses that in the promise state Robin has at least two cogent moves available: cancel and report-complete. In this state, Alex's possible moves are: cancel and declare-complete, the latter being a move he might make if someone else already had fulfilled the request.

Now, suppose for the next move in the conversation, Robin makes a report, after finishing the preparation of the budget. Suppose also that when Robin makes this move he asks Alex to respond by June 20th. In the conversation record the conversational state is changed from promise to report-complete. Notice the token changes in Table 31. The requestor's response token is added with the date by which Robin declares for response. The promisor's fulfillment token is removed, since Robin is declaring that the promise's conditions of satisfaction have been fulfilled. The requestor's fulfillment token is not changed: it will not be removed until Alex accepts Robin's report (or either of the participants take other relevant action in the conversation).

When Alex's personal computer receives the report move, the conversational state his conversation records is changed from promise to report. Again, refer to Table 31. The requestor's response token is added, with its date declared to match the respond-by date declared by Robin. The requestor's fulfillment and promisor's fulfillment tokens are not changed, since Alex's request and Robin's promise to him will remain pending until he accepts Robin's report and declares the conversation complete.

Finally, suppose that Alex accepts Robin's report and declares the conversation complete. In the conversation record the conversational state is changed from report-complete to the state, "final" and, as Table 31 shows, all tokens are removed, since no incompletions remain in the conversation. And, when The Coordinator system that Robin uses receives Alex's declaration, the conversational state is changed from that of report-complete to that of final and all tokens are removed.

As long as a conversation is not deleted from a participant's conversation records, that participant will be able to review it by using The Coordinator system's conversation and communication selection tools (described below).

Sorting criteria that could be used to gain access to this conversation while in the final state include: "closed conversations", category/domain ("newsales"), specific participant and dates of moves.

In this discussion, we examine only one move at each state. But the manner in which alternative moves would be described can be gleaned from that examination. Note also that in this discussion we do not deal with more conversations containing more diverse types of moves, e.g., conversations that include such moves as delegate and report progress. The manner in which such moves would occur can be understood from the present discussion, FIGS. 12 and 13, and earlier discussion of progress-report moves.

A traditional problem in methodologies for development of social systems of communication can be referred to as "getting messages crossed". It is the problem of conflicting declarations when systems have been structured in the presupposition that what people are doing when they are communicating is matching descriptions of some external physical reality. In such systems, the question of whose declaration will be given precedence in being recorded as the "accurate", "final", or "authoritative" declaration in a database is a major issue.

The present methodology presents an entirely alternative approach, and the problem of conflicting declarations does not arise in this methodology in the way it arises in traditional methodologies. The reason for this is that the "objects" worked upon in this methodology are participants' individual declarations of possibilities for action and declared incompletions with regard to actions to complete possibilities; and these declarations are linguistic objects which, as such, are always attributable to particular declarers, rather than being objects which (as is often supposed) exist independent of declarations (and which are therefore not attributable). Conflicts will arise in the conduct of conversations on systems built according to this method. For example, one participant may promise in the moment that the requestor cancels. And, when such conflicts arise, they arise within the very domain in which the system is itself a method for producing resolution—that is, in the domain of human conversations, where people will have conversations about coordinating their actions and possibilities.

(25b) Example of Delegation in a Conversation for Action

During REQUEST and QUESTION conversations, a promisor may open a Delegation subconversation, in which the promisor delegates to someone else the task of performing some action that will fulfill the Request or Question that opened the conversation.

When a person delegates a Request or Question he may or may not include the original requestor as an observer of the subconversation. If the original requestor is named as an observer of the subconversation, then the delegation is said to be "public".

Throughout this discussion the reader will find it helpful to consult FIG. 12, which represents the method of including Delegation in FSMs for various conversations, and Table 30, which shows the tokens for participants in a Question conversation involving public delegation. The conversation used as an example resembles that described in Table 31, and discussed above, except that Robin delegates Alex's Question (Request) to Sam. Because the "base" conversation has, in effect, been discussed above, because Table 31 includes not only token structures but text describing each move, and because Delegation subconversations have been discussed earlier (in conjunction with FIGS. 12 and 13), only a few salient remarks will be made here.

First, notice that when Robin delegates Alex's Question, he is in effect making a request to Sam and so assumes the role of requestor with respect to Sam. Just as Alex's database shows PR and RF tokens after Alex makes a Request to Robin, so does Robin's database show PR and RF tokens with respect to his role of requestor in the Delegation subconversation.

Second, notice that once Robin delegates Alex's Question Robin's database shows tokens for the base conversation with Alex and for the delegation subconversation with Sam. The conversational state for Robin has become a compound state, determined by tokens in effect for Robin's role as promisor in respect to Alex's Question, and tokens in effect for Robin's role as requestor in respect to the Delegation subconversation. Meanwhile, Sam is only in the Delegation subconversation, and so the conversation is not in a compound state for him.

Next, notice that Sam's acceptance of the delegation, and Sam's answer regarding Alex's question, change the compound state. However neither of those moves, nor indeed the original delegating move, effect the state of the base conversation.

Next, notice that after Robin thanks Sam, closing the Delegation subconversation, there are no tokens in effect in the Delegation subconversation, and the conversation is no longer in a compound state for Robin.

Finally, Table 30 indicates that after receiving Sam's Answer, Robin can answer Alex and Alex can then thank Robin, closing the conversation. In alternative 6A, presented at the close of Table 30, notice that after receiving a copy of Sam's Answer, Alex can send a Thank-you to Robin, with a copy to Sam. That leaves both the base conversation and the Delegation subconversation in the state Final, with no tokens in effect in either of them.

(25c) Example of a Conversation for Action of the Offer Type

Throughout this discussion the reader will find it useful to consult FIG. 23. As the Figure indicates, a variety of moves are possible in each state of this type of conversation. Changes in conversational state and results of token manipulation triggered by each of the various moves are also indicated there. Again, in this discussion, we examine only one move at each state.

As an example of this type of conversation, consider a conversation initiated by an offer Alex makes to Dianne on September 25th in a domain of possibilities he called "personel". Alex enters October 3rd as the complete-by date and October 1st as the respond-by date. In the conversation record begun when Alex makes this move, the conversational state is termed "offer" and the tokens that are recorded for Alex, the promisor, include: requestor's response, with the date of October 1st, and promisor's fulfillment with the date of October 3rd.

Now, suppose that in composing his offer, the opportunity to declare an alert date leads Alex to open a brief private conversation with himself concerning whether or not to declared an alert date. Further suppose that in this brief conversation Alex concludes he will prompt (remind) himself to get certain personnel records into his hands before the respond-by date he has specified. (He declares to himself that failure to have those records in hand by that date might cause him to miss the possibility of fulfilling his promise.) Consequently, Alex specifies an alert date in this conversation for September 30th, one day before the date by which he has requested a response. An alert token dated September 30th is stored in the token records in Alex's personal computer, and an alert will appear in his daily calendar for September 30th, as well as appearing in lists of commitments due on that date.

For example, Table 18 presents a facsimile of the "calendar" that The Coordinator system produces when a participant selects the "Show calendar" option presented under the Calendar menu in the main menu bar of the interface of the system. In the calendar can be seen summaries of conversations having incompletion tokens pending for that day, under the title "Pending for today." In addition, a participant can turn on an option called "Carry forward," in which case The Coordinator system will bring forward each day to the next those incompletions the participant has not explicitly handled; these will appear under the heading "Carry forward" in the calendar.

A participant may place the cursor on the screen at the location of any of the summaries shown, press "Enter," and The Coordinator system will go to the conversation records and retrieve to the screen the latest move in the conversation so selected. Further, the participant can then instruct The Coordinator system, by selecting options in the "Read" menu, to "trace backwards" and "trace forwards" in the selected conversation. Tracing backwards (and forwards) allows a participant to thereby review the entire history of the conversation so selected, and, as alerts are incompletions declared for the purpose of completing declared realizable possibilities, the participant can, in the moment of review, move in the conversation to declare new actions, declare new possibilities, or take other relevant action. Table 19 illustrates the tracing options offered in the system. In addition, a participant can select "Show history" in the "Organize" menu of the system, and The Coordinator system will present a list of all the moves recorded in the participants records for the conversation to date, including reminders and appointments declared in the conversation.

Declaring an alert incompletion—a reminder or event—allows the participant to request and be given by The Coordinator system summaries of conversations in which alerts have been declared, and to have these summaries displayed, in pre-defined formats, in calendars for the date of the alert. Such displays include daily calendars and calendars covering any period of time the participant desires. Also it is possible to get a list of all conversations in which no incompletions have been declared. An unlimited number of reminder and event-type incompletion alerts may be declared for each conversation by each participant.

Reminder and event tokens can be given "subjects'-'—brief declarations of the particular incompletion they represent within the conversation—that are distinct from the "subject" of the conversation itself. In this way, series of reminders can remark milestones or progressive sub-actions in a conversation, and series of appointments can be declared and planned in which various agenda items relevant to the completion of the conversation are recorded and tracked.

Reminder and event tokens are not "replaced" by other tokens during the course of the conversation, as are response and fulfillment tokens. However, when the record of a conversation is deleted from the database, reminder and event tokens associated with the conversation are deleted along with it.

Once The Coordinator system that Dianne uses processes Alex's offer, a new conversation record is opened and it shows the conversation to be in the state of offer. For Dianne, the requestor, the tokens recorded are requestor's response, for October 1st, and promisor's fulfillment for October 3rd.

Suppose Dianne accepts Alex's offer rather than exercising her option to make a counteroffer. In the conversation record, the conversational state is changed to that of accept, the requestor's response token is removed and the requestor's fulfillment token is added, with the data of October 3rd.

After Alex's personal computer processes Diane's accept move, the conversational state in his personal computer's conversation record is changed to that of accept, the requestor's response token is removed, since Dianne has answered Alex's offer, the requestor's fulfillment token is added with the data of October 3rd, and Alex's alert token for this conversation is removed from Alex's conversation records.

Suppose that Alex decides that he cannot fulfill his original offer and so makes a cancel move with a respond-by date of October 2nd. The conversational state is changed to that of cancel, the requestor's fulfillment and promisor's fulfillment tokens are removed and the requestor's response token is added with the date of October 2nd.

After Dianne's personal computer processes Alex's cancel move, the conversational state in her personal computer's conversation record is changed to cancel, the promisor's fulfillment and requestor's fulfillment tokens are removed and a requestor's response token with the date of October 2nd is added.

Suppose, next, that Dianne then declares the conversation complete. In the conversation record in her personal computer, the conversational state is changed from cancel to the state termed "final" and all tokens are removed, since no incompletions remain in the conversation.

When The Coordinator system that Alex uses receives Dianne's declaration, the conversational state is changed from that of cancel to that of final and all tokens are removed.

As long as the conversation is not deleted from a participant's conversation records that participant can review it by using The Coordinator system's selection mechanisms. Illustrated in Table 15 is the most general tool provided in The Coordinator system for selecting conversation and move records from a participant's conversation records database. Brief examination of the Table reveals that sorting criteria available there that could be used to gain access to this conversation in its final state include: "closed conversations", selection by domain ("personel"), selection of all conversations within some time parameter, selection of specific participant and selections by specific dates of moves.

Table 20 illustrates a list of conversation summaries sorted according to the person with whom the participant is in conversation. This can be helpful, for example, in conducting meetings with personnel whom one works with, where The Coordinator system assists in the preparation of an assessment of the current conversations between colleagues, manager and subordinate, customer and supplier, etc.

(25d) Example of a Conversation for Possibilities

We recommend the reader consult FIG. 24 during the following discussion.

As an example of a Conversation for Possibilities, consider a conversation that Alex opens in the domain "sales" with Dianne, proposing certain writing that he has done as a possible basis of a new advertising initiative, and asking that she review the writing and give some response by October 10th. In the conversation record opened in Alex's personal computer when he makes this move, the conversational state is "open" and the promisor's response token is recorded with a date of October 10th.

When The Coordinator system that Dianne uses processes Alex's move, a new conversation record is opened, showing the conversation to be in the state of p-open, and a promisor's response token is recorded with a date of October 10th. Suppose she responds to Alex's declaration with a "reformulation of the same declaration"—which in this means that she comments within and edits and delivers back to Alex the same writing he gave to her with her modifications—and suppose she declares a respond-by date of October 4th. This move changes the conversational state to open, the promisor's response token is removed and a requestor's reponse token is added with the date of October 4th.

After Alex's personal computer receives the new move from Dianne, the conversational state in his personal computer's conversation record is changed to open, the promisor's response token is removed and a requestor's response token is added with the date of October 4th.

We may suppose that this conversation continues in a similar fashion for several interactions, until Alex declares the Conversation for Possibilities complete. In the conversation record in his personal computer, the conversational state is then changed from open to the state termed "final" and all tokens are removed, since no incompletions remain in the conversation.

When The Coordinator system that Dianne uses receives Alex's declaration, it changes the conversational state from that of cancel to that of final and removes all tokens.

As long as the conversation is not purged from a participant's conversation records that participant can review it by using The Coordinator system's selection mechanisms. Sorting criteria that could be used to gain access to this conversation include: "closed conversations", domain ("sales"), specific participant and dates of moves.

g. Data Associated with Moves

For each type of move, a set of data associated with that move is defined. Table 28—the Move Definition Table—lists all the moves of the current embodiment. Below, the data associated with the moves of the "senior" members of each of the two classes of conversation defined in the current embodiment—the request, representing the Conversation for Action class of conversation, and the What if conversation, representing the Conversation for Possibilities class—are described. The data associated with moves in all other types of conversation defined in the current embodiment, including the Note type of conversation, are subsets of the data described.

(1) Data Associated with Moves in Conversations for Possibilities

In a Conversation for Possibilities, the initial move, DECLARE A POSSIBILITY OPEN, has the following data associated with it:

(a) identity of participants, including:

identity of requestor identity of promisor(s)

identities of any observers (b) domain of possibilities, where the domain of possibilities ("categories") of the conversation is the particular name given by the participant to the domain in which the participant will interpret the conversation;

(c) tokens representing the incompletions of the conversation, including data representing:

the type of token ("missing response," "reminder," and/or "appointment" for event), and the date (and time(s) where appropriate) declared for completion of the incompletion which the token represents;

(d) seven texts that will be used in presenting the move to participants:

the name of the move as it will appear in the reply menu;

the name of the move as it will appear in the title of a composition window;

pre-defined ("boilerplate") text for prompting the participant to interpret the move according to the participant's role and the current incompletions of the conversation can be declared for any move;

the name of the move as it will appear in sent and recorded messages as they are displayed to listeners, speakers, and observers;

the name of the move as it will appear in lists summarizing communications and conversations;

the text that will be presented as coaching help to participants when they ask for help when viewing the reply menu, which text the participant may modify or delete altogether, substituting text of his own invention in the case of all such moves; and the generic name of the move sent along with the message through electronic distribution systems, for the purpose of supporting future backward and horizontal compatibility of many different kinds of systems, embodying many different kinds of defined conversations and moves, that may have occasion to receive communications from each other.

Table 32 illustrates all the kinds of definable texts included for moves in the current embodiment, except for the generic name texts.

(e) tokens representing declared possibilities, including:

the "subject" of the conversation, which is the phrase-name given to the declared possibility of the conversation, and the "text" associated with the move, which includes the specific spelling-out of the declaration of specific realizable possibilities.

Notice that, as a consequence of our employment of conversations as the basic unit of recordkeeping in this methodology, the identities and roles of participants, declaration of domain of possibilities, previous incompletions of the conversation, and previous moves of the conversation, all are defined already in the moment that a participant makes a move after the initial move in any conversation.

In the case of any move after the opening move, the data associated with the move are:

(a) identities of speaker, listener(s), and any observers (b) tokens representing the incompletion of the conversation, including data representing: the type of token ("missing response" or "alert"), and the date (and time(s) where appropriate) declared for completion of the incompletion which the token represents;

(c) the seven texts that will be used in presenting the move to participants (described above, and illustrated in Table 32);

(d) tokens representing declared possibilities, including: the "subject" of the conversation, which is the phrase-name given to the declared possibility of the conversation, and the "text" associated with the move, which includes the specific spelling-out of the declaration of specific realizable possibilities.

(2) Data Associated with Moves in REQUEST Conversations

In a Conversation for Action of the REQUEST type, the initial move, request, has the following data associated with it:

(a) identity of participants, including:

identity of requestor identity of promisor(s)

identities of any observers (b) domain of possibilities, where the domain of possibilities ("category") of the conversation is the particular name given by the participant to the domain in which the participant will interpret the conversation;

(c) tokens representing the incompletions of the conversation, including data representing:

the type of token ("missing response,""missing fulfillment," "reminder," or "appointment"), and the date (and time(s) where appropriate) declared for completion of the incompletion which the token represents;

(d) seven texts that will be used in presenting the move to participants:

the name of the move as it will appear in the reply menu;

the name of the move as it will appear in the title of a composition window;

pre-defined ("boilerplate") text for prompting the participant to interpret the move according to the participant's role and the current incompletions of the conversation can be declared for any move;

the name of the move as it will appear in sent and recorded messages as they are displayed to listeners, speakers, and observers;

the name of the move as it will appear in lists summarizing communications and conversations;

the text that will be presented as coaching help to participants when they ask for help when viewing the reply menu, which text the participant may modify or delete altogether, substituting text of his own invention in the cases of all such moves; and the generic name of the move sent along with the message through electronic distribution systems, for the purpose of supporting future backward and horizontal compatibility of many different kinds of systems, embodying many different kinds of defined conversations and moves, that may have occasion to receive communications from each other.

Table 32 illustrates all the kinds of definable texts included for moves in the current embodiment, except for the generic name texts.

(e) tokens representing declared possibilities, including:

the "subject" of the conversation, which is the phrase-name given to the action(s) declared in the move for completing a realizable possibility in the conversation, and the "text" associated with the move, which includes the specific spelling-out of the declaration of action(s) for completing specific realizable possibilities.

More than thirty types of moves are permitted in a Conversation for Action of the REQUEST type, as illustrated in Table 28. Each has the following data associated with the move:

(a) identities of speaker, listener(s), and any observers (b) tokens representing declared possibilities, including: the "subject" of the conversation, which is the phrase-name given to the declared possibility of the conversation, and the "text" associated with the move, which includes the specific spelling-out of the declaration of specific realizable possibilities.

(c) the seven texts that will be used in presenting the move to participants (described above, and illustrated in Table 32.)

In addition, moves which complete incompletions and/or produce new incompletions (according to the definition of these moves described in section e., above) have the following additional data associated with them:

(d) tokens representing the incompletion of the conversation, including data representing:

the type of token ("missing response", "missing fulfillment", or "alert"), and the date declared for completion of the incompletion which the token represents.

Also at the time of making a move that is not the initial move in a conversation, the "subject" of the move is inherited from the opening move of the conversation, and identities of observers in the conversation are inherited from the particular move that the participant is reviewing in the moment that he initiates the move. At that time, the participant can add observers to or remove observers from the conversation as of the move he is making.

h. Conversation Records and Data Bases

In the current embodiment of The Coordinator system, a complete set of conversation records is generated for each participant, and stored in a storage device connected to the personal computer on which the participant works.

Figure 25A:
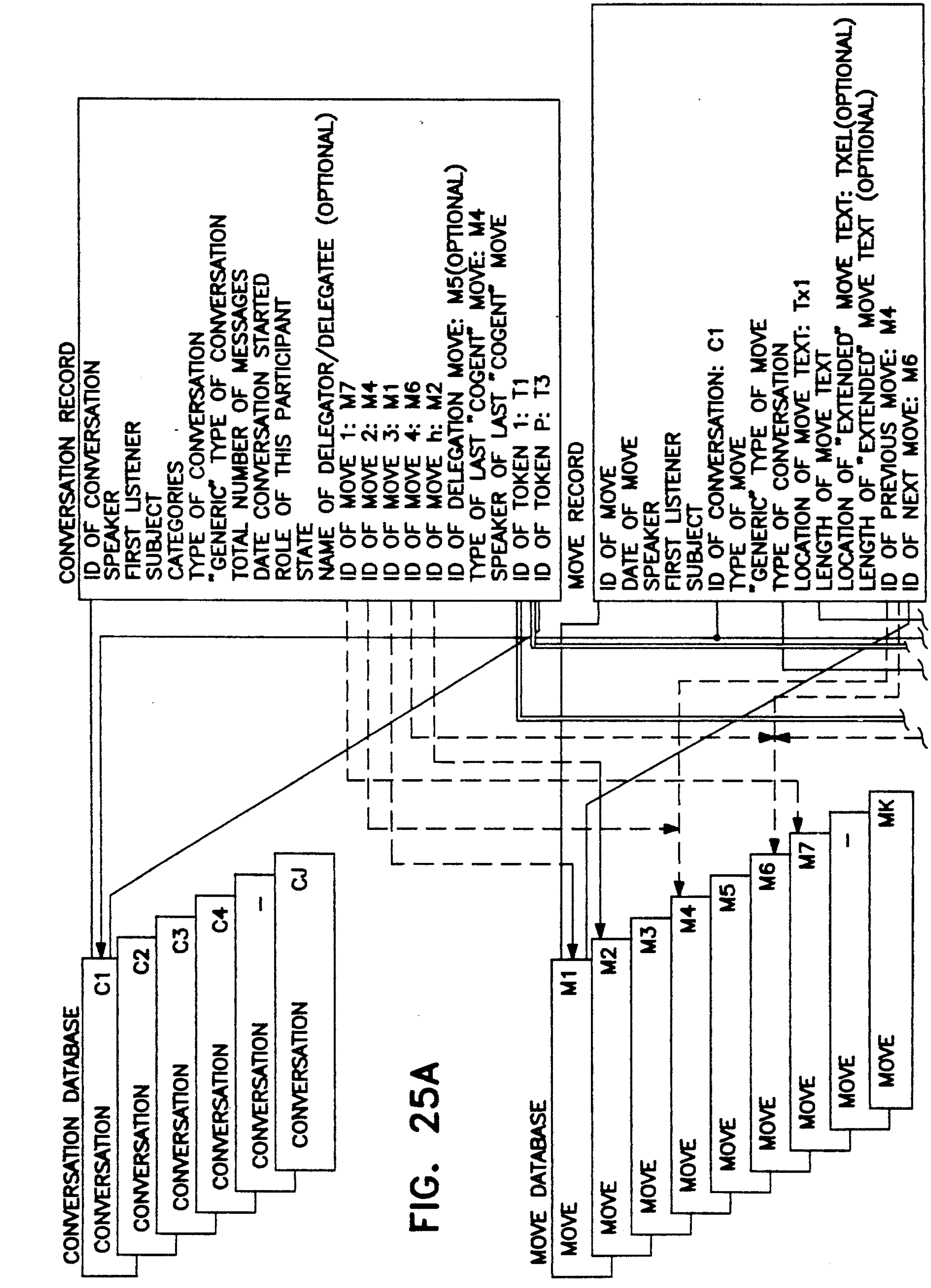
FIGS. 25A-25B is a diagram of the conversation record format and record structure employed in conversation management apparatus and methods in accordance with one embodiment of this invention.
Figure 25B:
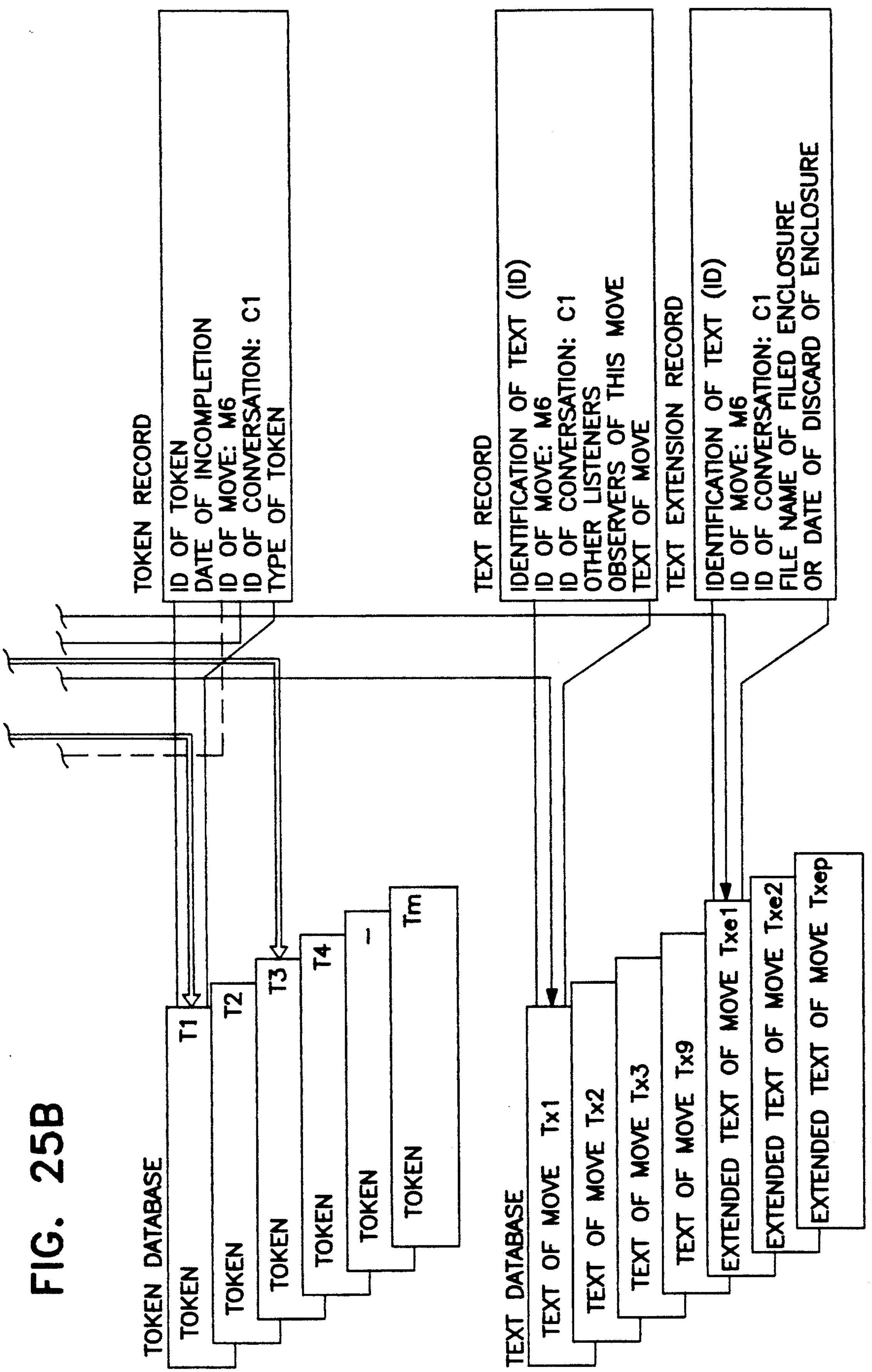

Conversation records in The Coordinator system are kept on an individual conversation basis in an overall data base system that comprises four separate data bases. FIG. 25 illustrates a preferred embodiment of four data bases and the data elements and relationships therebetween. As shown the four data bases are the following:

1. A Conversation Record Data Base that contains a single conversation record of predefined format for each conversation in the data base system.

2. A Moves Data Base that contains data elements for all moves in all conversations in the data base system.

3. A Token Data Base that contains all token data elements for all conversations in the data base system.

4. A Text Data Base that contains all data elements and text associated with all moves in all conversations in the data base system.

The current embodiment of The Coordinator system maintains a separate conversation data base for each of the participants in each conversation. For participants that are using The Coordinator system on an individual personal computer, the conversation data base is maintained on the hard disk storage system of the individual computer. If more than one user is sharing the use of the system on the same computer or on a file server on a LAN, individual conversation data bases are maintained for each of the users. Thus The Coordinator system implementation of this invention involves the use of distributed conversation data bases that are dynamically maintained by the Conversation Manager system in each of the computers involved as moves are made in conversations and as conversations change state as a result of moves being made. Among other things, this provides The Coordinator system with significant advantages in the timely(i.e., near real-time) management of human transactions.

All filing and recovery of records in The Coordinator system is accomplished with a "B*-Tree"-type data base, which data base was built specifically for the purpose of managing conversation records within The Coordinator system, and which has a conventional scheme of instructions and procedures for programmers to use, similar to that which will be found in the B-Trees studied in the curricula of most graduate departments of computer science.

Figure 34:
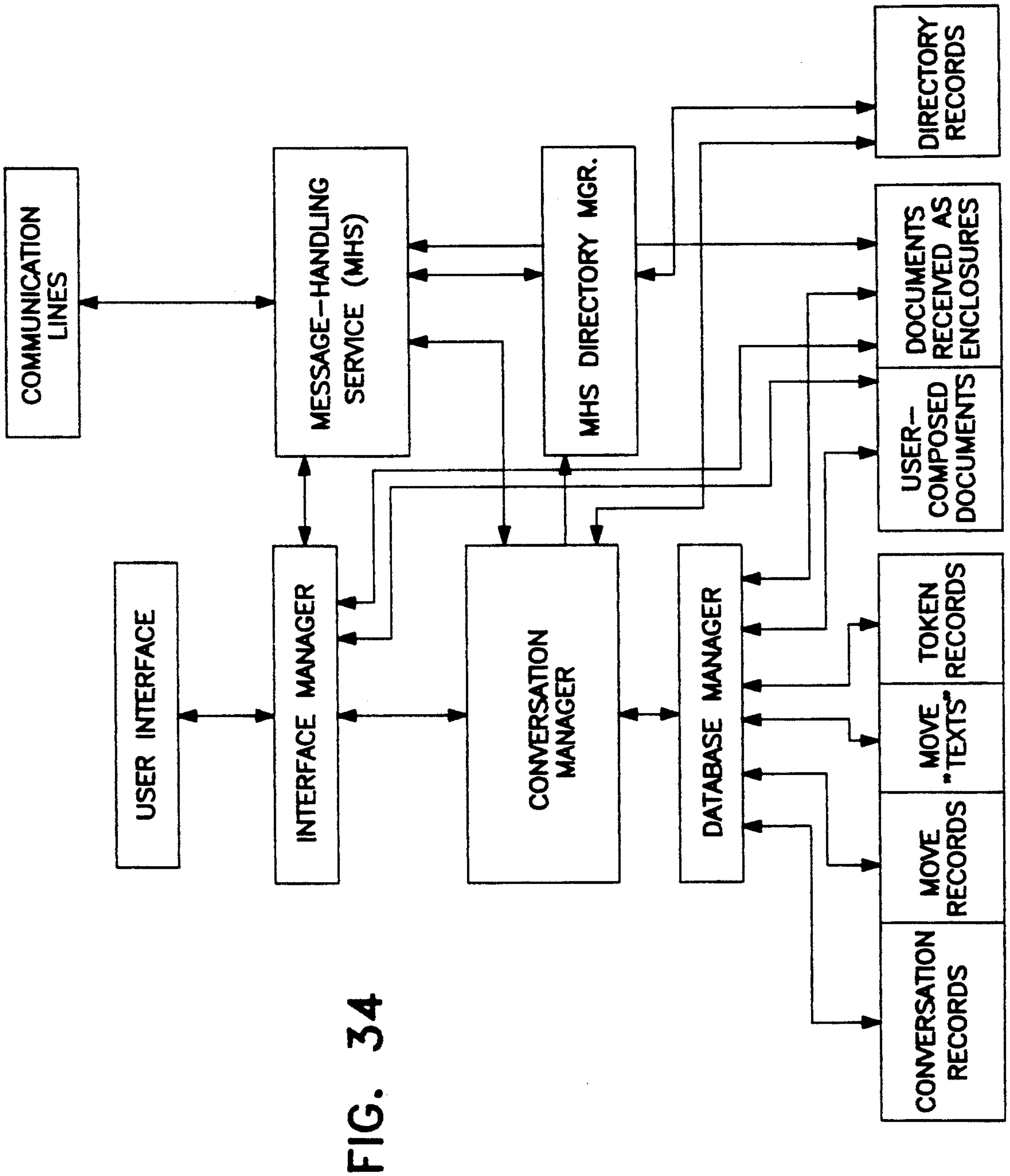
FIG. 34 is a schematic diagram illustrating the basic functional components and relationships of conversation management apparatus and methods in accordance with one embodiment of this invention.

The structure of the basic functional components of The Coordinator system is illustrated in FIG. 34, including the pivotal "Conversation Manager", the overall work of which is described in Section i., below. In this Figure can be seen the various databases of The Coordinator system, including the Conversation Records, Move Records, Token Records, and Move Text databases described in this Section, along with the Database Manager which manages the mechanics of efficient storage and retrieval of data in these databases. As can be seen in the FIG. 34, the participant, working at the point labelled "User Interfaces," is far removed from the operation of the Database Manager, which gets all of its operational instructions from the Conversation Manager, and which in turn interacts with an Interface Manager that manages the elements of the User Interface. Other features introduced in FIG. 34 will be discussed in later Sections.

Figure 26:
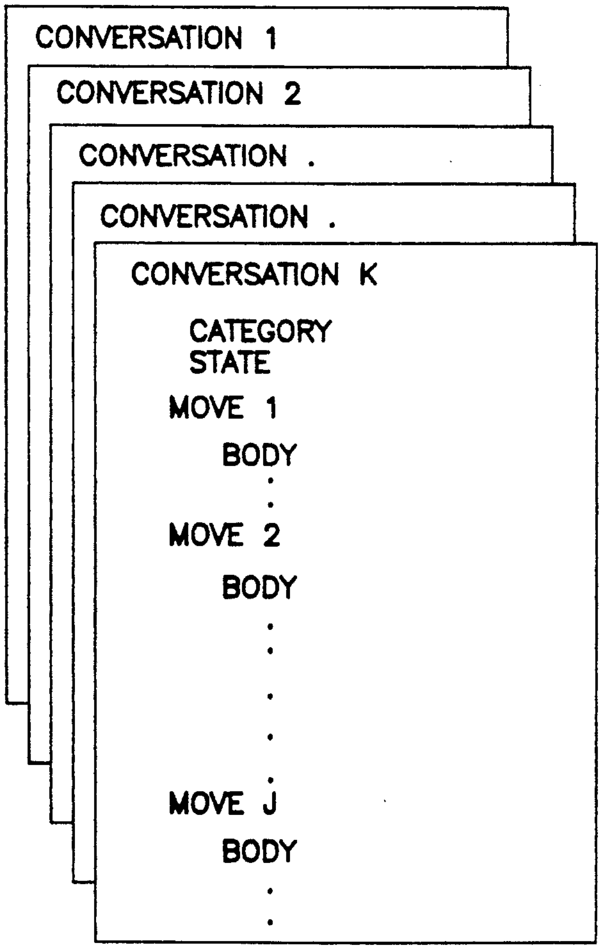
FIG. 26 is a diagram of an alternative conversation record format for conversation management apparatus and methods in accordance with one embodiment of this invention.

It should be understood that other embodiments of conversation data bases could also be employed. For example, a more simple conversation record format such as shown in FIG. 26 might be employed in a an embodiment of the Conversation Manager of this invention operating in a centralized computer environment where a single conversation record is kept for all participants and each has access to that record for making moves.

(1) The Conversation Record Data Base

The Conversation Record Data Base comprises a set of Conversation Records with one Conversation Record for each conversation in the data base system. Each of these Conversation Records includes these elements shown in FIG. 25:

"ID of Conversation"—this is a unique identifier for the conversation that is generated at the time a conversation is opened with an initial move. This identifier is maintained throughout all of the distributed conversation data bases of the participants in the conversation and is thus generated in a manner that insures its uniqueness. All moves in the conversation are tagged with this identifier so that the communications associated with the move can be processed accurately into the conversation data base.

"Speaker"—an identification of the participant that opened the conversation with the initial move.

"First Listener"—an identifier of the first participant (a Primary Participant, not an observer) to which the initial move in the conversation is directed. In what we have called Standard conversations there is only a First Listener. In group conversations there are one or more additional Listeners and data elements for recording identifications of these other participants are placed in the Text Record Data Base as described below. In a conversation between the Speaker and himself, the First Listener is also the Speaker.

"Subject"—the text for the title or subject of the conversation as entered by the Speaker in initiating the conversation. Once declared, this field cannot be changed by any of the participants.

"Categories"—one or more participant defined keywords or categories (also referred to as domains of possibilities) which are attached to the conversation. At the time of opening the conversation, the Speaker may declare categories and these are stored in his conversation database. Each of the Listeners of the conversation may declare their own Categories when they reply to the opening move or make other moves in the conversation and the Conversation Record in their data base system will record their declared Categories.

"Type of Conversation"—This field records the type of conversation based on the initial move and it is used by the Conversation Manager to locate the FSM to use for state transitions and token manipulations in the conversation.

"Generic Type of Conversation"—this field designates one of the three generic types of conversations that are managed by the Conversation Manager: Request, Offer, CFP. The inclusion of this field provides the possibility for basic compatibility between different embodiments and versions of the Conversation Manager system.

"Total number of Messages"—a field to record the total number of moves that have been made in the conversation and stored in the Moves Data base. This number is tracked for reporting in the Conversation Status window which is accessible when a message of the conversation is presented on the screen.

"Data Conversation Started"—a field to record the date of the openin move in the conversation. This date is presented in the Conversation Status Window.

"Role of this Participant"—a field to record the role in the conversation for the participant associated with this data base. The possible roles for this embodiment are REQUESTOR, PROMISOR, DELEGATEE, OBSERVER.

"Name of Delegator/Delegatee"—this field is present only when the conversation includes a delegation and the participant associated with the data base is either the DELEGATOR or the DELEGATEE. If the associated participant is the PROMISOR/DELEGATOR, then this field records the identification of the DELEGATEE. If the associated participant is the DELEGATEE, then this field records the identification of the PROMISOR/DELEGATOR.

"ID of Moves"—these fields record the location in the Moves Data Base for the moves in this conversation "ID of Delegation Move"—this field records the location of the delegation move in the Move Data Base. This permits quick access to the delegation move for information that is stored there during processing of moves in the delegation portion of the conversation.

"ID of last "Cogent" Move"—field that records the last "cogent" move (as previously defined). This is tracked so that the last cogent move rather than subsequent non-cogent moves can be displayed in lists of conversations, when applicable.

"Speaker of Last Cogent Move"—field identifying the participant that made the last cogent move in the conversation for purposes of display in lists of conversations.

"ID of Tokens"—these fields record the location in the Token Data Base for the Tokens that are associated with the conversation so that these tokens can be readily accessed for reading and/or updating.

(2) The Move Record Data Base

The Move Record Data Base records data for all moves made in all conversations that are stored in the data base system. A particular conversation may have only one move whereas other conversations may have a large number of moves. Each of the moves records includes the following data elements:

"ID of Move"—a unique identification for the move generated at the time that the move is stored.

"Date of Move"—a field holding the data of generation of the move

"Speaker"—the Speaker of this move, i.e. the participant in the conversation making the move, which may be different from the Speaker listed in the Conversation Record.

"First Listener"—the first participant to whom the move is directed by the Speaker. Again this may be a different participant from the First Listener in the Conversation Record.

"Subject"—same as in the Conversation Record unless the move is a reminder move for which a different subject has been declared.

"ID of Conversation"—same as in the Conversation Record.

"Type of Move"—the designated name of this move in the listing of permitted moves for this conversation.

"Generic Type of Move"—the name of the generic type of move that this move represents. This field is recorded for the same reason that the Generic Type of Conversation is recorded in the Conversation Record.

"Type of Conversation"—same as in the Conversation Record.

"Location of Move Text"—this field records the location of the move text in the Text Data Base.

"Length of Move Text"—a field recording the location of the end of the move text.

"Location of Extended Move Text"—this field stores the location of a text record that contains information on any enclosure that is attached to the move.

"Length of Extended Move Text"—this field identifies the end of the extended text move record.

"ID of Previous Move"—location of the prior move (cogent or not) to facilitate tracing of moves in the conversation without reference to the Conversation Record.

"ID of Next Move"—field identifying the location of the next move in the conversation if there is one. Also used to facilitate tracing of moves.

(3) The Token Record Data Base

The Token Record Data Base contains records of all of the tokens associated with incompletions in all conversations in the data base system. Each of the records in this data base includes the following data elements:

"ID of Token"—a unique identification assigned to the token record at the time that the record is created.

"Date of Incompletion"—the date associated with the incompletion represented by the token as declared by one of the participants (or as assigned by the system if a token is required but not declared).

"ID of Move"—the identification of the Move Record corresponding to the move in which the incompletion represented by the token was produced.

"ID of Conversation"—the identification of the conversation associated with the incompletion represented by the token.

"Type of Token"—the designation of the type of token taken from the different types of tokens discussed above.

(4) The Text Record Data Base

The Text Record Data Base stores the text associated with all of the moves in the various conversations that are in the Conversation Record Data Base. Each text record relates either to the move text itself or to the text of an enclosure. In the case of a move text record, the following data elements are present:

"ID of Text"—a field that uniquely identifies this text record.

"ID of Move"—a field identifying the location of the move record associated with the move text stored in this record.

"ID of Conversation"—same unique identification number as in the Conversation Record.

"Other Listeners"—a sequence of fields designating other principal participants in a group conversation. This information is required for ensuring that cogent moves are directed to all principal participants.

"Observers of this Move"—a sequence of fields designating observers that were declared by the participant making the associated move. This enables a participant making a reply to this move to adopt the same list of observers.

"Text of Move"—this is the actual text of the move as created or edited by the participant making the move. This includes fields for the message header information for convenience of screen display of the move especially during tracing of the conversation. Thus it includes such information as the original name of the enclosure if one was sent by the Speaker of the move.

If the Text Record is associated with an enclosure with a move, the following data elements are present in the record:

"ID of Record"—A unique identification assigned to this Text Record.

"ID of Move"—the location of the move associated with the record, i.e. the move that is associated with the enclosure.

"ID of Conversation"—same as in the associated conversation record.

"File Name of Filed Enclosure"—DOS file name of enclosure when filed by the associated participant or an identification of the date that an unfiled enclosure was discarded by the participant.

By storing data elements in the Text Record data base associated with Enclosures, the Conversation Manager can itself manage the operation of various tasks relating to these enclosures. Enclosure management features of the Conversation Manager are discussed below.

i. The Conversation Manager Program

The Coordinator system implements a conversation management program that allows participants to engage in a large number of individual conversations with support, control, and coaching from a Conversation Manager. Operation of one embodiment of a Conversation Manager comprises the steps and features which will now be described.

Figure 27A:
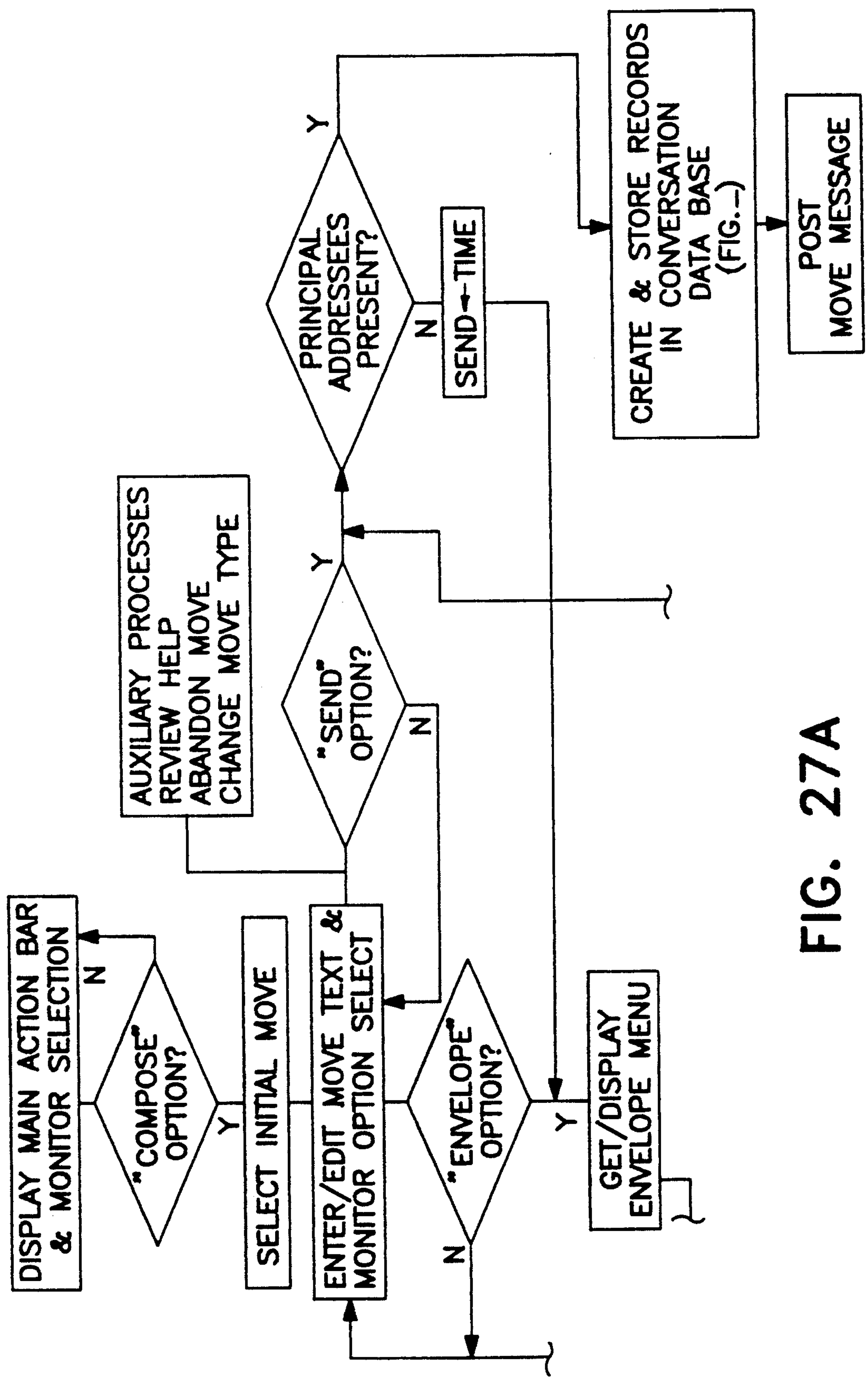
FIGS. 27A-27B is a flow chart showing opening of a conversation and processing of an initial move by conversation management apparatus and methods in accordance with one embodiment of this invention.
Figure 27B:
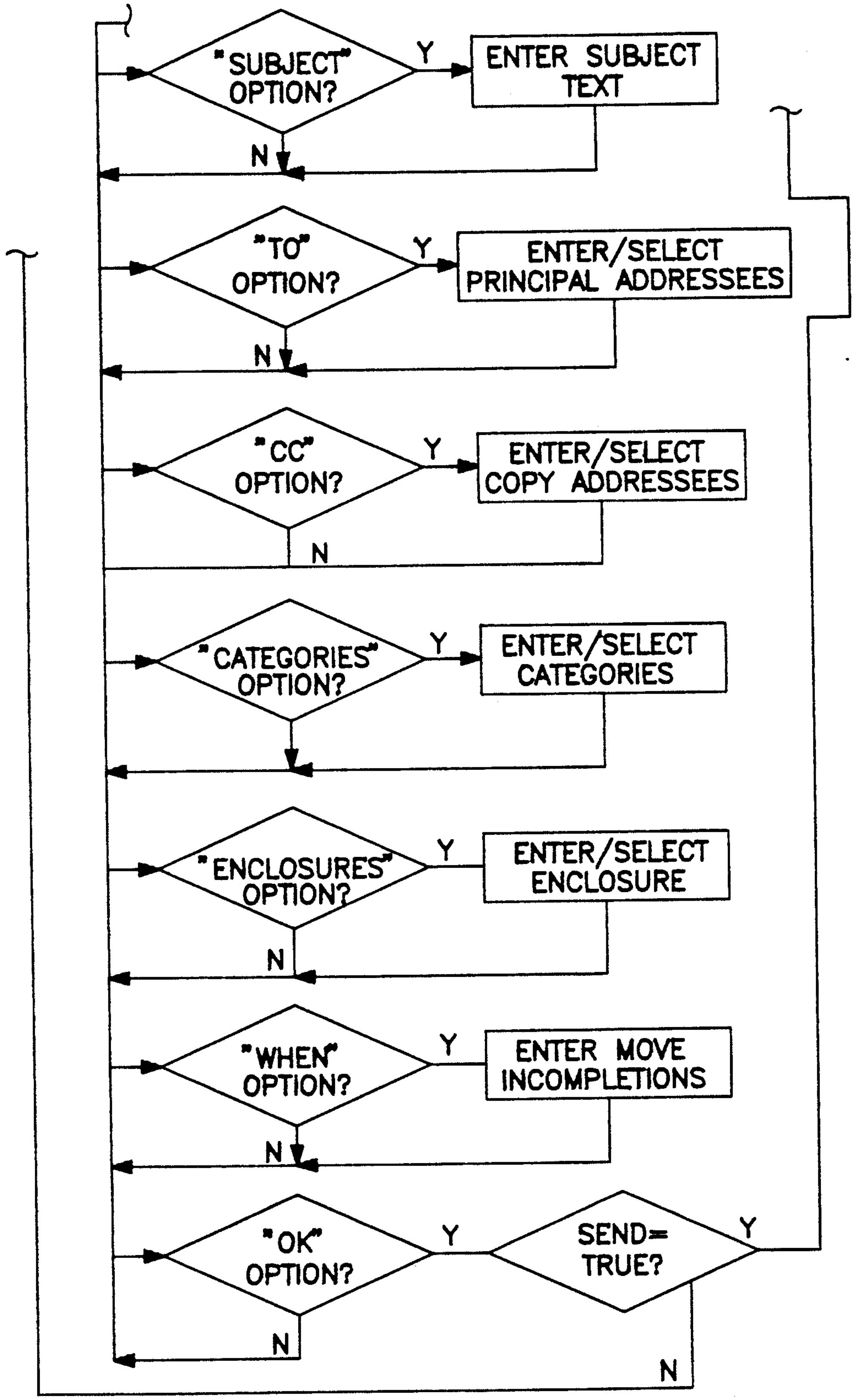

(1) Initiating or Opening a Conversation (FIG. 27 and Tables 1-15)

A new conversation is opened after selecting the "Compose" option in the main action bar. In response to selecting this option, a menu of initial moves is presented as shown in Table 1 and an initial move can be selected. The move text screen is then presented as in the example in Table 2 and the user can enter move text or edit any suggested text that is presented by the program.

Note that the selected initial move name "Request" is displayed in Table 3 which illustrates a sample move text entered by a participant.

Thereafter, the participant may select either the send option (by pressing Function Key F4) as shown in Table 4 or the envelope option (by selecting Compose again—Table 1). If the send option is selected before the envelope option is accessed to enter a principal addressee, then a send flag will be set to true and the envelope menu will be displayed as in Table 4.

The envelope option and menu display associated therewith (see Tables 1 and 5) permit entry of the following information related to the opening move of the conversation:

"Subject"—a short text identification of the opening move. See the example in Tables 5 and 6, noting that the entered Subject is presented in both the Envelope menu window and in the Subject line of the move message text.

"To"—the principal addressees of the opening move are selected or entered by selecting this option as shown in Tables 6 and 7 with the result shown in Table 8. There must be at least one participant selected here. The content of this entry is used in determining the type of conversation. If the participant enters himself, the conversation is only with himself. If only one other participant is entered, the conversation is a standard conversation. If more than one participant is entered, the conversation is a group conversation.

"Cc"—the other recipients of the communication can be entered here, i.e. the parties to receive copies of the communications of the conversation, and to serve as observers, but not as primary participants, in the conversation. These parties have the role of Observers.

"Categories"—when this option is selected, a menu window is presented such as shown in Table 9, and categories for the conversation can be selected from those already declared and/or new categories can be entered. All new categories entered are automatically considered selected, but can later be deleted by selecting the Categories option again and deleting with the "Del" key.

Figure 32A:
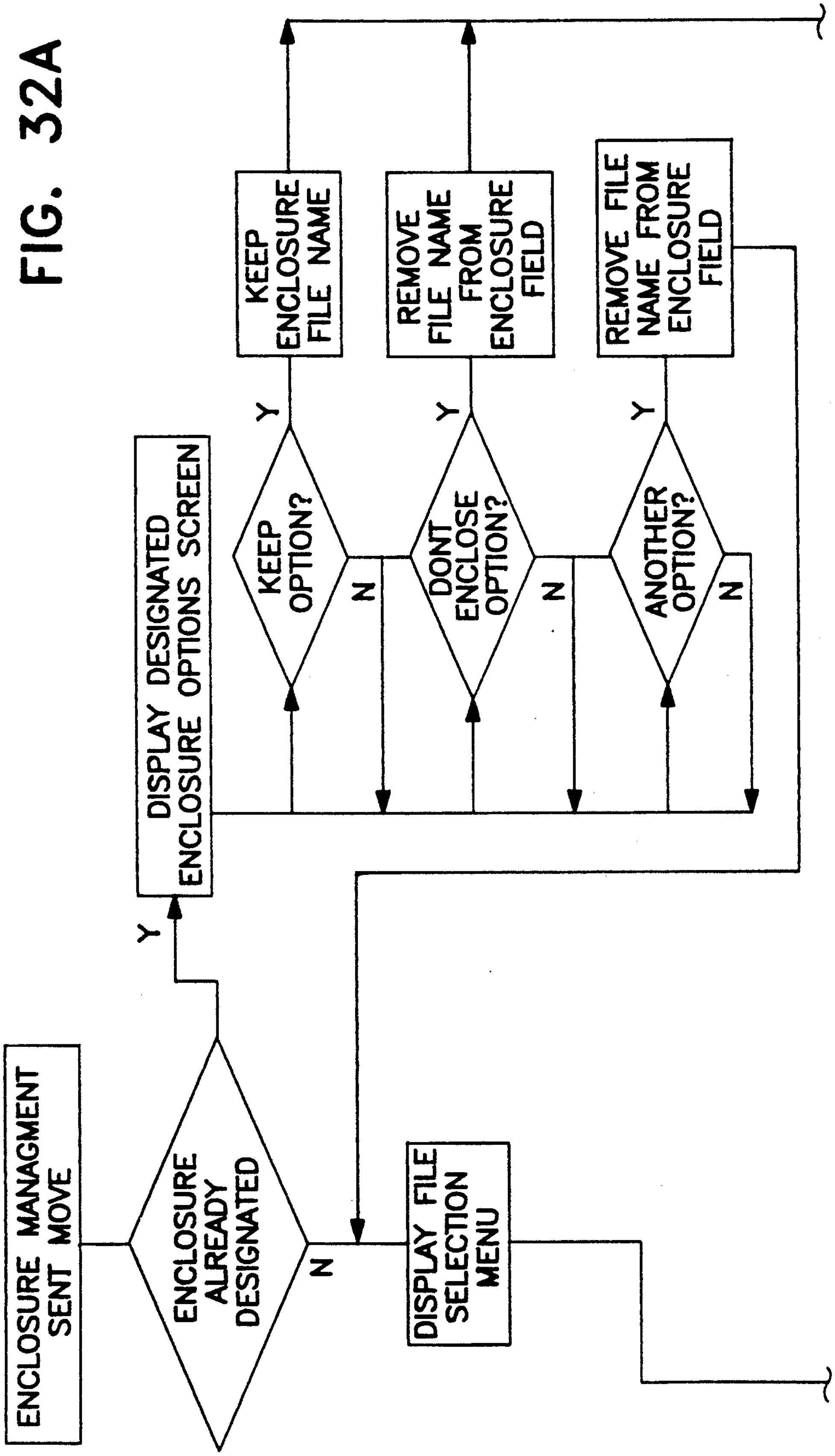
FIG. 32 is a flow chart showing an enclosure management process on a sent move enclosure employed in a conversation management apparatus and methods in accordance with one embodiment of this invention.
Figure 32B:
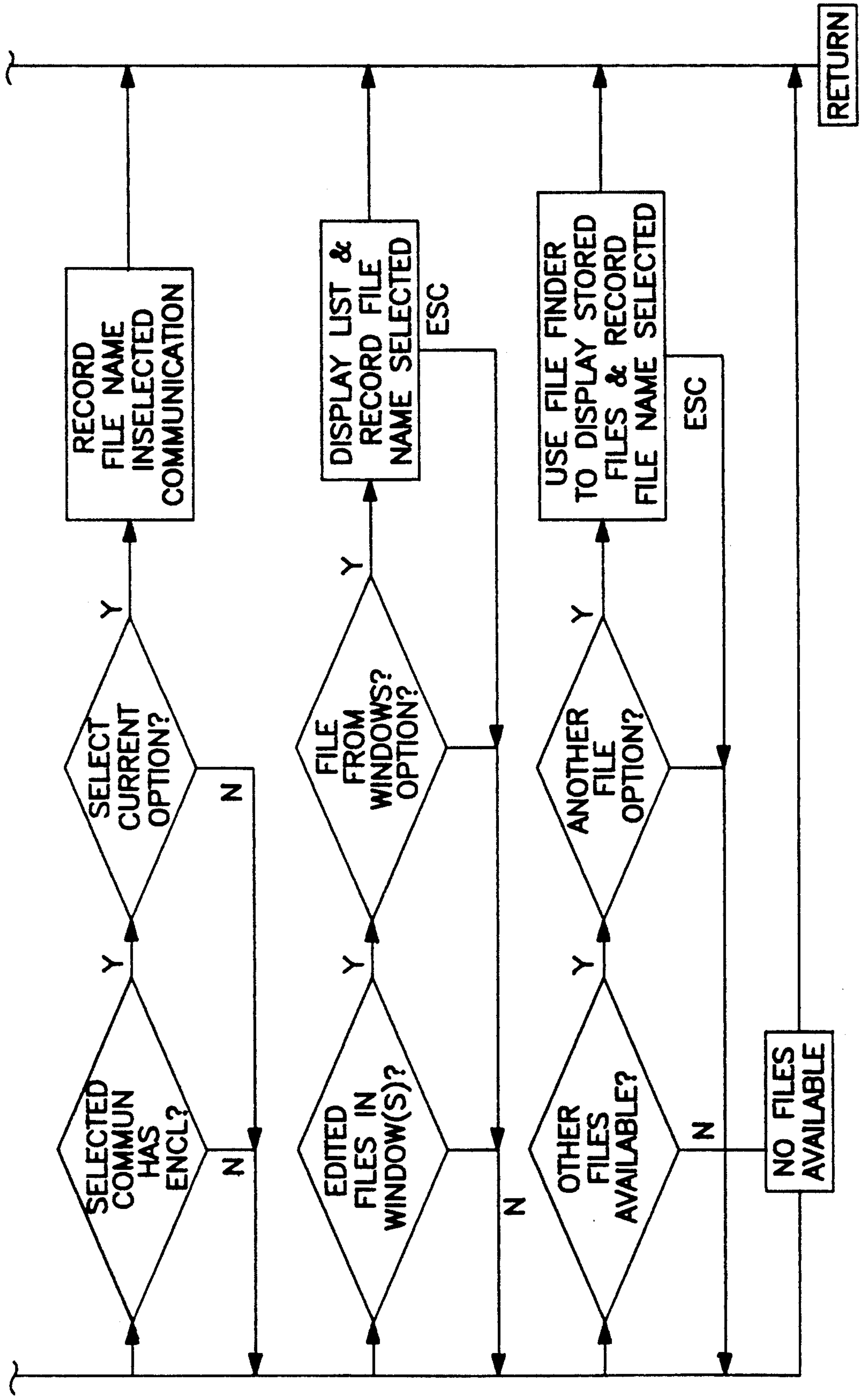
Figure 33:
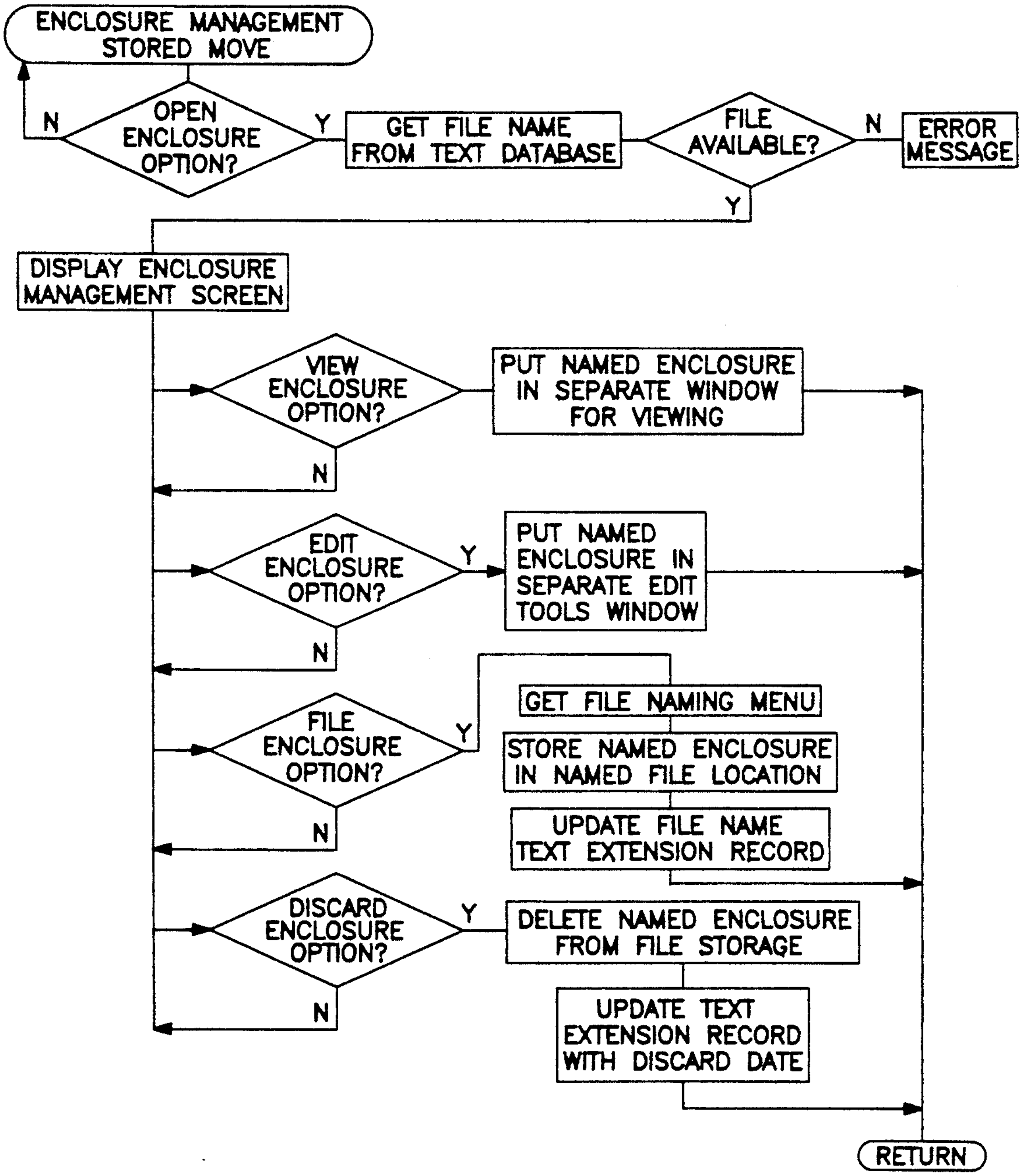
FIG. 33 is a flow chart showing an enclosure management process on a stored move as employed in a conversation management apparatus and methods in accordance with one embodiment of this invention.

"Enclosures"—this option permits a file to be attached to a message as an enclosure. The menu associated with this is shown in Table 11 and Table 12 shows that the file name is placed in the move message screen. FIGS. 32 and 33 show the steps involved in the Enclosure Processing routines. Basically, this routine enables the selection of a saved file in a current window or a file in any subdirectory to be selected as an enclosure. The designated enclosure can be changed prior to sending the move.

"When"—selection of this option brings up a menu screen which permits entry of dates for incompletions associated with the initial move as shown in Tables 12 and 13. Dates associated with incompletions can be entered or selected from a calendar display. If an alert ("Remind Me") incompletion is selected, a reminder date is entered and a separate subject can be designated for the alert.

"OK"—this option is selected when the filling in of the envelope fields is completed.

The Envelope menu can be accessed as many times as the participant desires, prior to selecting "Send."

Figure 30:
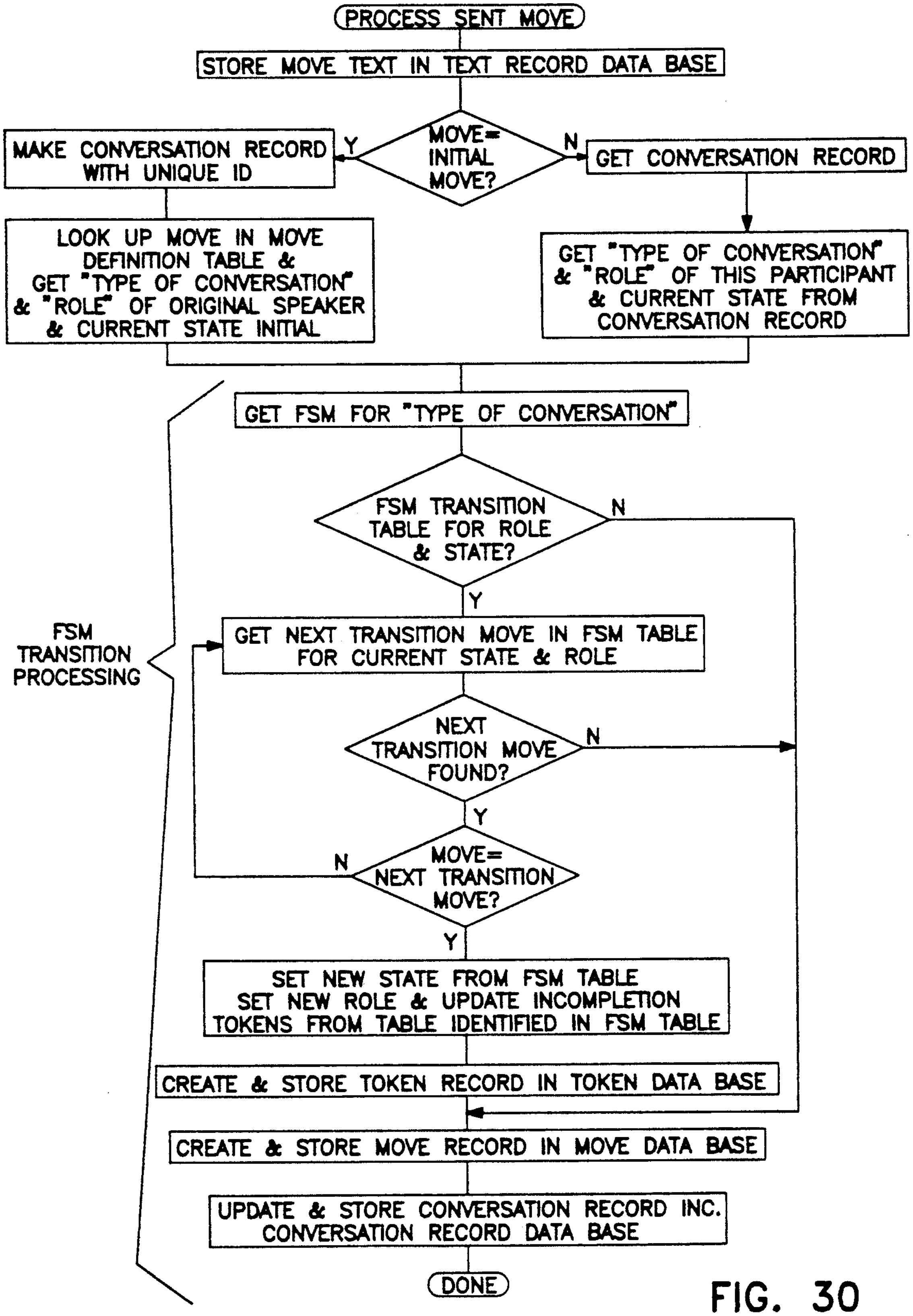
FIG. 30 is a flow chart showing processing of a sent move in a conversation management apparatus and methods in accordance with one embodiment of this invention.

If Send has not been previously selected, then the program will return to the Enter/Edit Move Text Screen which is filled in with the entries made in the Envelope screen processing. If Send has previously been selected, the program returns to the Send routine. Then the program will execute a routine to create and store records in the Conversation Data Base. A flow chart for this routine is shown in FIG. 30 and is described below. This routine is followed by posting the move message which will reach designated parties either via a LAN or other message transport system.

Figure 28A:
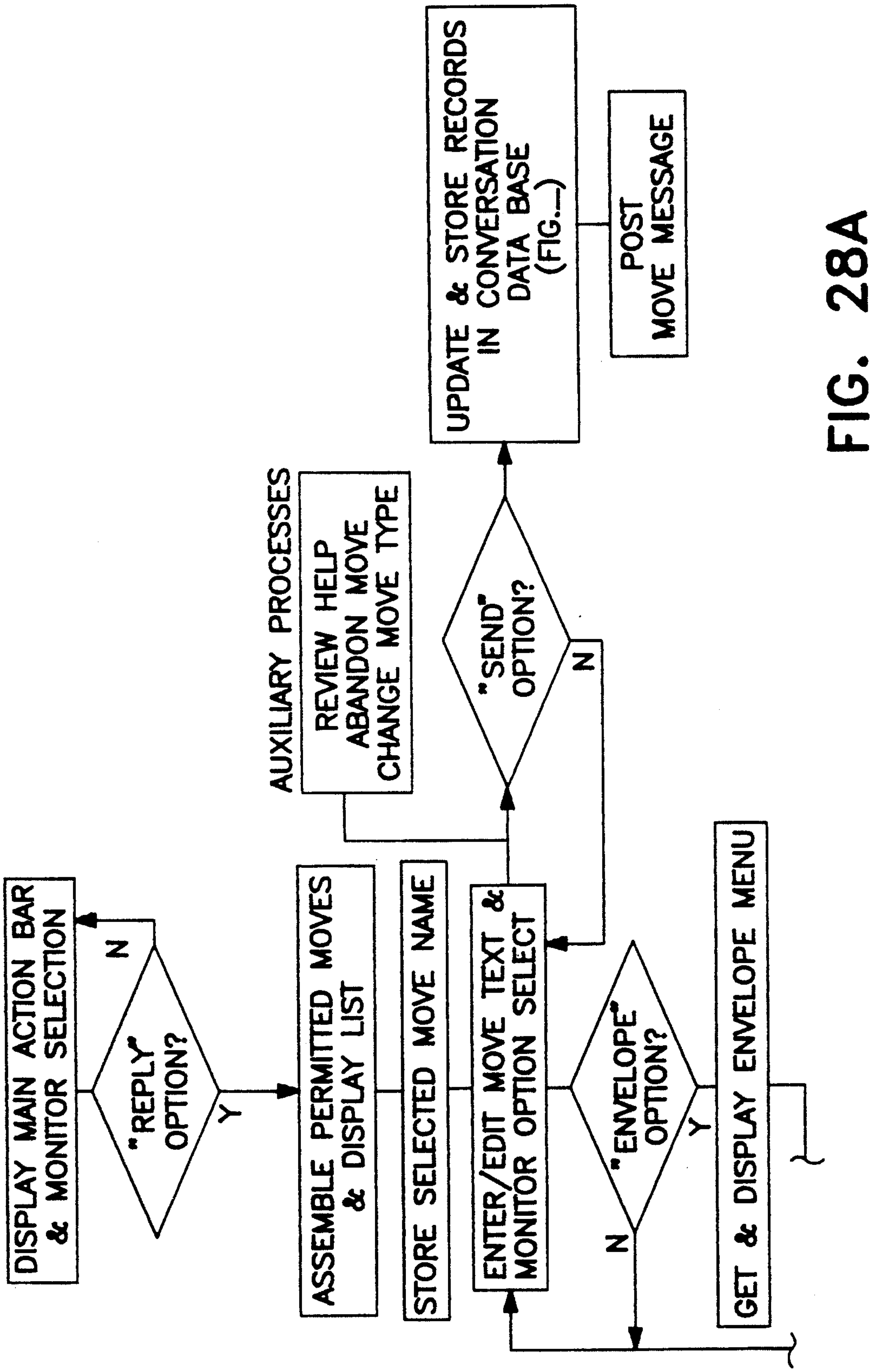
FIGS. 28A-28B is a flow chart showing processing of a continuing move in a conversation by conversation management apparatus and methods in accordance with one embodiment of this invention.
Figure 28B:
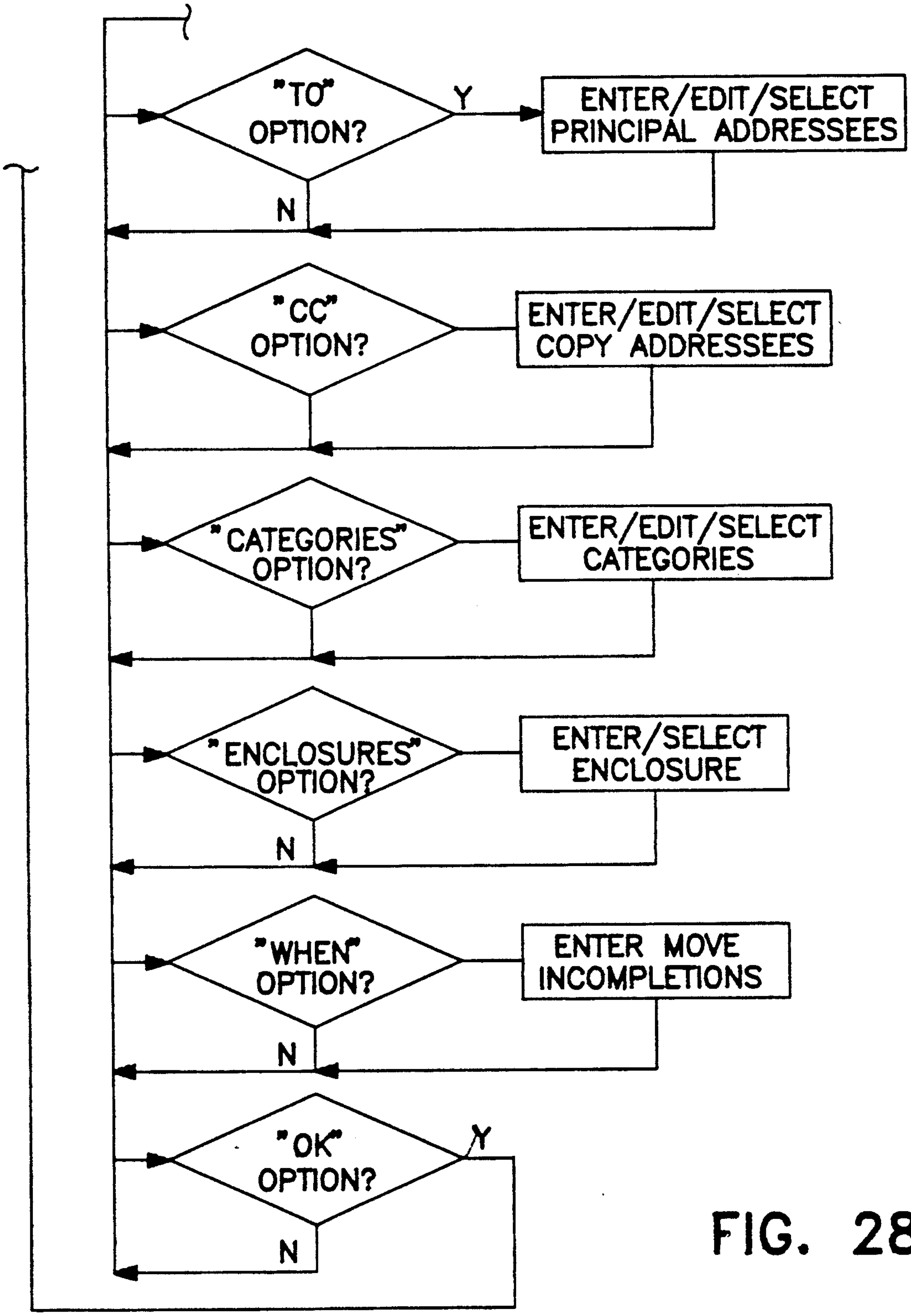
Figure 29A:
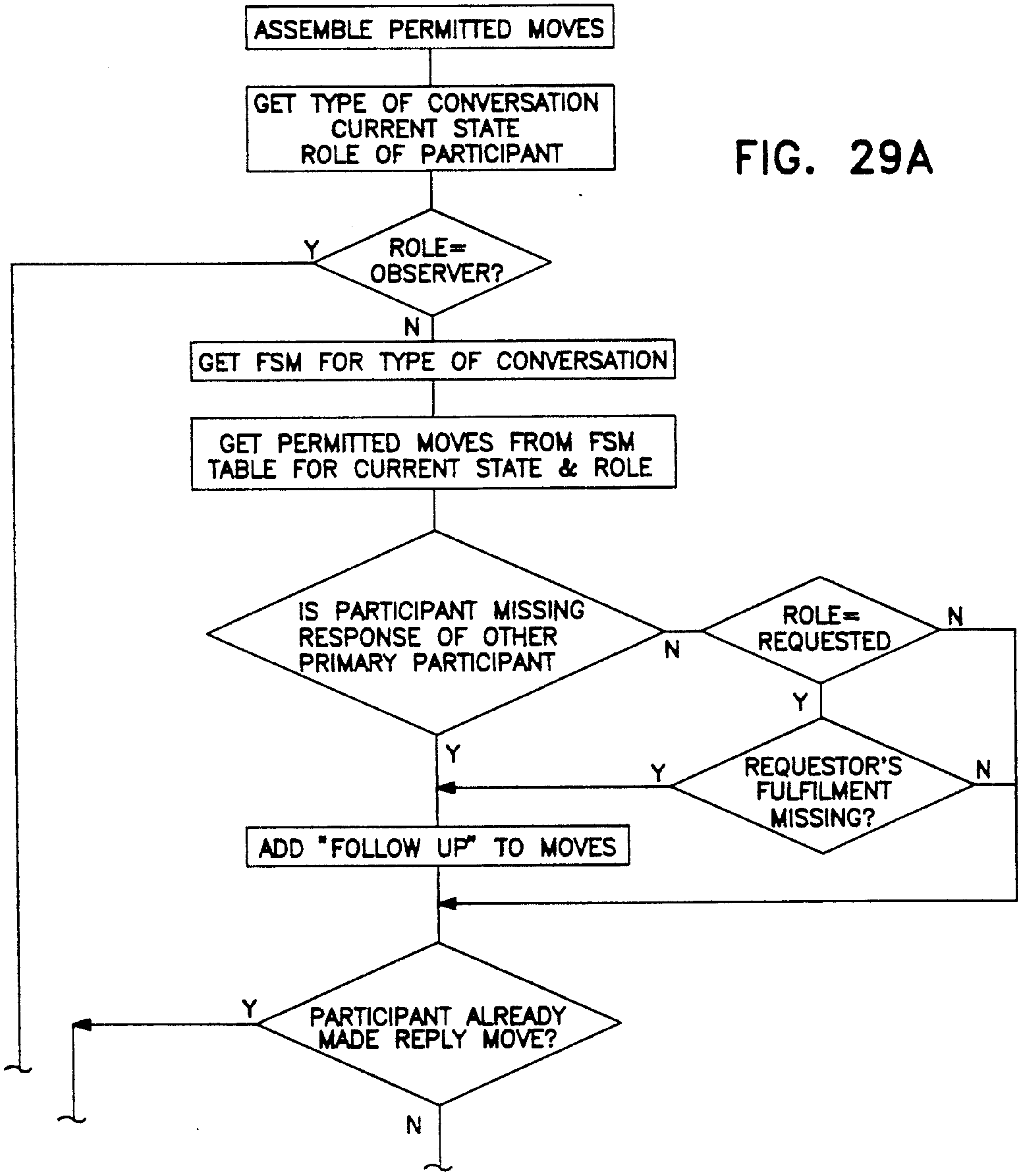
FIGS. 29A-29B is a flow chart showing obtaining permitted moves in a conversation conversation management apparatus and methods in accordance with one embodiment of this invention.
Figure 29B:
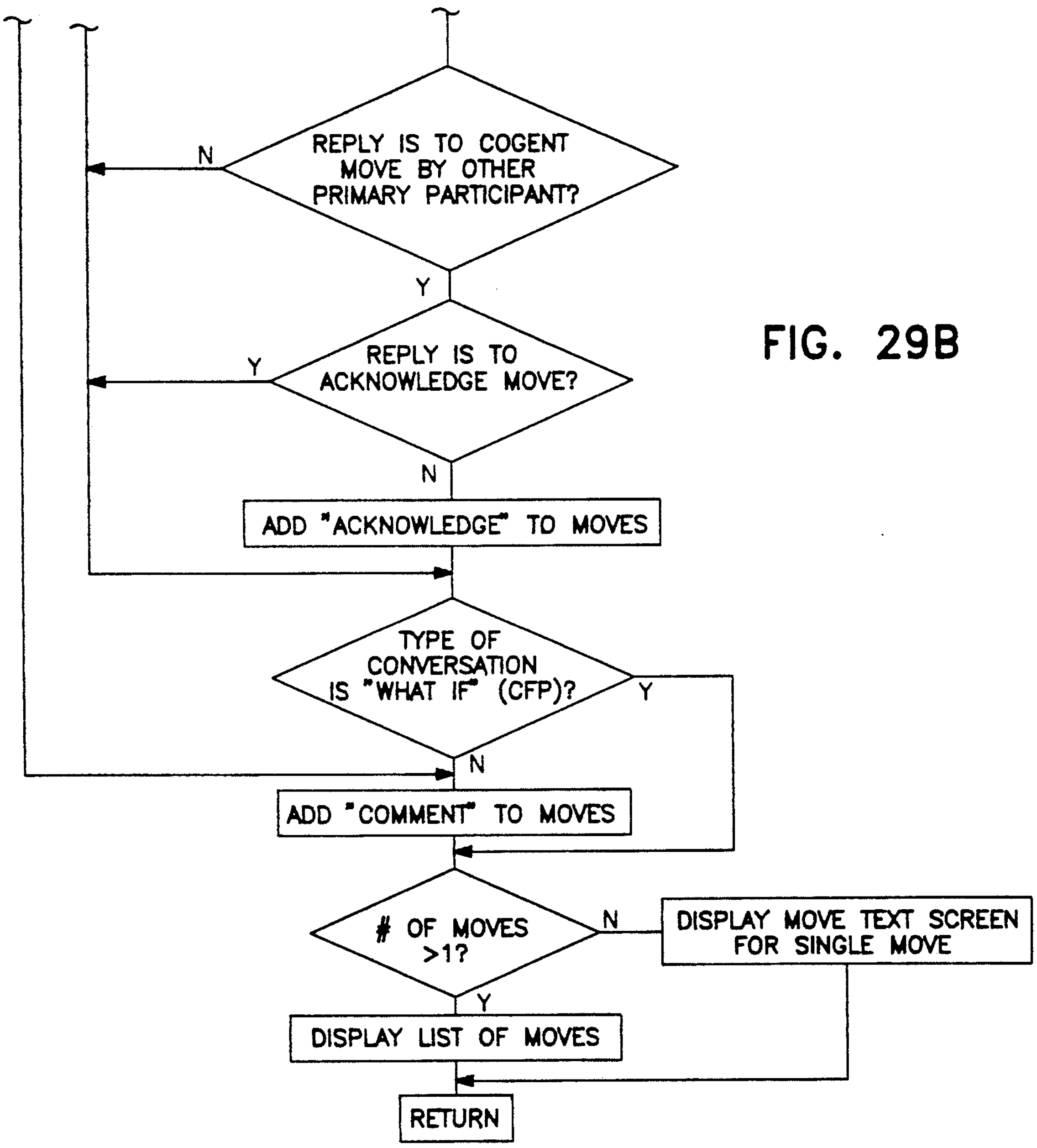

(2) Making a Move in an Existing Conversation (FIGS. 28 and 29 and Tables 17 through 23)

(a) Selecting an Existing Conversation

The Coordinator system provides a variety of facilities for use by a participant to select a conversation from among the existing conversations in which to make a move. One of the ways in which such selections are commonly made is described below where the facilities for reviewing new moves by other participants are described.

(a.1) Menus and Tools for Selecting Conversations

Table 33 shows a facsimile of the "Read" menu of The Coordinator system, wherein the option is presented of selecting a list of new, unread incoming communications.

Table 34 shows a facsimile of the "Calendar" menu, wherein the option is presented to produce a calendar. Calendars can be selected which show appointments only, or which show all types of incompletion, in which case the calendar will show selected incompletions declared for completion on the date(s) selected. By selecting a day or range of dates other than today, future appointments and incompletions can be reviewed. If the participant has set the option "Carry forward" on, in the "Tools/Customization" menu, then calendars spanning a single day which include incompletions other than appointments will also show incompletions "carried forward" due to their not having been completed on previous days.

Table 35 shows a facsimile of the "Organize" menu, wherein options are presented under "Review" for producing all manner of lists of conversations and communications. The options under the review menu, illustrated in facsimiles shown in Tables 36 and 37, constitute the most comprehensive tool available in The Coordinator system for selecting specific conversations, for reviewing the state of conversations, making a move, or for considering the possibility of making a move. There, the participant may build lists of conversations based upon the combinations and permutations of many characteristics of four criteria: types of conversation and communication, dates of initiation, incompletion, or communication, categories in which conversations have been declared, and who the conversation is with. The following are examples of the kinds of selections that can be made:

conversations where the participant's response is missing;

conversations where another participant's response is missing;

conversations in which a participant has made a promise and has not fulfilled it;

conversations in which a participant has made a request which has not been fulfilled;

conversations in which the other participant has made promises to the participant and those have not been fulfilled;

conversations in which the other participant has made requests to the participant and those have not been fulfilled;

conversations in a specific domain of possibilities, or a combination of domains;

conversations a participant has with a specific other participant;

conversations that were initiated within a specific range of dates;

conversations having a data associated with an incompletion which date lies within a specific range of dates;

conversations that are marked for deletion;

conversations that are open;

conversations that are closed;

conversations that have no reminders or incompletion tokens in them (other than appointments);

open conversations of a type (Note, What if, Offer, etc.);

communications with enclosures; and conversations in which the participant is an observer.

(a.2) Lists of Conversations (or Moves) Selected

Selecting one or more sorting criteria will cause The Coordinator system to execute a search of the conversation records database and to produce on the screen a list, in a pre-determined format, selected data summarizing the current list of selected conversations. See Table 23 for an example of a list of conversations in a particular domain.

The program allows several lists to be present at once in windows on the screen or in "hidden" windows, including at the same time a list of new mail, a list produced by the "Organize/Review" menu tools, and a list of communications in a conversation produced by the "History of a conversation" tool discussed below.

(a.3) Algorithm of Selection from Conversation Records

The foregoing discussion describes the selection process in terms of the possible selection criteria and what the participant "sees" as a result.

Figure 35:
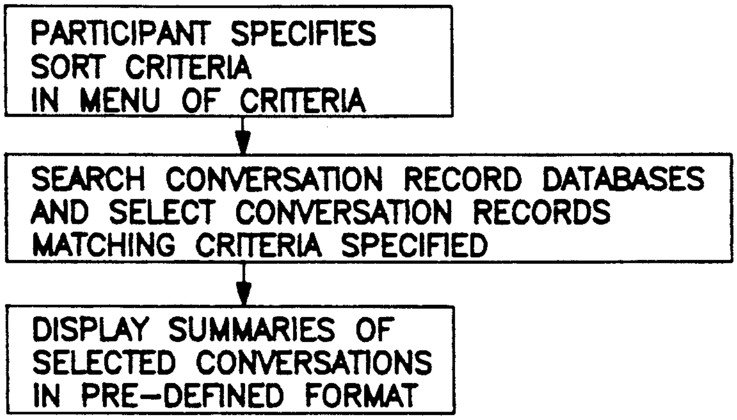
FIG. 35 is a flow chart illustrating a process for sorting and displaying conversation record information employed in a conversation management apparatus and methods in accordance with one embodiment of this invention.

Inside The Coordinator system, the following algorithm implements the selection process. FIG. 35 gives a conceptual overview of the selection method.

First, when making a selection the participant decides if the list that will be built is a conversations or a communications list. If it is a conversations list, the conversations data base will be searched. If The Coordinator system is going to build a communications list, the moves data base will be searched. In either case, The Coordinator system tests one by one the selection criteria, to determine if a conversation or communication belongs to the specified list. So for example, suppose that a participant requests a list of all open conversations in the domain "people" and in which his response is missing.

The Coordinator system searches through the conversation data base, according to an ordering of criteria that may differ from the order of their appearance in the menu shown in Tables 35 through 37. For each conversation The Coordinator system first determines whether or not that conversation is still open. If a reviewed conversation is not open, The Coordinator system stops reviewing that conversation and continues its search.

If The Coordinator system determines that a conversation is open, it next determines whether or not the response token for the participant is present. If that token is not present for the participant in the conversation under review, The Coordinator system stops reviewing that conversation and continues its search.

If the conversation being reviewed is open and the response token for the participant is present, The Coordinator system next determines whether or not the conversation takes place in the domain "people"?. If it does, the conversation will be included in the list being produced. If the conversation under review does not take place in the domain "people", The Coordinator system stops reviewing that conversation and continues its search.

The Coordinator system proceeds in this manner until all conversations in the database have been tested according to the selection criteria specified by the participant. The Coordinator system proceeds in a similar manner when the participant specifies selection criteria other than those considered in the above example. If no conversation or communication is found to meet the selection criteria, the message "Nothing pending . . . " is displayed.

(a.4) Tools for Reviewing Moves in Conversations

When a list of summaries of conversations or communications has been presented on the screen, a participant can review the records of specific moves by first moving the cursor to a line in the list and pressing the "Enter" key, which will bring to the screen the latest move in that conversation.

Table 19 shows a facsimile of the menu on which options for "Tracing" in conversations is presented. These options include those of moving from the present move backwards in time, or backwards all the way to the first communication currently in the participant's records in that conversation, or forwards a move at a time, or forwards all the way to the latest communication again. In addition, Table 19 offers options for bringing the calendar for the next date on which there is a reminder incompletion declared for the conversation, or bringing the calendar for the next date on which there is an appointment declared in the conversation.

(a.5) Tools for Reviewing Whole Conversations

The Coordinator system includes facilities for reviewing the whole of any selected conversation as a utility available while working with conversations. Table 35 shows a facsimile of the "Organize" menu, in which can be found the options "History of conversation" and "Status of conversation" with which a participant can produce (a) a journal of the moves that constitute the history of a conversation, and (b) a report on the status of a conversation.

The "History" option will produce a chronological list of summaries of all the moves in the current conversation, which list will also include separate entries for each reminder and each appointment declared in the conversation. Table 38 shows a facsimile of such a list.

The "Status" option will produce a report in which are detailed:

the "Subject" of the conversation;

the kind of move with which the conversation began;

the originator of the conversation, and the original addressees;

the date, type, speaker, and listener of the last move in the conversation, and, in the delegation sub-conversation if such a sub-conversation is open;

the number of moves currently recorded for the conversation;

the names of domains ("categories") assigned to the conversation;

the dates and identities of pending reminders and appointments in the conversation; and the full MHS addresses of the addressees of the current move.

(b) Making a New Move

FIG. 28 illustrates the steps of a routine for making a new move in a continuing conversation. This routine starts with selection of the Reply option at the time that a message of a selected conversation is displayed on the screen. This may be a displayed move that just arrived from another participant or a move that was selected out of the conversation data base as described above. First a routine is performed to assemble and display the permitted moves for the conversation based on the type of conversation, the current state and the role of the participant making the move. This routine is shown in FIG. 29 and is discussed below.

When the participant selects one of the permitted moves, the move name is stored and the move text window is presented for entering or editing the move text. Table 32 lists the offered move message text that is automatically presented by the Conversation Manager when various moves are selected. At this time the participant can either alter or add to the suggested text of the move, if any, or can select the Send option or the Envelope option. If the Send option is selected, the program moves directly to a routine to update and store records in the conversation data base and then to post the move message. The conversation record for the selected conversation is already available from the selection step, so the participants and other data and information on the conversation will remain as in the current conversation record.

If the envelope option is selected, the participant can make changes to certain of the fields of the conversation records before sending the move. The subject of the conversation can not be altered from that designated by the original speaker in the conversation, even if no subject was entered. However the following items can be changed using the envelope window.

"To"—selecting this option permits the participant to change the principal addressees of the move to an extent that depends on the type of move being made.

"Cc"—selecting this option permits addition or deletion of persons to receive copies of the move.

"Categories"—this option can be selected to change the categories of the conversation for this participant.

"Enclosure"—selection of this option permits an document or file to be attached to the reply. A detailed explanation of Enclosure Management is given in another section herein.

"When"—this option permits entry of dates as tokens of incompletions which are pertinent to the move being made. These are explained in detail elsewhere.

"OK"—selection of this option terminates the Envelope routine and returns the program to the Move text screen.

The envelope screen can be accessed as many times as the participant desires prior to selecting the Send option.

(c) Assembling Permitted Moves

FIG. 29 illustrates the steps in a routine carried out by the Conversation Manager to derive the permitted moves based on the type of conversation, the current state of the conversation and the role of the participant making the move, together with some additional information on prior moves and the status of certain incompletions. The first step of this routine is to get the Type of Conversation, the Current State, and the Role of the Participant making the move from the conversation record that is already available. A check is made to determine if the Role is Observer. If YES is returned, the only move is "Comment" so that move is added to the assembled list of permitted moves (now the only one) and since there is only one move available, the routine automatically displays the Comment Move text screen to the participant and the routine is done.

If the checking step as to the Role being Observer returns a NO, the FSM for the Type of Conversation is obtained and the permitted moves are obtained from the FSM table associated with the Current State and Role. As shown in the example of a FSM table discussed above and in Table 25, all permitted moves for the principal participants are listed in the table and from those are selected the ones for the Role of the participant making this move. An alternative approach would be to have separate FSM tables for each State and Role combination.

After the basic list of permitted moves in the current state is obtained, some checking steps are executed to determine if a "follow up" move (e.g., "Progress" is a permitted move. The token records in the data base are checked to see if the participant making the move is missing the response of the other participant. If this returns a YES, then a follow-up move is added to the list.

If this returns a NO, then a check is made whether the Role is Requestor and whether the token records show that the requestor is missing his fulfillment. If both checks return YES, then a follow-up move is added, otherwise it is not.

Following this a series of other checking steps are executed to determine if one or more "acknowledge" moves are permitted moves. For example, first the move records of the participant are checked to see if he already replied to the move being displayed. If this returns a YES, the acknowledge-receipt move is inappropriate since the other reply is inherently an acknowledgement. If this checking step returns a NO, then another check is made to see if the reply move being made is in response to a move by another primary participant. If this returns a NO, then the acknowledge-receipt move is not appropriate since acknowledge-receipt of comment moves from other participants are not defined as permitted moves in this embodiment. Finally, a check is made to determine if the reply move being made is in reply to an acknowledge move. If this returns a YES, the acknowledge-receipt move is skipped since it is not deemed appropriate in this embodiment to acknowledge an acknowledge-receipt move. If this checking step returns a NO, then the acknowledge-receipt move is appropriate and is added to the list of permitted moves.

Subsequently, a checking step is performed to determine if the Type of Conversation is a "What If" or CFP. If this returns a YES, then the Comment move is deemed inappropriate in this embodiment and adding it is skipped. If this checking step returns a NO, then the Comment move is added to the list of permitted moves.

Finally, in this embodiment a checking step is performed to determine if there is more than one move in the list of permitted moves. If this returns a NO, then the program automatically displays the move text screen of the single move that is available. If a YES is returned, the list of permitted moves is displayed for selection by the participant making the move.

In the current commercial embodiment of this invention, the comment move is also disallowed in all Note conversations. This is not shown in the flow chart of FIG. 29, but is achieved in practice by skipping directly to displaying the single move text screen for replies to Note moves after processing through the FSM for the permitted moves in that type of conversation.

Figure 31:
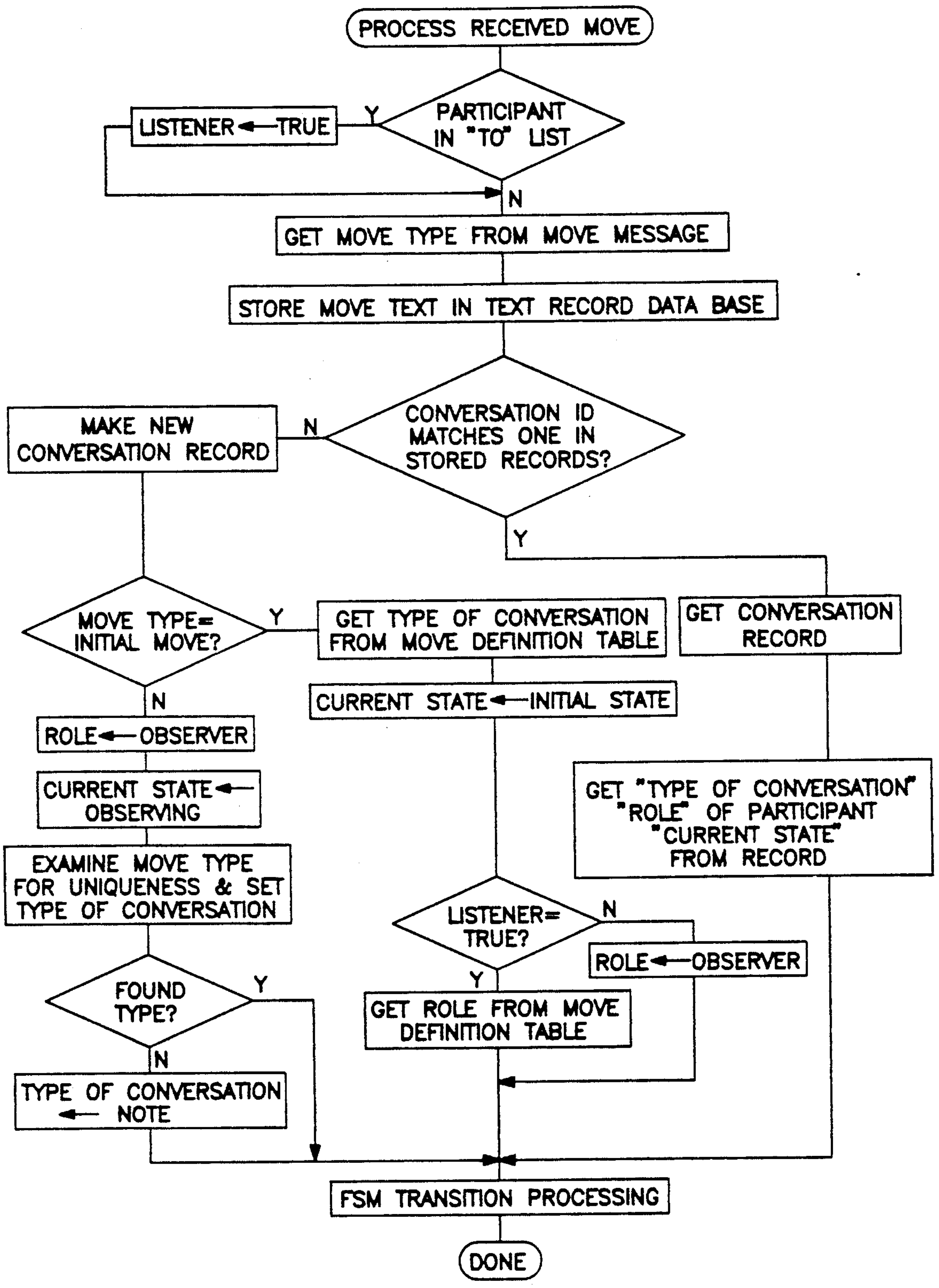
FIG. 31 is a flow chart showing processing of a received move in a conversation management apparatus and methods in accordance with one embodiment of this invention.

(3) Updating Conversation Date Base for Sent and Received Moves (FIGS. 30 and 31)

(a) Conversation Manager Processing of Sent Move

The Conversation Manager utilizes a single routine to process data from a sent move into the Conversation Data base of the participant making the move whether the move is an initial move or a subsequent move in the conversation. Only the path through the routine changes for new and continuing moves.

The first step in this routine is to store the move text in the text record data base of the participant making the move with appropriate tracking of location and length. This is done for security purposes since it permits the move and conversation records to be reconstructed if something happens to interrupt the routine before it is completed. Following this storage step, a test is made to determine if the move is an initial move. If this test returns YES, then a conversation record is made with a unique ID assigned and the initial move is looked up in the Move Definition Table (Table 28) to obtain the "Type of Conversation" and the "Role," of the original speaker of the move. The current state is set to the initial state for that type of conversation.

If the move is not an initial move, the conversation record for the displayed prior move associated with the sent move is obtained and the "Type of Conversation,""Role," and Current State are obtained from that record. It should be noted that the conversation record for the move that is being replied to is already available when that move is brought to the screen so the step of getting that record is set forth only for distinguishing the use of an existing record from the creation of a new record.

The next step is to get the Finite State Machine (FSM) for the "Type of Conversation." The structure and organization of the FSM is discussed in more detail in another section, but for purposes of this discussion, it should be understood that there is a separate FSM for each type of conversation and within that FSM there are transition tables for each state and participant role for which there is at least one move that can produce a change in the state of the conversation or a change in the incompletions.

After the FSM is obtained, a check is performed to determine if there is a transition table in the FSM for the Role and Current State. If there is no such table, no transition processing is required for the sent move, and the program skips to creating and storing a move record and updating and storing the conversation record. If there is a transition table, a sequence of steps is performed to examine the transition moves in sequence to determine if the move that is being made is in the transition table. If the entire table is examined and the current move is not found in the table, then the final steps of creating and storing the move record and updating and storing the conversation record are performed.

If the current move is found in the transition table for this Role and the Current State, then a "new" state is set from the transition table and a "new" role and updated incompletions are set from the table that is identified in the FSM transition table. It should be understood that the new state may be the same state as the Current State if the current move only changes one or more of the Role or Tokens of Incompletions. Similarly, the new role may be the same as the current Role if only one of the state or tokens of incompletions are changed. If the move is a delegate move, the state of the conversation may become a compound state. If the participant didn't enter dates for the incompletion tokens, then dates far in the future are assigned by the Conversation Manager so that incompletion tracking can be performed.

After setting new State, Role and Tokens, the token record is stored in the Token Data Base and processing continues with the last two steps previously identified.

(b) Conversation Manager Processing of Received Move

Referring to FIG. 31, the Conversation Manager routine for processing a received move shares some of the same processing steps as the routine for processing a sent move, but there are several important differences. It should be remembered that a received move can be one of the following:

a. an initial move in a conversation so that there is no conversation record in the receiving participant's Conversation Records;

b. a continuing move in an existing conversation for which the receiving participant has no conversation record either because this is the first move communicated to this participant or because this participant has purged or otherwise lost the the conversation record for the conversation; or c. a continuing move in an existing conversation for which the receiving participant has a conversation record in the conversation data base.

For purposes of this discussion, it will be assumed that all received moves arrive in the proper order that they are created and sent. In other words it will be assumed that the message transport system over which the moves are sent does not put the moves out of sequence. For example, if a participant opens a conversation with an initial move and follows that initial move immediately with a comment move, it will be assumed that the initial or opening move arrives for processing first and the comment move arrives thereafter. If this correct sequence is not guaranteed by the message distribution system used to deliver communications to Conversation Managers, then the Conversation Manager must be able to receive out-of-order moves, reorder those moves in the Conversation Data Base, and perform FSM state transition processing on the moves after they have been placed back in proper order. In the current embodiment it is not assumed that the message distribution system (MHS by Action Technologies, Inc.) will guarantee messages arriving in the correct order, and consequently the Conversation Manager re-orders messages before processing them in FSMs.

It should be understood that the routine shown in FIG. 31 is performed on all incoming moves in sequence until all have been processed. In the current embodiment of The Coordinator system, this processing is done automatically after a batch of incomming messages has been received and before presenting a list of new mail messages to the user. This is presently preferred to processing incoming moves as they are viewed (which is an alternative approach) since it safely puts the moves into the conversation data base and doesn't rely on the new mail file being safely maintained for as much as several days if the participant delays in reading mail.

Referring now to FIG. 31, the first step in processing a received move is to check the incoming move message to determine if this particpant is in the "To" list of the message. If this participant is in the "To" list, he is what is alternatively called a "Listener" or a "Primary Participant" instead of an "Observer"—i.e. one who is listed in the "CC" field of the Envelope. Thus if this checking step returns YES, a Listener flag is set TRUE.

The next step is to get the Move Type from the incoming move message, followed by the step of storing the move text in the incoming move message in the Text Record Date Base. The message transport service automatically handles the filing of any enclosure transported with the incoming move message.

Next the conversation ID in the incoming move message is checked to see if it matches any of the stored conversation records. If there is no match, a new conversation record is made and the incoming move is looked up in the Move Definition Table to determine if it is an initial move. If this checking step returns a NO, Role is set to Observer and the Current State is set to Observing. Then a routine is executed to attempt to determine from the move type itself what the type of conversation is. Since certain types of conversations have unique moves, such as Continue in the "What If" type of conversation, certain move types will themselves indicate the type of conversation.

If the type of conversation is not found from the move type itself, the type of conversation is set as a Note conversation and the processing of the received move continues through the FSM Transition Processing routine that is shown in FIG. 30 and discussed above. The FSM Transition Processing routine may alter the state to final or closed if the move being processed is a Declare Complete type of move.

If the checking step to determine if the incoming move is an initial move returns a YES, the Type of Conversation is obtained from the Move Definition Table and then the Current State is set to the Initial State. Then the value of the Listener flag is checked to see if it is TRUE. If this returns a NO, Role is set to Observer, and if it returns a YES, Role is obtained from the Move Definition Table. This is followed by executing the FSM Transition Processing routine as shown in FIG. 30 and described above. Although this is an initial move in a conversation, there is a transition table in the FSM for each of the initial moves for the purpose of defining the token pattern for the incompletions associated with that move.

Going back to the checking step to determine if the Conversation ID matches one of the stored conversation records, if this step returns a YES, the conversation record is retrieved and the Type of Coversation, Role and Current State are obtained from that record. Then the FSM transition processing routine is executed to complete the processing of the received move.

(4) Enclosure Management—Sent and Received Moves (FIGS. 32 and 33)

Version 2 of The Coordinator system includes an embodiment of a Conversation Manager which also includes enclosure management routines for facilitating the management of enclosures with sent and received moves. Once a file has been placed under the management of the Conversation Manager by including it in a communication in a conversation, it is readily accessed along with the stored communications in the conversation records of the participants. This adds to the "expert system" capabilities of the Conversation Manager method and apparatus of this invention.

(a) Sent Move Enclosure Designation

Referring to FIG. 32, if the enclosure designation option is selected from the envelope window (See FIG. 27) and Table 10), this routine checks to see if there is already an enclosure designated. IF this returns a YES, then the designated enclosure options screen is displayed with the following options to be selected:

Keep—selection of this option keeps the same designated file as the listed enclosure.

Discard—discards the designated file name with the result that no enclosure will be sent if the move is sent without later designating an enclosure.

Another—discards the designated file name and goes to a display of the file selection menu.

The file selection menu is displayed if there is no enclosure already designated and the first checking step returns a NO or if the above Another option is selected. At this time, the contents of the menu displayed depends on whether the selected communication being replied to (if not an initial move) has a designated enclosure, whether there are edited files in windows either on the screen or hidden, and whether there are files stored in the system. If there is a communication or move being replied to and that move has an attached enclosure which hasn't been previously deleted, then the Select Current option is presented in the menu. If there are edited files in the windows, the Select from Windows option is available. If there are stored files, the Enclose File option is available. The wording on these options may change depending on how many are available. The following is the action of the routine if one of these options is selected:

Select Current—the file name in the selected communication is recorded in the Enclosure field.

File from Windows—the list of files in windows is presented and the selected file name is recorded in the Enclosure field.

Enclose File—the file finder feature is used to display the files in the current DOS subdirectory and a designated file in that subdirectory or other subdirectory brought up using file finder tools is recorded in the Enclosure field.

Once the move is actually sent, the text records of the move will include a designation of the file sent as the enclosure. This file can be retrieved later under the management of the Conversation Manager by bringing this communication to a window and using the Open Enclosure Option to bring the file to the screen.

(b) Stored Move Enclosure Management

FIG. 33 illustrates a routine for management of an enclosure filed with a stored move. The starting point for this routine is a communication being selected in a list by cursor placement whether or not the communication is on the screen. If the enclosure is one that was sent by this participant, the text database of the participant stores the location of the enclosure. If the enclosure is one that was received from another participant, then initially the arriving enclosure is stored in a special subdirectory and the file name is placed into the text record database. Thus the Conversation Manager can retrieve enclosures attached to both sent and received communications.

When the user selects the Open Enclosure option from the Read Menu, the file name is obtained from the Text Database and then a checking step is performed to determine if the file is available under that name. If it is not available an error message is given, and if it is available, the routine proceeds to display an enclosure management screen with these four options:

View Enclosure—this option puts the enclosure in a separate window for viewing with viewing tools only. No editing or filing can be done.

Edit Enclosure—this option puts the named enclosure file into a separate edit tools window which is equivalent to bringing the file into a window using the Files Utility of THE COORDINATOR system. However, the file name cannot be changed under this option.

File Enclosure—this option gets the file naming menu of THE COORDINATOR system to enable the file to be given a different name and a specific subdirectory storage location. The file is then stored using that designation and that new file name is placed in the file name field in the text extension record in the data base.

Discard Enclosure—this option deletes the named enclosure from its incoming file location or from its current file location if previously filed using the File Enclosure option. The date of the file discard is placed in the text extension record so that status of the enclosure is available along with the other move text when a communication is brought to the screen.

Enclosure managment is also involved in deleting communications and conversations. In Version 2 of THE COORDINATOR system, enclosures are deleted along with the associated communications if they haven't been filed.

(c) Enclosure Management Facilities in Use

If a user uses the Conversation Manager to keep track of files, that user need not remember the contents and names of multiple DOS files. Instead, to retrieve files, the user can select Review from the Organize menu and then build a list of all conversations (or communications) with enclosures. Alternatively, the user can refine the list, specifying a time period, one or more categories, and/or a person (or organizational entity) with whom the user has conversed.

These options, and the tools that make them available, give new answers to practical and difficult-to-resolve questions concerning the filing of documents in an office. Are documents to be filed with correspondence or separately? What indexes should be used for filing? How can discarding of correspondence and enclosures be coordinated efficiently?

Certain indexes (e.g., date, subject of conversation, categories to which the conversation has been assigned, speaker and listener) are kept automatically in conversation management records in The Coordinator (see FIG. 25). By enclosing documents with communications, those indexes can be used to retrieve enclosures quickly.

In addition, disposal of documents can be tied to completion and discarding of conversations. When a user is about to remove a conversation or communication from his conversation records, the Conversation Manager warns the user if an unfiled enclosure is included with the conversation or communication in question. The user can discard the enclosure(s) at that time, or file them before discarding the communication(s).

Further, the Conversation Manager can be used to maintain records of drafts by different authors. For example, suppose that Alex and Sam are collaborating on a technical paper. Alex names and drafts a file, and encloses it in a Request to Alex that he review it and comment on it.

If Alex chooses to keep the draft file under the management of the Conversation Manager, he may review and edit the file by using the Edit option in the Open enclosure menu. He may then save the changes, compose a reply to Sam, open the Envelope menu, select Enclosure, and then select the appropriate file via the menu presented. (The file will have the numeric or alphanumeric name assigned to it by MHS when it was received and stored.)

The Conversation Manager keeps track of the file. When Sam or Alex respectively asks for the file associated with either Sam's communication or Alex's reply, the Conversation Manager in their respective machines gives the Interface Manager the current file name and the Interface Manager gets that file and puts it in a window.

Using the File option in the Open enclosure menu, a user can assign a new name to an unfiled enclosure. In that case, subsequent deletion of the communication or conversation will not delete the file. When the user names the file, the Conversation Manager creates a dummy move containing no text but showing the current location of the enclosure in the user's DOS directory structure.

Now, consider once again the conversation between Alex and Sam. There have been two moves in the conversation. Each move has a file associated with it. Sam's original file still has the name he assigned it, while the edited version supplied by Alex has a numeric or alphanumeric "name", such as "7281390r". Both files are now under the management of the Conversation Manager, the first having been associated with the conversation when Sam first sent it, and the second having been received by Sam, with Alex's changes, under a "strange" (alphanumeric) name given to it by MHS. Sam can rename the strangely-named file as "name2", including a helpful extension, if desired. Alternatively, Sam can edit it without filing it and then can return it to Alex who can likewise leave it under the control of the Conversation Manager, or file it.

Using these capabilities of management of successive drafts, practices can be designed for managing and supporting cooperative authorship and similar disciplines.

j. Calendars

The Coordinator system includes a set of facilities for presenting calendars as displays of incompletions. The particular relevance of this facility within the present method is rooted in the fact that participants, speaking in conversations, speak from physical bodies, and from time to time those physical bodies, and physical artifacts that are related to the capacity of those bodies to support conversations (e.g., buildings, rooms, vehicles, equipment) need to be located in particular locations or committed to particular purposes, in order that participants may declare possibilities for action and may declare specific actions for completion of possibilities. (In a future embodiment currently under preparation, facilities will be added for computer-assisted identification of suitable times for bringing people and resources together. These "group calendar" tools will allow a participant to ask questions of the sort, "When is the next time that Alex and I can get together with Sam in<-some location>.") As described earlier, in The Coordinator system a type of incompletion is defined for "events"—incompletions declared by participants regarding In that type of incompletion what is incomplete is the realization of the declared possibility that a physical entity will be located in a specified location, or will be employed for a specified purpose, at a particular time. In other words, a participant has declared the possibility of something (including his body as a possible "something") will be located somewhere or committed to some purpose at some time, AND that participant declares a specific time at which this incompletion is to be completed with the action of putting the "thing" in a location or committing it to a purpose. (This structure of incompletion corresponds to the structure of "missing declaration" and "missing move" found in the definitions of conversational incompletions.)

This incompletion is represented by a token which records the date/time combination:

(a) beginning date/time, (b) ending date/time.

In addition, we define a type of move in which the participant declares an action for completing the incompletion of a declared realizable possibility of the future location or commitment of an entity. This type of move is permitted to any participant in any role. This move is defined to be either (a) a move in an existing conversation, or (b) the opening move in a conversation that a participant conducts with himself, called "set appointment". A participant desiring to declare an event incompletion selects the option "Set appointment" in the "Calendar" (See Table 34). In the discussion below, this move will also be referred to as "make a time commitment".

The Coordinator system includes facilities:

to make "time commitments" (appointments);

to cancel previously made time commitments;

to revise previously made time commitments;

to repeat previously made time commitments on various frequencies;

to inform the participant when a newly-declared time commitment conflicts with an existing time commitment;

to review a list of conversations in which alerts are declared for a calendar date;

to review a list of conversations in which the response of the participant is missing and declared due on a calendar date;

to review a list of conversations in which the response of the other participant is missing and declared due on a calendar date;

to review a list of conversations in which fulfillment of promises are missing and declared due on a calendar date;

to review a list of conversations in which fulfillment of request are missing and declared due on a calendar date;

to enable the user to review daily and weekly calendars in the present, future, and past.

To make a time commitment, the user takes several steps as prompted by The Coordinator system in response to the user's selection of "Set an appointment" from the "Calendar" menu. The participant answers questions and selects options that define:

whether this appointment will be associated with any of the conversations currently being reviewed by the user (the system offers a menu listing conversations currently being reviewed);

data on which the time commitment will be declared;

starting and ending time of the time commitment;

the declared action to complete the declared realizable possibility of the "time commitment", comprising a short "subject" that will be displayed in all summary lists of time commitments and in calendars;

If the participant chooses to associate a time commitment with an existing conversation, the time commitment is added as a move in a presently-selected conversation in the participant's conversation record, and this new move does not change the state of the conversation; the move can be reviewed when the conversation is reviewed.

If the time commitment conflicts with a previously declared time commitment, The Coordinator system shows both time commitments and gives the participant the following choices: "double-book" by committing to the new time commitment, keep the previous commitment and cancel the new one; or revise the date/time of the new commitment.

Calendars are operated in The Coordinator system under the control of the Conversation Manager. The Conversation Manager gives special instructions to the Interface Manager regarding the special displays that are presented as facilities for handling this type of conversation in which what is missing pertains to location or commitment to purpose of a physical entity.

Time commitments are stored as moves in the moves data base, and associated tokens are stored in the tokens data base. Time tokens take the declarations of data and two associated times corresponding to starting and ending times of the declared incompletion. The date and times of these tokens are used to produce listings and displays of time commitments in calendars.

When the user request a calendars, The Coordinator system presents a menu offering the option of showing either appointments only, or appointments together with summaries of conversations which have incompletions declared for completion on the days for which the calendar is displayed. In this manner The Coordinator system builds a unified display of the commitments of a participant on a particular day emanating from all conversational moves handled by the Conversation Manager.

In addition, a participant can turn on an option called "Carry forward," in which case The Coordinator system will bring forward each day to the next those incompletions the participant has not explicitly handled; these will appear under the heading "Carry forward" in the calendar.

From the calendar display, the participant may select a time commitment to review, revise, cancel, or repeat. If the time commitment had been linked to an existing conversation, that conversation can be reviewed at the same time. Multiple windows are used by the Interface Manager to display the Calendar together with moves in associated conversations.

To build a calendar, The Coordinator system uses the token data base. In that data base all tokens can be sorted according to the associated data. The Coordinator system searches that data base and selects those tokens whose date is the date for which a calendar is being built, and at the same time builds the lists of time commitments and conversations with incompletions due that date.

The resulting list of conversations is sorted by the type of incompletion, such that the conversations are grouped by type of incompletion. Table 18 is a facsimile of this calendar display. From the calendar, a participant may select a specific conversation for review by pressing the "Enter" key on the keyboard.

The participant may make a permitted move in such a selected conversation. If after making that move the incompletion that caused the conversation to appear in the calendar is no longer present, the conversation will no longer appear in the calendar when it is requested again.

k. Coaching

For each defined type of permitted move in The Coordinator system a set of texts is defined in a way that is specifically adapted for use of the system by a predetermined community of participants in conversations. The set of all sets of such texts is illustrated in Table 32. Each such set of texts has been chosen so as to prompt participants to distinguish the characteristics of the named type of move according to the common understanding of members of the American English-speaking community. The process of prompting a participant in a conversation to distinguish for himself new and valid possibilities for declaration and for action which may be taken within the conversation we call "coaching".

(1) Naming Moves in a Specific Community of Speakers and Listeners

As described above, The Coordinator system displays to participants using the system the names of permitted moves in the form of menus and provides the facility to participants to select a move from such menus. These names are shown as "Move Menu Name" in Table 32.

Further, the method of this invention allows that menus may contain more than one name and accompanying set of texts that refer to and initiate the same move. Table 17, illustrating the reply menu for a promisor replying to a request, shows two counteroffer moves, "OK, except" and "No; however." The difference in the intention of the two moves is clear, and the texts associated with the two show these differences; however, the structure of the two moves is exactly the same.

Further, the method of this invention has been adapted for use by participants among and/or between different communities having different languages and different terminologies of the same conversational move. In these cases—in the development of versions operating in the Spanish and Italian languages—the step of defining a set of types of permitted moves includes individually defining particular names for each move which name corresponds to the particular community, where the names defined for each community are names that will prompt participants in that community to distiguish the characteristics of the move according to the common understanding of that community.

It is understood that the step of establishing a conversation management program in this case still includes the steps of providing a facility for selecting for each participant one of the defined set of names of moves according to the participant's community, and displaying to participants the permitted moves in the form of menus, and providing the facility to participants to select a move from such menus.

This method of constructing a version of the embodiment of this system in a community of participants who have inherited a different language than American English is NOT a matter of "translating" the words from American English to some other language. Systems constructed according to this method present conversational moves to a participant consistent with the possibilities for invention or realization the participant is distinguishing (or being invited to distinguish) as the participant uses the system, within some particular community. We note for example that the moves defined rigorously within the current embodiment in terms of the structure of (a) conversational roles, (b) incompletions of possibilities and actions, and (c) moves that have been taken already in a conversation, are not by any means most effectively named—even within every definable segment of the American-English-speaking community—with the same names given in the current embodiment. Different geographic segments, different corporate cultures, different social and religious groupings may be more effectively prompted to distinguish the specific social conversational moves that are presentable through this method with different names.

The conversational moves presented by this method prompt (a) the speaker, listening to his own possibilities in some moment, to move in a way that is consistent with declaring specific realizable possibilities or producing actions to complete specific possibilities; and prompt (b) other listeners (when the speaker is not speaking to himself) to distinguish specific realizable possibilities or possible actions for completing specific possibilities, all within a specific community of participants.

Let us give an example. In a conversation with himself, person "a" distinguishes a new possibility for himself within a domain of possibilities. Typically, "a" distinguishes actions which might be taken by person "b" to realize that possibility. The system will present a move for opening a conversation for producing action by "b" to realize a specific possibility distinguished by "a" for "a".

For the purpose of coaching "a" to invite "b" to distinguish for himself this moment in a social conversation for realizing possibilities in a way consistent with American English-speaking peoples' social conventions of distinguishing this type of moment, the system presents the name, "request" for the possibility of this move. A version of the system for Italian-speaking people presents coaching in the equivalent moment of the opening of social possibilities with the word, "invitazioné" (cognate to the American English "invitation"). A version of the system for Spanish-speaking people presents coaching in the equivalent moment of the opening of social possibilities with the word, "petición" (cognate to the American English "petition").

When "a" distinguishes a possibility for "b", and "a" distinguishes actions which might be taken by himself to realize that possibility, the system will present another move. For the purpose of coaching "a" to invite "b" to produce for "b" this distinction in a way consistent with American English-speaking peoples' social conventions of distinguishing this moment in a social conversation for realizing possibilities, the system presents the particular name, "offer" for the possibility of this move.

In this way (a) the structure of the social distinction, invention, and realization of possibilities in conversations, (b) the moves of speakers in such conversations, and (c) the particular distinctions presented by the system for coaching speakers' and listeners' distinguishing, are related to each other in the definition of the system and the conversations it will support.

Versions of this system specifically constructed for use in particular communities of speakers and listeners could coach participants by presenting words which prompt the making of distinctions for specific realizable possibilities or for producing actions to complete specific possibilities in those particular communities.

For example:

(a) Instead of the word, "request" to prompt the making of a particular distinction, the system might present "ask", "invite", "command", "petition", "order", "recommend", "want", "need", "require", "hope", or other words, tokens, sounds or pictures for coaching in this moment of the social invention and realization of possibilities in some English-speaking community of speakers and listeners.

(b) Instead of the word, "offer", the system might present "propose", "invite", "recommend", "advise", or other words, tokens, sounds or pictures for coaching in this moment of the social invention and realization of possibilities in some English-speaking community of speakers and listeners.

(c) Instead of the word, "promise", the system might present "agree", "will do", "OK", "commit", "can do", "guarantee", "consent", "will attempt", or other words, tokens, sounds or pictures for coaching in this moment of the social invention and realization of possibilities in some English-speaking community of speakers and listeners.

(d) Instead of the phrase, "What if" (for the move initiating a conversation to invent possibilities), the system might present "speculate", "declare an opening", "formulate", "comment", "assess", "what do you think about this?", "dream", "visualize", "wonder", "explore", "imagine", "plan", or other words, tokens, sounds or pictures for coaching in this moment of the social invention and realization of possibilities in some English-speaking community of speakers and listeners.

(2) Formal and Informal Move Names in Menus

Table 32 and Table 17 show the way that reply menus contain informal and formal names, together, for many or most moves that are named there. The two types of names appear in the field called "Move Menu Name" in Table 32. The purpose of this feature is to produce additional clarity for the participant about the intent conveyed by the move the participant is selecting.

(3) Name in Composition Title

When a participant has selected a move, from the "Compose" menu, or from a reply menu, a window for composing a communication appears. (See Table 2.) At the top center of the window, a name appears describing the move that is being made.

Often this name is the same as the name just selected from the menu, and ofter it is not the same. For example, "Cancel (cancel promise)" appears at the top of the composition window as "Cancel Promise." The names defined for the composition window are shown as "Composition Window Name" in Table 32.

(4) Name in Displays of Sent and Recorded Moves

In Table 32, "Move Name in Completed More" lists the names of moves as they appear, to any viewer, in displays of moves that have been sent and recorded. The past tense is used, along with more discursive text, to assist the reader in making a rapid assessment of the intention of the move on the screen. The texts are always shown in combination with the name of the participant that made the move, for example as "Tom White made a request," or "Sam Jones made a new promise."

(5) Explanatory Help Text

For each of the defined types of moves The Coordinator system provides explanatory help text discussing the distinctions of that type of move, in common terms indicating the structure of role, incompletion, and prior moves in the conversation. The Conversation Manager enables participants to access explanatory help text for each displayed permitted move. Table 32 shows samples of this text from the American English-speaking version of The Coordinator system as "Help Text Presentation". A participant may review such coaching text for specific moves when he is in the process of selecting among the permitted moves, by pressing a function key which, in The Coordinator system and according to the traditions of the personal computers upon which it operates, is the key, "F1".

(6) Recommended Declarative Texts

For each of a plurality of defined types of moves the Conversation Manager presents a body of recommended declarative text pertinent to that move. These pre-worded texts may be deleted or changed as the participant is in the process of composing his move. As recommended declarations, these texts serve as models to the participant for composing his own texts. Table 32 shows these texts as "Offered Message Text".

Through the device of these various texts, the Conversation Manager prompts ("coaches") the participant to attend to particular elements of the history of the conversation which are relevant to the fulfillment of the possibilities already declared in the conversation: a requestor's prior request is declared, in the set of permitted moves implemented in The Coordinator system, to remain open until declared complete, declined or cancelled by one of the participants. Counteroffers within the conversation do not have the incidental side effect of causing the disappearance of the original request and opening of possibilities it declared. This gives an example of how this method of invention can itself participate directly in the improvement of management.

The following was presented in a previous embodiment of the method, in Version 1.5 of The Coordinator system, for the move in which a participant in the conversational role of requestor selects the move, "cancel". It is not included in the current embodiment, for purposes of achieving simplicity in the microcomputer software marketplace, but it illustrates features of the method.

"I apologize; I am cancelling my request.
Thank you for any work you have performed on it.
Please make a request for compensation
if you conclude it is warranted."

Notice that in this case the coaching that was presented by The Coordinator system included coaching regarding (a) the repair of the mutual social space of possibilities in which participants have previously had the opportunity of conversation with each other to begin with ("I apologize"), (b) regarding likely or possible historical circumstances which, while not visible in the specific declarations of the records of the conversation, are a part of the structure of conversation of this type ("Thank you for any work you have performed on it."), and (c) regarding future moves that the participant may elect to take in order to produce the possibility of other declarations and actions in the future ("Please make a request for compensation if you conclude it is warranted.")

We draw the reader's attention to this NOT as a "good way of saying something"; in fact, we recommended in instruction manuals for The Coordinator system that participants change this specific wording and regard it only for its presence as a coach of possibilities. Rather, we draw the reader's attention to the extraordinary richness, rigor, and unity of the system of distinctions of this method evidenced in this example. The specific text presented above, as it appears in conversations, is not a "suggested protocol" for conversation. Rather, The Coordinator system itself is a system for supporting the declaring of possibilities and the taking of action in conversations, and all of the distinctions drawn in the text shown above are brought forth specifically from and according to the distinctions of the methodology itself, which begins with the definitional steps of:

a. defining all communications between a set of participants as moves in conversations for declaring specific realizable possibilities or as moves in conversations for producing actions to complete specific possibilities;

b. defining the conversations as taking place within a set of declared or understood domains of possibilities;

c. defining a set of conversational roles played by participants in the conversations, with each participant playing at least one conversational role in any such conversation; and d. defining a set of types of incompletions which occur recurringly within the conversations, including a first type in which a conversational move by at least one participant to declare at least one specific realizable possibility is missing, and a second type in which a conversational move by at least one participant to complete a specific realizable possibility is missing.

(7) Implementation in Different Languages

All of the pre-worded (suggested) messages, strings, and coaching and other texts of The Coordinator system are maintained as separate files during the construction of The Coordinator system, and are only brought together during the compilation of a particular (language or community) version of the programs. With this implementation organization, it is possible to efficiently produce versions of The Coordinator system for multiple languages.

In the Spanish version of The Coordinator system, the defined moves for the requestor include: "petición", "contra oferta", "cancela", "declina", "seguimiento", "texto libre", "enterado" and "declaración de completo".

In a Conversation for Action of the REQUEST type the defined moves for the promisor include: "promesa", "declina", "contra oferta", "cancela", "cancela con una nueva promesa", "prometo prometer", "reporte preliminar", "reporte de completo", "seguimiento", "texto libre", "enterado" y "declaración de completo".

In a Conversation for Action of the OFFER type the defined moves for the promisor include: "oferta", "promesa", "contra oferta", "reporte preliminar", "cancela oferta", "cancela con nueva oferta", "reporte de completo", "seguimiento", "texto libre", "enterado" y "declaración de completo".

In a Conversation for Action of the OFFER type the defined moves for the requestor include: "acepta oferta", "contra oferta", "prometo prometer", "declinar reporte", "cancela", "seguimiento", "texto libre", "enterado" y "declaración de completo".

While different compilations of The Coordinator system present all menus, coaching and other texts in different languages, nevertheless, the system is constructed such that different compilations share a unified data structure and, as a consequence, it is possible for participants working with equivalent English and Spanish versions of The Coordinator system to communicate with each other without requiring modification of communications, labels, token names, move names, or other texts provided by The Coordinator system. Someone observing such a conversation will see all the coaching, menu, and other texts appearing in two different languages, while the declarative texts spelled out by the participants will appear in whatever language they are speaking.

Another effect of this is to simplify the interpretation of social transactions conducted across languages, because for each participant The Coordinator system is providing coaching regarding the move being taken in the language of the participant.

1. Processing Incoming and Outgoing Communications

The current embodiment of the method of this invention is adapted for use in several situations, including ones in which each participant utilizes a separate version of The Coordinator system on a personal computer and their separate systems are linked by a communication channel, in which some or all participants utilize the same version of The Coordinator system on the same personal computer, and in which some or all participants utilize the same version of The Coordinator system on separate personal computers sharing a common file system interconnected by a Local Area Network.

The conversation record format in The Coordinator system includes a conversation identification token, and the system's conversation management program creates a unique identifier for each new conversation and enters that identifier into the identification token of the appropriate conversation record.

The Conversation Manager assembles a predefined packet of data associated with each move by a participant (in a new or existing conversation) together with the conversation identifier for the conversation; provides a facility to submit such predefined packets of data to, and gather such packets from, an electronic message transmission service; uses the conversation identifier included in each received packet of data to determine whether the received packet is associated with a new conversation or an existing conversation; creates a new conversation record for each received packet of data associated with a new conversation; and retrieves and updates a stored conversation record for each received packet of data associated with an existing conversation.

(1) MHS and MHS Directory Records

The current embodiment of The Coordinator system utilizes the services of "MHS by Action Technologies" ("MHS") Message Handling System software as an electronic message transfer service for distributing communications embodying conversational moves.

MHS is a public standard inter-process message transfer developed by Action Technologies and currently distributed by Action Technologies Inc., Novell Inc., and Ashton-Tate Corporation. MHS provides message transfer services between processes running on computers sharing a common file system and between processes running on computers connected via various communications channels including asynchronous digital communications links operating across switched or dedicated voice-grade telephone systems, digital satellite communications services, ISDN networks, X.25 networks, and various Local Area Network internets.

The architecture and design principles for MHS are consistent with the recommendations for Message Handling Services as defined in the X.400-X.430 recommendations of The International Telegraph and Telephone Consultative Committee (CCITT) Volume VIII-Fascicle VIII.7 from its VIIIth Plenary Assembly in Malaga-Torremolinos, Oct. 8-19, 1984.

MHS services are available to any process designed to produce and accept MHS protocols. These protocols are termed "SMF (Standard Message Format) protocols" in standards documents specifying the interface between MHS and applications. The current embodiments of Conversation Managers use particular SMF sub-protocols specifically designed to transfer Conversation Management tokens between participants.

MHS thus serves to allow a participant using The Coordinator system or other embodyments of a Conversation Manager to communicate with other participants who use The Coordinator system or any other any other embodyment of a Conversation Manager, regardless of whether the participants are using computer systems that are physically connected.

Each computer system—consisting of a microcomputer system or a "local area network" to which microcomputer systems are attached—sharing a file system, a a common installation of MHS software, and a set of common "MHS Directory Records" defining the characteristics of the MHS system and its interconnections, is termed a "host" in the following discussion.

The Coordinator system includes a subset of MHS services for performing "Local Delivery". Local Delivery is the direct delivery of communications to other participants served by the same MHS host. MHS assembles all communications that have been produced by a participant at a host that are directed to participants at other hosts, and then makes connections, directly or through a "Hub"—an intermediary host—and sends such communications to other hosts. At that time, the host that initiates connection may also receive communications from the Hub.

More than one participant can use The Coordinator system on a single microcomputer "host". It is presently more common for several participants running on a Local Area Network version of The Coordinator system to share use of the same MHS host, and for each participant running on non-Local Area Network versions to run The Coordinator system on his or her own personal computer running an MHS host dedicated for that person's use. Single and Multi-User MHS hosts and their associated versions of The Coordinator system can be located in geographically distinct locations. MHS links such separated hosts.

The "MHS Directory Manager" of every host (individual personal computer or local area network/personal computer installation) keeps a table of individuals and hosts declared available to participate in conversations. The Coordinator system provides facilities for reviewing and modifying MHS Directory Tables.

Figure 36:
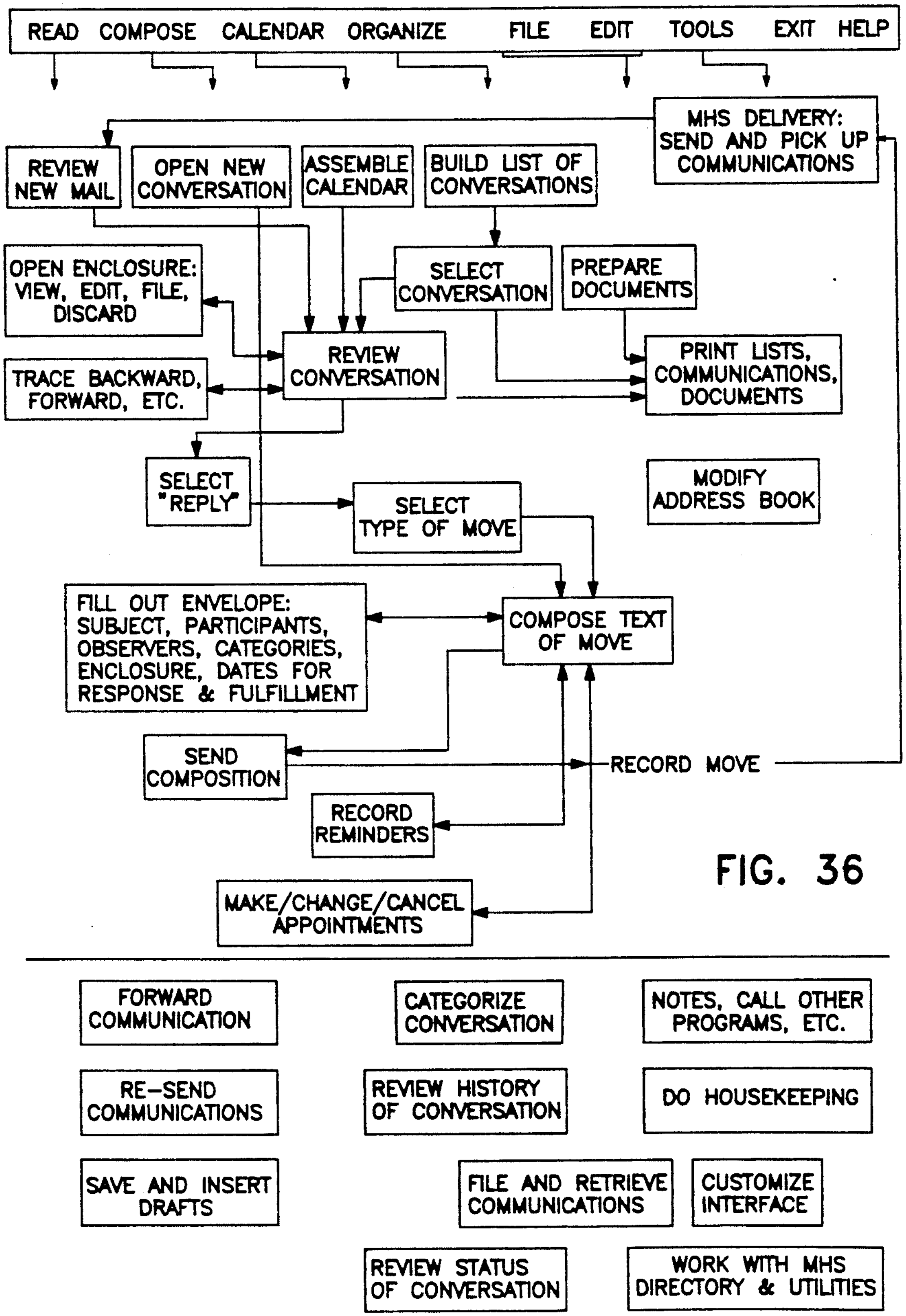
FIG. 36 is a schematic diagram illustrating functional relationships between various features and facilities of an overall system which utilizes conversation management apparatus and methods in accordance with one embodiment of this invention.

Notice, in FIG. 34, the relationship of MHS among the basic functional elements of The Coordinator system, including the Directory Records, and in FIG. 36, the relationship of MHS to the basic functions of The Coordinator system.

In the most frequently employed form of the current embodiment, MHS interfaces directly to a telephone system by using modems that may answer the telephone automatically and that may dial it automatically too. MHS uses a high-level telecommunications protocol to transfer communications between one host and another.

Since it is impractical and ineconomic for each host to individually connect separately to each of many hosts in order to exchange communications with them, MHS is structured for use with "communication servers", called "hubs", that function as "store and forward" communications systems. These are personal computers with modems, normally operating in "standby" mode, ready to accept incoming communications, 24 hours a day. If the number of communications that a hub must process is too large for a single microcomputer to handle, MHS handles such communications with a suitable number of personal computers inter-connected in a local area network and linked with a trunk-hunting telephone system.

Directory Table facilities enable a participant to define the characteristics of the different hosts he may communicate with. These characteristics include: the name of the host; the "routing", that is, the telephone number at which to reach either the host or a hub through which, in turn, communications may directly, or indirectly, reach the host; and the preferred times of connection. Facilities are also provided for defining a default route for messages when a host's Directory Tables do not contain explicit routing information for reaching a particular host.

By interconnecting hubs it becomes possible for communications to go from one host to another by passing through one or more hosts and hubs before reaching their destinations. To make that possible, the host name and routing is defined in every host or hub through which the communication is routed except in those hosts where the normal default route from a host is sufficient to route the communication to the proper host.

(2) Communications Packets and Headers

Each communication composed in The Coordinator system and destined for communication to a different storage device or location contains two distinct parts: a "header part", and a "body part". The header part, which embodies the SMF protocol information, contains information about the communication, including such components as: date of creation, identification of communication, originator, recipient(s), subject of communication, observers, associated dates of incompletion, identification of conversation, domain of possibilities, and the other elements defined in the previous section on conversation records. When a communication is being composed and when it is brought to the window, some parts of these "headers" (components of the header part) may be viewed at the top of the window.

Details of the SMF interface can be found in the "Reference Guide to the SMF Interface", February 1989, published by and available from Action Technologies, Inc. The discussion that follows presents some of the salient features of the SMF interface to MHS.

SMF header fields are identified with special keywords, such as "date", "message-id", "from", "to", "action", "conversation-id", "copies", "complete-by", "respond-by", "domain", and such phrases.

Every one of these SMF header fields has a value which is a string. Each of these values has a specific format, which varies according to the type of information the value contains. For example the "date", "complete-by" and "respond-by" headers have string values that correspond to a special format for dates. The "from" field contains a string identifying the participant who composed a communication. Such participant identifiers are termed "addresses" in the following discussion. Addresses are formed by the composition of two sets of strings with the symbol '@' between them. The first set of strings is a participant name and an optional identifier of the software application used by the referenced participant. The second string is a location or host name, plus optional descriptive information and information required to identify a participant's location or address in non-MHS systems. The "to" and "copies" fields contain a sequence of these address strings separated by commas.

The body part of a communication is the text that the participant enters when composing the communication.

The SMF protocol includes special characters which are used to identify the start and end of a communication, to separate each header field and to separate the headers from the body of the communication. This structure allows MHS to combine several communications in one single file for transmission.

When a communication is being composed, its headers are constructed with values obtained from data that is automatically generated (the identifications of communications and conversations) and with data entered by the participant.

Once this data is collected the communication record is built and inserted into the communication data base. A conversation record is created if the communication starts a new conversation. If the conversation already exists, the corresponding conversation record is updated. Such updating involves computation of the conversational state and modification or creation of tokens. Such tokens are modified or created depending on the type of move and the state of the conversation and are then inserted into the token-record data base.

The communication itself, including headers and body, is inserted into the text data base. The location at which the communication is stored in the text data base is kept in the communication record, to expedite retrieval when the communication is to be displayed.

When a participant has committed to sending a communication, The Coordinator system prepares one copy of the communication for delivery to each participant in the conversation. The communicatin is then either delivered by The Coordinator system to a recipient whose version of The Coordinator system uses services of the same MHS host (local delivery), or is submitted to MHS for delivery to a different host.

When a new communication arrives, The Coordinator system "parses" the header part of the communication in order to gather data needed to identify the communication. The gathered data includes specification of the following: the conversation to which the communication belongs; the identity of the sender, the type of move, the declared domain, dates of incompletion, the identifier of the conversation and the identifier of the communication. The receiving system then processes the new communication in a manner discussed earlier and illustrated in FIG. 31.

As a result of such manipulation of data structures for each conversation participant, every communication potentially resides in several data bases simultaneously, one for each participant and observer of the conversation. Even though each conversation record exists in the database of The Coordinator system used by each participant, the data of the record is not necessarily the same in each database. For example, the state of the conversation is different for participants and observers, and the tokens of the conversation are different for each participant and observers.

m. Overall Structure of The Coordinator system

FIG. 34 illustrates the overall structure and functional relationships of the program and data base management facilities of The Coordinator system. All conversation records (including records of time commitments) are maintained in a conversation record data base under the basic management of a Database Manager. However, the actual supervisory management of the creation, storage and retrieval of conversation records is handled by the Conversation Manager.

The Database Manager may be of any standard type having the capability to handle the types of records that the The Coordinator system is required to manage. For example, in the current embodiment of The Coordinator system, a B-tree data base system was used as discussed above. The Database Manager also maintains, under the supervision of the Network of Help Manager, the data relating to participants in the Network of Help.

The Interface Manager manages displays of screens, including windowing. It also manages integration of other program facilities such as work processing, and controls the operational significance of function keys on the keyboard.

The Conversation Manager and the MHS Directory Manager together coordinate and control the sending and receiving of messages through the facility of MHS. All of these functional relationships involve standard computer and communications technologies which are well understood and need not be explained in detail here.

n. Future Developments

The current embodiment discussed above is a foundation for expanded system implementations of the method of this invention. Central to the method of this invention is the managing of conversations in a structured manner. This managing importantly involves defining roles, permitted moves, incompletions and the relationships therebetween. This has dramatic implications for further implementations which structure new ways for people to carry out conversations. Work and management of work are conversations. Personal relationships are conversations. The methods of this invention will promote innovations in the structure of conversations themselves and innovations in the media, including computer hardware innovations, for conducting conversations.

Within the definition of conversations, new conversational roles may be defined to expand the opportunities for participants in conversations. For example, a role such as "advisor" may be added to Conversations for Action, in order to enable a participant to enter a conversation to make suggestions and recommendations, without becoming the promisor or requestor of action in the conversation. Further, a role such as "arbiter" may be added to Conversations for Possibilities, whose role is to settle disputes and reach decisions regarding what possibilities are realizable.

Each such newly defined role would introduce new conversational moves (e.g. "recommend", "resolve") to the current implementation, based on new specific incompletions in conversations, and would lead to correspondingly new conversational protocols. Such innovations represent open opportunities for expanding participants' possibilities in conversations.

Particular conversational protocols might be defined for recurrent conversations in particular domains between participants in recurrent roles. Thus, for example, within a certain domain, called "funding", a role could be defined for disbursor, who could open a conversation with an offer, but not with a request. Recurrent requests in some domain could be triggered automatically by selection of a domain. For instance, requests by a sales manager for weekly reports from his salespeople could be triggered automatically by weekly selection of a domain, rather than by the manager's composing individual requests each week. Furthermore, participants may be given the opportunity to play more than one role in conversations, given their concerns in more than one domain of possibilities to which the conversation is relevant.

Coaching within conversations has endless possibilities. Coaching texts and exercises can be added to the implementation to provide participants the opportunity to leave their conversations for the moment, in order to learn and sharpen their conversational practices as, for example, managers or speculators about possibilities.

The method of this invention can be the foundation for development of and integration of new hardware and systems innovations. For example, voice activation of computers and voice synthesis can be integrated in systems incorporating the method of this invention thus providing spontaneous conversational opportunities, in the manner of direct speaking and listening, rather than through the instrument of a keyboard. Conversations could be managed and conducted directly in speech.

The Coordinator system lends itself to implementation in a variety of possible technological environments, including variations in the data processing, storage, and communications components, and also including variations in the technologies of interfaces (of which voice implementation might be considered an example).

In the architecture of one of these environments—which happens to be that of the current embodiment—every host for The Coordinator system is a single PC microcomputer that may be used by one or a set of participants. These hosts are linked with each other through a set of hubs forming a decentralized network.

Another architecture in which The Coordinator system can be used consists in a local area network with microcomputers inter-connected and sharing disk storage and other resources. In such an architecture communications are transferred among participants through the facilities of the network. MHS will connect such a local area network with other hosts which can themselves be single microcomputers, or local area networks. In such local area network architectures the transferring of communications between participants is done automatically, under program control, within the shared disk storage space.

Figure 37:
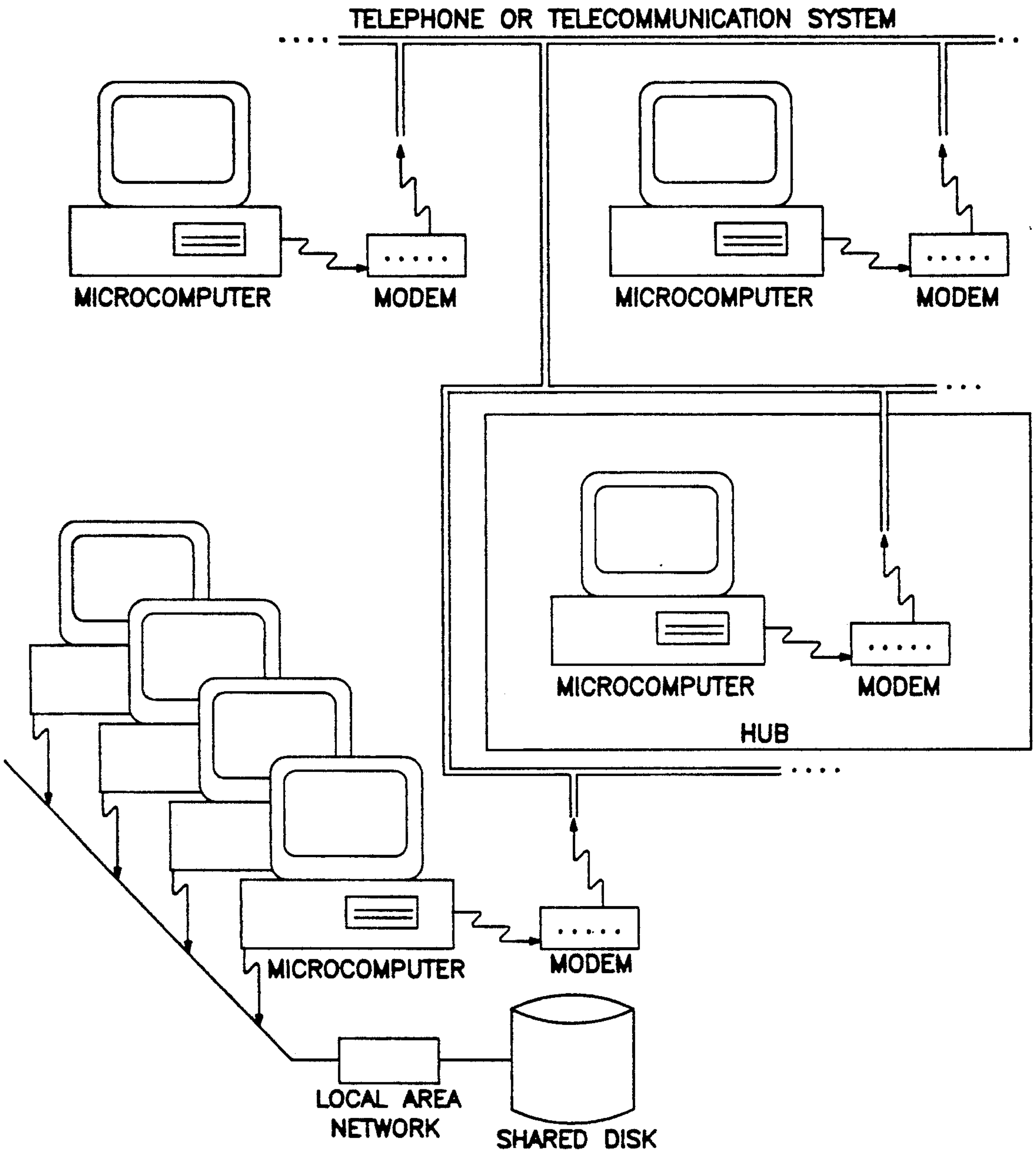

Both these architectures can be combined to form an extended network formed of individual microcomputers, local area networks, and hubs all interconnected using telephone or telecommunications connections. These combined architectures can be seen in FIG. 37. Such networks may be very large; networks of the current embodiment larger than 1,000 workstations are not uncommon.

Versions of The Coordinator system might also be produced for use within the architectures of different types of computer—e.g., on minicomputer, mainframe, networked mini- or mainframe, or within telecommunications processors, such as PBX equipment.

Figure 38:
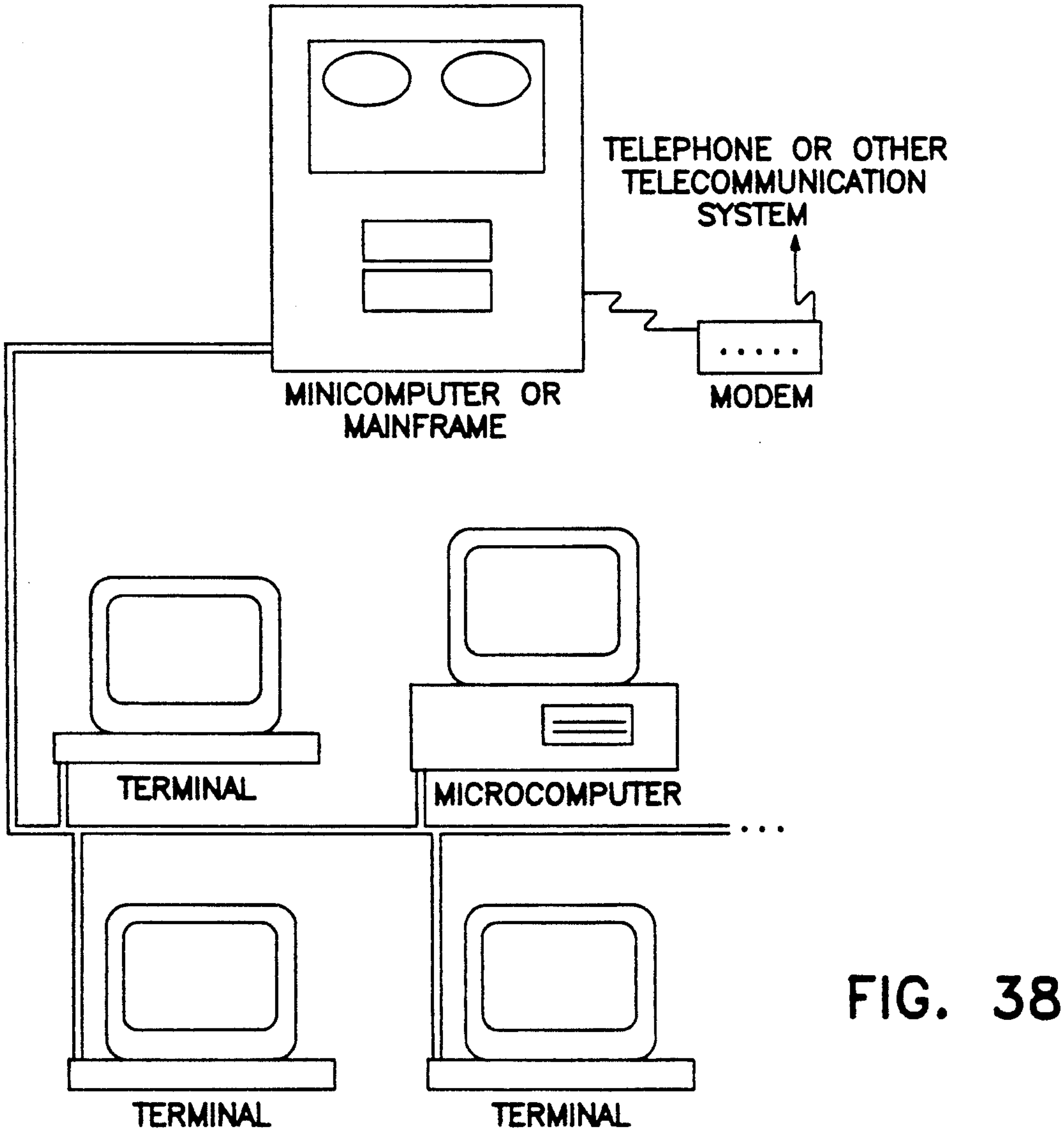
FIGS. 37-39 are schematic diagrams of alternative computer and communication systems which may be employed in implementing the method of this invention.

One example of such an embodiment would use a central machine to store all the participants' conversation data bases. Participants would run The Coordinator system through terminals connected to said central machine, as shown in FIG. 38. The transfer of communications would be done internally, in the central machine disk storage, in a manner similar to the manner in which communications are transferred in the local area network architecture of The Coordinator system.

Figure 39:
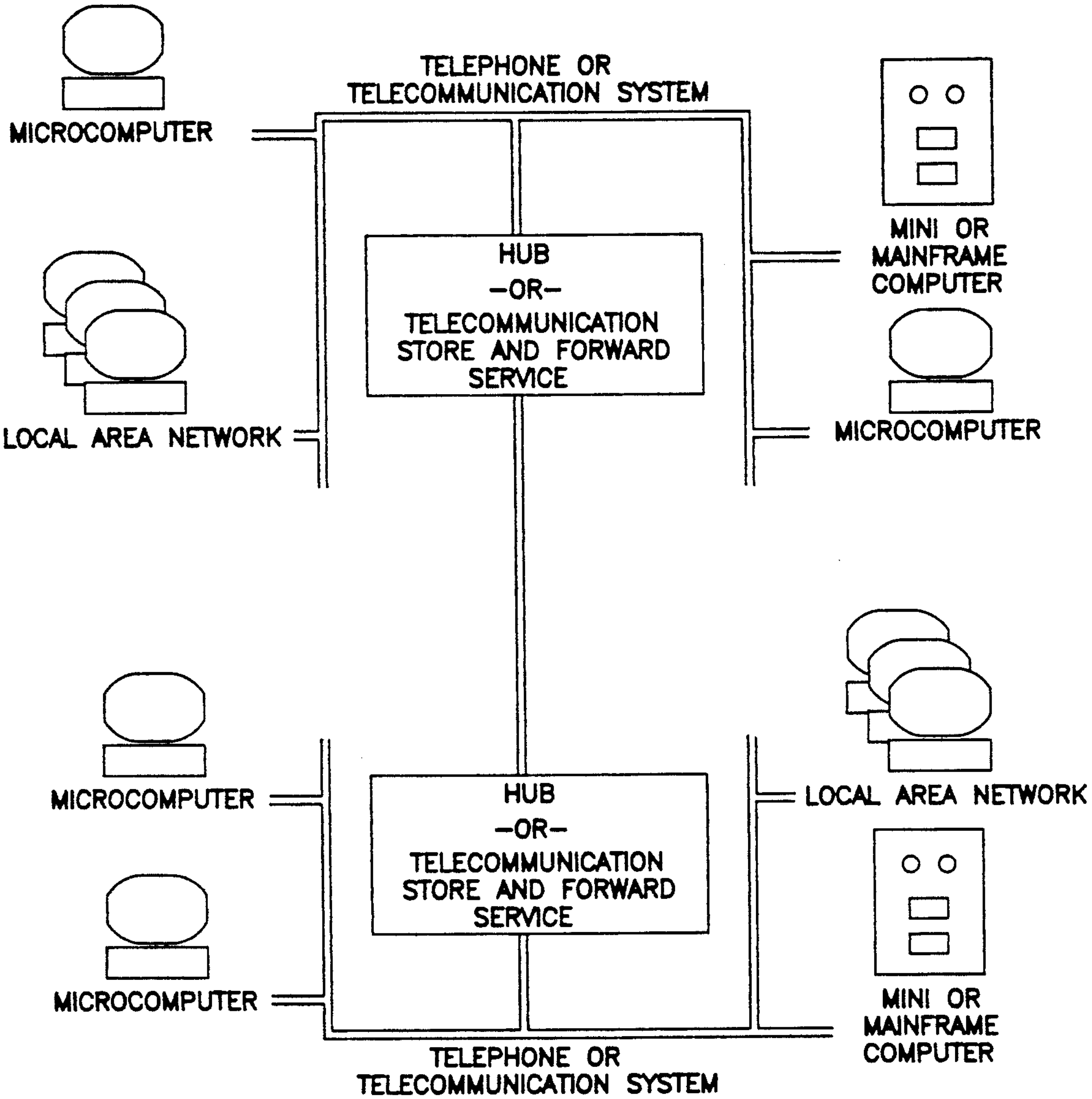

Such systems could also be interconnected, through telephone lines or local area networks or other telecommunication networks, with other similar systems and with PC microcomputers and local area networks on which The Coordinator system is running. Hub services, for storing and forwarding communications could be performed by commercial store-and-forward telecommunications services. An extended network employing a combination of the above-described architectures and hub services is depicted in FIG. 39.

It should be understood that the above description of this invention and the examples of embodiments of systems which practice the method of this invention are given to illustrate the principles of the invention and not to delimit its scope. It will be readily apparent to persons of skill in the art or arts to which this invention is addressed that numerous variations could be introduced into the specific embodiments described without departing from the scope of the invention as set forth in the following claims.

Table 1

```
  Read  Compose  Calendar  Organize  File  Edit  Tools  Exit  Help
 ________________________________________________________________
        | Note                 |
        | Inform               |
        | Question             |
        | Offer                |
        | Request              |
        | Promise              |
        | What if              |
        | -------------------- |
        | Envelope...          |
        | Reply...          F3 |
        | Forward       Alt+F3 |
        | Send              F4 |
        | Utilities...         |
        |______________________|

 Enter  Esc=Cancel  F1=Help  F10=Actions           Thu  8-Jun  5:31pm
```

Table 2

```
  Read  Compose  Calendar  Organize  File  Edit  Tools  Exit  Help
 ________________________________________________________________
                             Request
 To
 Subject
 When

 Esc  F1=Help  F4=Send  Alt+F4=When       L:4   C:1   Thu  8-Jun  5:31pm
```

Table 3

```
 Read  Compose  Calendar  Organize  File  Edit  Tools  Exit  Help
___________________________________________________________________
                              Request
To
Subject
When
Please review the attached report and give me your comments.
Thanks.
Chauncey






Esc  F1=Help  F4=Send  Alt+F4=When          L:6    C:10  Thu  8-Jun  5:32pm
```

Table 4

```
 Read  Compose  Calendar  Organize  File  Edit  Tools  Exit  Help
_____ ______________________ ______________________________________
      | Note                |        Request
To    | Inform              |
Subje | Question            |
When  | Offer               |
Pleas | Request             | rt and give me your comments.
Thank | Promise             |
Chaun | What if             |
      | ___________________ |
      | Envelope...         |
      | Reply...         F3 |
      | Forward      Alt+F3 |
      | Send             F4 |
      | Utilities...        |
      |_____________________|


Enter  Esc=Cancel  F1=Help  F10=Actions                 Thu  8-Jun  5:32pm
```

Table 5

```
 Read  Compose  Calendar  Organize  File  Edit  Tools  Exit  Help
 ----------------------------------------------------------------------
                                Request
To  -
Subject
When
Please review the attached report and give me your comments.
Thanks.
Chauncey

                                 Envelope

                   Subject       [                        >
                   To...
                   Cc...
                   Categories...
                   Enclosure...
                   When...
                   OK/Send       (Esc=return to composition)

Enter  Esc=Cancel  F1=Help  End=OK                 Thu  8-Jun  5:32pm
```

Table 6 .

```
 Read  Compose  Calendar  Organize  File  Edit  Tools  Exit  Help
 ----------------------------------------------------------------------
                                Request
To
Subject     Financial report
When
Please review the attached report and give me your comments.
Thanks.
Chauncey

                                 Envelope

                   Subject       [Financial report        >
                   To...
                   Cc...
                   Categories...
                   Enclosure...
                   When...
                   OK/Send       (Esc=return to composition)

Enter  Esc=Cancel  F1=Help  End=OK                 Thu  8-Jun  5:33pm
```

Table 7

```
 Read  Compose  Calendar  Organize  File  Edit  Tools  Exit  Help
_____________________________________________________________________

To                                     To
Subject     Finan
When             [        >  Christia  gui-mac    Luis      Roger
Please review the Alice      Craig     Hugo       Manuel    Ruben
Thanks.           Alicia     Daily     Ines       Marcelo   Russell
Chauncey          Andres     DanShurm  Jean       Max       Staff
                  Aram       DavePROE  Jesus      Mike      StevePEL
                  ATIMngt    DavidMon  JimVince   MikeZism  Support
                  Bart       DMOS      JoeGerb    Mngmt     Terry
_________________ Betsy      FAX       John       Pablo     Todd
                  BillBonn   Fernando ► JohnG     Patty     Tom
                  BillDrum   Fran      Juan       PattySey  TomWhite
                  BobD       Francisc  KarenG     PeterDen  Tona
                  Brad       FredHoff  Kathleen   PeterKEE  Warren
                  Buni       Gayle     KenNick    RalphPre  WynDunfd
                  Carlos     Giorgio   LeR        Raul      <Others>
                  Charles    GregLoux  Lorrie     RichardO  OK
                  Chauncey   Gui       Lowell     Rodrigo

Enter  Esc=Cancel  F1=Help  End=OK                Thu  8-Jun  5:34pm
```

Table 8

```
 Read  Compose  Calendar  Organize  File  Edit  Tools  Exit  Help
_____________________________________________________________________
                                Request
To          John Gorsich (jgorsich)
Subject     Financial report
When
Please review the attached report and give me your comments.
Thanks.
Chauncey


_______________________________
                                            Envelope

                              Subject      [Financial report        >
                              To...
                              Cc...
                              Categories...
                              Enclosure...
                              When...
                              OK/Send      (Esc=return to composition)

Enter  Esc=Cancel  F1=Help  End=OK                Thu  8-Jun  5:34pm
```

Table 9

```
  Read  Compose  Calendar  Organize  File  Edit  Tools  Exit  Help
 ____________________________________________________________________
                               Request
To           John Gorsich (jgorsich)                      Categories
Subject      Financial report
When                                                      [          >
Please review the attached report and give me your comments.
Thanks.                                                    dallas
Chauncey                                                   design
                                                           gazelle
                                                           groupcal
                                                           legal
 ________________________________________________________  marketng
                               Envelope                    ops
                                                           patent
                   Subject      [Financial rep             qualrel
                   To...                                   stratpln
                   Cc...                                   venice
                   Categories...                           writing
                   Enclosure...
                   When...                                 OK
                   OK/Send      (Esc=return to

Enter  Esc=Cancel  F1=Help  End=OK                 Thu  8-Jun  5:35pm
```

Table 10.

```
  Read  Compose  Calendar  Organize  File  Edit  Tools  Exit  Help
 ____________________________________________________________________
                               Request
To           John Gorsich (jgorsich)
Subject      Financial report
Categories   ops
When
Please review the attached report and give me your comments.
Thanks.
Chauncey

 ____________________________________________________________________
                               Envelope

                   Subject      [Financial report          >
                   To...
                   Cc...
                   Categories...
                   Enclosure...
                   When...
                   OK/Send      (Esc=return to composition)

Enter  Esc=Cancel  F1=Help  End=OK                 Thu  8-Jun  5:35pm
```

Table 11

```
 Read  Compose  Calendar  Organize  File  Edit  Tools  Exit  Help
 ------------------------------------------------------------------
 To           John Gorsich (jgor|              Enclose File
 Subject      Financial report  |
 Categories   ops               | [           >  MM-MAIL3.SPC    SCRIPT
 When                           |                MM-MAIL4.SPC    SETS&
 Please review the attached rep |  <Parent>      MMMAIL3M.DBD    SETUP.CNF
 Thanks.                        |  IOV1.TXT      MSTRPLAN.61     T
 Chauncey                       |  IPX.COM       MSTRPLAN.PRC    TCSDECS
                                |  K.BAT         MSTRPLAN.TXT    TESTIMS
                                |  KEY.COM       MSTRPLAN.BAK    TRANSPAR
 -------------------------------|  LOGOCONF      NET3.COM        UDHOUSG.CHP
                                |  MDEVSCHD.T#0  PAGE            UDHOUSG.CIF
                                |  MDEVSCHD.T#1  PRICES          UDHOUSG.MST
                                |  MDEVSCHD.T#2  PRINT           UDHOUSG.SPC
                                |  MDEVSCHD.T#3  PS2.LAY         VANDYNE
                                |  MHSV2.DEV     RDEMO2.EXE      WR
                                |  MHSV2.SPC     S&F             WRITING.TSK
                                |
                                |              I:\CB-DESK\*.*

 Enter  Esc=Cancel  F1=Help                          Thu  8-Jun  5:38pm
```

Table 12

```
 Read  Compose  Calendar  Organize  File  Edit  Tools  Exit  Help
 ------------------------------------------------------------------
                                 Request
 To           John Gorsich (jgorsich)
 Subject      Financial report
 Categories   ops
 Enclosure    I:\CB-DESK\MSTRPLAN.61
 When
 Please review the attached report and give me your comments.
 Thanks.
 Chauncey

 --------------------------------
                                 |             Envelope
                                 |
                                 |  Subject      [Financial report       >
                                 |  To...
                                 |  Cc...
                                 |  Categories...
                                 |  Enclosure...
                                 |  When...
                                 |  OK

 Enter  Esc=Cancel  F1=Help  End=OK                  Thu  8-Jun  5:38pm
```

Table 13

```
 Read  Compose  Calendar  Organize  File  Edit  Tools  Exit  Help
 ____________________________________________________________________
                                         R
 To          John Gorsich (jgorsich)     Please complete by      Fri 16-Jun-89
 Subject     Financial report            Please reply by...
 Categories  ops                         Remind me...
 Enclosure   I:\CB-DESK\MSTRPLAN.61      OK
 When
 Please review the attached report and give me
 Thanks.                                        Thu  8-Jun-89
 Chauncey
                                                June, 1989
                                                Sun Mon Tue Wed Thu Fri Sat
                                                 28  29  30  31   1   2   3
                              Subject             4   5   6   7   8   9  10
                              To...              11  12  13  14  15  16  17
                              Cc...              18  19  20  21  22  23  24
                              Categories         25  26  27  28  29  30   1
                              Enclosure.          2   3   4   5   6   7   8
                              When...
                              OK

 Enter  Esc=Cancel  F1=Help  F10=Actions  End=OK          Thu  8-Jun  5:38pm
```

Table 14

```
 Read  Compose  Calendar  Organize  File  Edit  Tools  Exit  Help
 ____________________________________________________________________
                                         R
 To          John Gorsich (jgorsich)     Please complete by      Fri 16-Jun-89
 Subject     Financial report            Please reply by         Fri  9-Jun-89
 Categories  ops                         Remind me...
 Enclosure   I:\CB-DESK\MSTRPLAN.61      OK
 When
 Please review the attached report and give me
 Thanks.                                        Thu  8-Jun-89
 Chauncey
                                                June, 1989
                                                Sun Mon Tue Wed Thu Fri Sat
                                                 28  29  30  31   1   2   3
                              Subject             4   5   6   7   8   9  10
                              To...              11  12  13  14  15  16  17
                              Cc...              18  19  20  21  22  23  24
                              Categories         25  26  27  28  29  30   1
                              Enclosure.          2   3   4   5   6   7   8
                              When...
                              OK

 Enter  Esc=Cancel  F1=Help  F10=Actions  End=OK          Thu  8-Jun  5:38pm
```

Table 15

```
  Read  Compose  Calendar  Organize  File  Edit  Tools  Exit  Help
________________________________________________________________________
                                Request
To          John Gorsich (jgorsich)
Subject     Financial report
Categories  ops
Enclosure   I:\CB-DESK\MSTRPLAN.61
When        Please complete by Fri 16-Jun-89   Please reply by Fri  9-Jun-89
Please review the attached report and give me your comments.
Thanks.
Chauncey
________________________________________________________________________




                                                       Posting to MHS.

Esc  F1=Help  F4=Send  Alt+F4=When           L:6    C:10  Thu  8-Jun  5:39pm
```

Table 16

```
  Read  Compose  Calendar  Organize  File  Edit  Tools  Exit  Help
________________________________________________________________________
                              Address Book
  Who       Full Name                MHS Address
  Alice     Alice Kaplan Bell        akaplan @ ati
  Alicia    Alicia Sandoval Flores   alicia @ ati
  Aram      Aram Attarian            aram
  ATIMngt   Russell's mgmt list      &C:\DIRS\atimngt.ds
  Bart      Bart MacLeod             bmacleod @ ati
  Betsy     Betsy Dixon              bdixon @ atc-cbp
  BillBonn  Bill Bonner              bbonner
  BillDrum  Bill Drummy              bdrummy @ bdrummy
  BobD      Bob Dunham               bdunham @ ati
  Buni      Buni Zeller              bzeller @ futura
  Carlos    Carlos Lopez             clo @ ati
  Charles   Charles Jones            cmjones @ ati
  Chauncey  Chauncey Bell Jr         cb-elder @ ati
  Christia  Christian Valenzuela     cvalenzu @ cvalenzu
  Craig     Craig Burton             cburton @ novell
  DanShurm  Daniel Shurman           dshurman @ humanwre
  DavePROE  David Proett             dproett @ bnkftsys
  DavidMon  David Montero            dmontero @ ati
► DMOS      David Moskowitz          dmos @ dmos
  FAX       Alcom FAX Gateway        fax @ easygate
Enter=Change  Esc  F1=Help  Ins=Add  Del=Remove     L:19   Mon 19-Jun  9:19am
```

Table 17

```
Read  Compose  Calendar  Organize  File  Edit  Tools  Exit  Help

Sat 17-Jun-89  1:22pm
Bart desk (publish) requested
To         cb-desk
Subject    test request
When       publish asked completion by We
When       publish asked for reply by Mon

                                         Reply options
                                         after publish's request

                                         A  Yes               (promise)
                                         B  OK, except   (counteroffer)
                                         C  No, however  (counteroffer)
                                         D  Delegate it
                                         E •This is done       (report)
                                         F •Can't, won't or no (decline)

                                         G  Postpone responding
                                         H  Comment
                                         I  Acknowledge receipt

Enter  Esc=Cancel  F1=Help  F10=Actions               Mon 19-Jun  9 20am
```

Table 18

```
Read  Compose  Calendar  Organize  File  Edit  Tools  Exit  Help

                          Calendar for Mon 19-Jun-89
   Appointments                                        Subject
    8:30am  11:00am                                    Ralph re agenda
   10:00am  10:10am                                    Call Russ
    2:00pm   3:30pm                                    Lunch with JLS
    7:00pm   9:00pm                                    Dinner Alice
▸
   Pending for today
   I'm      to reply to request  by publish            test request

   Carry forward
 D  4-May  jramer    to reply to request               BALCOR start up
 D 18-May  bdrummy   to reply to request           E   missing menus
   26-May  jj        to reply to request               bug reports and pilot mat'
    7-Jun            reminder re request           E   patent prep
 D  8-Jun  jludlow   to reply to request           E   Patent tasks
    8-Jun  I'm       to reply to note                  test note to you
    8-Jun  I'm       to reply to inform                Demonstrating an inform
    9-Jun  I'm       to reply to promise               Demonstrate opening prom
    9-Jun  I'm       to reply to request               Show a request
    9-Jun  I'm       to reply to question              Illustrative question
    9-Jun  I'm       to reply to offer                 Here's an offer
Enter  Esc  Del  F1=Help  F10=Actions  /=Mark set   L:6   Mon 19-Jun  9 23am
```

Table 19

```
  Read  Compose  Calendar  Organize  File  Edit  Tools  Exit  Help
 ┌──────────────────────────────┐
 │ List unopened mail        F2 │
 │ Open enclosure...            │                               Latest
 │ ──────────────────────────── │
 │ Trace...                     │
 ┌────────────────────────────┐─┘on by Wed 21-Jun-89
 │ Backward                F7 │ply by Mon 19-Jun-89
 │ Forward                 F8 │
 │ First             Shift+F7 │
 │ Latest            Shift+F8 │
 │ Next appointment           │
 │ Next reminder              │
 └────────────────────────────┘




 Enter  Esc=Cancel  F1=Help  F10=Actions                 Mon 19-Jun  9:23am
```

Table 20

```
  Read  Compose  Calendar  Organize  File  Edit  Tools  Exit  Help
 ──────────────────────────────────────────────────────────────────────
                              All open matters
    From categories: Any
    Started with       To          Latest    On        Subject
 ►  my       Requ -> bdunham,+  promise    7-Mar E  design of cb's work
    my       Info -> cbell      add-info 28-Feb E  at overview
    my       Info -> cbell      inform     6-Mar E  boxtonet
    my       Info -> cbell      inform     6-Mar E  buscase
    my       Info -> renato     inform     9-Mar E  chile outline
    my       Offe -> bdrummy    comment   17-Mar E  sketches revised
    cbell    Info -> me         inform    20-Mar E  identity, etc
    my       Info -> cbell      inform    20-Mar E  mktng obj
    renato   Offe -> me,+       anslater  28-Mar E  Including standards.
    my       Info -> renato     add-info  21-Mar E  chile2
    my       Info -> alicia     inform    21-Mar    gui job desc
    my       Info -> cbell      inform    22-Mar    more printer menus
    lburton  Offe -> me,+       offer     24-Mar E  MR outline MRD attached
    cbell    Info -> me         inform    24-Mar E  prod plan
    my       Requ -> lburton,+  promise   30-Mar E  Marketing analysis
    my       Info -> lburton    inform    24-Mar    for novell thinking
  D my       Requ -> jstevens   request   24-Mar    italy talk notes
    my       Offe -> renato     progrept  24-Mar E  chile outline
    cbell    Info -> me         inform    27-Mar E  chile
 Enter  Esc  F1=Help  F10=Actions  /=Mark set   L:1    C:49  Mon 19-Jun  9:23am
```

Table 21

```
Read  Compose  Calendar  Organize  File  Edit  Tools  Exit  Help
                        Review...         Alt+F7

                        • By type         All conversations
                        • By dates        Any date
                        • By categories   Any category
                        • With            Anybody

                        Save settings
                        OK - build list

Enter  Esc=Cancel  F1=Help  F10=Actions  End=OK          Thu  8-Jun  5:42pm
```

Table 22

```
Read  Compose  Calendar  Organize  File  Edit  Tools  Exit  Help
                       All open matters, with lburton
   From categories: Any
   Started with      To          Latest    On        Subject
►  lburton  Offe -> me,+         offer     24-Mar E  MR outline MRD attached
   my       Requ -> lburton,+    promise   30-Mar E  Marketing analysis
   my       Info -> lburton      inform    24-Mar    for novell thinking
   lburton  Info -> me,+         thankyou  29-Mar E  Beta for GC
   my       Requ -> lburton      progrept  20-Apr E  Beta list

Enter  Esc  F1=Help  F10=Actions  /=Mark set   L:1    C:49  Mon 19-Jun  9 24am
```

Table 23

```
  Read  Compose  Calendar  Organize  File  Edit  Tools  Exit  Help
 ----------------------------------------------------------------------
                              All open matters
    From categories: Any of dallas, design
    Started with    To         Latest   On       Subject
 ▸  my       Requ -> lburton,+  promise  30-Mar E Marketing analysis
  D my       Requ -> jstevens   request  24-Mar   italy talk notes
    my       Offe -> renato     progrept 24-Mar E chile outline
    cbell    Info -> me         inform   13-Apr   additions to function list
    my       Requ -> bdrummy    request  16-May   single-line entry pad
    my       Requ -> bdrummy    request  16-May   end time in entry pad

 Enter  Esc  F1=Help  F10=Actions  /=Mark set   L:1    C:49  Mon 19-Jun  9:25am
```

Table 24

```
  Read  Compose  Calendar  Organize  File  Edit  Tools  Exit  Help
 ----------------------------------------------------------------------
                                           Customization

                                       Startup windows...
                                       Video display...
                                       MHS delivery...
                                       Share calendar...
                                       ----------------------
                                       Action bar?          ON
                                       Function key area?   ON
                                       Interface beep?      ON
                                       Big memory?          ON
                                       Novice menus?        OFF
                                       Omit copies?         OFF
                                       Carry forward?       ON
                                       Prompt for dates?    ON

                                       Save setup
                                       OK

 Enter  Esc=Cancel  F1=Help  F10=Actions  End=OK          Mon 19-Jun  9:26am
```

Table 25

Permitted Moves in Conversations

/****** Finite State Machine: Request to One Other Person */

```
HIDDEN FSMACT riact [] = {
/* a */     {REQUEST, STA, NULL},
/* b */     {REQ_STPROMISE, STG, NULL},
/* ad */    {REQ_DELEG, STAD, NULL},
/* F1 */    {REQ_PDECLARE, STF1, RIACT_REQ_PDECLARE},
/* F2 */    {REQ_RDECLARE, STF2, RIACT_REQ_RDECLARE},
/* F2 */    {REQ_DECLCOMPDEL, STF2, RIACT_REQ_DECLCOMPDEL}
};

HIDDEN FSMACT raacts [] = {     /* request */
/* b  P*/       {REQ_YES, STB, NULL},
/* c  P*/       {REQ_COUNTER, STC, NULL},
/* ad P*/       {REQ_DELEG, STAD, NULL},
/* d  P*/       {REQ_REPORT, STD, NULL},
/* e  P*/       {REQ_PDECLINE, STE, NULL},
/* g  P*/       {REQ_COMTOCOM, STA, NULL},
/* F2 R*/       {REQ_RDECLARE, STF2, NULL},
/* a  R*/       {REQ_CANEREQ, STA, NULL},
/* f  R*/       {REQ_CANCEL, STF, NULL}
};

HIDDEN FSMACT rbacts [] = {     /* promise */
/* d */     {REQ_REPORT, STD, NULL},
/* bd */    {REQ_DELEG, STBD, NULL},
/* h */     {REQ_REVREPR, STH, NULL},
/* e */     {REQ_REVOKE, STE, NULL},
/* b */     {REQ_INTREPORT, STB, NULL},
/* F2 */    {REQ_RDECLARE, STF2, NULL},
/* a */     {REQ_CANEREQ, STA, NULL},
/* f */     {REQ_CANCEL, STF, RBACT_REQ_CANCEL}
};

HIDDEN FSMACT rcacts [] = {     /* counter */
/* b */     {REQ_ACCEPT, STB, NULL},
/* a */     {REQ_RCOUNTER, STA, NULL},
/* a */     {REQ_RDECLINE, STA, NULL},
/* F2 */    {REQ_RDECLARE, STF2, NULL},
/* a */     {REQ_CANEREQ, STA, NULL},
/* f */     {REQ_CANCEL, STF, RCACT_REQ_CANCEL},
/* g R*/     {OFF_COMTOCOM, STC, NULL},
/* d */     {REQ_REPORT, STD, NULL},
/* cd */    {REQ_DELEG, STCD, NULL},
/* h */     {REQ_REVRECOUNTER, STH, NULL},
/* e */     {REQ_REVCOUNTER, STE, NULL},
/* c */     {REQ_INTREPORT, STC, NULL}
};

HIDDEN FSMACT rdacts [] = {     /* report */
/* F2 */    {REQ_RDECLARE, STF2, NULL},
/* a */     {REQ_CANEREQ, STA, NULL},
/* b */     {REQ_DECLINREP, STB, NULL}
};

HIDDEN FSMACT reacts [] = {     /* decline */
/* F2 */    {REQ_RDECLARE, STF2, NULL},
/* a */     {REQ_RECONSDEC, STA, NULL}
};

HIDDEN FSMACT rfacts [] = {     /* cancel */
/* F1 */    {REQ_PDECLARE, STF1, NULL},
/* b */     {REQ_RECONSCAN, STB, NULL},
/* F2 */    {REQ_RDECLARE, STF2, NULL},
/* a */     {REQ_RECONSREV, STA, NULL}
};
```

```
HIDDEN FSMACT rgacts [] = {      /* opening promise */
/* b  R*/     {REQ_ACCEPTOPPR, STB, NULL},
/* f  R*/     {REQ_DECLOPPR, STF, NULL},
/* F2 R*/     {REQ_RDECLARE, STF2, NULL},
/* d */     {REQ_REPORT, STD, NULL},
/* bd */    {REQ_DELEG, STBD, NULL},
/* h */     {REQ_REVREPR, STH, NULL},
/* e */     {REQ_REVOKE, STE, NULL},
/* b */     {REQ_INTREPORT, STB, NULL}
};

HIDDEN FSMACT rhacts [] = {      /* prevoke/new */
/* b */    {REQ_ACCEPTNEWPR, STB, NULL},
/* b */    {REQ_DECLNEWPR, STB, NULL},
/* f */    {REQ_CANCEL, STF, NULL},
/* F2 R*/  {REQ_RDECLARE, STF2, NULL},
/* d */     {REQ_REPORT, STD, NULL},
/* bd */    {REQ_DELEG, STBD, NULL},
/* h */     {REQ_REVREPR, STH, NULL},
/* e */     {REQ_REVOKE, STE, NULL},
/* b */     {REQ_INTREPORT, STB, NULL}
};

HIDDEN FSMACT radacts [] = {      /* request,delegating */
/*delegating actions*/
/* add */    {REQ_ACCDELEG, STADD, NULL},
/* ad */    {REQ_DECLINDELEG, STAD, NULL},
/* ad */    {REQ_REPCOMPDEL, STAD, NULL},
/* ad */    {REQ_DECLCOMPDEL, STA, NULL},
/* ad */    {REQ_CANCELDELEG, STA, NULL},
/*request actions*/
/* bd */     {REQ_YES, STBD, NULL},
/* cd */     {REQ_COUNTER, STCD, NULL},
/* dd */     {REQ_REPORT, STDD, NULL},
/* ed */     {REQ_PDECLINE, STED, NULL},
/* gd P*/     {REQ_COMTOCOM, STAD, NULL},
/* F2D */    {REQ_RDECLARE, STF2D, NULL},
/* ad */    {REQ_CANEREQ, STAD, NULL},
/* fd */     {REQ_CANCEL, STFD, NULL}
};

HIDDEN FSMACT rbdacts [] = {      /* promise, delegating */
/*delegating actions*/
/* bdd */     {REQ_ACCDELEG, STBDD, NULL},
/* b */    {REQ_DECLINDELEG, STBD, NULL},
/* b */    {REQ_REPCOMPDEL, STBD, NULL},
/* b */    {REQ_DECLCOMPDEL, STB, NULL},
/* b */    {REQ_CANCELDELEG, STB, NULL},
/*promise actions*/
/* dd */     {REQ_REPORT, STDD, NULL},
/* hd */     {REQ_REVREPR, STHD, NULL},
/* ed */     {REQ_REVOKE, STED, NULL},
/* bd */     {REQ_INTREPORT, STBD, NULL},
/* F2D */    {REQ_RDECLARE, STF2D, NULL},
/* ad */     {REQ_CANEREQ, STAD, NULL},
/* fd */     {REQ_CANCEL, STFD, RBACT_REQ_CANCEL}
};

HIDDEN FSMACT rcdacts [] = {      /* counter, delegating */
/*delegating actions*/
/* cdd */    {REQ_ACCDELEG, STCDD, NULL},
/* c */    {REQ_DECLINDELEG, STCD, NULL},
/* c */    {REQ_REPCOMPDEL, STCD, NULL},
/* c */    {REQ_DECLCOMPDEL, STC, NULL},
/* c */    {REQ_CANCELDELEG, STC, NULL},
/*counter actions*/
/* bd */     {REQ_ACCEPT, STBD, NULL},
/* ad */     {REQ_COUNTER, STAD, NULL},
/* ad */     {REQ_RDECLINE, STAD, NULL},
/* F2D */    {REQ_RDECLARE, STF2D, NULL},
/* ad */     {REQ_CANEREQ, STAD, NULL},
/* fd*/      {REQ_CANCEL, STFD, RCACT_REQ_CANCEL},
/* gd R*/     {OFF_COMTOCOM, STCD, NULL},
/* dd */     {REQ_REPORT, STDD, NULL},
/* hd */     {REQ_REVRECOUNTER, STHD, NULL},
```

```
/* ed */     {REQ_REVCOUNTER, STED, NULL},
/* cd */     {REQ_INTREPORT, STCD, NULL}
};

HIDDEN FSMACT rddacts [] = {     /* report, delegating */
/*delegating actions*/
/* ddd */    {REQ_ACCDELEG, STDDD, NULL},
/* d */    {REQ_DECLINDELEG, STDD, NULL},
/* d */    {REQ_REPCOMPDEL, STDD, NULL},
/* d */    {REQ_DECLCOMPDEL, STD, NULL},
/* d */    {REQ_CANCELDELEG, STD, NULL},
/*report actions*/
/* F2D */    {REQ_RDECLARE, STF2D, NULL},
/* ad */    {REQ_CANEREQ, STAD, NULL},
/* bd */     {REQ_DECLINREP, STBD, NULL}
};

HIDDEN FSMACT redacts [] = {     /* decline, delegating */
/*delegating actions*/
/* edd */    {REQ_ACCDELEG, STEDD, NULL},
/* e */    {REQ_REPCOMPDEL, STED, NULL},
/* e */    {REQ_DECLINDELEG, STED, NULL},
/* e */    {REQ_CANCELDELEG, STE, NULL},
/* e */    {REQ_DECLCOMPDEL, STE, NULL},
/*decline actions*/
/* F2D */    {REQ_RDECLARE, STF2D, NULL},
/* ad */    {REQ_RECONSDEC, STAD, NULL}
};

HIDDEN FSMACT rfdacts [] = {     /* cancel, delegating */
/*delegating actions*/
/* fdd */    {REQ_ACCDELEG, STFDD, NULL},
/* f */    {REQ_DECLINDELEG, STFD, NULL},
/* f */    {REQ_REPCOMPDEL, STFD, NULL},
/* f */    {REQ_DECLCOMPDEL, STF, NULL},
/* f */    {REQ_CANCELDELEG, STF, NULL},
/*cancel actions*/
/* F2D */    {REQ_PDECLARE, STF2D, NULL},
/* bd */    {REQ_RECONSCAN, STBD, NULL},
/* F2D */    {REQ_RDECLARE, STF2D, NULL},
/* ad */     {REQ_RECONSREV, STAD, NULL}
};

HIDDEN FSMACT rhdacts [] = {     /* prevoke/new, delegating */
/*delegating actions*/
/* hdd */    {REQ_ACCDELEG, STHDD, NULL},
/* h */    {REQ_DECLINDELEG, STHD, NULL},
/* h */    {REQ_REPCOMPDEL, STHD, NULL},
/* h */    {REQ_DECLCOMPDEL, STH, NULL},
/* h */    {REQ_CANCELDELEG, STH, NULL},
/*prevoke/new actions*/
/* bd */    {REQ_ACCEPTNEWPR, STBD, NULL},
/* bd */    {REQ_DECLNEWPR, STBD, NULL},
/* fd */    {REQ_CANCEL, STFD, NULL},
/* F2D */    {REQ_RDECLARE, STF2D, NULL},
/* dd */     {REQ_REPORT, STDD, NULL},
/* hd */     {REQ_REVREPR, STHD, NULL},
/* ed */     {REQ_REVOKE, STED, NULL},
/* bd */     {REQ_INTREPORT, STBD, NULL}
};

HIDDEN FSMACT rf2dacts [] = {     /* final, delegating */
/*delegating actions*/
/* f2dd */    {REQ_ACCDELEG, STF2DD, NULL},
/* f2 */    {REQ_DECLINDELEG, STF2D, NULL},
/* f2 */    {REQ_REPCOMPDEL, STF2D, NULL},
/* f2 */    {REQ_DECLCOMPDEL, STF2, NULL},
/* f2 */    {REQ_CANCELDELEG, STF2, NULL}
/* no final actions*/
};

HIDDEN FSMACT raddacts [] = {     /* request,delegated */
/* delegated actions */
/* a */    {REQ_REPCOMPDEL, STADD, NULL},
/* a */    {REQ_REVDELEG, STADD, NULL},
```

```
/* a */    {REQ_DECLCOMPDEL, STA, NULL},
/* a */    {REQ_CANCELDELEG, STA, NULL},
/* request actions */
/* bdd */     {REQ_YES, STBDD, NULL},
/* cdd */     {REQ_COUNTER, STCDD, NULL},
/* ddd */     {REQ_REPORT, STDDD, NULL},
/* edd */     {REQ_PDECLINE, STEDD, NULL},
/* gdd P*/     {REQ_COMTOCOM, STADD, NULL},
/* F2DD */    {REQ_RDECLARE, STF2DD, NULL},
/* add */    {REQ_CANEREQ, STADD, NULL},
/* fdd */     {REQ_CANCEL, STFDD, NULL}
};

HIDDEN FSMACT rbddacts [] = {     /* promise, delegated */
/* delegated actions */
/* b */    {REQ_REPCOMPDEL, STBDD, NULL},
/* b */    {REQ_REVDELEG, STBDD, NULL},
/* b */    {REQ_DECLCOMPDEL, STB, NULL},
/* b */    {REQ_CANCELDELEG, STB, NULL},
/*promise actions*/
/* ddd */     {REQ_REPORT, STDDD, NULL},
/* hdd */     {REQ_REVREPR, STHDD, NULL},
/* edd */     {REQ_REVOKE, STEDD, NULL},
/* bdd */     {REQ_INTREPORT, STBDD, NULL},
/* F2DD */    {REQ_RDECLARE, STF2DD, NULL},
/* add */    {REQ_CANEREQ, STADD, NULL},
/* fdd */     {REQ_CANCEL, STFDD, RBACT_REQ_CANCEL}
};

HIDDEN FSMACT rcddacts [] = {     /* counter, delegated */
/* delegated actions */
/* c */    {REQ_REPCOMPDEL, STCDD, NULL},
/* c */    {REQ_REVDELEG, STCDD, NULL},
/* c */    {REQ_DECLCOMPDEL, STC, NULL},
/* c */    {REQ_CANCELDELEG, STC, NULL},
/*counter actions*/
/* bdd */     {REQ_ACCEPT, STBDD, NULL},
/* add */     {REQ_COUNTER, STADD, NULL},
/* add */     {REQ_RDECLINE, STADD, NULL},
/* F2DD */    {REQ_RDECLARE, STF2DD, NULL},
/* add */     {REQ_CANEREQ, STADD, NULL},
/* fdd */     {REQ_CANCEL, STFDD, RCACT_REQ_CANCEL},
/* gdd R*/     {OFF_COMTOCOM, STCDD, NULL},
/* ddd */     {REQ_REPORT, STDDD, NULL},
/* hdd */     {REQ_REVRECOUNTER, STHDD, NULL},
/* edd */     {REQ_REVCOUNTER, STEDD, NULL},
/* cdd */     {REQ_INTREPORT, STCDD, NULL}
};

HIDDEN FSMACT rdddacts [] = {     /* report, delegated */
/* delegated actions */
/* d */    {REQ_REPCOMPDEL, STDDD, NULL},
/* d */    {REQ_REVDELEG, STDDD, NULL},
/* d */    {REQ_DECLCOMPDEL, STD, NULL},
/* d */    {REQ_CANCELDELEG, STD, NULL},
/* report actions */
/* F2D */    {REQ_RDECLARE, STF2DD, NULL},
/* add */    {REQ_CANEREQ, STADD, NULL},
/* bdd */     {REQ_DECLINREP, STBDD, NULL}
};
HIDDEN FSMACT reddacts [] = {     /* decline, delegated */
/* delegated actions */
/* e */    {REQ_REPCOMPDEL, STEDD, NULL},
/* e */    {REQ_REVDELEG, STEDD, NULL},
/* e */    {REQ_DECLCOMPDEL, STE, NULL},
/* e */    {REQ_CANCELDELEG, STE, NULL},
/* decline actions */
/* F2DD */    {REQ_RDECLARE, STF2DD, NULL},
/* add */    {REQ_RECONSDEC, STADD, NULL}
};

HIDDEN FSMACT rfddacts [] = {     /* cancel, delegated */
/* delegated actions */
/* f */    {REQ_REPCOMPDEL, STFDD, NULL},
/* f */    {REQ_REVDELEG, STFDD, NULL},
```

```
/* f */    {REQ_DECLCOMPDEL, STF, NULL},
/* f */    {REQ_CANCELDELEG, STF, NULL},
/* cancel actions */
/* F2DD */    {REQ_PDECLARE, STF2DD, NULL},
/* bdd */     {REQ_RECONSCAN, STBDD, NULL},
/* F2DD */    {REQ_RDECLARE, STF2DD, NULL},
/* add */     {REQ_RECONSREV, STADD, NULL}
};

HIDDEN FSMACT rhddacts [] = {     /* prevoke/new, delegated */
/* delegated actions */
/* h */    {REQ_REPCOMPDEL, STHDD, NULL},
/* h */    {REQ_REVDELEG, STHDD, NULL},
/* h */    {REQ_DECLCOMPDEL, STH, NULL},
/* h */    {REQ_CANCELDELEG, STH, NULL},
/* prevoke/new actions */
/* bdd */    {REQ_ACCEPTNEWPR, STBDD, NULL},
/* bdd */    {REQ_DECLNEWPR, STBDD, NULL},
/* fdd */    {REQ_CANCEL, STFDD, NULL},
/* F2DD */    {REQ_RDECLARE, STF2DD, NULL},
/* ddd */     {REQ_REPORT, STDDD, NULL},
/* hdd */     {REQ_REVREPR, STHDD, NULL},
/* edd */     {REQ_REVOKE, STEDD, NULL},
/* bdd */     {REQ_INTREPORT, STBDD, NULL}
};

HIDDEN FSMACT rf2ddacts [] = {     /* final, delegated */
/* delegated actions */
/* f2 */    {REQ_REPCOMPDEL, STF2DD, NULL},
/* f2 */    {REQ_REVDELEG, STF2DD, NULL},
/* f2 */    {REQ_DECLCOMPDEL, STF2, NULL},
/* f2 */    {REQ_CANCELDELEG, STF2, NULL}
/* no final actions */
};

HIDDEN FSMROW rrow [] = {
               {6, riact},
/* A */        {9, raacts},
/* B */        {8, rbacts},
/* C */        {12, rcacts},
/* D */        {3, rdacts},
/* E */        {2, reacts},
/* F */        {4, rfacts},
/* F1 */       {0, 0},
/* F2 */       {0, 0},
/* G */        {8, rgacts},
/* H */        {9, rhacts},
/* AD */       {13, radacts},
/* BD */       {12, rbdacts},
/* CD */       {16, rcdacts},
/* DD */       {8, rddacts},
/* ED */       {7, redacts},
/* FD */       {9, rfdacts},
/* GD */       {0, 0},
/* HD */       {13, rhdacts},
/* F2D */      {5, rf2dacts},
/* ADD */      {12, raddacts},
/* BDD */      {11, rbddacts},
/* CDD */      {15, rcddacts},
/* DDD */      {7, rdddacts},
/* EDD */      {6, reddacts},
/* FDD */      {8, rfddacts},
/* GDD */      {0, 0},
/* HDD */      {12, rhddacts},
/* F2DD */     {4, rf2ddacts}
};
```

/****** Finite State Machine: Offer to One Other Person */

```
HIDDEN FSMACT oiact [] = {
/* a */     {OFFER, STA, NULL},
/* F2 */    {OFF_RDECLARE, STF2, OIACT_OFF_RDECLARE}
};
```

```
HIDDEN FSMACT oaacts [] = {      /* offer */
/* b */     {OFF_ACCEPT, STB, NULL},
/* c */     {OFF_COUNTER, STC, NULL},
/* e */     {OFF_RDECLINE, STE, NULL},
/* F2 */    {OFF_RDECLARE, STF2, NULL},
/* g */     {OFF_COMTOCOM, STA, NULL},
/* d */     {OFF_REPORT, STD, NULL},
/* a */     {OFF_REVREOFF, STA, NULL},
/* f */     {OFF_REVOKE, STF, NULL},
/* a */     {OFF_INTREPORT, STA, NULL}
};

HIDDEN FSMACT obacts [] = {      /* accept */
/* d */     {OFF_REPORT, STD, NULL},
/* b */     {OFF_REVREOFF, STB, NULL},
/* f */     {OFF_REVOKE, STF},
/* b */     {OFF_INTREPORT, STB, NULL},
/* F2 */    {OFF_RDECLARE, STF2, NULL},
/* e */     {OFF_CANCEL, STE, NULL}
};

HIDDEN FSMACT ocacts [] = {      /* counter */
/* b */     {OFF_PROMISE, STB, NULL},
/* a */     {OFF_PCOUNTER, STA, NULL},
/* a */     {OFF_PDECLINE, STA, NULL},
/* f */     {OFF_REVOKE, STF, NULL},
/* d */     {OFF_REPORT, STD, NULL},
/* c */     {OFF_INTREPORT, STC, NULL},
/* e */     {OFF_RRETRACT, STE, NULL},
/* c */     {OFF_RREVREOFF, STC, NULL},
/* F2 */    {OFF_RDECLARE, STF2, NULL}
};

HIDDEN FSMACT odacts [] = {      /* report */
/* F2 */    {OFF_RDECLARE, STF2, NULL},
/* b */     {OFF_DECLINREP, STB, NULL},
/* e */     {OFF_CANCEL, STE, NULL}
};

HIDDEN FSMACT oeacts [] = {      /* decline*/
/* a */    {OFF_RECONSCAN, STA, NULL},
/* F2 */   {OFF_PDECLARE, STF2, NULL}
};

HIDDEN FSMACT ofacts [] = {      /* cancel */
/* c */    {OFF_RECONSDEC, STC, NULL},
/* F2 */    {OFF_RDECLARE, STF2, NULL}
};

HIDDEN FSMROW orow [] = {
    {2, oiact},
/* A */    {9, oaacts},
/* B */    {6, obacts},
/* C */    {9, ocacts},
/* D */    {3, odacts},
/* E */    {2, oeacts},
/* F */    {2, ofacts},
/* F1 */   {0, 0},
/* F2 */   {0, 0}
};
```

/****** Finite State Machine: Ask Question to One Other Person */

```
HIDDEN FSMACT qiact [] = {
/* a */     {QUESTION, STA, NULL},
/* ad */    {Q_DELEG, STAD, NULL},
/* F2 */    {Q_PDECLARE, STF2, RIACT_REQ_PDECLARE},
/* F2 */    {Q_RDECLARE, STF2, RIACT_REQ_RDECLARE}
};

HIDDEN FSMACT qaacts [] = {      /* request */
/* d */     {Q_REPORT, STD, NULL},
```

```
/* b */     {Q_PROMISE, STB, NULL},
/* ad */    {Q_DELEG, STAD, NULL},
/* e */     {Q_PDECLINE, STE, NULL},
/* F2 */    {Q_RDECLARE, STF2, NULL},
/* a */     {Q_CANEREQ, STA, NULL},
/* f */     {Q_CANCEL, STF, NULL}
};

HIDDEN FSMACT qbacts [] = {     /* promise */
/* d */     {Q_REPORT, STD, NULL},
/* bd */    {Q_DELEG, STBD, NULL},
/* b */     {Q_REVREPR, STB, NULL},
/* e */     {Q_REVOKE, STE, NULL},
/* b */     {Q_INTREPORT, STB, NULL},
/* F2 */    {Q_RDECLARE, STF2, NULL},
/* a */     {Q_CANEREQ, STA, NULL},
/* f */     {Q_CANCEL, STF, RBACT_REQ_CANCEL}
};

HIDDEN FSMACT qdacts [] = {     /* report */
/* F2 */    {Q_RDECLARE, STF2, NULL},
/* b */     {Q_DECLINREP, STB, NULL},
/* a */     {Q_CANEREQ, STA, NULL}
};

HIDDEN FSMACT qeacts [] = {     /* decline */
/* F2 */    {Q_RDECLARE, STF2, NULL},
/* a */     {Q_RECONSDEC, STA, NULL}
};

HIDDEN FSMACT qfacts [] = {     /* cancel */
/* F2 */    {Q_PDECLARE, STF2, NULL},
/* b */     {Q_RECONSCAN, STB, NULL},
/* F2 */    {Q_RDECLARE, STF2, NULL},
/* a */     {Q_RECONSREV, STA, NULL},
};

HIDDEN FSMACT qadacts [] = {     /* request,delegating */
/*delegating actions*/
/* a */    {Q_REPCOMPDEL, STA, NULL},
/* add */  {Q_ACCDELEG, STADD, NULL},
/* a */    {Q_DECLINDELEG, STA, NULL},
/* a */    {Q_DECLCOMPDEL, STA, NULL},
/* a */    {Q_CANCELDELEG, STA, NULL},
/*request actions*/
/* dd */     {Q_REPORT, STDD, NULL},
/* bd */     {Q_PROMISE, STBD, NULL},
/* ed */     {Q_PDECLINE, STED, NULL},
/* ad */     {Q_INTREPORT, STAD, NULL},
/* F2D */    {Q_RDECLARE, STF2D, NULL},
/* ad */     {Q_CANEREQ, STAD, NULL},
/* fd */     {Q_CANCEL, STFD, NULL}
};

HIDDEN FSMACT qbdacts [] = {     /* promise, delegating */
/*delegating actions*/
/* b */    {Q_REPCOMPDEL, STB, NULL},
/* bdd */  {Q_ACCDELEG, STBDD, NULL},
/* b */    {Q_DECLINDELEG, STB, NULL},
/* b */    {Q_DECLCOMPDEL, STB, NULL},
/* b */    {Q_CANCELDELEG, STB, NULL},
/*promise actions*/
/* dd */     {Q_REPORT, STDD, NULL},
/* bd */     {Q_REVREPR, STBD, NULL},
/* ed */     {Q_REVOKE, STED, NULL},
/* bd */     {Q_INTREPORT, STBD, NULL},
/* F2d */    {Q_RDECLARE, STF2D, NULL},
/* ad */     {Q_CANEREQ, STAD, NULL},
/* fd */     {Q_CANCEL, STFD, RBACT_REQ_CANCEL}
};

HIDDEN FSMACT qddacts [] = {     /* report, delegating */
/*delegating actions*/
/* d */      {Q_REPCOMPDEL, STD, NULL},
/* ddd */    {Q_ACCDELEG, STDDD, NULL},
```

```
/* d */      {Q_DECLINDELEG, STD, NULL},
/* d */    {Q_DECLCOMPDEL, STD, NULL},
/* d */    {Q_CANCELDELEG, STD, NULL},
/*report actions*/
/* F2D */    {Q_RDECLARE, STF2D, NULL},
/* ad */   {Q_CANEREQ, STAD, NULL},
/* bd */     {Q_DECLINREP, STBD, NULL}
};

HIDDEN FSMACT qedacts [] = {     /* decline, delegating */
/*delegating actions*/
/* e */    {Q_REPCOMPDEL, STE, NULL},
/* edd */    {Q_ACCDELEG, STEDD, NULL},
/* e */    {Q_DECLINDELEG, STE, NULL},
/* e */    {Q_CANCELDELEG, STE, NULL},
/* e */    {Q_DECLCOMPDEL, STE, NULL},
/*decline actions*/
/* F2D */    {Q_RDECLARE, STF2D, NULL},
/* ad */     {Q_RECONSDEC, STAD, NULL}
};

HIDDEN FSMACT qfdacts [] = {     /* cancel, delegating */
/*delegating actions*/
/* f */    {Q_REPCOMPDEL, STF, NULL},
/* fdd */    {Q_ACCDELEG, STFDD, NULL},
/* f */    {Q_DECLINDELEG, STF, NULL},
/* f */    {Q_DECLCOMPDEL, STF, NULL},
/* f */    {Q_CANCELDELEG, STF, NULL},
/*cancel actions*/
/* F2D */    {Q_PDECLARE, STF2D, NULL},
/* bd */     {Q_RECONSCAN, STBD, NULL},
/* F2D */    {Q_RDECLARE, STF2D, NULL},
/* ad */     {Q_RECONSREV, STAD, NULL}
};

HIDDEN FSMACT qf2dacts [] = {     /* final, delegating */
/*delegating actions*/
/* F2dd */    {Q_ACCDELEG, STF2DD, NULL},
/* F2 */    {Q_DECLINDELEG, STF2, NULL},
/* F2 */    {Q_REPCOMPDEL, STF2, NULL},
/* F2 */    {Q_DECLCOMPDEL, STF2, NULL},
/* F2 */    {Q_CANCELDELEG, STF2, NULL}
/* no final actions*/
};

HIDDEN FSMACT qaddacts [] = {     /* request,delegated */
/* delegated actions */
/* a */    {Q_REPCOMPDEL, STA, NULL},
/* a */    {Q_REVDELEG, STA, NULL},
/* a */    {Q_DECLCOMPDEL, STA, NULL},
/* a */    {Q_CANCELDELEG, STA, NULL},
/* request actions */
/* ddd */     {Q_REPORT, STDDD, NULL},
/* bdd */     {Q_PROMISE, STBDD, NULL},
/* edd */     {Q_PDECLINE, STEDD, NULL},
/* add */     {Q_INTREPORT, STADD, NULL},
/* F2DD */    {Q_RDECLARE, STF2DD, NULL},
/* add */     {Q_CANEREQ, STADD, NULL},
/* fdd */     {Q_CANCEL, STFDD, NULL}
};

HIDDEN FSMACT qbddacts [] = {     /* promise, delegated */
/* delegated actions */
/* b */    {Q_REPCOMPDEL, STB, NULL},
/* b */    {Q_REVDELEG, STB, NULL},
/* b */    {Q_DECLCOMPDEL, STB, NULL},
/* b */    {Q_CANCELDELEG, STB, NULL},
/*promise actions*/
/* ddd */     {Q_REPORT, STDDD, NULL},
/* bdd */     {Q_REVREPR, STBDD, NULL},
/* edd */     {Q_REVOKE, STEDD, NULL},
/* bdd */     {Q_INTREPORT, STBDD, NULL},
/* F2dd */    {Q_RDECLARE, STF2DD, NULL},
/* add */     {Q_CANEREQ, STADD, NULL},
/* fdd */     {Q_CANCEL, STFDD, NULL}
};
```

```
HIDDEN FSMACT qdddacts [] = {     /* report, delegated */
/* delegated actions */
/* d */    {Q_REPCOMPDEL, STD, NULL},
/* d */    {Q_REVDELEG, STD, NULL},
/* d */    {Q_DECLCOMPDEL, STD, NULL},
/* d */    {Q_CANCELDELEG, STD, NULL},
/* report actions */
/* F2DD */    {Q_RDECLARE, STF2DD, NULL},
/* add */    {Q_CANEREQ, STADD, NULL},
/* bdd */     {Q_DECLINREP, STBDD, NULL}
};
HIDDEN FSMACT qeddacts [] = {     /* decline, delegated */
/* delegated actions */
/* e */    {Q_REPCOMPDEL, STA, NULL},
/* e */    {Q_REVDELEG, STA, NULL},
/* e */    {Q_DECLCOMPDEL, STA, NULL},
/* e */    {Q_CANCELDELEG, STA, NULL},
/* decline actions */
/* F2DD */     {Q_RDECLARE, STF2DD, NULL},
/* add */     {Q_RECONSDEC, STADD, NULL}
};

HIDDEN FSMACT qfddacts [] = {     /* cancel, delegated */
/* delegated actions */
/* f */    {Q_REPCOMPDEL, STF, NULL},
/* f */    {Q_REVDELEG, STF, NULL},
/* f */    {Q_DECLCOMPDEL, STF, NULL},
/* f */    {Q_CANCELDELEG, STF, NULL},
/* cancel actions */
/* F2DD */    {Q_PDECLARE, STF2DD, NULL},
/* bdd */     {Q_RECONSCAN, STBDD, NULL},
/* F2DD */    {Q_RDECLARE, STF2DD, NULL},
/* add */     {Q_RECONSREV, STADD, NULL}
};

HIDDEN FSMACT qf2ddacts [] = {     /* final, delegated */
/* delegated actions */
/* F2 */    {Q_REPCOMPDEL, STF2, NULL},
/* F2 */    {Q_REVDELEG, STF2, NULL},
/* F2 */    {Q_DECLCOMPDEL, STF2, NULL},
/* F2 */    {Q_CANCELDELEG, STF2, NULL}
/* no final actions */
};

HIDDEN FSMROW qrow [] = {
                {4, qiact},
/* A */         {7, qaacts},
/* B */         {8, qbacts},
/* C */         {0, NULL},
/* D */         {3, qdacts},
/* E */         {2, qeacts},
/* F */         {4, qfacts},
/* F1 */        {0, NULL},           /* final */
/* F2 */        {0, NULL},           /* final */
/* G */         {0, NULL},
/* H */         {0, NULL},
/* AD */        {12, qadacts},
/* BD */        {12, qbdacts},
/* CD */        {0, NULL},
/* DD */        {8, qddacts},
/* ED */        {7, qedacts},
/* FD */        {9, qfdacts},
/* GD */        {0, NULL},
/* HD */        {0, NULL},
/* F2D */       {5, qf2dacts},
/* ADD */       {11, qaddacts},
/* BDD */       {11, qbddacts},
/* CDD */       {0, NULL},
/* DDD */       {7, qdddacts},
/* EDD */       {6, qeddacts},
/* FDD */       {8, qfddacts},
/* GDD */       {0, NULL},
/* HDD */       {0, NULL},
/* F2DD */      {4, qf2ddacts},
};
```

/****** Finite State Machine: Inform One Other Person */

```
HIDDEN FSMACT iiact [] = {
/* a */     {FYI, STA, NULL},
/* F */     {INF_RDECLARE, STFF, IIACT_INF_RDECLARE}
};

HIDDEN FSMACT iaacts [] = {     /* fyi */
/* F */    {INF_RDECLARE, STFF, NULL},
/* f */     {INF_REVOKE, STFF, NULL},
/* a */     {INF_INTREPORT, STA, NULL},
};

HIDDEN FSMROW irow [] = {
    {2, iiact},
    {3, iaacts},
    {0, NULL}          /* final */
};
```

/****** Finite State Machine: What If?? Conversation with One Person (Conversation for Possibilities) */

```
HIDDEN FSMACT cpiact [] = {
/* a */     {CFPOPEN, STA, NULL},
/* a */     {CFP_CFPRANSWER, STA, NULL},
/* a */     {CFP_CFPPANSWER, STA, NULL},
/* F */     {CFP_CFPDECLARE, STCPF, NULL}
};

HIDDEN FSMACT cpaacts [] = {
/* a */     {CFP_CFPPANSWER, STA, NULL},
/* a */     {CFP_CFPRANSWER, STA, NULL},
/* F */     {CFP_CFPDECLARE, STCPF, NULL}
};

HIDDEN FSMROW cprow [] = {
    {4, cpiact},
    {3, cpaacts},
    {0, NULL}          /* final */
};
```

/****** Finite State Machine: Note to One Other Person */

```
HIDDEN FSMACT niact [] = {
/* i */     {NOTE, STI, NULL},
/* i */     {NOTEANSWER, STI, NULL}
};

HIDDEN FSMROW nrow [] = {
    {2, niact},
};
```

/****** Finite State Machine: Request to More Than One Person */

```
HIDDEN FSMACT rgriact [] = {
/* a */     {REQGRP, STA, NULL},
/* G */     {REQ_STPROMGRP, STG, NULL},
/* F2 */    {REQ_PDECLARE, STF2, RIACT_REQ_PDECLARE}, /* listnr OBSERVER, not REQUESTOR, */
/* F2 */    {REQ_RDECLARE, STF2, RIACT_REQ_RDECLARE}  /* listnr OBSERVER, not PROMISOR */
};

HIDDEN FSMACT rgraacts [] = {   /* request */
/* b */     {REQ_YES, STB, RGRAACT_REQ_YES}, /* listener: NULL, NULL */
/* ad */    {REQ_DELEG, STAD, NULL},
/* d */     {REQ_REPORT, STD, RGRAACT_REQ_REPORT}, /* listener: NULL, NULL */
/* e */     {REQ_PDECLINE, STE, RGRAACT_REQ_PDECLINE}, /* listener: NULL, NULL */
/* g */     {REQ_COMTOCOM, STA, RGRAACT_REQ_COMTOCOM}, /* listener: NULL, NULL */
```

```
/* F2 */    {REQ_RDECLARE, STF2, NULL},
/* a */     {REQ_CANEREQ, STA, NULL},
/* f */     {REQ_CANCEL, STF, NULL},
};

HIDDEN FSMACT rgrbacts [] = {   /* promise */
/* d */     {REQ_REPORT, STD, RGRAACT_REQ_REPORT}, /* listener: NULL, NULL */
/* bd */    {REQ_DELEG, STBD, NULL},
/* b */     {REQ_REVREPR, STB, RGRBACT_REQ_REVREPR}, /* listener: NULL, NULL */
/* e */     {REQ_REVOKE, STE, RGRBACT_REQ_REVOKE}, /* listener: NULL, NULL */
/* b */     {REQ_INTREPORT, STB, RGRAACT_REQ_INTREPORT}, /* listener: NULL, NULL */
/* F2 */    {REQ_RDECLARE, STF2, NULL},
/* a */     {REQ_CANEREQ, STA, NULL},
/* f */     {REQ_CANCEL, STF, NULL}
};

HIDDEN FSMACT rgrdacts [] = {     /* report */
/* F2 */    {REQ_RDECLARE, STF2, NULL},
/* a */     {REQ_CANEREQ, STA, NULL},
/* b */     {REQ_DECLINREP, STB, NULL},
/* f */     {REQ_CANCEL, STF, NULL}
};

HIDDEN FSMACT rgreacts [] = {   /* decline */
/* F2 */    {REQ_RDECLARE, STF2, NULL}
};

HIDDEN FSMACT rgrfacts [] = {   /* cancel */
/* F2 */    {REQ_PDECLARE, STF2, RGRFACTS_REQ_PDECLARE}, /* listener: NULL, NULL */
/* F2 */    {REQ_RDECLARE, STF2, NULL}
};

HIDDEN FSMACT rgrgacts [] = {   /* opening promise */
/* b */     {REQ_ACCEPTOPPR, STB, NULL},
/* f */     {REQ_DECLOPPR, STF, NULL},
/* F2 R*/     {REQ_RDECLARE, STF2, NULL},
/* d */     {REQ_REPORT, STD, NULL},
/* h */     {REQ_REVREPR, STH, NULL},
/* e */     {REQ_REVOKE, STE, NULL},
/* b */     {REQ_INTREPORT, STB, NULL}
};

HIDDEN FSMACT rgradacts [] = {     /* request,delegating */
/*delegating actions*/
/* add */     {REQ_ACCDELEG, STADD, NULL},
/* a */    {REQ_DECLINDELEG, STA, NULL},
/* a */    {REQ_REPCOMPDEL, STA, NULL},
/* a */    {REQ_DECLCOMPDEL, STA, NULL},
/* a */    {REQ_CANCELDELEG, STA, NULL},
/*request actions*/
/* bd */     {REQ_YES, STBD, RGRAACT_REQ_YES}, /* listener: NULL, NULL */
/* dd */     {REQ_REPORT, STDD, RGRAACT_REQ_REPORT}, /* listener: NULL, NULL */
/* ed */     {REQ_PDECLINE, STED, RGRAACT_REQ_PDECLINE}, /* listener: NULL, NULL */
/* gd */     {REQ_COMTOCOM, STAD, RGRAACT_REQ_COMTOCOM}, /* listener: NULL, NULL */
/* ad */     {REQ_INTREPORT, STAD, RGRAACT_REQ_INTREPORT}, /* listener: NULL, NULL */
/* F2D */    {REQ_RDECLARE, STF2D, NULL},
/* ad */    {REQ_CANEREQ, STA, NULL},
/* fd */     {REQ_CANCEL, STFD, NULL}
};

HIDDEN FSMACT rgrbdacts [] = {     /* promise, delegating */
/*delegating actions*/
/* bdd */    {REQ_ACCDELEG, STBDD, NULL},
/* b */    {REQ_DECLINDELEG, STB, NULL},
/* b */    {REQ_REPCOMPDEL, STB, NULL},
/* b */    {REQ_DECLCOMPDEL, STB, NULL},
/* b */    {REQ_CANCELDELEG, STB, NULL},
/*promise actions*/
/* bd */     {REQ_REPORT, STDD, RGRAACT_REQ_REPORT}, /* listener: NULL, NULL */
/* bd */     {REQ_REVREPR, STBD, RGRBACT_REQ_REVREPR}, /* listener: NULL, NULL */
/* ed */     {REQ_REVOKE, STED, RGRBACT_REQ_REVOKE}, /* listener: NULL, NULL */
/* bd */     {REQ_INTREPORT, STBD, RGRAACT_REQ_INTREPORT}, /* listener: NULL, NULL */
/* F2D */    {REQ_RDECLARE, STF2D, NULL},
/* ad */     {REQ_CANEREQ, STA, NULL},
/* fd */     {REQ_CANCEL, STFD, NULL}
};
```

```
HIDDEN FSMACT rgrddacts [] = {     /* report, delegating */
/*delegating actions*/
/* ddd */    {REQ_ACCDELEG, STDDD, NULL},
/* d */    {REQ_DECLINDELEG, STD, NULL},
/* d */    {REQ_REPCOMPDEL, STD, NULL},
/* d */    {REQ_DECLCOMPDEL, STD, NULL},
/* d */    {REQ_CANCELDELEG, STD, NULL},
/*report actions*/
/* F2D */    {REQ_RDECLARE, STF2D, NULL},
/* ad */    {REQ_CANEREQ, STA, NULL},
/* bd */    {REQ_DECLINREP, STBD, NULL},
/* fd */    {REQ_CANCEL, STFD, NULL}
};

HIDDEN FSMACT rgredacts [] = {     /* decline, delegating */
/*delegating actions*/
/* edd */    {REQ_ACCDELEG, STEDD, NULL},
/* e */    {REQ_REPCOMPDEL, STE, NULL},
/* e */    {REQ_DECLINDELEG, STE, NULL},
/* e */    {REQ_CANCELDELEG, STE, NULL},
/* e */    {REQ_DECLCOMPDEL, STE, NULL},

/*decline actions*/
/* F2D */    {REQ_RDECLARE, STF2D, NULL},
};

HIDDEN FSMACT rgrfdacts [] = {     /* cancel, delegating */
/*delegating actions*/
/* fdd */    {REQ_ACCDELEG, STFDD, NULL},
/* f */    {REQ_DECLINDELEG, STF, NULL},
/* f */    {REQ_REPCOMPDEL, STF, NULL},
/* f */    {REQ_DECLCOMPDEL, STF, NULL},
/* f */    {REQ_CANCELDELEG, STF, NULL},
/*cancel actions*/
/* F2D */    {REQ_PDECLARE, STF2D, RGRFACTS_REQ_PDECLARE}, /* listener: NULL, NULL */
/* F2D */    {REQ_RDECLARE, STF2D, NULL}
};

HIDDEN FSMACT rgrf2dacts [] = {     /* final, delegating */
/*delegating actions*/
/* f2dd */    {REQ_ACCDELEG, STF2DD, NULL},
/* f2 */    {REQ_DECLINDELEG, STF2, NULL},
/* f2 */    {REQ_REPCOMPDEL, STF2, NULL},
/* f2 */    {REQ_DECLCOMPDEL, STF2, NULL},
/* f2 */    {REQ_CANCELDELEG, STF2, NULL}
/* no final actions*/
};

HIDDEN FSMACT rgraddacts [] = {     /* request,delegated */
/* delegated actions */
/* a */    {REQ_REPCOMPDEL, STA, NULL},
/* a */    {REQ_REVDELEG, STA, NULL},
/* a */    {REQ_DECLCOMPDEL, STA, NULL},
/* a */    {REQ_CANCELDELEG, STA, NULL},
/* request actions */
/* bdd */     {REQ_YES, STBDD, RGRAACT_REQ_YES}, /* listener: NULL, NULL */
/* ddd */     {REQ_REPORT, STDDD, RGRAACT_REQ_REPORT}, /* listener: NULL, NULL */
/* edd */     {REQ_PDECLINE, STEDD, RGRAACT_REQ_PDECLINE}, /* listener: NULL, NULL */
/* gdd */     {REQ_COMTOCOM, STADD, RGRAACT_REQ_COMTOCOM}, /* listener: NULL, NULL */
/* add */     {REQ_INTREPORT, STADD, RGRAACT_REQ_INTREPORT}, /* listener: NULL, NULL */
/* F2DD */    {REQ_RDECLARE, STF2DD, NULL},
/* add */    {REQ_CANEREQ, STADD, NULL},
/* fdd */     {REQ_CANCEL, STFDD, NULL}
};

HIDDEN FSMACT rgrbddacts [] = {     /* promise, delegated */
/* delegated actions */
/* b */    {REQ_REPCOMPDEL, STB, NULL},
/* b */    {REQ_REVDELEG, STB, NULL},
/* b */    {REQ_DECLCOMPDEL, STB, NULL},
/* b */    {REQ_CANCELDELEG, STB, NULL},
/*promise actions*/
/* ddd */     {REQ_REPORT, STDDD, RGRAACT_REQ_REPORT}, /* listener: NULL, NULL */
/* bdd */     {REQ_REVREPR, STBDD, RGRBACT_REQ_REVREPR}, /* listener: NULL, NULL */
/* edd */     {REQ_REVOKE, STEDD, RGRBACT_REQ_REVOKE}, /* listener: NULL, NULL */
```

```
/* bdd */     {REQ_INTREPORT, STBDD, RGRAACT_REQ_INTREPORT}, /* listener: NULL, NULL */
/* F2DD */    {REQ_RDECLARE, STF2DD, NULL},
/* add */     {REQ_CANEREQ, STADD, NULL},
/* fdd */     {REQ_CANCEL, STFDD, NULL}
};

HIDDEN FSMACT rgrdddacts [] = {     /* report, delegated */
/* delegated actions */
/* d */    {REQ_REPCOMPDEL, STD, NULL},
/* d */    {REQ_REVDELEG, STD, NULL},
/* d */    {REQ_DECLCOMPDEL, STD, NULL},
/* d */    {REQ_CANCELDELEG, STD, NULL},
/* report actions */
/* F2DD */    {REQ_RDECLARE, STF2DD, NULL},
/* add */     {REQ_CANEREQ, STADD, NULL},
/* bdd */     {REQ_DECLINREP, STBDD, NULL},
/* fdd */     {REQ_CANCEL, STFDD, NULL}
};
HIDDEN FSMACT rgreddacts [] = {     /* decline, delegated */
/* delegated actions */
/* e */    {REQ_REPCOMPDEL, STE, NULL},
/* e */    {REQ_REVDELEG, STE, NULL},
/* e */    {REQ_DECLCOMPDEL, STE, NULL},
/* e */    {REQ_CANCELDELEG, STE, NULL},
/* decline actions */
/* F2DD */    {REQ_RDECLARE, STF2DD, NULL}
};

HIDDEN FSMACT rgrfddacts [] = {     /* cancel, delegated */
/* delegated actions */
/* f */    {REQ_REPCOMPDEL, STF, NULL},
/* f */    {REQ_REVDELEG, STF, NULL},
/* f */    {REQ_DECLCOMPDEL, STF, NULL},
/* f */    {REQ_CANCELDELEG, STF, NULL},
/* cancel actions */
/* F2Dd */    {REQ_PDECLARE, STF2DD, RGRFACTS_REQ_PDECLARE}, /* listener: NULL, NULL */
/* F2DD */    {REQ_RDECLARE, STF2DD, NULL},
};

HIDDEN FSMACT rgrf2ddacts [] = {     /* final, delegated */
/* delegated actions */
/* f2 */    {REQ_REPCOMPDEL, STF2, NULL},
/* f2 */    {REQ_REVDELEG, STF2, NULL},
/* f2 */    {REQ_DECLCOMPDEL, STF2, NULL},
/* f2 */    {REQ_CANCELDELEG, STF2, NULL}
/* no final actions */
};

HIDDEN FSMROW rgrrow [] = {
                {4, rgriact},
/* A */         {8, rgraacts},
/* B */         {8, rgrbacts},
/* C */         {0, 0},
/* D */         {4, rgrdacts},
/* E */         {1, rgreacts},
/* F */         {2, rgrfacts},
/* F1 */        {0, 0},
/* F2 */        {0, 0},
/* G */         {7, rgrgacts},
/* H */         {0, 0},
/* AD */        {13, rgradacts},
/* BD */        {12, rgrbdacts},
/* CD */        {0, 0},
/* DD */        {9, rgrddacts},
/* ED */        {6, rgredacts},
/* FD */        {7, rgrfdacts},
/* GD */        {0, 0},
/* HD */        {0, 0},
/* F2D */       {5, rgrf2dacts},
/* ADD */       {12, rgraddacts},
/* BDD */       {11, rgrbddacts},
/* CDD */       {0, 0},
/* DDD */       {8, rgrdddacts},
/* EDD */       {5, rgreddacts},
/* FDD */       {6, rgrfddacts},
```

```
/* GDD */        {0, 0},
/* HDD */        {0, 0},
/* F2DD */       {4, rgrf2ddacts},
};
```

/****** Finite State Machine: Offer to More Than One Person */

```
HIDDEN FSMACT ogriact [] = {
/* a */     {OFFERGRP, STA, NULL},
/* F2 */    {OFF_RDECLARE, STF2, OIACT_OFF_RDECLARE}
};

HIDDEN FSMACT ograacts [] = {   /* offer */
/* b */     {OFF_ACCEPT, STB, NULL},
/* e */     {OFF_RDECLINE, STE, NULL},
/* F2 */    {OFF_RDECLARE, STF2, NULL},
/* g */     {OFF_COMTOCOM, STA, NULL},
/* d */     {OFF_REPORT, STD, NULL},
/* a */     {OFF_REVREOFF, STA, NULL},
/* f */     {OFF_REVOKE, STF, NULL},
/* a */     {OFF_INTREPORT, STA, NULL}
};

HIDDEN FSMACT ogrbacts [] = {   /* accept */
/* d */     {OFF_REPORT, STD, NULL},
/* b */     {OFF_REVREOFF, STB, NULL},
/* f */     {OFF_REVOKE, STF},
/* b */     {OFF_INTREPORT, STB, NULL},
/* F2 */    {OFF_RDECLARE, STF2, NULL},
/* e */     {OFF_CANCEL, STE, NULL}
};

HIDDEN FSMACT ogrdacts [] = {   /* report */
/* F2 */    {OFF_RDECLARE, STF2, NULL},
/* b */     {OFF_DECLINREP, STB, NULL},
/* e */     {OFF_CANCEL, STE, NULL}
};

HIDDEN FSMACT ogreacts [] = {   /* decline*/
/* F2 */   {OFF_PDECLARE, STF2, NULL}
};

HIDDEN FSMACT ogrfacts [] = {   /* cancel */
/* F2 */    {OFF_RDECLARE, STF2, NULL}
};

HIDDEN FSMROW ogrrow [] = {
           {2, ogriact},
/* A */    {8, ograacts},
/* B */    {6, ogrbacts},
/* C */    {0, 0},
/* D */    {3, ogrdacts},
/* E */    {1, ogreacts},
/* F */    {1, ogrfacts},
/* F1 */   {0, 0},
/* F2 */   {0, 0}
};
```

/****** Finite State Machine: Ask Question to More Than One Person */

```
HIDDEN FSMACT qgriact [] = {
/* a */     {QUESGRP, STA, NULL},
/* F2 */    {Q_PDECLARE, STF2, QIACT_Q_PDECLARE}, /* listnr OBSERVER, not REQUESTOR, */
/* F2 */    {Q_RDECLARE, STF2, QIACT_Q_RDECLARE} /* listnr OBSERVER, not PROMISOR */
};

HIDDEN FSMACT qgraacts [] = {   /* request */
/* d */     {Q_REPORT, STD, QGRAACT_Q_REPORT},
/* b */     {Q_PROMISE, STB, QGRAACT_Q_PROMISE},
/* ad */    {Q_DELEG, STAD, NULL},
```

```
/* e */     {Q_PDECLINE, STE, QGRAACT_Q_PDECLINE},
/* F2 */    {Q_RDECLARE, STF2, NULL},
/* a */     {Q_CANEREQ, STA, NULL},
/* f */     {Q_CANCEL, STF, NULL}
};

HIDDEN FSMACT qgrbacts [] = {   /* promise */
/* d */     {Q_REPORT, STD, QGRAACT_Q_REPORT},
/* bd */    {Q_DELEG, STBD, NULL},
/* h */     {Q_REVREPR, STH, QGRBACT_Q_REVREPR},
/* e */     {Q_REVOKE, STE, QGRBACT_Q_REVOKE},
/* b */     {Q_INTREPORT, STB, QGRAACT_Q_INTREPORT},
/* F2 */    {Q_RDECLARE, STF2, NULL},
/* a */     {Q_CANEREQ, STA, NULL},
/* f */     {Q_CANCEL, STF, NULL}
};

HIDDEN FSMACT qgrdacts [] = {     /* report */
/* F2 */    {Q_RDECLARE, STF2, NULL},
/* b */     {Q_DECLINREP, STB, NULL},
/* a */    {Q_CANEREQ, STA, NULL}
};

HIDDEN FSMACT qgreacts [] = {   /* decline */
/* F2 */    {Q_RDECLARE, STF2, NULL}
};

HIDDEN FSMACT qgrfacts [] = {   /* cancel */
/* F2 */    {Q_PDECLARE, STF2, QGRFACTS_Q_PDECLARE},
/* F2 */    {Q_RDECLARE, STF2, NULL}
};

HIDDEN FSMACT qgradacts [] = {     /* request,delegating */
/*delegating actions*/
/* a */    {Q_REPCOMPDEL, STA, NULL},
/* add */    {Q_ACCDELEG, STADD, NULL},
/* a */    {Q_DECLINDELEG, STA, NULL},
/* a */    {Q_DECLCOMPDEL, STA, NULL},
/* a */    {Q_CANCELDELEG, STA, NULL},
/*request actions*/
/* dd */     {Q_REPORT, STDD, QGRAACT_Q_REPORT},
/* bd */     {Q_PROMISE, STBD, QGRAACT_Q_PROMISE},
/* ed */     {Q_PDECLINE, STED, QGRAACT_Q_PDECLINE},
/* F2D */    {Q_RDECLARE, STF2D, NULL},
/* ad */    {Q_CANEREQ, STAD, NULL},
/* fd */     {Q_CANCEL, STFD, NULL}
};

HIDDEN FSMACT qgrbdacts [] = {     /* promise, delegating */
/*delegating actions*/
/* b */    {Q_REPCOMPDEL, STB, NULL},
/* bdd */    {Q_ACCDELEG, STBDD, NULL},
/* b */    {Q_DECLINDELEG, STB, NULL},
/* b */    {Q_DECLCOMPDEL, STB, NULL},
/* b */    {Q_CANCELDELEG, STB, NULL},
/*promise actions*/
/* dd */     {Q_REPORT, STDD, QGRAACT_Q_REPORT},
/* bd */     {Q_REVREPR, STBD, QGRBACT_Q_REVREPR},
/* ed */     {Q_REVOKE, STED, QGRBACT_Q_REVOKE},
/* bd */     {Q_INTREPORT, STBD, QGRAACT_Q_INTREPORT},
/* F2d */    {Q_RDECLARE, STF2D, NULL},
/* ad */    {Q_CANEREQ, STAD, NULL},
/* fd */     {Q_CANCEL, STFD, NULL}
};

HIDDEN FSMACT qgrddacts [] = {     /* report, delegating */
/*delegating actions*/
/* d */    {Q_REPCOMPDEL, STD, NULL},
/* ddd */    {Q_ACCDELEG, STDDD, NULL},
/* d */    {Q_DECLINDELEG, STD, NULL},
/* d */    {Q_DECLCOMPDEL, STD, NULL},
/* d */    {Q_CANCELDELEG, STD, NULL},
/*report actions*/
/* F2D */    {Q_RDECLARE, STF2D, NULL},
```

```
/* ad */    {Q_CANEREQ, STAD, NULL},
/* bd */     {Q_DECLINREP, STBD, NULL}
};

HIDDEN FSMACT qgredacts [] = {     /* decline, delegating */
/*delegating actions*/
/* e */    {Q_REPCOMPDEL, STE, NULL},
/* edd */    {Q_ACCDELEG, STEDD, NULL},
/* e */    {Q_DECLINDELEG, STE, NULL},
/* e */    {Q_CANCELDELEG, STE, NULL},
/* e */    {Q_DECLCOMPDEL, STE, NULL},
/*decline actions*/
/* F2D */    {Q_RDECLARE, STF2D, NULL}
};

HIDDEN FSMACT qgrfdacts [] = {     /* cancel, delegating */
/*delegating actions*/
/* f */    {Q_REPCOMPDEL, STF, NULL},
/* fdd */    {Q_ACCDELEG, STFDD, NULL},
/* f */    {Q_DECLINDELEG, STF, NULL},
/* f */    {Q_DECLCOMPDEL, STF, NULL},
/* f */    {Q_CANCELDELEG, STF, NULL},
/*cancel actions*/
/* F2D */    {Q_PDECLARE, STF2D, QGRFACTS_Q_PDECLARE},
/* F2D */    {Q_RDECLARE, STF2D, NULL}
};

HIDDEN FSMACT qgrf2dacts [] = {     /* final, delegating */
/*delegating actions*/
/* F2dd */    {Q_ACCDELEG, STF2DD, NULL},
/* F2 */    {Q_DECLINDELEG, STF2, NULL},
/* F2 */    {Q_REPCOMPDEL, STF2, NULL},
/* F2 */    {Q_DECLCOMPDEL, STF2, NULL},
/* F2 */    {Q_CANCELDELEG, STF2, NULL}
/* no final actions*/
};

HIDDEN FSMACT qgraddacts [] = {     /* request,delegated */
/* delegated actions */
/* a */    {Q_REPCOMPDEL, STA, NULL},
/* a */    {Q_REVDELEG, STA, NULL},
/* a */    {Q_DECLCOMPDEL, STA, NULL},
/* a */    {Q_CANCELDELEG, STA, NULL},
/* request actions */
/* ddd */     {Q_REPORT, STDDD, QGRAACT_Q_REPORT},
/* bdd */     {Q_PROMISE, STBDD, QGRAACT_Q_PROMISE},
/* edd */     {Q_PDECLINE, STEDD, QGRAACT_Q_PDECLINE},
/* F2DD */    {Q_RDECLARE, STF2DD, NULL},
/* add */    {Q_CANEREQ, STADD, NULL},
/* fdd */     {Q_CANCEL, STFDD, NULL}
};

HIDDEN FSMACT qgrbddacts [] = {     /* promise, delegated */
/* delegated actions */
/* b */    {Q_REPCOMPDEL, STB, NULL},
/* b */    {Q_REVDELEG, STB, NULL},
/* b */    {Q_DECLCOMPDEL, STB, NULL},
/* b */    {Q_CANCELDELEG, STB, NULL},
/*promise actions*/
/* ddd */     {Q_REPORT, STDDD, QGRAACT_Q_REPORT},
/* bdd */     {Q_REVREPR, STBDD, QGRBACT_Q_REVREPR},
/* edd */     {Q_REVOKE, STEDD, QGRBACT_Q_REVOKE},
/* bdd */     {Q_INTREPORT, STBDD, QGRAACT_Q_INTREPORT},
/* F2dd */    {Q_RDECLARE, STF2DD, NULL},
/* add */    {Q_CANEREQ, STADD, NULL},
/* fdd */     {Q_CANCEL, STFDD, NULL}
};

HIDDEN FSMACT qgrdddacts [] = {     /* report, delegated */
/* delegated actions */
/* d */    {Q_REPCOMPDEL, STD, NULL},
/* d */    {Q_REVDELEG, STD, NULL},
/* d */    {Q_DECLCOMPDEL, STD, NULL},
/* d */    {Q_CANCELDELEG, STD, NULL},
/* report actions */
```

```
/* F2DD */    {Q_RDECLARE, STF2DD, NULL},
/* add */    {Q_CANEREQ, STADD, NULL},
/* bdd */     {Q_DECLINREP, STBDD, NULL}
};

HIDDEN FSMACT qgreddacts [] = {     /* decline, delegated */
/* delegated actions */
/* e */    {Q_REPCOMPDEL, STA, NULL},
/* e */    {Q_REVDELEG, STA, NULL},
/* e */    {Q_DECLCOMPDEL, STA, NULL},
/* e */    {Q_CANCELDELEG, STA, NULL},
/* decline actions */
/* F2DD */    {Q_RDECLARE, STF2DD, NULL}
};

HIDDEN FSMACT qgrfddacts [] = {     /* cancel, delegated */
/* delegated actions */
/* f */    {Q_REPCOMPDEL, STF, NULL},
/* f */    {Q_REVDELEG, STF, NULL},
/* f */    {Q_DECLCOMPDEL, STF, NULL},
/* f */    {Q_CANCELDELEG, STF, NULL},
/* cancel actions */
/* F2DD */    {Q_PDECLARE, STF2DD, QGRFACTS_Q_PDECLARE},
/* F2DD */    {Q_RDECLARE, STF2DD, NULL}
};

HIDDEN FSMACT qgrf2ddacts [] = {     /* final, delegated */
/* delegated actions */
/* F2 */    {Q_REPCOMPDEL, STF2, NULL},
/* F2 */    {Q_REVDELEG, STF2, NULL},
/* F2 */    {Q_DECLCOMPDEL, STF2, NULL},
/* F2 */    {Q_CANCELDELEG, STF2, NULL}
/* no final actions */
};

HIDDEN FSMROW qgrrow [] = {
                {3, qgriact},
/* A */         {7, qgraacts},
/* B */         {8, qgrbacts},
/* C */         {0, NULL},
/* D */         {3, qgrdacts},
/* E */         {1, qgreacts},
/* F */         {2, qgrfacts},
/* F1 */        {0, NULL},              /* final */
/* F2 */        {0, NULL},              /* final */
/* G */         {0, NULL},
/* H */         {0, NULL},
/* AD */        {11, qgradacts},
/* BD */        {12, qgrbdacts},
/* CD */        {0, NULL},
/* DD */        {8, qgrddacts},
/* ED */        {6, qgredacts},
/* FD */        {7, qgrfdacts},
/* GD */        {0, NULL},
/* HD */        {0, NULL},
/* F2D */       {5, qgrf2dacts},
/* ADD */       {10, qgraddacts},
/* BDD */       {11, qgrbddacts},
/* CDD */       {0, NULL},
/* DDD */       {7, qgrdddacts},
/* EDD */       {5, qgreddacts},
/* FDD */       {6, qgrfddacts},
/* GDD */       {0, NULL},
/* HDD */       {0, NULL},
/* F2DD */      {4, qgrf2ddacts},
};
```

/****** Finite State Machine: Inform More Than One Person */

```
/* goes into both states:
|* F *|    {INF_PDECLARE, STFF, NULL}
*/
```

```
HIDDEN FSMACT igriact [] = {
/* a */     {FYIGRP, STA, NULL},
/* F */     {INF_RDECLARE, STFF, IIACT_INF_RDECLARE}
};

HIDDEN FSMACT igraacts [] = {   /* offer */
/* F */    {INF_RDECLARE, STFF, NULL},
/* f */     {INF_REVOKE, STFF, NULL},
/* a */     {INF_INTREPORT, STA, NULL}
};

HIDDEN FSMROW igrrow [] = {
    {2, igriact},
    {3, igraacts},
    {0, NULL}           /* final */
};
```

/****** Finite State Machine: What If?? Conversation with More Than One Person (Group Conversation for Possibilities) */

```
HIDDEN FSMACT cpgriact [] = {
/* a */     {CFPGRP, STA, NULL},
/* a */     {CFP_CFPRANSWER, STA, NULL},
/* a */     {CFP_CFPPANSWER, STA, NULL},
/* F */     {CFP_CFPDECLARE, STCPF, NULL}
};

HIDDEN FSMACT cpgraacts [] = {
/* a */     {CFP_CFPPANSWER, STA, NULL},
/* a */     {CFP_CFPRANSWER, STA, NULL},
/* F */     {CFP_CFPDECLARE, STCPF, NULL}
};

HIDDEN FSMROW cpgrrow [] = {
    {4, cpgriact},
    {3, cpgraacts},
    {0, NULL}           /* final */
};
```

/****** Finite State Machine: Request to Myself */

```
HIDDEN FSMACT rmiact [] = {
/* a */     {REQMYSELF, STA, RMIACT_REQUEST},
/* G */     {REQ_STPROMYSELF, STG, RMIACT_STPROMYSELF},
/* F2 */    {REQ_PDECLARE, STF2, RMIACT_REQ_PDECLARE}, /* listnr OBSERVER, not REQUESTOR, */
/* F2 */    {REQ_RDECLARE, STF2, RMIACT_REQ_RDECLARE} /* listnr OBSERVER, not PROMISOR */
};

HIDDEN FSMACT rmaacts [] = {    /* request */
/* b */     {REQ_YES, STB, RMAACT_REQ_YES}, /* PROMISOR speaks, is REQUESTOR after */
/* c */     {REQ_COUNTER, STC, RMAACT_REQ_COUNTER}, /* PROMISOR speaks, is REQU'OR after */
/* F2 */    {REQ_RDECLARE, STF2, RMAACT_REQ_RDECLARE}, /* listener: NULL, NULL */
/* d */     {REQ_REPORT, STD, RMAACT_REQ_REPORT}, /* PROMISOR speaks, is REQU'OR after */
/* a */     {REQ_CANEREQ, STA, RMAACT_REQ_CANEREQ}, /* PROMISOR speaks, PROMISOR listens */
/* e */     {REQ_PDECLINE, STE, RMAACT_REQ_PDECLINE}, /* PROMISOR speaks,is REQU'OR after */
/* f */     {REQM_CANCEL, STF, RMAACT_REQM_CANCEL}, /* listener: NULL, NULL */
/* g */     {REQ_COMTOCOM, STA, RMAACT_REQ_COMTOCOM}, /* listener: NULL, NULL */
};

HIDDEN FSMACT rmbacts [] = {    /* promise */
/* F2 */    {REQ_RDECLARE, STF2, RMBACT_REQ_RDECLARE}, /* listener: NULL, NULL */
/* d */     {REQ_REPORT, STD, RMBACT_REQ_REPORT}, /* PROMISOR speaks, is REQU'OR after */
/* b */     {REQ_REVREPR, STB, RMBACT_REQ_REVREPR}, /* listener: NULL, NULL */
/* a */     {REQ_CANEREQ, STA, RMBACT_REQ_CANEREQ}, /* PROMISOR cancels req */
/* f */     {REQM_CANCEL, STF, RMBACT_REQM_CANCEL}, /* listener: NULL, NULL */
/* b */     {REQ_INTREPORT, STB, RMBACT_REQ_INTREPORT} /* listener: NULL, NULL */
};

HIDDEN FSMACT rmcacts [] = {    /* counter */
/* b */     {REQ_ACCEPT, STB, RMCACT_REQ_ACCEPT},
```

```
/* a */     {REQ_RCOUNTER, STA, RMCACT_REQ_RCOUNTER},   /* OJO adjust delta */
/* a */     {REQ_RDECLINE, STA, RMCACT_REQ_RDECLINE},
/* F2 */    {REQ_RDECLARE, STF2, RMCACT_REQ_RDECLARE},
/* a */     {REQ_CANEREQ, STA, RMCACT_REQ_CANEREQ},
/* f */     {REQM_CANCEL, STF, RMCACT_REQM_CANCEL},
/* g */     {OFF_COMTOCOM, STC, RMCACT_OFF_COMTOCOM}
};

HIDDEN FSMACT rmdacts [] = {     /* report */
/* F2 */    {REQ_RDECLARE, STF2, RMDACT_REQ_RDECLARE},
/* a */    {REQ_CANEREQ, STA, RMDACT_REQ_CANEREQ},
/* b */     {REQ_DECLINREP, STB, RMDACT_REQ_DECLINREP},
/* f */     {REQM_CANCEL, STF, RMDACT_REQM_CANCEL}
};

HIDDEN FSMACT rmeacts [] = {    /* decline */
/* F2 */    {REQ_RDECLARE, STF2, RMEACT_REQ_RDECLARE},
/* a */     {REQ_RECONSDEC, STA, RMEACT_REQ_RECONSDEC},
};

HIDDEN FSMACT rmfacts [] = {    /* cancel */
/* F2 */    {REQ_RDECLARE, STF2, RMFACT_REQ_RDECLARE},
/* a */     {REQ_RECONSREV, STA, RMFACT_REQ_RECONSREV},
};

HIDDEN FSMACT rmgacts [] = {    /* opening promise */
/* b */     {REQ_ACCEPTOPPR, STB, NULL},
/* f */     {REQ_DECLOPPR, STF, NULL},
/* F2 R*/     {REQ_RDECLARE, STF2, NULL},
/* d */     {REQ_REPORT, STD, NULL},
/* h */     {REQ_REVREPR, STH, NULL},
/* e */     {REQ_REVOKE, STE, NULL},
/* b */     {REQ_INTREPORT, STB, NULL}
};

HIDDEN FSMROW rmrow [] = {
                {4, rmiact},
/* A */         {8, rmaacts},
/* B */         {6, rmbacts},
/* C */         {7, rmcacts},
/* D */         {4, rmdacts},
/* E */         {2, rmeacts},
/* F */         {2, rmfacts},
/* F1 */        {0, 0},
/* F2 */        {0, 0},
/* G */         {7, rmgacts}
};
```

/****** Finite State Machine: Offer to Myself */

```
HIDDEN FSMACT omiact [] = {
/* a */     {OFFMYSELF, STA, NULL},
/* F2 */    {OFF_RDECLARE, STF2, OIACT_OFF_RDECLARE}
};

HIDDEN FSMACT omaacts [] = {    /* offer */
/* b */     {OFF_ACCEPT, STB, NULL},
/* c */     {OFF_COUNTER, STC, NULL},
/* e */     {OFF_RDECLINE, STE, NULL},
/* F2 */    {OFF_RDECLARE, STF2, NULL},
/* g */     {OFF_COMTOCOM, STA, NULL},
/* d */     {OFF_REPORT, STD, NULL},
/* a */     {OFF_REVREOFF, STA, NULL},
/* f */     {OFF_REVOKE, STF, NULL},
/* a */     {OFF_INTREPORT, STA, NULL}
};

HIDDEN FSMACT ombacts [] = {    /* accept */
/* d */     {OFF_REPORT, STD, NULL},
/* b */     {OFF_REVREOFF, STB, NULL},
/* f */     {OFF_REVOKE, STF},
/* b */     {OFF_INTREPORT, STB, NULL},
/* F2 */    {OFF_RDECLARE, STF2, NULL},
/* e */     {OFF_CANCEL, STE, NULL}
};
```

```
HIDDEN FSMACT omcacts [] = {    /* counter */
/* b */     {OFF_PROMISE, STB, NULL},
/* a */     {OFF_PCOUNTER, STA, NULL},
/* a */     {OFF_PDECLINE, STA, NULL},
/* f */     {OFF_REVOKE, STF, NULL},
/* d */     {OFF_REPORT, STD, NULL},
/* c */     {OFF_INTREPORT, STC, NULL},
/* e */     {OFF_RRETRACT, STE, NULL},
/* c */     {OFF_RREVREOFF, STC, NULL},
/* F2 */    {OFF_RDECLARE, STF2, NULL}
};

HIDDEN FSMACT omdacts [] = {    /* report */
/* F2 */    {OFF_RDECLARE, STF2, NULL},
/* b */     {OFF_DECLINREP, STB, NULL},
/* e */     {OFF_CANCEL, STE, NULL}
};

HIDDEN FSMACT omeacts [] = {    /* decline*/
/* a */   {OFF_RECONSCAN, STA, NULL},
/* F2 */  {OFF_PDECLARE, STF2, NULL}
};

HIDDEN FSMACT omfacts [] = {    /* cancel */
/* c */   {OFF_RECONSDEC, STC, NULL},
/* F2 */   {OFF_RDECLARE, STF2, NULL}
};

HIDDEN FSMROW omrow [] = {
          {2, omiact},
/* A */   {9, omaacts},
/* B */   {6, ombacts},
/* C */   {9, omcacts},
/* D */   {3, omdacts},
/* E */   {2, omeacts},
/* F */   {2, omfacts},
/* F1 */  {0, 0},
/* F2 */  {0, 0}
};
```

/****** Finite State Machine: Question to Myself */

```
HIDDEN FSMACT qmiact [] = {
/* a */     {QUESMYSELF, STA, QMIACT_REQUEST},
/* FF */    {Q_PDECLARE, STFF, QMIACT_PDECLARE},
/* FF */    {Q_RDECLARE, STFF, QMIACT_RDECLARE}
};

HIDDEN FSMACT qmaacts [] = {    /* request */
/* FF */    {Q_RDECLARE, STFF, QMAACT_Q_RDECLARE},
/* b */     {Q_PROMISE, STB, QMAACT_Q_PROMISE},
/* a */     {Q_CANEREQ, STA, QMAACT_Q_CANEREQ},
/* FF */    {Q_CANCEL, STFF, QMAACT_Q_CANCEL}
};

HIDDEN FSMACT qmbacts [] = {    /* promise */
/* FF */    {Q_RDECLARE, STFF, QMBACT_Q_RDECLARE},
/* b */     {Q_REVREPR, STB, QMBACT_Q_REVREPR},
/* a */     {Q_CANEREQ, STA, QMBACT_Q_CANEREQ},
/* FF */    {Q_CANCEL, STFF, QMBACT_Q_CANCEL},
/* b */     {Q_INTREPORT, STB, QMBACT_Q_INTREPORT}
};

HIDDEN FSMROW qmrow [] = {
              {3, qmiact},
/* A */       {4, qmaacts},
/* B */       {5, qmbacts},
/* FF */      {0, NULL}              /* final */
};
```

/****** Finite State Machine: Inform Myself */

```
HIDDEN FSMACT imiact [] = {
/* a */     {FYIMYSELF, STA, NULL}, /* listener: NULL, NULL */
/* f */     {INF_RDECLARE, STFF, IMIACT_INF_RDECLARE}, /* listener: NULL, NULL */
};

HIDDEN FSMACT imaacts [] = {    /* offer */
/* f */     {INF_REVOKE, STFF, IMAACT_INF_REVOKE}, /* listener: NULL, NULL */
/* a */     {INF_INTREPORT, STA, IMAACT_INF_INTREPORT}, /* listener: NULL, NULL */
/* f */     {INF_RDECLARE, STFF, IMIACT_INF_RDECLARE}, /* listener: NULL, NULL */
};

HIDDEN FSMROW imrow [] = {
    {2, imiact},
    {3, imaacts},
    {0, NULL}          /* final */
};
```

/****** Finite State Machine: "What If?" Conversation with Myself ("Conversation for Possibilities" with Myself) */

```
HIDDEN FSMACT cpmiact [] = {
/* a */     {CFPMYSELF, STA, NULL},
/* a */     {CFPM_ANSWER, STA, NULL},
/* a */     {CFP_CFPPANSWER, STA, NULL},
/* F */     {CFPM_DECLARE, STCPF, CPMIACT_CFPM_DECLARE}
};

HIDDEN FSMACT cpmaacts [] = {
/* a */     {CFPM_ANSWER, STA, NULL},
/* a */     {CFP_CFPPANSWER, STA, NULL},
/* F */     {CFPM_DECLARE, STCPF, NULL}
};

HIDDEN FSMROW cpmrow [] = {
    {4, cpmiact},
    {3, cpmaacts},
    {0, NULL}          /* final */
};
```

/****** Finite State Machine: Note to Myself */

```
HIDDEN FSMACT nslfiact [] = {
/* i */     {NOTEMYSELF, STI, NULL},
/* i */     {NOTEANSWER, STI, NULL}
};

HIDDEN FSMROW nselfrow [] = {
    {2, nslfiact},
};
```

Table 26

Table of Token Patterns

<table>
<tr><th>Token Pattern Name</th><th>: Speaker Incompletion Tokens</th><th>: Listener Incompletion Tokens</th></tr>
<tr><td>TKPAT_NULL</td><td>: NULL</td><td>: NULL</td></tr>
<tr><td>TKPAT_REQUEST</td><td>: TKRMFON | TKRHRON</td><td>: TKPHFON | TKPMRON</td></tr>
<tr><td>TKPAT_REQ_YES</td><td>: TKPMFON | TKPMROFF</td><td>: TKRHFON | TKRHROFF</td></tr>
<tr><td>TKPAT_REQ_COUNTER</td><td>: TKPMFON | TKPHRON | TKPMROFF</td><td>: TKRHFON | TKRHROFF | TKRMRON</td></tr>
<tr><td>TKPAT_REQ_REPORT</td><td>: TKPMFOFF | TKPHRON | TKPMROFF</td><td>: TKRHROFF | TKRMRON</td></tr>
<tr><td>TKPAT_REQ_PDECLINE</td><td>: TKPHFOFF | TKPHRON | TKPMROFF</td><td>: TKRHROFF | TKRMRON</td></tr>
<tr><td>TKPAT_REQ_COMTOCOM</td><td>: TKPMRON</td><td>: TKRHRON</td></tr>
<tr><td>TKPAT_REQ_RDECLARE</td><td>: TKRHFOFF | TKRMFOFF | TKRMROFF | TKRHROFF</td><td>: TKPHFOFF | TKPMFOFF | TKPHROFF | TKPMROFF</td></tr>
<tr><td>TKPAT_REQ_CANEREQ</td><td>: TKRHFOFF | TKRMFON | TKRMROFF | TKRHRON</td><td>: TKPHFON | TKPMFOFF | TKPHROFF | TKPMRON</td></tr>
<tr><td>TKPAT_REQ_CANCEL</td><td>: TKRMFOFF | TKRHRON</td><td>: TKPHFOFF | TKPMRON</td></tr>
<tr><td>TKPAT_REQ_REVREPR</td><td>: TKPMFON | TKPMROFF | TKPHRON</td><td>: TKRHFON | TKRHROFF | TKRMRON</td></tr>
<tr><td>TKPAT_REQ_REVOKE</td><td>: TKPMFOFF | TKPHRON | TKPMROFF</td><td>: TKRHFOFF | TKRHROFF | TKRMRON</td></tr>
<tr><td>TKPAT_REQ_ACCEPT</td><td>: TKRMFON | TKRMROFF</td><td>: TKPHFON | TKPHROFF</td></tr>
</table>

```
TKPAT_REQ_RDECLINE     : TKRHFOFF | TKRHRON | TKRMROFF             : TKPMFOFF | TKPHROFF | TKPMRON
TKPAT_REQ_DECLINREP    : TKRHFON | TKRMFON | TKRHRON | TKRMROFF    : TKPHFON | TKPMFON | TKPHROFF | TKPMRON
TKPAT_REQ_PDECLARE     : TKPHROFF | TKPMROFF                       : TKRHROFF | TKRMROFF
TKPAT_OFF_COMTOCOM     : TKRMRON                                   : TKPHRON
TKPAT_OFF_REVOKE       : TKRHFOFF | TKRMFOFF | TKRHROFF | TKRMROFF: TKPHFOFF | TKPMFOFF | TKPHROFF | TKPMROFF
TKPAT_OFF_RDECLINE     : TKRHFOFF | TKRHRON | TKRMROFF             : TKPHROFF | TKPMRON
TKPAT_REQ_INSISTDEC    : TKRMFON | TKRHRON | TKRMROFF              : TKPHFON | TKPHROFF | TKPMRON
TKPAT_OFF_CANCEL       : TKRHFOFF | TKRMFOFF | TKRHROFF | TKRMROFF: TKPHFOFF | TKPMRON
TKPAT_OFF_PDECLARE     : TKPMFOFF | TKPHROFF | TKPMROFF            : TKRHROFF | TKRMROFF
TKPAT_OFF_RDECLARE     : TKRMROFF                                  : TKPMFOFF | TKPHROFF
TKPAT_CFP_CFPOPEN      : TKRHRON                                   : TKPMRON
TKPAT_CFP_CFPPANSWER   : TKPHRON | TKPMROFF                        : TKRHROFF | TKRMRON
TKPAT_CFP_CFPRANSWER   : TKRHRON | TKRMROFF                        : TKPHROFF | TKPMRON
TKPAT_CFP_CFPDECLARE   : TKRHROFF | TKRMROFF                       : TKPHROFF | TKPMROFF
TKPAT_REQ_RBACT_CANCEL : TKRHFOFF | TKRMFOFF | TKRHRON             : TKPHFOFF | TKPMFOFF | TKPMRON
TKPAT_REQ_RCACT_CANCEL : TKRHFOFF | TKRMFOFF | TKRHRON | TKRMROFF  : TKPMFOFF | TKPHFOFF | TKPMRON | TKPHROFF
TKPAT_REQ_RCACT_COUNTER: TKRHFOFF | TKRMFON | TKRHRON | TKRMROFF   : TKPMFOFF | TKPHFON | TKPMRON | TKPHROFF
TKPAT_OFF_COUNTER      : TKRMFON | TKRHRON | TKRMROFF              : TKPHFON | TKPMRON | TKPHROFF
TKPAT_OFF_PDECLINE     : TKPHFOFF | TKPHRON | TKPMROFF             : TKRMFOFF | TKRMRON | TKRHROFF
TKPAT_CFPM_OPEN        : TKRMRON                                   : NULL
TKPAT_CFPM_DECLARE     : TKRMROFF                                  : NULL
TKPAT_OFF_OFFER        : TKPMFON | TKPHRON                         : TKRHFON | TKRMRON
TKPAT_REQ_STPROMISE    : TKPMFON | TKPHFON | TKPHRON               : TKRHFON | TKRMRON
TKPAT_NOTE             : TKRHRON | TKRMROFF                        : TKRHROFF | TKRMRON
TKPAT_REQ_RCOUNTER     : TKRMFON | TKRHRON | TKRMROFF              : TKPHFON | TKPHROFF | TKPMRON
TKPAT_FUP_REQUESTOR    : TKRMROFF | TKRHRON                        : TKRHROFF | TKRMRON
TKPAT_FUP_PROMISOR     : TKPMROFF | TKPHRON                        : TKPHROFF | TKPMRON
TKPAT_Q_PROMISE        : TKPMFON | TKPMRON                         : TKRHFON | TKRHR
```

Table 27

Table of Non-Standard Transitions

```
Transition Name      Data Elements

                     {Speaker's Role after transition,
                     Listener's Role before transition,
                     Listener's Role after transition,
                     Token Pattern after transition}
-------------        ----------------------------------

RMIACT_STPROMYSELF   {PROMISOR,
                     PROMISOR,
                     PROMISOR,
                     TKPAT_REQ_STPROMISE},

RMIACT_REQUEST       {PROMISOR,
                     PROMISOR,
                     PROMISOR,
                     TKPAT_REQUEST},

RMIACT_REQ_PDECLARE  {PROMISOR,
                     OBSERVER,
                     OBSERVER,
                     TKPAT_NULL},

RMIACT_REQ_RDECLARE  {REQUESTOR,
                     OBSERVER,
                     OBSERVER,
                     TKPAT_NULL},

RMAACT_REQ_YES       {PROMISOR,
                     PROMISOR,
                     PROMISOR,
                     TKPAT_REQ_YES},

RMAACT_REQ_COUNTER   {REQUESTOR,
                     REQUESTOR,
                     REQUESTOR,
                     TKPAT_REQ_COUNTER},

RMAACT_REQ_RDECLARE  {PROMISOR,
                     NULL,
                     NULL,
                     TKPAT_REQ_RDECLARE},
```

```
RMAACT_REQ_REPORT        {REQUESTOR,
                          REQUESTOR,
                          REQUESTOR,
                          TKPAT_REQ_REPORT},

RMAACT_REQ_CANEREQ       {PROMISOR,
                          PROMISOR,
                          PROMISOR,
                          TKPAT_REQ_CANEREQ},

RMAACT_REQ_PDECLINE      {REQUESTOR,
                          REQUESTOR,
                          REQUESTOR,
                          TKPAT_REQ_PDECLINE},

RMAACT_REQM_CANCEL       {PROMISOR,
                          NULL,
                          NULL,
                          TKPAT_REQ_RCACT_CANCEL},

RMAACT_REQ_COMTOCOM      {PROMISOR,
                          NULL,
                          NULL,
                          TKPAT_REQ_COMTOCOM},

RMAACT_REQ_INTREPORT     {PROMISOR,
                          NULL,
                          NULL,
                          TKPAT_REQ_COMTOCOM},

RMBACT_REQ_RDECLARE      {PROMISOR,
                          NULL,
                          NULL,
                          TKPAT_REQ_RDECLARE},

RMBACT_REQ_REPORT        {REQUESTOR,
                          REQUESTOR,
                          REQUESTOR,
                          TKPAT_REQ_REPORT},

RMBACT_REQ_REVREPR       {PROMISOR,
                          NULL,
                          NULL,
                          TKPAT_REQ_REVREPR},

RMBACT_REQ_CANEREQ       {PROMISOR,
                          PROMISOR,
                          PROMISOR,
                          TKPAT_REQ_CANEREQ},

RMBACT_REQM_CANCEL       {PROMISOR,
                          NULL,
                          NULL,
                          TKPAT_REQ_RCACT_CANCEL},

RMBACT_REQ_INTREPORT     {PROMISOR,
                          NULL,
                          NULL,
                          TKPAT_REQ_COMTOCOM},

RMCACT_REQ_ACCEPT        {PROMISOR,
                          PROMISOR,
                          PROMISOR,
                          TKPAT_REQ_ACCEPT},

RMCACT_REQ_RCOUNTER      {PROMISOR,
                          PROMISOR,
                          PROMISOR,
                          TKPAT_REQ_RCACT_COUNTER},

RMCACT_REQ_RDECLINE      {PROMISOR,
                          PROMISOR,
                          PROMISOR,
                          TKPAT_REQ_RDECLINE},
```

```
RMCACT_REQ_RDECLARE      {REQUESTOR,
                          NULL,
                          NULL,
                          TKPAT_REQ_RDECLARE},

RMCACT_REQ_CANEREQ       {PROMISOR,
                          PROMISOR,
                          PROMISOR,
                          TKPAT_REQ_CANEREQ},

RMCACT_REQM_CANCEL       {REQUESTOR,
                          NULL,
                          NULL,
                          TKPAT_REQ_RCACT_CANCEL},

RMCACT_OFF_COMTOCOM      {REQUESTOR,
                          NULL,
                          NULL,
                          TKPAT_OFF_COMTOCOM},

RMDACT_REQ_RDECLARE      {REQUESTOR,
                          NULL,
                          NULL,
                          TKPAT_REQ_RDECLARE},

RMDACT_REQ_CANEREQ       {PROMISOR,
                          PROMISOR,
                          PROMISOR,
                          TKPAT_REQ_CANEREQ},

RMDACT_REQ_DECLINREP     {PROMISOR,
                          PROMISOR,
                          PROMISOR,
                          TKPAT_REQ_DECLINREP},

RMDACT_REQM_CANCEL       {REQUESTOR,
                          NULL,
                          NULL,
                          TKPAT_REQ_RCACT_CANCEL},

RMEACT_REQ_RDECLARE      {REQUESTOR,
                          NULL,
                          NULL,
                          TKPAT_REQ_RDECLARE},

RMEACT_REQ_RECONSDEC     {PROMISOR,
                          PROMISOR,
                          PROMISOR,
                          TKPAT_REQ_INSISTDEC},

RMEACT_REQ_INSISTDEC     {PROMISOR,
                          PROMISOR,
                          PROMISOR,
                          TKPAT_REQ_INSISTDEC},

RMFACT_REQ_RDECLARE      {REQUESTOR,
                          NULL,
                          NULL,
                          TKPAT_REQ_RDECLARE},

RMFACT_REQ_RECONSREV     {PROMISOR,
                          PROMISOR,
                          PROMISOR,
                          TKPAT_REQ_INSISTDEC},

RMFACT_REQ_INSISTREV     {PROMISOR,
                          PROMISOR,
                          PROMISOR,
                          TKPAT_REQ_INSISTDEC},

QMIACT_REQUEST           {PROMISOR,
                          PROMISOR,
                          PROMISOR,
                          TKPAT_REQUEST},
```

```
QMIACT_PDECLARE         {PROMISOR,
                         NULL,
                         NULL,
                         TKPAT_REQ_RDECLARE},

QMIACT_RDECLARE         {REQUESTOR,
                         NULL,
                         NULL,
                         TKPAT_NULL},

QMAACT_Q_RDECLARE       {PROMISOR,
                         NULL,
                         NULL,
                         TKPAT_REQ_RDECLARE},

QMAACT_Q_PROMISE        {PROMISOR,
                         NULL,
                         NULL,
                         TKPAT_REQ_YES},

QMAACT_Q_CANEREQ        {PROMISOR,
                         NULL,
                         NULL,
                         TKPAT_REQ_CANEREQ},

QMAACT_Q_CANCEL         {PROMISOR,
                         NULL,
                         NULL,
                         TKPAT_REQ_RCACT_CANCEL},

QMAACT_Q_INTREPORT      {PROMISOR,
                         NULL,
                         NULL,
                         TKPAT_REQ_COMTOCOM},

QMBACT_Q_RDECLARE       {PROMISOR,
                         NULL,
                         NULL,
                         TKPAT_REQ_RDECLARE},

QMBACT_Q_REVREPR        {PROMISOR,
                         NULL,
                         NULL,
                         TKPAT_REQ_REVREPR},

QMBACT_Q_CANEREQ        {PROMISOR,
                         NULL,
                         NULL,
                         TKPAT_REQ_CANEREQ},

QMBACT_Q_CANCEL         {PROMISOR,
                         NULL,
                         NULL,
                         TKPAT_REQ_RCACT_CANCEL},

QMBACT_Q_INTREPORT      {PROMISOR,
                         NULL,
                         NULL,
                         TKPAT_REQ_COMTOCOM},

RBACT_REQ_CANCEL        {REQUESTOR,
                         PROMISOR,
                         PROMISOR,
                         TKPAT_REQ_RBACT_CANCEL},

RCACT_REQ_CANCEL        {REQUESTOR,
                         PROMISOR,
                         PROMISOR,
                         TKPAT_REQ_RCACT_CANCEL},

RIACT_REQ_PDECLARE      {PROMISOR,
                         OBSERVER,
                         OBSERVER,
                         TKPAT_NULL},
```

```
RIACT_REQ_RDECLARE        {REQUESTOR,
                           OBSERVER,
                           OBSERVER,
                           TKPAT_NULL},

RIACT_REQ_DECLCOMPDEL     {PROMISOR,
                           OBSERVER,
                           OBSERVER,
                           TKPAT_NULL},

RGRAACT_REQ_YES           {PROMISOR,
                           NULL,
                           NULL,
                           TKPAT_REQ_YES},

RGRAACT_REQ_REPORT        {PROMISOR,
                           NULL,
                           NULL,
                           TKPAT_REQ_REPORT},

RGRAACT_REQ_PDECLINE      {PROMISOR,
                           NULL,
                           NULL,
                           TKPAT_REQ_PDECLINE},
```

Table 28

Move Definition Table

```
#define TIDX_REQ_TIT            0
#define TIDX_REQ                TIDX_REQ_TIT+1
#define TIDX_REQ_YES            TIDX_REQ+1
#define TIDX_REQ_COUNTER        TIDX_REQ+2
#define TIDX_REQ_DELEG          TIDX_REQ+4
#define TIDX_REQ_REPORT         TIDX_REQ+5
#define TIDX_REQ_PDECLINE       TIDX_REQ+6
#define TIDX_REQ_COMTOCOM       TIDX_REQ+7
#define TIDX_REQ_INTREPORT      TIDX_REQ+8
#define TIDX_REQ_RDECLARE       TIDX_REQ+9
#define TIDX_REQ_ACCEPTOPPR     TIDX_REQ+11
#define TIDX_REQ_DECLOPPR       TIDX_REQ+12
#define TIDX_REQ_CANEREQ        TIDX_REQ+13
#define TIDX_REQ_CANCEL         TIDX_REQ+14
#define TIDX_REQ_REVREPR        TIDX_REQ+15
#define TIDX_REQ_REVOKE         TIDX_REQ+16
#define TIDX_REQ_ACCEPT         TIDX_REQ+17
#define TIDX_REQ_RDECLINE       TIDX_REQ+18
#define TIDX_REQ_DECLINREP      TIDX_REQ+19
#define TIDX_REQ_RECONSDEC      TIDX_REQ+20
#define TIDX_REQ_PDECLARE       TIDX_REQ+21
#define TIDX_REQ_RECONSCAN      TIDX_REQ+22
#define TIDX_REQ_RECONSREV      TIDX_REQ+23
#define TIDX_REQ_ACCEPTNEWPR    TIDX_REQ+24
#define TIDX_REQ_DECLNEWPR      TIDX_REQ+25
#define TIDX_REQ_ACCDELEG       TIDX_REQ+26
#define TIDX_REQ_DECLINDELEG    TIDX_REQ+27
#define TIDX_REQ_REPCOMPDEL     TIDX_REQ+28
#define TIDX_REQ_DECLCOMPDEL    TIDX_REQ+29
#define TIDX_REQ_CANCELDELEG    TIDX_REQ+30
#define TIDX_REQ_REVDELEG       TIDX_REQ+31
#define TIDX_REQ_TXINDIV        TIDX_REQ+32
#define TIDX_REQM_CANCEL        TIDX_REQ+33
#define TIDX_REQ_STPROMISE      TIDX_REQ+34     /* Start request with promise */
#define TIDX_REQ_REVRECOUNTER   TIDX_REQ+35
#define TIDX_REQ_REVCOUNTER     TIDX_REQ+36
#define TIDX_REQ_LAST           TIDX_REQ+38
                        /* Added two holes */

#define TIDX_OFF_TIT            TIDX_REQ_LAST+1
#define TIDX_OFF                TIDX_OFF_TIT+1
#define TIDX_OFF_ACCEPT         TIDX_OFF+1
#define TIDX_OFF_COUNTER        TIDX_OFF+2
#define TIDX_OFF_RDECLINE       TIDX_OFF+4
```

```
#define TIDX_OFF_RDECLARE       TIDX_OFF+5
#define TIDX_OFF_COMTOCOM       TIDX_OFF+6
#define TIDX_OFF_REPORT         TIDX_OFF+7
#define TIDX_OFF_REVREOFF       TIDX_OFF+8
#define TIDX_OFF_REVOKE         TIDX_OFF+9
#define TIDX_OFF_INTREPORT      TIDX_OFF+10
#define TIDX_OFF_CANCEL         TIDX_OFF+11
#define TIDX_OFF_RRETRACT       TIDX_OFF+12
#define TIDX_OFF_PROMISE        TIDX_OFF+13
#define TIDX_OFF_PDECLINE       TIDX_OFF+14
#define TIDX_OFF_DECLINREP      TIDX_OFF+15
#define TIDX_OFF_RECONSDEC      TIDX_OFF+16
#define TIDX_OFF_RECONSCAN      TIDX_OFF+17
#define TIDX_OFF_RREVREOFF      TIDX_OFF+18
#define TIDX_OFF_PDECLARE       TIDX_OFF+19
#define TIDX_OFF_LAST           TIDX_OFF+23
                                /* Added four empty slots */

#define TIDX_QUE_TIT            TIDX_OFF_LAST+1
#define TIDX_QUE                TIDX_QUE_TIT+1
#define TIDX_Q_REPORT           TIDX_QUE+1
#define TIDX_Q_PROMISE          TIDX_QUE+2
#define TIDX_Q_DELEG            TIDX_QUE+3
#define TIDX_Q_PDECLINE         TIDX_QUE+4
#define TIDX_Q_INTREPORT        TIDX_QUE+5
#define TIDX_Q_RDECLARE         TIDX_QUE+6
#define TIDX_Q_CANEREQ          TIDX_QUE+8
#define TIDX_Q_CANCEL           TIDX_QUE+9
#define TIDX_Q_REVREPR          TIDX_QUE+10
#define TIDX_Q_REVOKE           TIDX_QUE+11
#define TIDX_Q_DECLINREP        TIDX_QUE+12
#define TIDX_Q_RECONSDEC        TIDX_QUE+13
#define TIDX_Q_PDECLARE         TIDX_QUE+14
#define TIDX_Q_RECONSCAN        TIDX_QUE+15
#define TIDX_Q_RECONSREV        TIDX_QUE+16
#define TIDX_Q_REPCOMPDEL       TIDX_QUE+17
#define TIDX_Q_ACCDELEG         TIDX_QUE+18
#define TIDX_Q_DECLINDELEG      TIDX_QUE+19
#define TIDX_Q_DECLCOMPDEL      TIDX_QUE+20
#define TIDX_Q_CANCELDELEG      TIDX_QUE+21
#define TIDX_Q_REVDELEG         TIDX_QUE+22
#define TIDX_Q_LAST             TIDX_QUE+26
                                /* Added four slots */

#define TIDX_INF_TIT            TIDX_Q_LAST+1
#define TIDX_INF                TIDX_INF_TIT+1
#define TIDX_INF_RDECLARE       TIDX_INF+1
#define TIDX_INF_REVOKE         TIDX_INF+2
#define TIDX_INF_INTREPORT      TIDX_INF+3
#define TIDX_INF_LAST           TIDX_INF+5
                                /* Added two empty slots */

#define TIDX_CFP_CFPOPEN_TIT    TIDX_INF_LAST+1
#define TIDX_CFP_CFPOPEN        TIDX_CFP_CFPOPEN_TIT+1
#define TIDX_CFP_CFPPANSWER     TIDX_CFP_CFPOPEN+1
#define TIDX_CFP_CFPRANSWER     TIDX_CFP_CFPOPEN+2
#define TIDX_CFP_CFPDECLARE     TIDX_CFP_CFPOPEN+3
#define TIDX_CFPM_OPEN          TIDX_CFP_CFPOPEN+4
#define TIDX_CFPM_DECLARE       TIDX_CFP_CFPOPEN+5
#define TIDX_CFPM_ANSWER        TIDX_CFP_CFPOPEN+6
#define TIDX_CFP_LAST           TIDX_CFP_CFPOPEN+12
                                /* Added five empty slots */

#define TIDX_NOTE_TIT           TIDX_CFP_LAST+1
#define TIDX_NOTE               TIDX_NOTE_TIT+1

#define TIDX_GRPCAL             TIDX_NOTE+1
#define TIDX_FOLLOWUP           TIDX_GRPCAL+1
#define TIDX_ANSFREEFORM        TIDX_FOLLOWUP+1
#define TIDX_ACKNOWLEDGE        TIDX_FOLLOWUP+2


#ifdef PC_MAIL
CONVELEM CElemArr [] = {
/* 0 */     {NOTE,
```

```
            ANSFREEFORM,
            REQUESTOR,
            TIDX_NOTE,
            0,
            CE_OPEN | CE_NOTE | CE_SPECULATE,
            OBSERVER,
            OBSERVER,
            OBSERVER,
            0},
/* 1 */     {NOTEANSWER,
            ANSFREEFORM,
            OBSERVER,
            TIDX_NOTE,
            0,
            CE_NOTE | CE_SPECULATE,
            OBSERVER,
            OBSERVER,
            OBSERVER,
            0},
/* 2 */     {NOTEMYSELF,
            ANSFREEFORM,
            REQUESTOR,
            TIDX_NOTE,
            0,
            CE_OPEN | CE_NOTE | CE_SELF | CE_SPECULATE,
            OBSERVER,
            OBSERVER,
            OBSERVER,
            0}
};
#else
CONVELEM CElemArr [] = {
/* 0 */     {TIMERECORD,
            NULL,0,
            0,
            0,
            CE_ACK,
            0,0,0,0},
/* 1 */     {REQUEST,               /* SLIM RMM: specific */
            REQUEST,
            REQUESTOR,
            TIDX_REQ,               /* SLIM RMM: index into text structures */
            0,                      /* SLIM RMM: additonal associated text */
            CE_OPEN | CE_COGENT,
            REQUESTOR,
            PROMISOR,
            PROMISOR,
            TKPAT_REQUEST},
/* 2 */     {OFFER,
            OFFER,
            PROMISOR,
            TIDX_OFF,
            0,
            CE_OPEN | CE_COGENT,
            PROMISOR,
            REQUESTOR,
            REQUESTOR,
            TKPAT_OFF_OFFER},
/* 3 */     {REQMYSELF,
            REQUEST,
            REQUESTOR,
            TIDX_REQ,
            0,
            CE_OPEN | CE_COGENT | CE_SELF,
            REQUESTOR,
            PROMISOR,
            PROMISOR,
            TKPAT_REQUEST},

/* 4 */     {CFPOPEN,
            CFPOPEN,
            REQUESTOR,
            TIDX_CFP_CFPOPEN,
            0,
            CE_OPEN | CE_COGENT | CE_SPECULATE,
```

```
        REQUESTOR,
        OBSERVER,
        OBSERVER,
        TKPAT_CFP_CFPOPEN},

/* 5 */    {CFPMYSELF,
        CFPOPEN,
        REQUESTOR,
        TIDX_CFPM_OPEN,
        0,
        CE_OPEN | CE_COGENT | CE_SELF | CE_SPECULATE,
        REQUESTOR,
        OBSERVER,
        OBSERVER,
        TKPAT_CFPM_OPEN},

/* 6 */    {NOTE,
        ANSFREEFORM,
        REQUESTOR,
        TIDX_NOTE,
        0,
        CE_OPEN | CE_NOTE | CE_SPECULATE,
        OBSERVER,
        OBSERVER,
        OBSERVER,
        TKPAT_NOTE},

/* 7 */    {FYI,
        OFFER,
        PROMISOR,
        TIDX_INF,
        0,
        CE_OPEN | CE_COGENT | CE_SINGLETK,
        PROMISOR,
        REQUESTOR,
        REQUESTOR,
        TKPAT_OFF_OFFER},

/* 8 */    {FYIGRP,
        OFFER,
        PROMISOR,
        TIDX_INF,
        0,
        CE_OPEN | CE_COGENT | CE_SINGLETK,
        PROMISOR,
        REQUESTOR,
        REQUESTOR,
        TKPAT_OFF_OFFER},

/* 9 */    {FYIMYSELF,
        OFFER,
        PROMISOR,
        TIDX_INF,
        0,
        CE_OPEN | CE_COGENT | CE_SELF | CE_SINGLETK,
        REQUESTOR,
        NULL,
        NULL,
        TKPAT_OFF_OFFER},

/* 10 */    {QUESTION,
        REQUEST,
        REQUESTOR,
        TIDX_QUE,
        0,
        CE_OPEN | CE_COGENT | CE_SINGLETK,
        REQUESTOR,
        PROMISOR,
        PROMISOR,
        TKPAT_REQUEST},
/* 11 */    {QUESGRP,
        REQUEST,
        REQUESTOR,
        TIDX_QUE,
        0,
```

```
        CE_OPEN | CE_COGENT | CE_SINGLETK,
        REQUESTOR,
        PROMISOR,
        PROMISOR,
        TKPAT_REQUEST},
/* 12 */   {QUESMYSELF,
        REQUEST,
        REQUESTOR,
        TIDX_QUE,
        0,
        CE_OPEN | CE_COGENT | CE_SELF | CE_SINGLETK,
        REQUESTOR,
        PROMISOR,
        PROMISOR,
        TKPAT_REQUEST},
/* 13 */   {REQGRP,                /* SLIM RMM: specific */
        REQUEST,                /* SLIM RMM: generic */
        REQUESTOR,
        TIDX_REQ,               /* SLIM RMM: index into text structures */
        0,                      /* SLIM RMM: additonal associated text */
        CE_OPEN | CE_COGENT,
        REQUESTOR,
        PROMISOR,
        PROMISOR,
        TKPAT_REQUEST},
/* 14 */   {CFPGRP,
        CFPOPEN,
        REQUESTOR,
        TIDX_CFP_CFPOPEN,
        0,
        CE_OPEN | CE_COGENT | CE_SPECULATE,
        REQUESTOR,
        OBSERVER,
        OBSERVER,
        TKPAT_CFP_CFPOPEN},
/* 15 */   {PROMISE,               /* REQ_YES */
        PROMISE,                /* SLIM RMM: generic move */
        PROMISOR,               /* SLIM RMM: speaking role */
        TIDX_REQ_YES,           /* SLIM RMM: string index */
        0,                      /* SLIM RMM: #add'l strings */
        CE_COGENT | CE_PROMISE, /* SLIM RMM: flags */
        PROMISOR,               /* SLIM RMM: role of speaker after move */
        REQUESTOR,              /* SLIM RMM: role of listener */
        REQUESTOR,              /* SLIM RMM: role of listener after move */
        TKPAT_REQ_YES},                 /* SLIM RMM: token pattern */

       {FOLLOWUP,
        FOLLOWUP,
        0, /* REQUESTOR, OR PROMISOR, */
        TIDX_FOLLOWUP,
        0,
        0,
        0, /* REQUESTOR, OR PROMISOR, */
        0, /* REQUESTOR, OR PROMISOR, */
        0, /* REQUESTOR, OR PROMISOR, */
        0  /* SAME AS CFP MOVES */
        },

       {COUNTER,           /* REQ_COUNTER */
        COUNTER,
        PROMISOR,
        TIDX_REQ_COUNTER,
        0,
        CE_COGENT,
        PROMISOR,
        REQUESTOR,
        REQUESTOR,
        TKPAT_REQ_COUNTER},

       {ACCEPT,
        ACCEPT,
        REQUESTOR,
        TIDX_OFF_ACCEPT,
        0,
        CE_COGENT | CE_ACCEPT,
```

```
            REQUESTOR,
            PROMISOR,
            PROMISOR,
            TKPAT_REQ_ACCEPT},

        {REPORT,
            REPORT,
            PROMISOR,
            TIDX_REQ_REPORT,
            0,
            CE_COGENT,
            PROMISOR,
            REQUESTOR,
            REQUESTOR,
            TKPAT_REQ_REPORT},

/* 20 */    {RDECLARE,
            RDECLARE,
            REQUESTOR,
            TIDX_REQ_RDECLARE,
            1,
            CE_COGENT | CE_COMPLETE,
            REQUESTOR,
            PROMISOR,
            PROMISOR,
            TKPAT_REQ_RDECLARE},

        {PDECLARE,
            PDECLARE,
            PROMISOR,
            TIDX_REQ_PDECLARE,
            0,
            CE_COGENT | CE_COMPLETE,
            PROMISOR,
            REQUESTOR,
            REQUESTOR,
            TKPAT_REQ_PDECLARE},

        {RDECLINE,
            RDECLINE,
            REQUESTOR,
            TIDX_REQ_RDECLINE,
            0,
            CE_COGENT,
            REQUESTOR,
            PROMISOR,
            PROMISOR,
            TKPAT_REQ_RDECLINE},

        {PDECLINE,
            PDECLINE,
            PROMISOR,
            TIDX_REQ_PDECLINE,
            0,
            CE_COGENT,
            PROMISOR,
            REQUESTOR,
            REQUESTOR,
            TKPAT_REQ_PDECLINE},

        {REVOKE,
            REVOKE,
            PROMISOR,
            TIDX_REQ_REVOKE,
            0,
            CE_COGENT,
            PROMISOR,
            REQUESTOR,
            REQUESTOR,
            TKPAT_REQ_REVOKE},

/* 25 */    {REVREPR,
            REVREPR,
            PROMISOR,
            TIDX_REQ_REVREPR,
```

```
            0,
            CE_COGENT,
            PROMISOR,
            REQUESTOR,
            REQUESTOR,
            TKPAT_REQ_REVREPR},
            PROMISOR,
            REQUESTOR,
            REQUESTOR,
            TKPAT_REQ_COMTOCOM},

/* 32 */    {INTREPORT,
            INTREPORT,
            PROMISOR,
            TIDX_REQ_INTREPORT,
            0,
            0,
            PROMISOR,
            REQUESTOR,
            REQUESTOR,
            TKPAT_REQ_COMTOCOM},

/* 33 */    {REVREOFF,
            REVREOFF,
            PROMISOR,
            TIDX_OFF_REVREOFF,
            0,
            CE_COGENT,
            PROMISOR,
            REQUESTOR,
            REQUESTOR,
            TKPAT_REQ_COUNTER},

/* 34 */    {DECLINREP,
            DECLINREP,
            REQUESTOR,
            TIDX_REQ_DECLINREP,
            0,
            CE_COGENT,
            REQUESTOR,
            PROMISOR,
            PROMISOR,
            TKPAT_REQ_DECLINREP},

/* 35 */    {0,0,0,0,0,0,0,0,0,0},      /* reminder, not a move */
/* 36 */    {EXTENDEDHDR,
            NULL,0,
            0,
            0,
            CE_ACK,
            0,0,0,0},

/* 37 */    {OFFERGRP,
            OFFER,
            PROMISOR,
            TIDX_OFF,
            0,
            CE_OPEN | CE_COGENT,
            PROMISOR,
            REQUESTOR,
            REQUESTOR,
            TKPAT_OFF_OFFER},

/* 38 */    {OFFMYSELF,
            OFFER,
            PROMISOR,
            TIDX_OFF,
            0,
            CE_OPEN | CE_COGENT | CE_SELF,
            PROMISOR,
            REQUESTOR,
            REQUESTOR,
            TKPAT_OFF_OFFER},

/* 39 */    {NOTEMYSELF,
```

```
                ANSFREEFORM,
                REQUESTOR,
                TIDX_NOTE,
                0,
                CE_OPEN | CE_NOTE | CE_SELF | CE_SPECULATE,
                OBSERVER,
                OBSERVER,
                OBSERVER,
                0},
/* 40 */        {GRPCALENTRY,
                 ANSFREEFORM,
                 OBSERVER,
                 TIDX_GRPCAL,
                 0,
                 CE_NOTE,
                 OBSERVER,
                 OBSERVER,
                 OBSERVER,
                 TKPAT_NOTE},
/* 41 */        {0,0,0,0,0,0,0,0,0,0},
/* 42 */        {0,0,0,0,0,0,0,0,0,0},
/* 43 */        {0,0,0,0,0,0,0,0,0,0},
/* 44 */        {0,0,0,0,0,0,0,0,0,0},
/* 45 */        {0,0,0,0,0,0,0,0,0,0},
/* 46 */        {0,0,0,0,0,0,0,0,0,0},
/* 47 */        {0,0,0,0,0,0,0,0,0,0},
/* 48 */        {REQ_STPROMYSELF,
                 PROMISE,
                 PROMISOR,
                 TIDX_REQ_STPROMISE,
                 0,
                 CE_OPEN | CE_COGENT | CE_SELF,
                 PROMISOR,
                 REQUESTOR,
                 REQUESTOR,
                 TKPAT_REQ_STPROMISE},

/* 49 */        {REQ_STPROMGRP,
                 PROMISE,
                 PROMISOR,
                 TIDX_REQ_STPROMISE,
                 0,
                 CE_OPEN | CE_COGENT,
                 PROMISOR,
                 REQUESTOR,
                 REQUESTOR,
                 TKPAT_REQ_STPROMISE},

/* 50 */        {REQ_STPROMISE,
                 PROMISE,
                 PROMISOR,
                 TIDX_REQ_STPROMISE,
                 0,
                 CE_OPEN | CE_COGENT,
                 PROMISOR,
                 REQUESTOR,
                 REQUESTOR,
                 TKPAT_REQ_STPROMISE},

/* 51 */        {REQ_YES,
                 PROMISE,
                 PROMISOR,
                 TIDX_REQ_YES,
                 0,
                 CE_COGENT | CE_PROMISE,
                 PROMISOR,
                 REQUESTOR,
                 REQUESTOR,
                 TKPAT_REQ_YES},
/* ?? */        {REQ_COUNTER,
                 COUNTER,
                 PROMISOR,
                 TIDX_REQ_COUNTER,
                 1,
                 CE_COGENT,
```

```
            PROMISOR,
            REQUESTOR,
            REQUESTOR,
            TKPAT_REQ_COUNTER},

/* ?? */    {REQ_DELEG,
            REQUEST,
            PROMISOR,
            TIDX_REQ_DELEG,
            0,
            CE_COGENT | CE_OPENDELEGATE | CE_DELEGATE,
            PROMISOR,
            OBSERVER,
            DELEGATEE,
            TKPAT_REQUEST},

/* ?? */    {REQ_REPORT,
            REPORT,
            PROMISOR,
            TIDX_REQ_REPORT,
            0,
            CE_COGENT,
            PROMISOR,
            REQUESTOR,
            REQUESTOR,
            TKPAT_REQ_REPORT},

/* ?? */    {REQ_PDECLINE,
            PDECLINE,
            PROMISOR,
            TIDX_REQ_PDECLINE,
            0,
            CE_COGENT,
            PROMISOR,
            REQUESTOR,
            REQUESTOR,
            TKPAT_REQ_PDECLINE},

/* ?? */    {REQ_COMTOCOM,
            COMTOCOM,
            PROMISOR,
            TIDX_REQ_COMTOCOM,
            0,
            0,
            PROMISOR,
            REQUESTOR,
            REQUESTOR,
            TKPAT_REQ_COMTOCOM},

/* 57 */    {REQ_INTREPORT,
            INTREPORT,
            PROMISOR,
            TIDX_REQ_INTREPORT,
            0,
            0,
            PROMISOR,
            REQUESTOR,
            REQUESTOR,
            TKPAT_REQ_COMTOCOM},

/* ?? */    {REQ_RDECLARE,
            RDECLARE,
            REQUESTOR,
            TIDX_REQ_RDECLARE,
            1,
            CE_COGENT | CE_COMPLETE,
            REQUESTOR,
            PROMISOR,
            PROMISOR,
            TKPAT_REQ_RDECLARE},

/* ?? */    {REQ_CANEREQ,
            REQUEST,
            REQUESTOR,
            TIDX_REQ_CANEREQ,
```

```
        0,
        CE_COGENT,
        REQUESTOR,
        PROMISOR,
        PROMISOR,
        TKPAT_REQ_CANEREQ},

/* 60 */     {REQ_CANCEL,
        CANCEL,
        REQUESTOR,
        TIDX_REQ_CANCEL,
        0,
        CE_COGENT,
        REQUESTOR,
        PROMISOR,
        PROMISOR,
        TKPAT_REQ_CANCEL},

/* ?? */     {REQ_REVREPR,
        PROMISE,
        PROMISOR,
        TIDX_REQ_REVREPR,
        0,
        CE_COGENT,
        PROMISOR,
        REQUESTOR,
        REQUESTOR,
        TKPAT_REQ_REVREPR},

/* ?? */     {REQ_REVOKE,
        REVOKE,
        PROMISOR,
        TIDX_REQ_REVOKE,
        0,
        CE_COGENT,
        PROMISOR,
        REQUESTOR,
        REQUESTOR,
        TKPAT_REQ_REVOKE},

/* ?? */     {REQ_ACCEPT,
        ACCEPT,
        REQUESTOR,
        TIDX_REQ_ACCEPT,
        0,
        CE_COGENT | CE_ACCEPT,
        REQUESTOR,
        PROMISOR,
        PROMISOR,
        TKPAT_REQ_ACCEPT},

/* ?? */     {REQ_RDECLINE,
        RDECLINE,
        REQUESTOR,
        TIDX_REQ_RDECLINE,
        0,
        CE_COGENT,
        REQUESTOR,
        PROMISOR,
        PROMISOR,
        TKPAT_REQ_RDECLINE},

/* 65 */     {REQ_DECLINREP,
        DECLINREP,
        REQUESTOR,
        TIDX_REQ_DECLINREP,
        0,
        CE_COGENT,
        REQUESTOR,
        PROMISOR,
        PROMISOR,
        TKPAT_REQ_DECLINREP},

        {REQ_ACCEPTOPPR,
        ACCEPT,
```

```
          REQUESTOR,
          TIDX_REQ_ACCEPTOPPR,
          0,
          CE_COGENT | CE_ACCEPT,
          REQUESTOR,
          PROMISOR,
          PROMISOR,
          TKPAT_REQ_ACCEPT},

/* 67 */ {REQ_RECONSDEC,
          REQUEST,
          REQUESTOR,
          TIDX_REQ_RECONSDEC,
          0,
          CE_COGENT,
          REQUESTOR,
          PROMISOR,
          PROMISOR,
          TKPAT_REQ_INSISTDEC},

/* ?? */ {REQ_PDECLARE,
          PDECLARE,
          PROMISOR,
          TIDX_REQ_PDECLARE,
          0,
          CE_COGENT | CE_COMPLETE,
          PROMISOR,
          REQUESTOR,
          REQUESTOR,
          TKPAT_REQ_PDECLARE},

/* 69 */ {REQ_DECLOPPR,
          RDECLINE,
          REQUESTOR,
          TIDX_REQ_DECLOPPR,
          0,
          CE_COGENT,
          REQUESTOR,
          PROMISOR,
          PROMISOR,
          TKPAT_REQ_RDECLINE},

/* 70 */ {REQ_RECONSCAN,
          PROMISE,
          PROMISOR,
          TIDX_REQ_RECONSCAN,
          0,
          CE_COGENT,
          PROMISOR,
          REQUESTOR,
          REQUESTOR,
          TKPAT_REQ_COUNTER},

         {REQ_RCOUNTER,
          COUNTER,
          REQUESTOR,
          TIDX_REQ_COUNTER,
          1,
          CE_COGENT,
          REQUESTOR,
          PROMISOR,
          PROMISOR,
          TKPAT_REQ_RCOUNTER},

/* ?? */ {REQ_RECONSREV,
          REQUEST,
          REQUESTOR,
          TIDX_REQ_RECONSREV,
          0,
          CE_COGENT,
          REQUESTOR,
          PROMISOR,
          PROMISOR,
          TKPAT_REQ_INSISTDEC},

         {REQ_ACCEPTNEWPR,
```

```
              ACCEPT,
              REQUESTOR,
              TIDX_REQ_ACCEPTNEWPR,
              0,
              CE_COGENT | CE_ACCEPT,
              REQUESTOR,
              PROMISOR,
              PROMISOR,
              TKPAT_REQ_ACCEPT},

/* ?? */    {REQ_DECLNEWPR,
              RDECLINE,
              REQUESTOR,
              TIDX_REQ_DECLNEWPR,
              0,
              CE_COGENT,
              REQUESTOR,
              PROMISOR,
              PROMISOR,
              TKPAT_REQ_RDECLINE},

/* ?? */    {REQ_ACCDELEG,
              PROMISE,
              DELEGATEE,
              TIDX_REQ_ACCDELEG,
              0,
              CE_COGENT,
              DELEGATEE,
              PROMISOR,
              PROMISOR,
              TKPAT_REQ_YES},

/* ?? */    {REQ_DECLINDELEG,
              PDECLINE,
              DELEGATEE,
              TIDX_REQ_DECLINDELEG,
              0,
              CE_COGENT,
              OBSERVER,
              PROMISOR,
              PROMISOR,
              TKPAT_REQ_PDECLINE},

/* ?? */    {REQ_REPCOMPDEL,
              REPORT,
              DELEGATEE,
              TIDX_REQ_REPCOMPDEL,
              0,
              CE_COGENT,
              OBSERVER,
              PROMISOR,
              PROMISOR,
              TKPAT_REQ_REPORT},

/* ?? */    {REQ_DECLCOMPDEL,
              RDECLARE,
              PROMISOR,
              TIDX_REQ_DECLCOMPDEL,
              0,
              CE_COGENT | CE_DELEGATE | CE_COMPLETE,
              PROMISOR,
              DELEGATEE,
              OBSERVER,
              TKPAT_REQ_RDECLARE},

/* ?? */    {REQ_CANCELDELEG,
              CANCEL,
              PROMISOR,
              TIDX_REQ_CANCELDELEG,
              0,
              CE_COGENT | CE_DELEGATE | CE_COMPLETE,
              PROMISOR,
              DELEGATEE,
              OBSERVER,
              TKPAT_REQ_CANCEL},
```

```
/* 80 */      {REQ_REVDELEG,
                 REVOKE,
                 DELEGATEE,
                 TIDX_REQ_REVDELEG,
                 0,
                 CE_COGENT,
                 OBSERVER,
                 PROMISOR,
                 PROMISOR,
                 TKPAT_REQ_REVOKE},

/* 81 */      {REQ_TXINDIV,
                 RDECLARE,
                 REQUESTOR,
                 TIDX_REQ_TXINDIV,
                 0,
                 0,
                 REQUESTOR,
                 OBSERVER,
                 OBSERVER,
                 TKPAT_NULL},

/* ?? */      {REQM_CANCEL,
                 CANCEL,
                 PROMISOR,
                 TIDX_REQM_CANCEL,
                 0,
                 CE_COGENT,
                 PROMISOR,
                 NULL,
                 NULL,
                 TKPAT_REQ_RCACT_CANCEL},

/* 83 */      {REQ_REVRECOUNTER,
                 PROMISE,
                 PROMISOR,
                 TIDX_REQ_REVRECOUNTER,
                 0,
                 CE_COGENT,
                 PROMISOR,
                 REQUESTOR,
                 REQUESTOR,
                 TKPAT_REQ_REVREPR},

/* 84 */      {REQ_REVCOUNTER,
                 REVOKE,
                 PROMISOR,
                 TIDX_REQ_REVCOUNTER,
                 0,
                 CE_COGENT,
                 PROMISOR,
                 REQUESTOR,
                 REQUESTOR,
                 TKPAT_REQ_REVOKE},

/* 85 */      {0,0,0,0,0,0,0,0,0,0},
/* 86 */      {0,0,0,0,0,0,0,0,0,0},
/* 87 */      {0,0,0,0,0,0,0,0,0,0},

/* 88 */      {OFF_ACCEPT,
                 ACCEPT,
                 REQUESTOR,
                 TIDX_OFF_ACCEPT,
                 0,
                 CE_COGENT | CE_ACCEPT,
                 REQUESTOR,
                 PROMISOR,
                 PROMISOR,
                 TKPAT_REQ_ACCEPT},

/* ?? */      {OFF_COUNTER,
                 COUNTER,
                 REQUESTOR,
                 TIDX_OFF_COUNTER,
                 1,
```

```
               CE_COGENT,
               REQUESTOR,
               PROMISOR,
               PROMISOR,
               TKPAT_OFF_COUNTER},

/* 90 */    {OFF_RDECLINE,
               RDECLINE,
               REQUESTOR,
               TIDX_OFF_RDECLINE,
               0,
               CE_COGENT,
               REQUESTOR,
               PROMISOR,
               PROMISOR,
               TKPAT_OFF_RDECLINE},

/* ?? */    {OFF_RDECLARE,
               RDECLARE,
               REQUESTOR,
               TIDX_OFF_RDECLARE,
               0,
               CE_COGENT | CE_COMPLETE,
               REQUESTOR,
               PROMISOR,
               PROMISOR,
               TKPAT_OFF_RDECLARE},

/* ?? */    {OFF_COMTOCOM,
               COMTOCOM,
               REQUESTOR,
               TIDX_OFF_COMTOCOM,
               0,
               0,
               REQUESTOR,
               PROMISOR,
               PROMISOR,
               TKPAT_OFF_COMTOCOM},

/* ?? */    {OFF_REPORT,
               REPORT,
               PROMISOR,
               TIDX_OFF_REPORT,
               0,
               CE_COGENT,
               PROMISOR,
               REQUESTOR,
               REQUESTOR,
               TKPAT_REQ_REPORT},

/* ?? */    {OFF_REVREOFF,
               REVREOFF,
               PROMISOR,
               TIDX_OFF_REVREOFF,
               0,
               CE_COGENT,
               PROMISOR,
               REQUESTOR,
               REQUESTOR,
               TKPAT_REQ_COUNTER},

/* 95 */    {OFF_REVOKE,
               REVOKE,
               PROMISOR,
               TIDX_OFF_REVOKE,
               0,
               CE_COGENT,
               PROMISOR,
               REQUESTOR,
               REQUESTOR,
               TKPAT_REQ_REVOKE},

/* ?? */    {OFF_INTREPORT,
               INTREPORT,
               PROMISOR,
```

```
                TIDX_OFF_INTREPORT,
                0,
                0,
                PROMISOR,
                REQUESTOR,
                REQUESTOR,
                TKPAT_REQ_COMTOCOM},

/* ?? */      {OFF_CANCEL,
                CANCEL,
                REQUESTOR,
                TIDX_OFF_CANCEL,
                0,
                CE_COGENT,
                REQUESTOR,
                PROMISOR,
                PROMISOR,
                TKPAT_OFF_CANCEL},

/* ?? */      {OFF_RRETRACT,
                CANCEL,
                REQUESTOR,
                TIDX_OFF_RRETRACT,
                0,
                CE_COGENT,
                REQUESTOR,
                PROMISOR,
                PROMISOR,
                TKPAT_OFF_RDECLINE},

/* ?? */      {OFF_PROMISE,
                PROMISE,
                PROMISOR,
                TIDX_OFF_PROMISE,
                0,
                CE_COGENT,
                PROMISOR,
                REQUESTOR,
                REQUESTOR,
                TKPAT_REQ_YES},

/* 100 */     {OFF_PDECLINE,
                PDECLINE,
                PROMISOR,
                TIDX_OFF_PDECLINE,
                0,
                CE_COGENT,
                PROMISOR,
                REQUESTOR,
                REQUESTOR,
                TKPAT_OFF_PDECLINE},

/* ?? */      {OFF_DECLINREP,
                DECLINREP,
                REQUESTOR,
                TIDX_OFF_DECLINREP,
                0,
                CE_COGENT,
                REQUESTOR,
                PROMISOR,
                PROMISOR,
                TKPAT_REQ_DECLINREP},

              {OFF_PCOUNTER,
                COUNTER,
                PROMISOR,
                TIDX_OFF_COUNTER,
                1,
                CE_COGENT,
                PROMISOR,
                REQUESTOR,
                REQUESTOR,
                TKPAT_REQ_INSISTDEC},

/* ?? */      {OFF_RECONSDEC,
```

```
                        REQUEST,
                        REQUESTOR,
                        TIDX_OFF_RECONSDEC,
                        0,
                        CE_COGENT,
                        REQUESTOR,
                        PROMISOR,
                        PROMISOR,
                        TKPAT_REQ_INSISTDEC),

/* 104 */       (0,0,0,0,0,0,0,0,0,0),

/* 105 */       (OFF_RECONSCAN,
                        PROMISE,
                        PROMISOR,
                        TIDX_OFF_RECONSCAN,
                        0,
                        CE_COGENT,
                        PROMISOR,
                        REQUESTOR,
                        REQUESTOR,
                        TKPAT_REQ_COUNTER),

/* ?? */        (OFF_RREVREOFF,
                        REVREOFF,
                        REQUESTOR,
                        TIDX_OFF_RREVREOFF,
                        0,
                        CE_COGENT,
                        REQUESTOR,
                        PROMISOR,
                        PROMISOR,
                        TKPAT_REQ_INSISTDEC),

/* ?? */        (OFF_PDECLARE,
                        PDECLARE,
                        PROMISOR,
                        TIDX_OFF_PDECLARE,
                        0,
                        CE_COGENT | CE_COMPLETE,
                        PROMISOR,
                        REQUESTOR,
                        REQUESTOR,
                        TKPAT_OFF_PDECLARE),

/* 108 */       (0,0,0,0,0,0,0,0,0,0),
/* 109 */       (0,0,0,0,0,0,0,0,0,0),
/* 110 */       (0,0,0,0,0,0,0,0,0,0),
/* 111 */       (0,0,0,0,0,0,0,0,0,0),

/* ?? */        (Q_REPORT,
                        REPORT,
                        PROMISOR,
                        TIDX_Q_REPORT,
                        0,
                        CE_COGENT,
                        PROMISOR,
                        REQUESTOR,
                        REQUESTOR,
                        TKPAT_REQ_REPORT),

/* ?? */        (Q_PROMISE,
                        PROMISE,
                        PROMISOR,
                        TIDX_Q_PROMISE,
                        0,
                        CE_COGENT,
                        PROMISOR,
                        REQUESTOR,
                        REQUESTOR,
                        TKPAT_Q_PROMISE),

/* ?? */        (Q_DELEG,
                        REQUEST,
                        PROMISOR,
                        TIDX_Q_DELEG,
```

```
              0,
              CE_COGENT | CE_OPENDELEGATE | CE_DELEGATE,
              PROMISOR,
              OBSERVER,
              DELEGATEE,
              TKPAT_REQUEST},

/* 115 */    {Q_PDECLINE,
              PDECLINE,
              PROMISOR,
              TIDX_Q_PDECLINE,
              0,
              CE_COGENT,
              PROMISOR,
              REQUESTOR,
              REQUESTOR,
              TKPAT_REQ_PDECLINE},

/* ?? */     {Q_INTREPORT,
              INTREPORT,
              PROMISOR,
              TIDX_Q_INTREPORT,
              0,
              0,
              PROMISOR,
              REQUESTOR,
              REQUESTOR,
              TKPAT_REQ_COMTOCOM},

/* ?? */     {Q_RDECLARE,
              RDECLARE,
              REQUESTOR,
              TIDX_Q_RDECLARE,
              1,
              CE_COGENT | CE_COMPLETE,
              REQUESTOR,
              PROMISOR,
              PROMISOR,
              TKPAT_REQ_RDECLARE},

/* ?? */     {Q_CANEREQ,
              REQUEST,
              REQUESTOR,
              TIDX_Q_CANEREQ,
              0,
              CE_COGENT,
              REQUESTOR,
              PROMISOR,
              PROMISOR,
              TKPAT_REQ_CANEREQ},

/* ?? */     {Q_CANCEL,
              CANCEL,
              REQUESTOR,
              TIDX_Q_CANCEL,
              0,
              CE_COGENT,
              REQUESTOR,
              PROMISOR,
              PROMISOR,
              TKPAT_REQ_CANCEL},

/* 120 */    {Q_REVREPR,
              PROMISE,
              PROMISOR,
              TIDX_Q_REVREPR,
              0,
              CE_COGENT,
              PROMISOR,
              REQUESTOR,
              REQUESTOR,
              TKPAT_Q_PROMISE},

/* ?? */     {Q_REVOKE,
              REVOKE,
              PROMISOR,
```

```
                TIDX_Q_REVOKE,
                0,
                CE_COGENT,
                PROMISOR,
                REQUESTOR,
                REQUESTOR,
                TKPAT_REQ_REVOKE},

/* ?? */      {Q_DECLINREP,
                DECLINREP,
                REQUESTOR,
                TIDX_Q_DECLINREP,
                0,
                CE_COGENT,
                REQUESTOR,
                PROMISOR,
                PROMISOR,
                TKPAT_REQ_DECLINREP},

/* ?? */      {Q_RECONSDEC,
                REQUEST,
                REQUESTOR,
                TIDX_Q_RECONSDEC,
                0,
                CE_COGENT,
                REQUESTOR,
                PROMISOR,
                PROMISOR,
                TKPAT_REQ_INSISTDEC},

/* 124 */      {0,0,0,0,0,0,0,0,0,0},

/* 125 */      {Q_PDECLARE,
                PDECLARE,
                PROMISOR,
                TIDX_Q_PDECLARE,
                0,
                CE_COGENT | CE_COMPLETE,
                PROMISOR,
                REQUESTOR,
                REQUESTOR,
                TKPAT_REQ_PDECLARE},

/* ?? */      {Q_RECONSCAN,
                PROMISE,
                PROMISOR,
                TIDX_Q_RECONSCAN,
                0,
                CE_COGENT,
                PROMISOR,
                REQUESTOR,
                REQUESTOR,
                TKPAT_REQ_COUNTER},

/* ?? */      {0,0,0,0,0,0,0,0,0,0},

/* ?? */      {Q_RECONSREV,
                REQUEST,
                REQUESTOR,
                TIDX_Q_RECONSREV,
                0,
                CE_COGENT,
                REQUESTOR,
                PROMISOR,
                PROMISOR,
                TKPAT_REQ_INSISTDEC},

/* 129 */      {0,0,0,0,0,0,0,0,0,0},

/* 130 */      {Q_REPCOMPDEL,
                REPORT,
                DELEGATEE,
                TIDX_Q_REPCOMPDEL,
                0,
                CE_COGENT,
                OBSERVER,
```

```
                PROMISOR,
                PROMISOR,
                TKPAT_REQ_REPORT},

/* 131 */      {Q_ACCDELEG,
                PROMISE,
                DELEGATEE,
                TIDX_Q_ACCDELEG,
                0,
                CE_COGENT,
                DELEGATEE,
                PROMISOR,
                PROMISOR,
                TKPAT_REQ_YES},

/* ?? */       {Q_DECLINDELEG,
                PDECLINE,
                DELEGATEE,
                TIDX_Q_DECLINDELEG,
                0,
                CE_COGENT,
                OBSERVER,
                PROMISOR,
                PROMISOR,
                TKPAT_REQ_PDECLINE},

/* ?? */       {Q_DECLCOMPDEL,
                RDECLARE,
                PROMISOR,
                TIDX_Q_DECLCOMPDEL,
                0,
                CE_COGENT | CE_DELEGATE | CE_COMPLETE,
                PROMISOR,
                DELEGATEE,
                OBSERVER,
                TKPAT_REQ_RDECLARE},

/* ?? */       {Q_CANCELDELEG,
                CANCEL,
                PROMISOR,
                TIDX_Q_CANCELDELEG,
                0,
                CE_COGENT | CE_DELEGATE | CE_COMPLETE,
                PROMISOR,
                DELEGATEE,
                OBSERVER,
                TKPAT_REQ_CANCEL},

/* ?? */       {Q_REVDELEG,
                REVOKE,
                DELEGATEE,
                TIDX_Q_REVDELEG,
                0,
                CE_COGENT,
                OBSERVER,
                PROMISOR,
                PROMISOR,
                TKPAT_REQ_REVOKE},

/* 136 */      {0,0,0,0,0,0,0,0,0,0},
/* 137 */      {0,0,0,0,0,0,0,0,0,0},
/* 138 */      {0,0,0,0,0,0,0,0,0,0},
/* 139 */      {0,0,0,0,0,0,0,0,0,0},

/* 140 */      {INF_RDECLARE,
                RDECLARE,
                REQUESTOR,
                TIDX_INF_RDECLARE,
                0,
                CE_COGENT | CE_COMPLETE,
                REQUESTOR,
                PROMISOR,
                PROMISOR,
                TKPAT_REQ_RDECLARE},
```

```
/* ?? */      {INF_REVOKE,
                REVOKE,
                PROMISOR,
                TIDX_INF_REVOKE,
                0,
                CE_COGENT,
                PROMISOR,
                REQUESTOR,
                REQUESTOR,
                TKPAT_REQ_REVOKE},

/* 142 */     {INF_INTREPORT,
                INTREPORT,
                PROMISOR,
                TIDX_INF_INTREPORT,
                0,
                0,
                PROMISOR,
                REQUESTOR,
                REQUESTOR,
                TKPAT_REQ_COMTOCOM},

/* 143 */     {0,0,0,0,0,0,0,0,0,0},
/* 144 */     {0,0,0,0,0,0,0,0,0,0},

/* 145 */       {CFP_CFPPANSWER,
                CFPANSWER,
                OBSERVER,
                TIDX_CFP_CFPPANSWER,
                0,
                CE_NOTE | CE_SPECULATE,
                OBSERVER,
                REQUESTOR,
                REQUESTOR,
                TKPAT_CFP_CFPPANSWER},

/* 146 */       {CFP_CFPRANSWER,
                CFPANSWER,
                REQUESTOR,
                TIDX_CFP_CFPRANSWER,
                0,
                CE_NOTE | CE_SPECULATE,
                REQUESTOR,
                OBSERVER,
                OBSERVER,
                TKPAT_CFP_CFPRANSWER},

/* 147 */       {CFP_CFPDECLARE,
                CFPDECLARE,
                REQUESTOR,
                TIDX_CFP_CFPDECLARE,
                0,
                CE_COGENT | CE_COMPLETE | CE_SPECULATE,
                REQUESTOR,
                OBSERVER,
                OBSERVER,
                TKPAT_CFP_CFPDECLARE},

/* 148 */     {0,0,0,0,0,0,0,0,0,0},
/* 149 */     {0,0,0,0,0,0,0,0,0,0},
/* 150 */     {0,0,0,0,0,0,0,0,0,0},
/* 151 */     {0,0,0,0,0,0,0,0,0,0},
/* 152 */     {0,0,0,0,0,0,0,0,0,0},

/* 153 */       {CFPM_DECLARE,
                CFPDECLARE,
                REQUESTOR,
                TIDX_CFPM_DECLARE,
                0,
                CE_COGENT | CE_COMPLETE | CE_SPECULATE,
                REQUESTOR,
                OBSERVER,
                OBSERVER,
                TKPAT_CFPM_DECLARE},
```

```
/* 154 */       {CFPM_ANSWER,
                CFPANSWER,
                REQUESTOR,
                TIDX_CFPM_ANSWER,
                0,
                CE_NOTE | CE_SPECULATE,
                REQUESTOR,
                OBSERVER,
                OBSERVER,
                TKPAT_CFPM_OPEN},

/* 155 */       {0,0,0,0,0,0,0,0,0,0},
/* 156 */       {0,0,0,0,0,0,0,0,0,0},
/* 157 */       {0,0,0,0,0,0,0,0,0,0},

/* 158 */       {NOTEANSWER,
                 ANSFREEFORM,
                 OBSERVER,
                 TIDX_NOTE,
                 0,
                 CE_NOTE | CE_SPECULATE,
                 OBSERVER,
                 OBSERVER,
                 OBSERVER,
                 TKPAT_NOTE}

};
#endif /* PC_MAIL */
```

Table 29

Moves, States, and Token Records for a Question to Three Addressees (1) Alex asks three people a QUESTION Opening move of question by Alex to Robin, Sam and Jason with response date of Wednesday 14-June-89 and fulfillment date of Friday 16-June-89 leaves conversation in state "request."

Alex's database shows:

| RR | PR | RF | PF |
|---|---|---|---|
| | 061489 | 061689 | |

After receiving the communication, Robin's, Sam's and Jason's separate databases all show:

| pr | rr | pf | rf |
|---|---|---|---|
| 061489 | | | 061689 |

(2) Robin provides an ANSWER

Robin answers Alex's question, which leaves the conversation in state "report" for her.

Robin's database shows:

| pr | rr | pf | rf |
|---|---|---|---|
| | 061689 | | 061689 |

After receiving the communication, Alex's database remains unchanged, and still shows:

| RR | PR | RF | PF |
|---|---|---|---|
| | 061489 | 061689 | |

Robin's move does not affect the state of the conversation for Sam or Jason.

(3A) Sam PROMISES to answer later

Sam promises to answer Alex's question by the date specified by Alex, leaving the conversation in the state "Promise", for Sam.

Sam's database shows:

| pr | rr | pf | rf |
|---|---|---|---|
| | | 061689 | 061689 |

After receiving the communication, Alex's database remains unchanged. Sam's move does not affect the state of the conversation for Robin or Jason.

(3B) Sam provides his ANSWER

Sam answers Alex's question, which leaves the conversation in state "report" for him.

Sam's database shows:

| pr | rr | pf | rf |
|---|---|---|---|
| | 061689 | | 061689 |

After receiving the communication, Alex's database remains unchanged. Sam's move does not affect the state of the conversation for Robin or Jason.

(4) Jason DECLINEs to answer Alex's QUESTION

After Jason sends a DECLINE, in which he indicates that he is unable to answer Alex's question, the conversation is in state "decline" for him.

Jason's database shows:

| pr | rr | pf | rf |
|---|---|---|---|
| | 061689 | | 061689 |

After receiving the communication, Alex's database remains unchanged. Jason's move does not affect the state of the conversation for Robin or Sam.

(5) Alex THANKS Robin, Sam, and Jason

Alex's move, in which he thanks his addressees for their timely responses, leaves the conversation in state "final" for Alex, Robin, Sam and Jason.

Alex's database shows:

| RR | PR | RF | PF |
|---|---|---|---|

After receiving the communication, Robin's, Sam's, and Jason's separate databases all show:

| pr | rr | pf | rf |
|---|---|---|---|

Table 30

Moves, States, and Token Records for a Question with a "Public" Delegation (1) Alex asks a QUESTION Opening move of question by Alex to Robin with response date of Wednesday 21-June-89 and fulfillment date of Friday 23-June-89 leaves conversation in state "request."

Alex's database shows:

| RR | PR | RF | PF |
|---|---|---|---|
| | 062189 | 062389 | |

After receiving the communication, Robin's database shows:

| pr | rr | pf | rf |
|---|---|---|---|
| 062189 | | | 062389 |

(2) Robin PROMISES

Promise move by Robin leaves conversation between Alex and Robin in state "promise."

Robin's database shows:

| pr | rr | pf | rf |
|---|---|---|---|
| | | 062389 | 062389 |

After receiving the communication, Alex's database shows:

| RR | PR | RF | PF |
|---|---|---|---|
| | | 062389 | 062389 |

(3) Robin DELEGATES Alex's question to Sam

Delegate move by Robin with a response date of Wednesday 21-June-89 and fulfillment date of Thursday 22-June-89, addressed to Sam, with a copy to Alex (thereby keeping Alex informed about the fact that Robin is delegating the question, and making this a "public" delegation), changes Sam's role in the conversation from "observer" to "delegatee" and leaves the conversation in a compound state: "promise, delegating."

Robin's database shows:

...in role "promisor" in respect to Alex's question:

| pr | rr | pf | rf |
|---|---|---|---|
| | | 062389 | 062389 |

...in role "requestor" in respect to delegation to Sam:

| RR | PR | RF | PF |
|---|---|---|---|

| | |
|---|---|
| 062189 | 062289 |

After receiving the communication, Sam's database shows:

| pr | rr | pf | rf |
|---|---|---|---|
| 062189 | | | 062289 |

After receiving the communication, Alex's database shows no change:

| RR | PR | RF | PF |
|---|---|---|---|
| | | 062389 | 062389 |

(4) Sam ACCEPTS Robin's delegation

Accept-delegation move by Sam to Robin, with a copy to Alex, leaves the conversation in the compound state "promise, delegated."

Sam's database shows:

| pr | rr | pf | rf |
|---|---|---|---|
| | | 062289 | 062289 |

After receiving the communication, Robin's database shows:

...in role "promisor" in respect to Alex's question:

| pr | rr | pf | rf |
|---|---|---|---|
| | | 062389 | 062389 |

...in role "requestor" in respect to delegation to Sam:

| RR | PR | RF | PF |
|---|---|---|---|

| | | | |
|---|---|---|---|
| | | 062289 | 062289 |

After receiving the communication, Alex's database shows no change:

| RR | PR | RF | PF |
|---|---|---|---|
| | | 062389 | 062389 |

(5) Sam ANSWERS Robin regarding Alex's question

Answer move by Sam to Robin, asking acknowledgement of the answer by Thursday 22-June-89, with copy to Alex, again leaves the conversation in the compound state, "promise, delegated."

Sam's database shows:

| pr | rr | pf | rf |
|---|---|---|---|
| | 062289 | | 062289 |

After receiving the communication, Robin's database shows:

...in role "promisor" in respect to Alex's question:

| pr | rr | pf | rf |
|---|---|---|---|
| | | 062389 | 062389 |

...in role "requestor" in respect to delegation to Sam:

| RR | PR | RF | PF |
|---|---|---|---|

062289 062289

After receiving the communication, Alex's database shows no change:

| RR | PR | RF | PF |
|---|---|---|---|
| | | 062389 | 062389 |

(6A) Robin THANKS Sam

Thank-you move by Robin to Sam changes Sam's role in the conversation from "delegatee" to "observer" and returns the conversation to the state "promise." Alex is copied, so as to continue the public character of the delegation.

Robin's database shows:

...in role "promisor" in respect to Alex's question:

| pr | rr | pf | rf |
|---|---|---|---|
| | | 062389 | 062389 |

...in role "requestor" in respect to delegation to Sam:

| RR | PR | RF | PF |
|---|---|---|---|

After receiving the communication, Sam's database shows:

| pr | rr | pf | rf |
|---|---|---|---|

After receiving the communication, Alex's database shows no change:

| RR | PR | RF | PF |
|---|---|---|---|
| | | 062389 | 062389 |

(7A) Robin ANSWERS Alex

Answer move by Robin to Alex, asking acknowledgement of the answer by Thursday 22-June-89, leaves the conversation in state "report." A copy to Sam keeps Sam as an observer in the conversation.

Robin's database shows:

| pr | rr | pf | rf |
|---|---|---|---|
| | 062289 | | 062389 |

After receiving the communication, Alex's database shows:

| RR | PR | RF | PF |
|---|---|---|---|
| 062289 | | 062389 | |

(8A) Alex THANKS Robin

Thank-you move by Alex to Robin leaves the conversation in state "final." A copy to Sam keeps Sam an observer.

Alex's database shows:

| RR | PR | RF | PF |
|---|---|---|---|

After receiving the communication, Robin's database shows:

| pr | rr | pf | rf |
|---|---|---|---|

Alternative path showing that a thank-you move by the original requestor, Alex, can close the conversation for both the requestor/delegator and the delegatee, thereby adjusting three databases with one move.

(6B) Alex closes the conversation by saying THANK YOU

On reading Sam's answer to the question as Robin delegated it to him, Alex declares him/herself satisfied that the question is answered and makes a Thank-you move to Robin, with a copy to Sam, leaving the conversation in the state "final."

Alex's database shows:

| RR | PR | RF | PF |
|---|---|---|---|

After receiving the communication, Robin's database shows:

| pr | rr | pf | rf |
|---|---|---|---|

| RR | PR | RF | PF |
|---|---|---|---|

After receiving the communication, Sam's database shows:

| pr | rr | pf | rf |
|---|---|---|---|

Table 31

Moves, States, and Token Records for a Simple Request with Counteroffer (1) Alex makes a REQUEST Opening move of request by Alex to Robin with response date of Wednesday 14-June-89 and fulfillment date of Friday 16-June-89 leaves conversation in state "request."

Alex's database shows:

| RR | PR | RF | PF |
|---|---|---|---|
| | 061489 | 061689 | |

After receiving the communication, Robin's database shows:

| pr | rr | pf | rf |
|---|---|---|---|
| 061489 | | | 061689 |

(2) Robin makes a COUNTEROFFER

Counteroffer move by Robin with fulfillment date of Monday 19-June-89 and response date of Wednesday 14-June-89 leaves conversation in state "counteroffer."

Robin's database shows:

| pr | rr | pf | rf |
|---|---|---|---|
| | 061489 | 061989 | 061689 |

After receiving the communication, Alex's database shows:

| RR | PR | RF | PF |
|---|---|---|---|
| 061489 | | 061689 | 061989 |

(3) Alex ACCEPTS the counteroffer

Accept move by Alex leaves conversation in state "promise."

Alex's database shows:

| RR | PR | RF | PF |
|---|---|---|---|
| | | 061989 | 061989 |

After receiving the communication, Robin's database shows:

| pr | rr | pf | rf |
|---|---|---|---|
| | | 061989 | 061989 |

(4) Robin REPORTS that the work is DONE

Report-done move by Robin with a response date of Tuesday 20-June-89 leaves conversation in state "report."

Robin's database shows:

| pr | rr | pf | rf |
|---|---|---|---|

062089 061989

After receiving the communication, Alex's database shows:

| RR | PR | RF | PF |
|---|---|---|---|
| 062089 | | 061989 | 061989 |

(5) Alex THANKS Robin

Thank-you move by Alex leaves conversation in state "final."

Alex's database shows:

| RR | PR | RF | PF |
|---|---|---|---|

After receiving the communication, Robin's database shows:

| pr | rr | pf | rf |
|---|---|---|---|

Table 32

Texts Associated with Permitted Moves

---------------- REQUEST ----------------

Move Menu Name: Request
Composition Window Name: Request
Offered Message Text (can edit or delete): <none>
Move Name in Completed Move: requested
Move Name in Lists: request
Help Text Presentation: Ask one or more people to do something. Examples include inviting people to meetings, and asking a group of people to perform a set of related tasks. Requests are completed when the requester acknowledges that the actions requested are complete.

Move Menu Name: Yes (promise)
Composition Window Name: Promise
Offered Message Text (can edit or delete): I'll do it.
Move Name in Completed Move: promised
Move Name in Lists: promise
Help Text Presentation: Agree to perform the actions requested, either by the time stipulated in the request or by the time you stipulate in this reply.

| | |
|---|---|
| Move Menu Name: | OK, except (counteroffer) |
| Composition Window Name: | Counteroffer |
| Offered Message Text (can edit or delete): | OK, if we agree to some changes: |
| Move Name in Completed Move: | counteroffered |
| Move Name in Lists: | counter |
| Help Text Presentation: | Agree to perform the actions requested, provided that the other person accepts the exceptions and conditions you specify in this reply. |
| Move Menu Name: | No, however (counteroffer) |
| Composition Window Name: | Counteroffer |
| Offered Message Text (can edit or delete): | No; however, I can do this instead: |
| Move Name in Completed Move: | counteroffered |
| Move Name in Lists: | counter |
| Help Text Presentation: | Say that you don't agree to do what is asked but are willing to fulfill a different but similar request that you describe here. If the other person accepts your counteroffer, normally s/he will interpret that you have agreed to do what you say in your reply. |
| Move Menu Name: | Delegate it |
| Composition Window Name: | Delegate |
| Offered Message Text (can edit or delete): | Can you please handle this for me? |
| Move Name in Completed Move: | delegated |
| Move Name in Lists: | delegate |
| Help Text Presentation: | Ask someone else to handle the request, either on your behalf or because it falls in that person's area of responsibility. You can inform the original requester about the delegation by sending him/her a copy, or not, as you choose. |
| Move Menu Name: | This is done (report) |
| Composition Window Name: | Report Completion |
| Offered Message Text (can edit or delete): | This is done. |
| Move Name in Completed Move: | reported completion |
| Move Name in Lists: | rpt-done |
| Help Text Presentation: | Report that you have done what was asked and are finished with the conversation. |
| Move Menu Name: | Can't, won't or no (decline) |
| Composition Window Name: | Decline |
| Offered Message Text (can edit or delete): | I'm sorry, but I can't/won't do this. |
| Move Name in Completed Move: | declined |
| Move Name in Lists: | decline |
| Help Text Presentation: | Say that you will not do what is asked, for whatever reason. You are unavailable, don't have the authority to act, or while you have the choice, you simply elect not to do it. This reply completes your part in the conversation. As alternatives, consider delegating or counteroffering. |
| Move Menu Name: | Postpone responding |
| Composition Window Name: | Postpone Responding |
| Offered Message Text (can edit or delete): | I'll respond later. |
| Move Name in Completed Move: | postponed responding |
| Move Name in Lists: | anslater |
| Help Text Presentation: | Say that you are not able to respond to this request right now, and say when you expect to be able to respond. |
| Move Menu Name: | Report progress |
| Composition Window Name: | Progress Report |
| Offered Message Text (can edit or delete): | Here's a progress report: |
| Move Name in Completed Move: | reported progress |
| Move Name in Lists: | progrept |
| Help Text Presentation: | Report that work has started, is progressing, or that progress has not been made. |
| Move Menu Name: | Thanks (close) |
| Composition Window Name: | Thank You |
| Offered Message Text (can edit or delete): | Thanks for getting this done. |
| Move Name in Completed Move: | thanked |

| | |
|---|---|
| Move Name in Lists: | thankyou |
| Help Text Presentation: | Acknowledge that what you asked has been completed satisfactorily, and close the conversation. This reply moves the conversation to an inactive state in your records. |

| | |
|---|---|
| Move Menu Name: | Acknowledge and close |
| Composition Window Name: | Acknowledge and Close |
| Offered Message Text (can edit or delete): | Thank you. |
| Move Name in Completed Move: | acknowledged and closed |
| Move Name in Lists: | ack/done |
| Help Text Presentation: | Use this reply to acknowledge the current state of the conversation (whatever it is and whether or not you are satisfied with it), announce that you are finished with the conversation, and move it to an inactive state in your records. |

| | |
|---|---|
| Move Menu Name: | OK (accept promise) |
| Composition Window Name: | Accept Opening Promise |
| Offered Message Text (can edit or delete): | Thank you for the promise. |
| Move Name in Completed Move: | accepted opening promise |
| Move Name in Lists: | acc-prom |
| Help Text Presentation: | Tell the person who has agreed to do what you ask that you accept his/her promise and that you expect completion of the task(s) on the date stipulated. |

| | |
|---|---|
| Move Menu Name: | No thanks, or please don't |
| Composition Window Name: | Decline Opening Promise |
| Offered Message Text (can edit or delete): | <none> |
| Move Name in Completed Move: | declined opening promise |
| Move Name in Lists: | decl-pro |
| Help Text Presentation: | Tell the person who has agreed to do what you ask not to do the work after all. Use this reply when your situation changes (e.g., you can't use, can't pay for, or no longer need the work you requested). |

| | |
|---|---|
| Move Menu Name: | Revise my request (restart) |
| Composition Window Name: | New Request |
| Offered Message Text (can edit or delete): | Please start again with this request: |
| Move Name in Completed Move: | made a new request |
| Move Name in Lists: | strtover |
| Help Text Presentation: | Make a new request in the place of the one that currently started this conversation. Your addressee(s) will have a fresh oppor- tunity to respond to the new request. |

| | |
|---|---|
| Move Menu Name: | Cancel (cancel request) |
| Composition Window Name: | Cancel |
| Offered Message Text (can edit or delete): | Please cancel the request I made. |
| Move Name in Completed Move: | canceled |
| Move Name in Lists: | cancel |
| Help Text Presentation: | Cancel the whole conversation, for whatever reason. This reply completes your part in the conversation. |

| | |
|---|---|
| Move Menu Name: | Revise my promise |
| Composition Window Name: | New Promise |
| Offered Message Text (can edit or delete): | Please accept a change from what I promised: |
| Move Name in Completed Move: | made a new promise |
| Move Name in Lists: | newprom |
| Help Text Presentation: | Ask the other person to accept a change in your agreement, such as when you'll finish, or what you'll accomplish; or begin a renegotiation to change the agreement. |

| | |
|---|---|
| Move Menu Name: | Cancel (cancel promise) |
| Composition Window Name: | Cancel Promise |
| Offered Message Text (can edit or delete): | <none> |
| Move Name in Completed Move: | canceled promise |
| Move Name in Lists: | cancel |
| Help Text Presentation: | Report or warn that what you promised will not happen, for whatever reason, without offering additional help. This reply completes your part in the conversation. |

Move Menu Name: OK (accept)
Composition Window Name: Accept
Offered Message Text (can edit or delete): I accept your offer.
Move Name in Completed Move: accepted counteroffer
Move Name in Lists: accept
Help Text Presentation: Agree to the other person's conditions, exceptions, and/or stipulations about what will be produced.

Move Menu Name: No to the counteroffer
Composition Window Name: Decline
Offered Message Text (can edit or delete): <none>
Move Name in Completed Move: declined counteroffer
Move Name in Lists: decline
Help Text Presentation: Say you will not accept the other person's conditions, exceptions, and/or stipulations about what will be produced. If what you are declining is a counteroffer, your own prior request or counteroffer is still in effect.

Move Menu Name: More, please (decline rprt)
Composition Window Name: Decline
Offered Message Text (can edit or delete): <none>
Move Name in Completed Move: declined report
Move Name in Lists: decline
Help Text Presentation: Acknowledge the report you received, and ask the other person to do more or different work to complete what was defined in the conversation.

Move Menu Name: Please reconsider
Composition Window Name: Ask Reconsideration
Offered Message Text (can edit or delete): Please reconsider my request.
Move Name in Completed Move: asked for reconsideration
Move Name in Lists: askrecon
Help Text Presentation: Ask that the other person reconsider your request, for reasons you stipulate.

Move Menu Name: Acknowledge and close
Composition Window Name: Acknowledge Cancellation
Offered Message Text (can edit or delete): <none>
Move Name in Completed Move: acknowledged and closed
Move Name in Lists: ack/done
Help Text Presentation: Use this reply to acknowledge the current state of the conversation (whatever it is and whether or not you are satisfied with it), announce that you are finished with the conversation, and move it to an inactive state in your records.

Move Menu Name: Please reconsider
Composition Window Name: Ask Reconsideration
Offered Message Text (can edit or delete): Please reconsider your cancellation.
Move Name in Completed Move: asked for reconsideration
Move Name in Lists: askrecon
Help Text Presentation: Ask that the other person reconsider cancelling this conversation, for reasons you stipulate.

Move Menu Name: Please reconsider
Composition Window Name: Ask Reconsideration
Offered Message Text (can edit or delete): I ask that you reconsider.
Move Name in Completed Move: asked for reconsideration
Move Name in Lists: askrecon
Help Text Presentation: Ask that the other person reconsider revoking his/her promise in this conversation, for reasons you stipulate.

Move Menu Name: OK (accept new promise)
Composition Window Name: Accept
Offered Message Text (can edit or delete): OK.
Move Name in Completed Move: accepted new promise
Move Name in Lists: accept
Help Text Presentation: Accept the other person's new promise.

Move Menu Name: No to the counteroffer
Composition Window Name: Decline
Offered Message Text (can edit or delete): I'm sorry, but I can't/don't accept your new promise.
Move Name in Completed Move: declined
Move Name in Lists: decline Help Text Presentation: Say you will not accept the new promise, and insist that the other party complete, revoke, or cancel his/her existing promise in this conversation.

Move Menu Name: OK (accept delegation)
Composition Window Name: Accept
Offered Message Text (can edit or delete): I will do it.
Move Name in Completed Move: accepted delegation
Move Name in Lists: acc-del
Help Text Presentation: Accept the delegation. You are promising to complete what has been requested of the other person.

Move Menu Name: No (decline delegation)
Composition Window Name: Decline
Offered Message Text (can edit or delete): I'm sorry, but I can't/won't do this.
Move Name in Completed Move: declined delegation
Move Name in Lists: decl-del
Help Text Presentation: Say that you will not accept the delegation, and complete your participation in this conversation.

Move Menu Name: It's done (close)
Composition Window Name: Report
Offered Message Text (can edit or delete): What you delegated to me is done.
Move Name in Completed Move: reported delegated task done
Move Name in Lists: rpt-done
Help Text Presentation: Report that you have completed the request that was delegated to you. This completes your part in the conversation.

Move Menu Name: Thank delegatee
Composition Window Name: Thank You
Offered Message Text (can edit or delete): Thanks for handling this.
Move Name in Completed Move: thanked
Move Name in Lists: thankyou
Help Text Presentation: Thank the person to whom you delegated the work for completing it.

Move Menu Name: Cancel delegation
Composition Window Name: Cancel
Offered Message Text (can edit or delete): I'm cancelling the delegation I made to you.
Move Name in Completed Move: canceled delegation
Move Name in Lists: cancel
Help Text Presentation: Cancel (take back) the delegation, telling the person to whom you delegated that you no longer want him/her to complete it, for whatever reasons.

Move Menu Name: Cancel promise
Composition Window Name: Cancel Promise
Offered Message Text (can edit or delete): I'm sorry, but I can't/won't finish this as promised.
Move Name in Completed Move: canceled
Move Name in Lists: cancel
Help Text Presentation: Report or warn that you will not complete what was delegated to you, for whatever reason. This completes your part in the conversation.

Move Menu Name: Say thanks to an individual
Composition Window Name: Thank You
Offered Message Text (can edit or delete): Thank you!
Move Name in Completed Move: thanked
Move Name in Lists: thanks
Help Text Presentation: Express your thanks to one of the people in a group to which you made a request.

Move Menu Name: Cancel request
Composition Window Name: Cancel
Offered Message Text (can edit or delete): <none>
Move Name in Completed Move: canceled
Move Name in Lists: cancel
Help Text Presentation: Cancel this request and remove it from your active records.

Move Menu Name: <none>
Composition Window Name: Opening Promise
Offered Message Text (can edit or delete): <none>

Move Name in Completed Move: opened with a promise
Move Name in Lists: promise
Help Text Presentation: Promise to do something. Promises are completed when whomever you make the promise to acknowledges that the actions you promised have been completed.

Move Menu Name: Revise my counteroffer
Composition Window Name: Revise Counteroffer
Offered Message Text (can edit or delete): Please consider a different counteroffer:
Move Name in Completed Move: revised counteroffer
Move Name in Lists: newcount
Help Text Presentation: Revise the counteroffer you made. The other person will have a fresh opportunity to respond to your new counter.

Move Menu Name: Cancel
Composition Window Name: Cancel
Offered Message Text (can edit or delete): <none>
Move Name in Completed Move: cancelled
Move Name in Lists: decline
Help Text Presentation: Cancel your counteroffer, and your participation in the conversation, for whatever reason.

---------------- OFFER ----------------

Move Menu Name: Offer
Composition Window Name: Offer
Offered Message Text (can edit or delete): <none>
Move Name in Completed Move: offered
Move Name in Lists: offer
Help Text Presentation: Offer to do something, or propose to take joint action. Offers may be addressed to one or more people, and are completed when the addressees acknowledge that the offer has been fulfilled.

Move Menu Name: OK (accept offer)
Composition Window Name: Accept
Offered Message Text (can edit or delete): I accept your offer.
Move Name in Completed Move: accepted offer
Move Name in Lists: accept
Help Text Presentation: Accept the offer as it was made.

Move Menu Name: OK, except (counteroffer)
Composition Window Name: Counteroffer
Offered Message Text (can edit or delete): OK, if we agree to some changes:
Move Name in Completed Move: counteroffered
Move Name in Lists: counter
Help Text Presentation: Say that you accept the offer, provided that the other person accepts the exceptions and conditions you specify in this reply.

Move Menu Name: No, however (counteroffer)
Composition Window Name: Counteroffer
Offered Message Text (can edit or delete): No; however, you can do this instead:
Move Name in Completed Move: counteroffered
Move Name in Lists: counter
Help Text Presentation: Say that you don't accept the offer, but are willing to accept a different but similar offer that you describe here. If the other person accepts this counteroffer, normally s/he will interpret that you have agreed to do what you say in your reply.

Move Menu Name: No thank you (decline)
Composition Window Name: Decline
Offered Message Text (can edit or delete): <none>
Move Name in Completed Move: declined
Move Name in Lists: decline
Help Text Presentation: Say that you will not accept the offer, for whatever reason. This reply completes your part in the conversation.

Move Menu Name: Thanks (close)
Composition Window Name: Thank You
Offered Message Text (can edit or delete): Thanks for this.
Move Name in Completed Move: thanked
Move Name in Lists: thankyou Help Text Presentation: Acknowledge that the other person has fulfilled the offer, and close the conversation.

Move Menu Name: Postpone responding
Composition Window Name: Postpone Responding
Offered Message Text (can edit or delete): I'll get back to you later on this.
Move Name in Completed Move: postponed responding
Move Name in Lists: anslater
Help Text Presentation: Say that you are not able to respond to this right now, and say when you expect to be able to respond.

Move Menu Name: This is done (report)
Composition Window Name: Report Completion
Offered Message Text (can edit or delete): This is done.
Move Name in Completed Move: reported completion
Move Name in Lists: rpt-done
Help Text Presentation: Report that you have done what you offered.

Move Menu Name: Revise my offer
Composition Window Name: New Offer
Offered Message Text (can edit or delete): <none>
Move Name in Completed Move: made a new offer
Move Name in Lists: newoffer
Help Text Presentation: Cancel the offer you made and make a new one in its place.

Move Menu Name: Cancel (cancel offer)
Composition Window Name: Cancel
Offered Message Text (can edit or delete): <none>
Move Name in Completed Move: canceled offer
Move Name in Lists: cancel
Help Text Presentation: Cancel the offer you made without making a new offer, for whatever reason. This reply completes your participation in the conversation.

Move Menu Name: Report progress
Composition Window Name: Progress Report
Offered Message Text (can edit or delete): Here's a progress report:
Move Name in Completed Move: reported progress
Move Name in Lists: progrept
Help Text Presentation: Report that work has started, is progressing, or that progress has not been made.

Move Menu Name: No thanks (cancel)
Composition Window Name: Cancel Conversation
Offered Message Text (can edit or delete): <none>
Move Name in Completed Move: canceled conversation
Move Name in Lists: cancel
Help Text Presentation: Cancel your previous acceptance of the offer, for whatever reason. This reply completes your participation in the conversation.

Move Menu Name: Retract counteroffer
Composition Window Name: Retract My Counteroffer
Offered Message Text (can edit or delete): I'm sorry, but I take back my counteroffer.
Move Name in Completed Move: retracted counteroffer
Move Name in Lists: retract
Help Text Presentation: Take back the counteroffer you made. The original offer still stands.

Move Menu Name: Agree to offer
Composition Window Name: Accept
Offered Message Text (can edit or delete): I accept your counteroffer.
Move Name in Completed Move: accepted counteroffer
Move Name in Lists: accept
Help Text Presentation: Agree to accept the other person's conditions, exceptions, and/or stipulations about what will be produced.

Move Menu Name: No thank you (decline)
Composition Window Name: Decline
Offered Message Text (can edit or delete): <none>
Move Name in Completed Move: declined counteroffer
Move Name in Lists: decline
Help Text Presentation: Say you do not accept the other person's conditions, exceptions, and/or stipulations about what will be produced. Your original offer is still in force.

Move Menu Name: More, please (decline rprt)
Composition Window Name: Decline
Offered Message Text (can edit or delete): <none>
Move Name in Completed Move: declined report
Move Name in Lists: decline
Help Text Presentation: Acknowledge the report you received, and ask the other person to do more or different work to complete what was defined in the conversation.

Move Menu Name: Please reconsider
Composition Window Name: Ask Reconsideration
Offered Message Text (can edit or delete): <none>
Move Name in Completed Move: asked reconsideration
Move Name in Lists: askrecon
Help Text Presentation: Ask that the other person reconsider your offer, for reasons you stipulate.

Move Menu Name: Please reconsider
Composition Window Name: Ask Reconsideration
Offered Message Text (can edit or delete): <none>
Move Name in Completed Move: asked reconsideration
Move Name in Lists: askrecon
Help Text Presentation: Use this reply to acknowledge the current state of the conversation (whatever it is and whether or not you are satisfied with it), announce that you are finished with the conversation, and move it to an inactive state in your records.

Move Menu Name: Make another counteroffer
Composition Window Name: Another Counteroffer
Offered Message Text (can edit or delete): <none>
Move Name in Completed Move: counteroffered again
Move Name in Lists: counter
Help Text Presentation: Use this reply to acknowledge the current state of the conversation (whatever it is and whether or not you are satisfied with it), announce that you are finished with the conversation, and move it to an inactive state in your records.

Move Menu Name: Acknowledge and close
Composition Window Name: Acknowledge Cancellation
Offered Message Text (can edit or delete): <none>
Move Name in Completed Move: acknowledged and closed
Move Name in Lists: ack/done
Help Text Presentation: Use this reply to acknowledge the current state of the conversation (whatever it is and whether or not you are satisfied with it), announce that you are finished with the conversation, and move it to an inactive state in your records.

---------------- QUESTION ----------------

Move Menu Name: Question
Composition Window Name: Question
Offered Message Text (can edit or delete): <none>
Move Name in Completed Move: questioned
Move Name in Lists: question
Help Text Presentation: Ask a question or make a simple request that will be addressed to one or more people. The conversation will be closed by the questioner's acknowledgment.

Move Menu Name: Answer
Composition Window Name: Answer
Offered Message Text (can edit or delete): <none>
Move Name in Completed Move: answered
Move Name in Lists: answer
Help Text Presentation: Provide an answer to the question. This reply completes your part in the conversation.

Move Menu Name: Promise to answer later
Composition Window Name: Promise to Answer Offered Message Text (can edit or delete): I'll get back to you later on this.
Move Name in Completed Move: promised to answer
Move Name in Lists: anslater
Help Text Presentation: Promise to answer to the question at a later date.

Move Menu Name: Delegate it
Composition Window Name: Delegate
Offered Message Text (can edit or delete): Please answer this for me:
Move Name in Completed Move: delegated question
Move Name in Lists: delegate
Help Text Presentation: Ask someone else to handle the question for you. You can inform the original questioner that you have delegated by copying him/her, or not, as you choose.

Move Menu Name: Can't, won't or no (decline)
Composition Window Name: Decline
Offered Message Text (can edit or delete): <none>
Move Name in Completed Move: declined to answer
Move Name in Lists: decline
Help Text Presentation: Say that you will not answer the question, for whatever reason. You are not available, don't have the authority to answer, or while you have the choice, you simply elect not to answer. This reply completes your part in the conversation. As alternatives, consider delegating or counteroffering.

Move Menu Name: Report progress
Composition Window Name: Progress Report
Offered Message Text (can edit or delete): Here's a progress report:
Move Name in Completed Move: reported progress
Move Name in Lists: progrept
Help Text Presentation: Report that work has started, is progressing, or that progress has not been made.

Move Menu Name: Thanks (close)
Composition Window Name: Thank You
Offered Message Text (can edit or delete): Thank you.
Move Name in Completed Move: thanked
Move Name in Lists: thankyou
Help Text Presentation: Acknowledge that you are satisfied with the answer, and close the conversation. This reply moves the conversation into an inactive state in your records.

Move Menu Name: Acknowledge and close
Composition Window Name: Acknowledge Revoked Promise
Offered Message Text (can edit or delete): <none>
Move Name in Completed Move: acknowledged and closed
Move Name in Lists: ack/done
Help Text Presentation: Use this reply to acknowledge the current state of the conversation (whatever it is and whether or not you are satisfied with it), announce that you are finished with the conversation, and move it to an inactive state in your records.

Move Menu Name: Revise my question
Composition Window Name: New Question
Offered Message Text (can edit or delete): Please start over again with this question:
Move Name in Completed Move: asked new question
Move Name in Lists: strtover
Help Text Presentation: Ask a new question in place of the one you asked before. Your addressee(s) will have a fresh opportunity to respond to the new question.

Move Menu Name: Retract my question
Composition Window Name: Retract
Offered Message Text (can edit or delete): <none>
Move Name in Completed Move: retracted question
Move Name in Lists: cancel
Help Text Presentation: Cancel (take back) the question you asked, for whatever reason.

Move Menu Name: Revise date for answer

Composition Window Name: New Answer Date
Offered Message Text (can edit or delete): <none>
Move Name in Completed Move: gave new date for answer
Move Name in Lists: newprom
Help Text Presentation: Ask the other person to accept your answer on a different date; or begin a new negotiation about when you'll answer.

Move Menu Name: Cancel my promise
Composition Window Name: Cancel
Offered Message Text (can edit or delete): <none>
Move Name in Completed Move: canceled promise
Move Name in Lists: cancel
Help Text Presentation: Report or warn that you will not answer the question as you had promised, for whatever reason, and without offering additional help. This reply completes your part in the conversation.

Move Menu Name: More, please (decline ans)
Composition Window Name: Decline
Offered Message Text (can edit or delete): <none>
Move Name in Completed Move: declined answer
Move Name in Lists: decline
Help Text Presentation: Acknowledge the answer you received, and ask the other person to do more or different work on the question.

Move Menu Name: Please reconsider
Composition Window Name: Ask Reconsideration
Offered Message Text (can edit or delete): <none>
Move Name in Completed Move: asked reconsideration
Move Name in Lists: askrecon
Help Text Presentation: Ask that the other person reconsider answering your question, for reasons you stipulate.

Move Menu Name: Acknowledge and close
Composition Window Name: Acknowledge Cancellation
Offered Message Text (can edit or delete): <none>
Move Name in Completed Move: acknowledged and closed
Move Name in Lists: ack/done
Help Text Presentation: Use this reply to acknowledge the current state of the conversation (whatever it is and whether or not you are satisfied with it), announce that you are finished with the conversation, and move it to an inactive state in your records.

Move Menu Name: Please reconsider
Composition Window Name: Ask Reconsideration
Offered Message Text (can edit or delete): <none>
Move Name in Completed Move: asked reconsideration
Move Name in Lists: askrecon
Help Text Presentation: Ask that the other person reconsider cancelling this question, for reasons you stipulate.

Move Menu Name: Please reconsider
Composition Window Name: Ask Reconsideration
Offered Message Text (can edit or delete): <none>
Move Name in Completed Move: asked reconsideration
Move Name in Lists: askrecon
Help Text Presentation: Ask that the other person reconsider his/her decision not to answer this question, for reasons you stipulate.

Move Menu Name: Answer
Composition Window Name: Answer
Offered Message Text (can edit or delete): <none>
Move Name in Completed Move: answered
Move Name in Lists: answer
Help Text Presentation: Answer the question delegated to you, thereby completing your part in the conversation.

Move Menu Name: OK (promise to answer)
Composition Window Name: Accept
Offered Message Text (can edit or delete): I will answer:
Move Name in Completed Move: accepted delegation Move Name in Lists: acc-del
Help Text Presentation: Accept the delegation, thereby promising to answer the delegated question at a later date.

Move Menu Name: No (decline to answer)
Composition Window Name: Decline
Offered Message Text (can edit or delete): <none>
Move Name in Completed Move: declined delegation
Move Name in Lists: decl-del
Help Text Presentation: Say that you will not accept the delegation, and complete your part in the conversation.

Move Menu Name: Thanks to delegatee
Composition Window Name: Thank You
Offered Message Text (can edit or delete): Thanks for handling this.
Move Name in Completed Move: thanked
Move Name in Lists: thanks
Help Text Presentation: Thank the person to whom you delegated the question for answering it.

Move Menu Name: Cancel delegation
Composition Window Name: Cancel
Offered Message Text (can edit or delete): I'm sorry, but I am cancelling this.
Move Name in Completed Move: canceled delegation
Move Name in Lists: cancel
Help Text Presentation: Cancel (take back) the question you delegated, telling the person that you no longer want him/her to answer it.

Move Menu Name: Cancel (cancel promise)
Composition Window Name: Cancel
Offered Message Text (can edit or delete): I'm sorry, but I can't/won't answer this as promised.
Move Name in Completed Move: canceled promise
Move Name in Lists: cancel
Help Text Presentation: Report or warn that you will not be answering the question as promised, for whatever reason.

---------------- INFORM ----------------

Move Menu Name: Inform
Composition Window Name: Inform
Offered Message Text (can edit or delete): <none>
Move Name in Completed Move: informed
Move Name in Lists: inform
Help Text Presentation: Provide information, a simple suggestion, report news or progress, or distribute policies or procedures to one or more people. Informs are completed by the acknowledgment of those informed.

Move Menu Name: Thank you (close)
Composition Window Name: Thank You
Offered Message Text (can edit or delete): Thanks for bringing this to my attention.
Move Name in Completed Move: thanked
Move Name in Lists: thankyou
Help Text Presentation: Acknowledge that you have read the inform. This reply completes your part in the conversation.

Move Menu Name: Disregard the last (cancel)
Composition Window Name: Cancel
Offered Message Text (can edit or delete): Please disregard my inform.
Move Name in Completed Move: canceled
Move Name in Lists: cancel
Help Text Presentation: Cancel (take back) what you said in your previous inform, for whatever reason.

Move Menu Name: Provide additional info
Composition Window Name: Additional Information
Offered Message Text (can edit or delete): Here's more on that matter:
Move Name in Completed Move: provided additional information
Move Name in Lists: add-info
Help Text Presentation: Add to, modify, or update your inform.

---------------- WHAT IF ----------------

Move Menu Name: What if?
Composition Window Name: Open a Speculation
Offered Message Text (can edit or delete): <none>
Move Name in Completed Move: opened a speculation
Move Name in Lists: whatif
Help Text Presentation: Speculate about actions that could be taken, about problems or new opportunities for action, or about conditions that could constrain opportunities (to one or more addressees). What if conversations are useful for groups to prepare agendas, lists, announcements, etc. The person who begins a What if conversation is the one who completes it.

Move Menu Name: Continue the speculation
Composition Window Name: Continue Speculation
Offered Message Text (can edit or delete): <none>
Move Name in Completed Move: continued the speculation
Move Name in Lists: whatif
Help Text Presentation: Speculate about actions that could be taken, about problems or new opportunities for action, or about conditions that could constrain opportunities (to one or more addressees). What if conversations are useful for groups to prepare agendas, lists, announcements, etc. The person who begins a What if conversation is the one who completes it.

Move Menu Name: Continue the speculation
Composition Window Name: Continue Speculation
Offered Message Text (can edit or delete): <none>
Move Name in Completed Move: continued the speculation
Move Name in Lists: whatif
Help Text Presentation: Speculate about actions that could be taken, about problems or new opportunities for action, or about conditions that could constrain opportunities (to one or more addressees). What if conversations are useful for groups to prepare agendas, lists, announcements, etc. The person who begins a What if conversation is the one who completes it.

Move Menu Name: Close the speculation
Composition Window Name: Close Speculation
Offered Message Text (can edit or delete): <none>
Move Name in Completed Move: closed the speculation
Move Name in Lists: closwif
Help Text Presentation: Close the What if conversation.

Move Menu Name: What if?
Composition Window Name: Open Speculation with Myself
Offered Message Text (can edit or delete): <none>
Move Name in Completed Move: opened speculation with myself
Move Name in Lists: whatif
Help Text Presentation: Open a conversation with yourself in which you speculate about actions that could be taken, about problems or new opportunities for action, or about conditions that could constrain opportunities.

Move Menu Name: Close the speculation
Composition Window Name: Close Speculation
Offered Message Text (can edit or delete): <none>
Move Name in Completed Move: closed the speculation
Move Name in Lists: closwif
Help Text Presentation: Close the speculation.

Move Menu Name: Continue the speculation
Composition Window Name: Continue Speculation
Offered Message Text (can edit or delete): <none>
Move Name in Completed Move: continued the speculation
Move Name in Lists: whatif
Help Text Presentation: Speculate with yourself about possible actions, about problems or new opportunities for action, or about conditions that could constrain opportunities.

---------------- NOTE ----------------

| | |
|---|---|
| Move Menu Name: | Note |
| Composition Window Name: | Note |
| Offered Message Text (can edit or delete): | <none> |
| Move Name in Completed Move: | noted |
| Move Name in Lists: | note |
| Help Text Presentation: | Send a simple note to one or more people, where the response, the record of the note, and subsequent actions do not need to be managed. |

---------------- ADDITIONAL ----------------

| | |
|---|---|
| Move Menu Name: | Ask about progress |
| Composition Window Name: | Asking for Reply or Progress Report |
| Offered Message Text (can edit or delete): | Please tell me about the status of this. |
| Move Name in Completed Move: | asked for reply or progress report |
| Move Name in Lists: | askprog |
| Help Text Presentation: | Prompt for a reply or ask about progress. |

| | |
|---|---|
| Move Menu Name: | Comment |
| Composition Window Name: | Comment |
| Offered Message Text (can edit or delete): | <none> |
| Move Name in Completed Move: | commented |
| Move Name in Lists: | comment |
| Help Text Presentation: | Your reply is an informal communication in the middle of a managed conversation. Use it to make a comment, ask a question, digress on details of the conversa- tion, have a side conversation with someone else, or make a note to yourself about the conversation. |

| | |
|---|---|
| Move Menu Name: | Acknowledge receipt |
| Composition Window Name: | Acknowledging Receipt |
| Offered Message Text (can edit or delete): | I received your %s, dated %s. Thank you. |
| Move Name in Completed Move: | acknowledged receipt |
| Move Name in Lists: | acknowlg |
| Help Text Presentation: | Acknowledge that you read this communication. |

Table 33

```
Read  Compose  Calendar  Organize  File  Edit  Tools  Exit  Help

List unopened mail        F2
Open enclosure...
-----------------------------
Trace...

Enter  Esc=Cancel  F1=Help  F10=Actions          Mon 19-Jun  9:26am
```

Table 34

```
Read  Compose  Calendar  Organize  File  Edit  Tools  Exit  Help
                Show calendar...
                ----------------------
                Set appointment...
                Set reminder...
                Confirm event...
                Move/repeat event(s)...
                ----------------------
                Group calendar...

Enter  Esc=Cancel  F1=Help  F10=Actions              Mon 19-Jun  9:26am
```

Table 35

```
Read  Compose  Calendar  Organize  File  Edit  Tools  Exit  Help
                          Review...          Alt+F7
                          Categorize...
                          Link...
                          ----------------------
                          History of conversation
                          Status of conversation

Enter  Esc=Cancel  F1=Help  F10=Actions              Mon 19-Jun  9:26am
```

Table 36

```
Read  Compose  Calendar  Organize  File  Edit  Tools  Exit  Help

                          Review...          Alt+F7

                            • By type          All open matters
                            • By dates         Any date
                            • By categories    Any of dallas, design
                            • With             Anybody

                            Save settings
                            OK - build list

Enter  Esc=Cancel  F1=Help  F10=Actions  End=OK          Mon 19-Jun  9 26am
```

Table 37

```
Read  Compose  Calendar  Organize  File  Edit  Tools  Exit  Help

                          Review...          Alt+F7

                           • By type          All open matters

                        A  All open matters        K  Enclosures

                        B  All promises            L  All missing replies
                        C  My promises             M  Missing my replies
                        D  Their promises          N  Missing their replies

                        E  All requests            O  Where I'm copied
                        F  My requests             P  Without reminders
                        G  Their requests          Q  Marked for deletion

                        H  Other offers/informs    R  All conversations
                        I  What ifs                S  All communications
                        J  Notes                   T  Closed matters

Enter  Esc=Cancel  F1=Help  F10=Actions                  Mon 19-Jun  9:26am
```

Table 38

```
 Read  Compose  Calendar  Organize  File  Edit  Tools  Exit  Help
 ------------------------------------------------------------------
                        History of my request
  Dated                                           Subject
   24-Mar  my       request  -> lburton,+         Marketing analysis
   24-Mar  my       comment  -> lburton,+      E  Marketing analysis
   24-Mar  wwittenb promise  -> me                Marketing analysis
   24-Mar  my       acknowlg -> wwittenb          Marketing analysis
 ▸ 28-Mar  my       askprog  -> lburton,+         Marketing analysis
   28-Mar  lburton  comment  -> me                Marketing analysis
   30-Mar  rflores  promise  -> me                Marketing analysis
   30-Mar  my       acknowlg -> rflores           Marketing analysis
    8-Jun  Appt      9:00am  -> 11:00am           Marketing analysis

 Enter  Esc  Del  F1=Help  F10=Actions  /=Mark set    L:5    Thu  8-Jun  5:20pm
```

What is claimed is:

1. The machine-implemented method for managing business, social, and/or personal communications in which a communication among a set of participants is treated as a move in one of a first type of conversation for declaring specific realizable possibilities and a second type of conversation for producing action to complete a specific declared possibility, said method utilizing a computer system including a user input/output interface and a record storage system and being based on a predefined set of conversational roles played by participants in said conversations, with each participant playing at least one conversational role in any one of said conversations;

a preselected set of types of incompletions which occur recurringly within said conversations, including a first type in which a conversational move by at least one participant to declare at least one specific realizable possibility is missing, and a second type in which a conversational move by at least one participant to complete a specific realizable possibility is missing;

a set of types of permitted moves for each of said first type of conversation and said second type of conversation, including at least one predefined initial type of move and subsequent types of moves preselected on the basis of a functional relationship among said types of incompletions, said conversational roles, and a specific subset of said types of incompletions produced by each of said initial and subsequent types of moves;

a preselected set of associated data for each of said initial and subsequent types of moves;

a predefined conversation record format for each of said conversations comprising identities and roles of participants, incompletions, and a pre-defined body of data associated with each move in the coversation, including the type of move;

said method comprising the steps of:

a. presenting to one participant via said user input/output interface device a selection menu comprising menu elements for selecting one of Task 1 comprising opening a new conversation of one of said first type and second type, Task 2 comprising selecting an existing conversation in which to make a subsequent type of move, and Task 3 comprising reviewing one of all initial types of moves and subsequent types of moves by other participants in all conversations in which said one participant plays one of said conversational roles;

b. responding to a selection by said one participant of said Task 1 via said interface device by performing a sequence of steps comprising:

b.1. prompting said one participant via said interface device to select an initial move in one of said first and second types of conversations;

b.2. prompting said one participant via said interface device to enter said set of associated data for said selected initial move; and b.3. responding to entry of said set of associated data by creating and storing in said record storage system a new conversation record corresponding to said conversation record format, including said associated data and said types of incompletions produced by said selected initial type of move;

c. responding to a selection by said one participant of said Task 2 via said interface device by performing a sequence of steps comprising:

c.1. deriving from said stored conversation record of said selected existing conversation a subset of said set of moves comprising currently permitted moves for said one participant;

c.2. prompting said one participant via said interface device to select one of said currently permitted moves;

c.3. prompting said one participant via said interface device to enter said set of associated data for said selected one of said currently permitted moves; and c.4. responding to entry of said set of associated data by updating and storing in said record storage system said conversation record corresponding to said selected conversation, including said associated data and said types of incompletions produced by said selected one of said currently permitted moves.

2. The method of claim 1 adapted for use by a predetermined community of participants in conversations, wherein said set of types of permitted moves is provided by selecting a particular name for each of said moves which will enable said participants to distinguish the characteristics of said move according to the common understanding of said community.

3. The method of claim 1 adapted for use by participants in different predetermined communities having different languages or different terminologies for the same conversational move and said set of types of permitted moves is based on selecting a particular set of names for each of said moves corresponding to said different communities with each name for each community enabling participants in that community to distinguish the characteristics of said move according to the common understanding of that community; and said steps a., b., and c. are based on a preselected one of said sets of move names.

4. The method of claim 2, further comprising the step of creating for each of said predefined types of moves an explanatory help text discussing the distinctions of said move; and said steps b.1. and c.2. include the step of providing a facility for said participants to access said explanatory help text for each of said initial and permitted moves.

5. The method of claim 1, wherein each of a plurality of said defined types of moves has associated therewith a body of recommended declarative text pertinent to said move; and said steps b.2. and c.3. includes the step of displaying to said participant said body of recommended declarative text associated with said selected move for possible use by said participant as an element of data associated with said move.

6. The method of claim 1, wherein said first type of defined incompletions specifically includes RESPONSE IS MISSING and said second type of defined incompletions specifically includes FULFILLMENT IS MISSING; and said Task 2 includes providing facilities for use of each participant to select one or more sort criteria from a predefined set of conversation record sort criteria comprising:

said participant's RESPONSE IS MISSING,
another participant's RESPONSE IS MISSING,
said participant's FULFILLMENT IS MISSING,
another participant's FULFILLMENT IS MISSING,
any incompletions present, and
no incompletions present;

gathering conversation records in accordance with said selected sort criteria; and displaying data from said gathered conversation records to said participant in a prearranged display format.

7. The method of claim 6, wherein said predefined set of conversation record sort criteria further comprises:

domain of possibilities,
identity of participant,
specific current incompletions
which participant's move is currently missing.

8. The method of claim 1, wherein said incompletions in said conversation record format comprise tokens associating time with at least some of said incompletions; and said steps b.2. and c.d. each include providing a facility for said participant to enter time data for any incompletions which are created or altered in making said initial move or said selected move.

9. The method of claim 8, wherein said Task 2 including the steps of:

providing a facility for use of each participant to select a sort criteria in the form of a specific moment in time or a period of time;

gathering conversation records in accordance with said selected sort criteria; and displaying data from said gathered conversation records to said participant in a prearranged display format.

10. The method of claim 8, wherein said said set of types of incompletions includes a third type of incompletion in which what is incomplete is the realization of the declared possibility that a physical entity be located in a specified location, or be employed for a specified purpose, at a particular time; and said set of types of permitted moves includes a single type of permitted calendar move by a participant by declaring said third type of incompletion;

and said method includes the steps of:

providing facilities for each participant to make said single type of permitted calendar move, including entering the appointed time and duration of said incompletions and entering declarations regarding said specific location or said specific purpose;

providing a facility for said participant making said single type of permitted calendar move to link said move to an existing conversation or to open a new conversation with said move;

creating a new conversation record for said move if it opens a new conversation by assembling said incompletions and said declarations according to said conversation record format, and storing said new conversation record in at least one file;

updating the conversation record of said existing conversation if said move is linked thereto by said participant, said updating including storing said incompletions and said declarations according to said conversation record format;

providing a facility for each participant to select a sort criteria for conversation records comprising a date or a range of dates;

gathering conversation records in accordance with said selected sort criteria; and displaying data from said gathered conversation records to said participant in a prearranged display format.

11. The method of claim 1, further including the steps of:

providing facilities for each participant to select a subset of sort criteria from a predefined set of conversation record sort criteria including a plurality of incompletions;

gathering conversation records in accordance with said selected sort criteria; and displaying data from said gathered conversation records to said participant in a prearranged display format.

12. The method of claim 1 adapted for use in situations wherein each of at least a plurality of participants is utilizing a separate programmed computer system and said separate systems are linked by a communication channel, wherein said conversation record format includes a conversation identification token;

said step b.3. includes the steps of creating a unique conversation identifier for said new conversation and entering said identifier into said identification token of said conversation record;

and said conversation management program further includes the steps of:

assembling a predefined packet of data associated with each move by a participant in a new or existing conversation which includes another participant using a separate system, said packet including said conversation identifier for said conversation;

providing a facility to send and receive said predefined packet of data via said communication channel;

using said conversation identifier in each received packet of data to determine whether said packet is associated with a new conversation or an existing conversation;

creating a new conversation record for each of said received packets of data associated with a new conversation; and retrieving and updating a stored conversation record for each of said received packets of data associated with an existing conversation.

13. The method of claim 1, wherein said step b. includes the step of providing a facility for a participant to initiate a multiple participant conversation by designating a plurality of other participants as principal participants in the conversation, and said method further includes maintaining a separate set of conversation records for each of said designated participants;

providing a facility for each designated participant to make a move in said multiple participant conversation; and managing incompletions and the state of said multiple participant conversation in said conversation records for each of said designated participants based on a preselected algorithm which includes the current state in said participants conversation record and the role of said participant in said multiple participant conversation.

14. The method of claim 1, wherein one of said permitted moves in said set of types of permitted moves is a DELEGATE move which opens a separate subconversation between at least a Participant-Delegator and a Participant-Delegatee, and said method further includes:

maintaining a common conversation record identifier for both the initial conversation and the delegate conversation in the conversation records of said Participant-Delegator;

storing in said conversation record of said Participant-Delegator a set of tokens of incompletion relating both to the initial conversation and said delegate conversation; and maintaining in said conversation record of said Participant-Delegator records of all moves in both the initial conversation and said delegate conversation.

15. Apparatus for managing an electronic conversation between at least a first and a second participant with said electronic conversation being defined by a set of assigned roles for said participants, a set of unique conversation states including an initial state and a final state with each of said states being defined in accordance with a prearranged set of incompletions represented by token data elements, and a set of permitted moves for each of said participants including an initial move, comprising conversation opening means for providing a first participant with a facility to open an electronic conversation with at least a second participant by selecting an initial electronic move, including means for recording in a conversation record associated with each of said participants prearranged data elements including said assigned roles, a conversation state consisting of said initial state, and a set of token data elements comprising incompletions based on said assigned roles and said initial electronic move; and conversation continuing means for presenting to one of said participants a list of permitted electronic moves in said electronic conversation based on data elements in said conversation record, including said assigned role of said one participant and said conversation state, and for responding to and recording a move selected by said one participant from said list, including means for updating said conversation record based on said selected electronic move with a conversation state comprising the current conversation state after said selected electronic move and a set of token data elements comprising current incompletions after said selected electronic move.

16. Apparatus for managing communications among a plurality of participants comprising means for providing each participant with a facility to open an electronic conversation with a plurality of other participants with an initial electronic move, said electronic conversation being defined by a plurality of unique states, said unique states each being defined by a set of incompletions represented by token data elements, including means for assigning unique roles in said electronic conversation to each of said participants based on said initial electronic move and means for recording in a separate record associated with each participant prearranged data elements associated with said initial electronic move including a separate set of incompletions for each said participant based on said assigned roles and said initial electronic move; and means for presenting to one of said participants a list of permitted electronic moves in said electronic conversation based on said record associated with said participant, including said role of said participant, and for responding to and recording a move selected by said participant from said list of permitted electronic moves, including means for recording data associated with said selected electronic move and for updating said record of incompletions associated with each of said particpants based on said selected electronic move and the role of each said participant in said conversation.

17. Apparatus for managing communications among a plurality of participants comprising a plurality of participant specific computer systems and means for communicating data among said participant specific computer systems, each of said participant specific computer systems comprising means for providing a participant with a facility to open an electronic conversation with a plurality of other participants with an initial electronic move, said electronic conversation being defined by a plurality of unique states, said unique states each being defined by a set of incompletions represented by token data elements, including means for assigning unique roles in said electronic conversation to each of said participants based on said initial electronic move, means for recording in a record prearranged data elements associated with said initial electronic move including a set of incompletions for said participant based on said participants assigned role and said initial electronic move, and means for transmitting a record of said initial electronic move to each of said participant specific computer systems associated with said other participants over said communicating means;

means for receiving via said communicating means an initial electronic move from another participant and for recording in a record prearranged data elements associated with said initial electronic move including a set of incompletions for said participant based on said participants assigned role and said initial electronic move;

means for receiving via said communicating means a new electronic move by another particpant in an existing conversation and for updating said record of incompletions associated with said particpant based on said new electronic move;

means for providing said participant with a facility to continue an electronic conversation with one of said other participants, including means for selecting one of a plurality of conversations, means for displaying data associated with prior moves in said conversation, means for presenting to said particpant a list of permitted electronic moves in said electronic conversation based on said record associated with said conversation and for responding to and recording a move selected by said participant from said list of permitted electronic moves, including means for recording data associated with said selected electronic move and for updating said record of incompletions associated with said particpant based on said selected electronic move, and means for transmitting a record of said selected electronic move to each of said participant specific computer systems associated with said other participants in said conversation over said communicating means.

18. Apparatus as claimed in claim 17, wherein said means for selecting one of a plurality of conversations includes means for selectively displaying a list of all electronic conversations in which an initial move or a new move has been received or a list of all electronic conversations which share a preselected set of values of tokens of incompletion.

19. The machine implemented method for managing communications utilizing a computer system including a user input/output display and selection interface and a record storage system comprising the steps of:

(a) presenting to a participant via said user input/output interface a listing of initial electronic moves available for opening an electronic conversation being defined by a plurality of unique states with said unique states being defined in terms of a set of incompletions represented by token data elements and having associated therewith a preselected set of permitted moves, (b) responding to selection by said participant of an initial electronic move by (b-1) assigning a role to said particpant based on said initial electronic move, (b-2) recording in said record storage system a record comprising prearranged data elements associated with said initial electronic move including a set of incompletions based on said assigned role and said initial electronic move;

(c) presenting to a participant via said user input/output interface a list of permitted electronic moves in said electronic conversation based on said record, and (d) responding to selection by said participant of one of said permitted electronic moves via said user input/output interface by (d-1) recording data associated with said selected electronic move in said record storage system, and (d-2) updating said set of incompletions in said record based on said selected electronic move.

* * * * *